United States Patent
Ohki

(10) Patent No.: US 9,813,626 B2
(45) Date of Patent: Nov. 7, 2017

(54) IMAGE SENSOR, OPERATING METHOD THEREFOR, AND ELECTRONIC DEVICE

(71) Applicant: Sony Semiconductor Solutions Corporation, Kanagawa (JP)

(72) Inventor: Mitsuharu Ohki, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 317 days.

(21) Appl. No.: 14/513,515

(22) Filed: Oct. 14, 2014

(65) Prior Publication Data

US 2015/0108329 A1    Apr. 23, 2015

(30) Foreign Application Priority Data

Oct. 21, 2013 (JP) ................... 2013-218176

(51) Int. Cl.
*H01L 27/00*     (2006.01)
*H04N 5/232*     (2006.01)
*H04N 5/217*     (2011.01)

(52) U.S. Cl.
CPC ....... *H04N 5/23254* (2013.01); *H04N 5/2173* (2013.01); *H04N 5/23251* (2013.01)

(58) Field of Classification Search
CPC ............... H04N 5/2173; H04N 5/2354; H04N 5/23232; H01L 27/146; H01L 27/14601

USPC ...... 250/208.1; 348/208.1, 208.2, 208.4, 308
See application file for complete search history.

(56) References Cited

U.S. PATENT DOCUMENTS

2013/0076940 A1*  3/2013  Kimura .............. H04N 5/23254
                                                        348/229.1

FOREIGN PATENT DOCUMENTS

| JP | 2001-358999 A | 12/2001 |
| JP | 2006-287946 A | 10/2006 |
| JP | 2006-304313 A | 11/2006 |
| JP | 2006-311544 A | 11/2006 |
| JP | 2012-080490 A | 4/2012 |
| JP | 2013-074372 A | 4/2013 |

* cited by examiner

*Primary Examiner* — Kevin Pyo
(74) *Attorney, Agent, or Firm* — Sheridan Ross P.C.

(57) ABSTRACT

An image sensor includes: a plurality of light-receiving elements that receive light from a subject and are arranged in a 2-dimensional form; a detection unit that detects a movement amount of a projected image of the subject projected to the plurality of light-receiving elements arranged in the 2-dimensional form; and a light-receiving element control unit that adaptively controls a timing at which pixel data is read from the plurality of light-receiving elements arranged in the 2-dimensional form for each line according to the movement amount.

12 Claims, 77 Drawing Sheets

FIG. 59

```
// first exposure lines for motion capture
if(readNumForCurMotCapt == 4){
    if((1*HM/4) <= timeHM){
        if(timeHM == (1*HM/4)+1){ // Note:(1*HM/4) is even value.
            if(0 <= latestReadForCurMotCapt[0] && latestReadForCurMotCapt[0] <= HS-1){
                presentReadLineForCurMotCapt[0]=latestReadForCurMotCapt[0];
                out[presentReadLineForCurMotCapt[0]]=DoFirstQuarterRead;
            }
        }else{
            if(latestReadForCurMotCapt[0]+2 <= floor(readPositionForCurMotCapt[0])){
                latestReadForCurMotCapt[0]=latestReadForCurMotCapt[0]+2 ;
                if(0 <= latestReadForCurMotCapt[0] && latestReadForCurMotCapt[0] <= HS-1){
                    presentReadLineForCurMotCapt[0]=latestReadForCurMotCapt[0];
                    out[presentReadLineForCurMotCapt[0]]=DoFirstQuarterRead;
                }
            }
        }
    }
}
```

S212

IMAGE SENSOR, OPERATING METHOD THEREFOR, AND ELECTRONIC DEVICE

CROSS REFERENCE TO RELATED APPLICATIONS

This application claims the benefit of Japanese Priority Patent Application JP 2013-218176 filed Oct. 21, 2013, the entire contents of which are incorporated herein by reference.

BACKGROUND

The present technology relates to an image sensor, an operating method therefor, and an electronic device, and more particularly, to an image sensor, an operating method therefor, and an electronic device configured to reduce a blur and a rolling shutter phenomenon.

Since complementary metal oxide semiconductor (CMOS) image sensors which have become the mainstream of recent image sensors perform line-sequential reading, a rolling shutter phenomenon may occur. When moving images are captured with digital cameras during movement, images may be distorted.

This distortion can be prevented by performing line-sequential reading at a high speed. That is, for a moving image of 60 fps (frame/second), pixel data corresponding to 1 frame is normally read for $1/60$ seconds. In this case, for example, by speeding up pixel data corresponding to 1 frame and reading all of the pixel data for $1/480$ seconds, it is possible to suppress the rolling shutter phenomenon to $1/8$.

Incidentally, when the pixel data is finally displayed on a display or is recorded on a recording medium on a rear stage, the pixel data corresponding to 1 frame has to be transmitted continuously (not intermittently) at a data rate of $1/60$ seconds. Accordingly, when all of the pixels are read from an image sensor for $1/480$ seconds, it is necessary to store the pixel data in a frame memory once and then adjust a timing so that the pixel data corresponding to 1 frame is continuously output for $1/60$ seconds. Accordingly, in the method of the related art, the frame memory is a requisite constituent.

Technologies for correcting the rolling shutter phenomenon by controlling timings at which pixel data is read from image sensors have been suggested (Japanese Unexamined Patent Application Publication No. 2012-080490 and Japanese Unexamined Patent Application Publication No. 2013-074372). More specifically, the technologies of Japanese Unexamined Patent Application Publication No. 2012-080490 and Japanese Unexamined Patent Application Publication No. 2013-074372 are technologies for reading odd lines sequentially from the lower side to the upper side, reading even lines sequentially from the upper side to the lower side reversely, and performing correction in image processing from the 2 sets of data groups. In this case, when the process is performed, the pixel data of the adjacent even and odd lines are simultaneously necessary. Accordingly, in these technologies, frame memories are necessary and a device cost imposes a burden.

A technology for correcting the rolling shutter phenomenon only in a horizontal direction has also been suggested (Japanese Unexamined Patent Application Publication No. 2001-358999).

Technologies for correcting the rolling shutter phenomenon in the vertical and horizontal directions have been suggested (Japanese Unexamined Patent Application Publication No. 2006-287946, Japanese Unexamined Patent Application Publication No. 2006-304313, and Japanese Unexamined Patent Application Publication No. 2006-311544). In these technologies, correction of the rolling shutter phenomenon has been embodied by dynamically switching reading timings from image sensors. However, description of a reset timing is not made and is unclear.

SUMMARY

In the above-described technologies, however, a frame memory is a requisite constituent in order to correct the rolling shutter phenomenon. Therefore, a device cost generally increases.

Further, when the rolling shutter phenomenon is corrected and then imaging is performed so that the position of a subject in an image is fixed to a predetermined position in a moving image, it is necessary to cancel (suppress) a blur. In the above-described technologies, however, a process of cancelling the blur has not been realized. For this reason, when the rolling shutter phenomenon is corrected and then imaging is performed so that the position of a subject in an image is fixed to a predetermined position in a moving image, a blur in the image may occur.

It is desirable to reduce a cost by not particularly providing a frame memory and to suppress a blur while correcting a rolling shutter phenomenon.

According to a first embodiment of the present technology, there is provided an image sensor including a plurality of light-receiving elements that receive light from a subject and are arranged in a 2-dimensional form; a detection unit that detects a movement amount of a projected image of the subject projected to the plurality of light-receiving elements arranged in the 2-dimensional form; and a light-receiving element control unit that adaptively controls a timing at which pixel data is read from the plurality of light-receiving elements arranged in the 2-dimensional form for each line according to the movement amount.

The detection unit may detect the movement amount using images captured previously and currently by the light-receiving elements or detect the movement amount using a gyro sensor.

The light-receiving element control unit may adaptively control reading for each line at a timing obtained by proration of chronological displacement of a line in which the pixel data is previously read from the plurality of light-receiving elements and chronological displacement of a line in which pixel data is currently read from the plurality of light-receiving elements.

The light-receiving element control unit may calculate a coefficient proportional to a reciprocal of a ratio of an exposure time, in which the light-receiving elements are reset and the pixel data is then read, to a proper exposure time. The image sensor may further include: a multiplication unit that adjusts a gain by multiplying pixel data generated when some of the plurality of light-receiving elements arranged in the 2-dimensional form receive light, by the coefficient.

According to the first embodiment of the present technology, there is provided a method of operating an image sensor including a plurality of light-receiving elements that receive light from a subject and are arranged in a 2-dimensional form. The method includes: detecting a movement amount of a projected image of the subject projected to the plurality of light-receiving elements arranged in the 2-dimensional form; and adaptively controlling a line in which pixel data is read from the plurality of light-receiving elements arranged in the 2-dimensional form according to the movement amount.

According to the first embodiment of the present technology, there is provided a program causing a computer controlling an image sensor including a plurality of light-receiving elements that receive light from a subject and are arranged in a 2-dimensional form to perform a process including: detecting a movement amount of a projected image of the subject projected to the plurality of light-receiving elements arranged in the 2-dimensional form; and adaptively controlling a line in which pixel data is read from the plurality of light-receiving elements arranged in the 2-dimensional form according to the movement amount.

According to the first embodiment of the present technology, there is provided an electronic device including: a plurality of light-receiving elements that receive light from a subject and are arranged in a 2-dimensional form; a detection unit that detects a movement amount of a projected image of the subject projected to the plurality of light-receiving elements arranged in the 2-dimensional form; and a light-receiving element control unit that adaptively controls a timing at which pixel data is read from the plurality of light-receiving elements arranged in the 2-dimensional form for each line according to the movement amount.

According to a second embodiment of the present technology, there is provided an image sensor including a plurality of light-receiving elements that receive light from a subject and are arranged in a 2-dimensional form; a detection unit that detects a movement amount of a projected image of the subject projected to the plurality of light-receiving elements arranged in the 2-dimensional form; and a light-receiving element control unit that adaptively controls an exposure time of some of the plurality of light-receiving elements arranged in the 2-dimensional form according to the movement amount such that the exposure time is adaptively shortened.

The detection unit may detect the movement amount using images captured previously and currently by the light-receiving elements or detect the movement amount using a gyro sensor.

The image sensor may further include a combining unit that combines pixel data captured by the some light-receiving elements of which the exposure time is controlled to be shortened and pixel data captured by the light-receiving elements excluding the some light-receiving elements.

According to the second embodiment of the present technology, there is provided a method of operating an image sensor including a plurality of light-receiving elements that receive light from a subject and are arranged in a 2-dimensional form. The method includes: detecting a movement amount of a projected image of the subject projected to the plurality of light-receiving elements arranged in the 2-dimensional form; and adaptively controlling an exposure time of some of the plurality of light-receiving elements arranged in the 2-dimensional form according to the movement amount such that the exposure time is adaptively shortened.

According to the second embodiment of the present technology, there is provided a program causing a computer controlling an image sensor including a plurality of light-receiving elements that receive light from a subject and are arranged in a 2-dimensional form to perform a process including: detecting a movement amount of a projected image of the subject projected to the plurality of light-receiving elements arranged in the 2-dimensional form; and adaptively controlling an exposure time of some of the plurality of light-receiving elements arranged in the 2-dimensional form according to the movement amount such that the exposure time is adaptively shortened.

According to the second embodiment of the present technology, there is provided an electronic device including a plurality of light-receiving elements that receive light from a subject and are arranged in a 2-dimensional form; a detection unit that detects a movement amount of a projected image of the subject projected to the plurality of light-receiving elements arranged in the 2-dimensional form; and a light-receiving element control unit that adaptively controls an exposure time of some of the plurality of light-receiving elements arranged in the 2-dimensional form according to the movement amount such that the exposure time is adaptively shortened.

According to a third embodiment of the present technology, there is provided an image sensor including a plurality of light-receiving elements that receive light from a subject and are arranged in a 2-dimensional form; a detection unit that detects a movement amount of a projected image of the subject projected to the plurality of light-receiving elements arranged in the 2-dimensional form; and a light-receiving element control unit that adaptively controls an exposure time of some of the plurality of light-receiving elements arranged in the 2-dimensional form according to the movement amount such that the exposure time is adaptively shortened and imaging is performed a plurality of times.

The light-receiving element control unit may allow a word length of pixel data captured by the some light-receiving elements to be shorter than that of pixel data captured by the light-receiving elements excluding the some light-receiving elements.

The detection unit may detect the movement amount using images captured previously and currently by the some light-receiving elements or detect the movement amount using a gyro sensor.

According to the third embodiment of the present technology, there is provided a method of operating an image sensor including a plurality of light-receiving elements that receive light from a subject and are arranged in a 2-dimensional form. The method includes: detecting a movement amount of a projected image of the subject projected to the plurality of light-receiving elements arranged in the 2-dimensional form; and adaptively controlling an exposure time of some of the plurality of light-receiving elements arranged in the 2-dimensional form according to the movement amount such that the exposure time is adaptively shortened and imaging is performed a plurality of times.

According to the third embodiment of the present technology, there is provided a program causing a computer controlling an image sensor including a plurality of light-receiving elements that receive light from a subject and are arranged in a 2-dimensional form to perform a process including: detecting a movement amount of a projected image of the subject projected to the plurality of light-receiving elements arranged in the 2-dimensional form; and adaptively controlling an exposure time of some of the plurality of light-receiving elements arranged in the 2-dimensional form according to the movement amount such that the exposure time is adaptively shortened and imaging is performed a plurality of times.

According to the third embodiment of the present technology, there is provided an electronic device including a plurality of light-receiving elements that receive light from a subject and are arranged in a 2-dimensional form; a detection unit that detects a movement amount of a projected image of the subject projected to the plurality of light-receiving elements arranged in the 2-dimensional form; and a light-receiving element control unit that adaptively controls an exposure time of some of the plurality of light-receiving elements arranged in the 2-dimensional form according to the movement amount such that the exposure time is adaptively shortened and imaging is performed a plurality of times.

In the first embodiment of the present technology, light from a subject is received by a plurality of light-receiving elements arranged in a 2-dimensional form. A movement amount of a projected image of the subject projected to the plurality of light-receiving elements arranged in the 2-dimensional form is detected. A timing at which pixel data is read from the plurality of light-receiving elements arranged in the 2-dimensional form is adaptively controlled for each line according to the movement amount.

In the second embodiment of the present technology, light from a subject is received by a plurality of light-receiving elements arranged in a 2-dimensional form. A movement amount of a projected image of the subject projected to the plurality of light-receiving elements arranged in the 2-dimensional form is detected. An exposure time of some of the plurality of light-receiving elements arranged in the 2-dimensional form is adaptively controlled according to the movement amount such that the exposure time is adaptively shortened.

In the third embodiment of the present technology, light from a subject is received by a plurality of light-receiving elements arranged in a 2-dimensional form. A movement amount of a projected image of the subject projected to the plurality of light-receiving elements arranged in the 2-dimensional form is detected. An exposure time of some of the plurality of light-receiving elements arranged in the 2-dimensional form is adaptively controlled according to the movement amount such that the exposure time is adaptively shortened and imaging is performed a plurality of times.

According to the first to third embodiments of the present technology, it is possible to reduce a device cost by not particularly providing a frame memory and suppress a blur while correcting a rolling shutter phenomenon.

BRIEF DESCRIPTION OF THE DRAWINGS

FIG. 59 is a flowchart for describing the 5th process of the timing control unit;

DETAILED DESCRIPTION OF EMBODIMENTS

Operation of General Image Sensor

Since complementary metal oxide semiconductor (CMOS) image sensors which have become the mainstream of resent image sensors perform line-sequential reading, a rolling shutter phenomenon may occur. When moving images are captured with digital cameras during movement, images may be distorted.

In order to prevent this distortion from occurring, a line-sequential reading speed may be sped up. For example, in the case of a moving image of 60 fps (frame/second), pixel data corresponding to 1 frame is normally read for $1/60$ seconds. On the other hand, by speeding up a reading speed and reading all of the pixel data for $1/480$ seconds to prevent distortion of an image, the rolling shutter phenomenon is suppressed to $1/8$.

However, when the pixel data is finally displayed on a display or is recorded on a recording medium on a rear stage, the pixel data corresponding to 1 frame has to be transmitted continuously (not intermittently) at a data rate of $1/60$ seconds. Accordingly, when all of the pixels are read from an image sensor for $1/480$ seconds, it is necessary to store the pixel data in a frame memory once and then adjust a timing so that the pixel data corresponding to 1 frame is continuously output for $1/60$ seconds.

Figure 1:
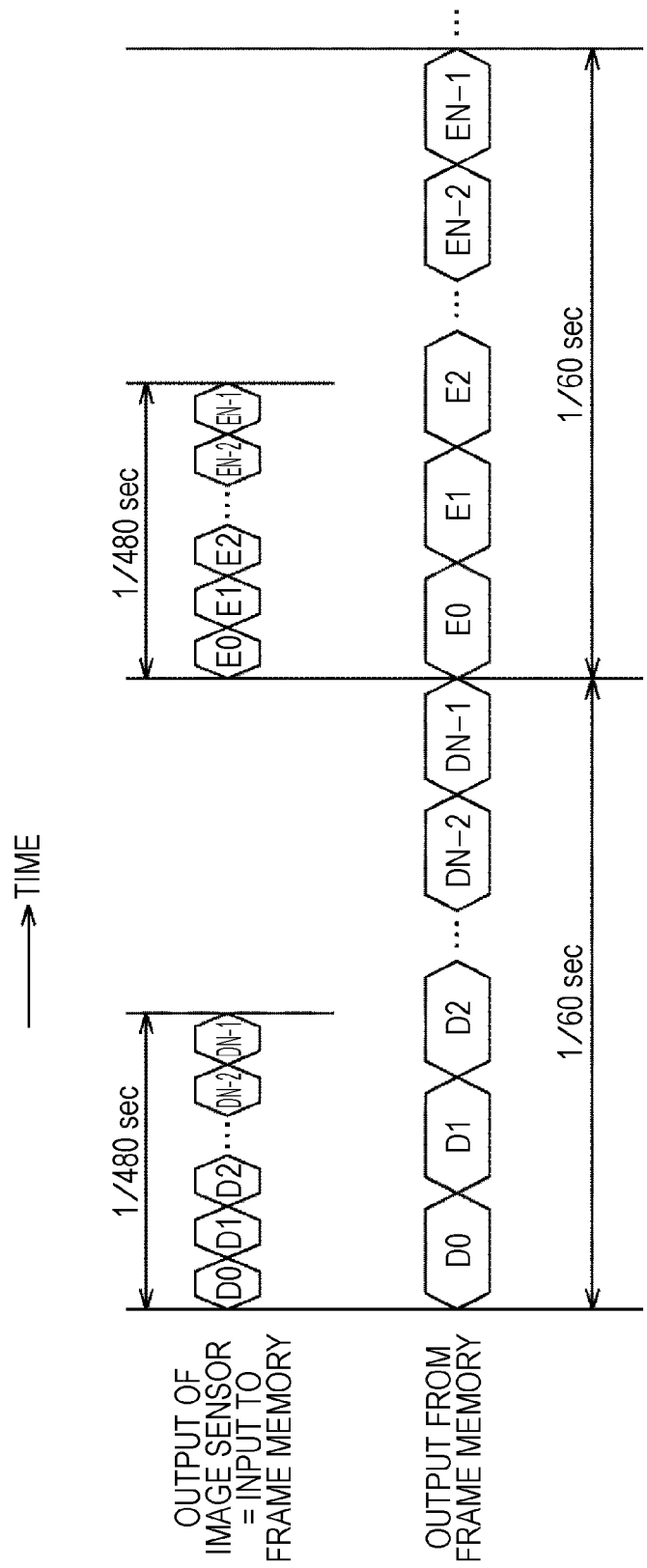
FIG. 1 is a diagram for describing the fact that a frame memory is a requisite constituent in the configuration of a general image sensor.

That is, for example, as shown in the upper part of FIG. 1, in the case of a moving image of 60 fps (frame/second), pixel data corresponding to 1 frame is read from the image sensor to the frame memory for $1/480$ seconds. As shown in the lower part of FIG. 1, all of the pixel data are configured to be read at a reading speed of $1/60$ seconds. Through such an operation, the rolling shutter phenomenon is suppressed to $1/8$. FIG. 1 shows a form in which 1 frame is configured to include N pieces of pixel data, and thus pieces of pixel data $D0, D1, \ldots,$ and $DN-1$ included in an image of 1 frame are sequentially output, and then pieces of pixel data $E0, E1, \ldots,$ and $EN-1$ included in an image of 1 frame output at the subsequent timing are output.

However, when such a method is used, a frame memory is generally considered to be a requisite constituent, and therefore a device cost may increase.

When a moving image is captured using an imaging device held by the hands, a problem in which a blur does not occur in a predetermined image (pixel data corresponding to 1 frame) and a blur is present in an image different from the predetermined image frequently arises. That is, during the capturing of the predetermined image (that is, within an exposure time for 1 predetermined frame), the blur occurring or not occurring in the captured images due to the handheld imaging depends on whether the imaging device is moved to change an imaging direction of the imaging device.

In general, during reproduction of a moving image, the position of a subject is moved in the moving image when the imaging device is moved to change the imaging direction of the imaging device. Therefore, a viewer feels that "a blur is present since the subject is being moved" and thus does not feel a sense of the discomfort of the blur when viewing the imaging image.

Figure 2:
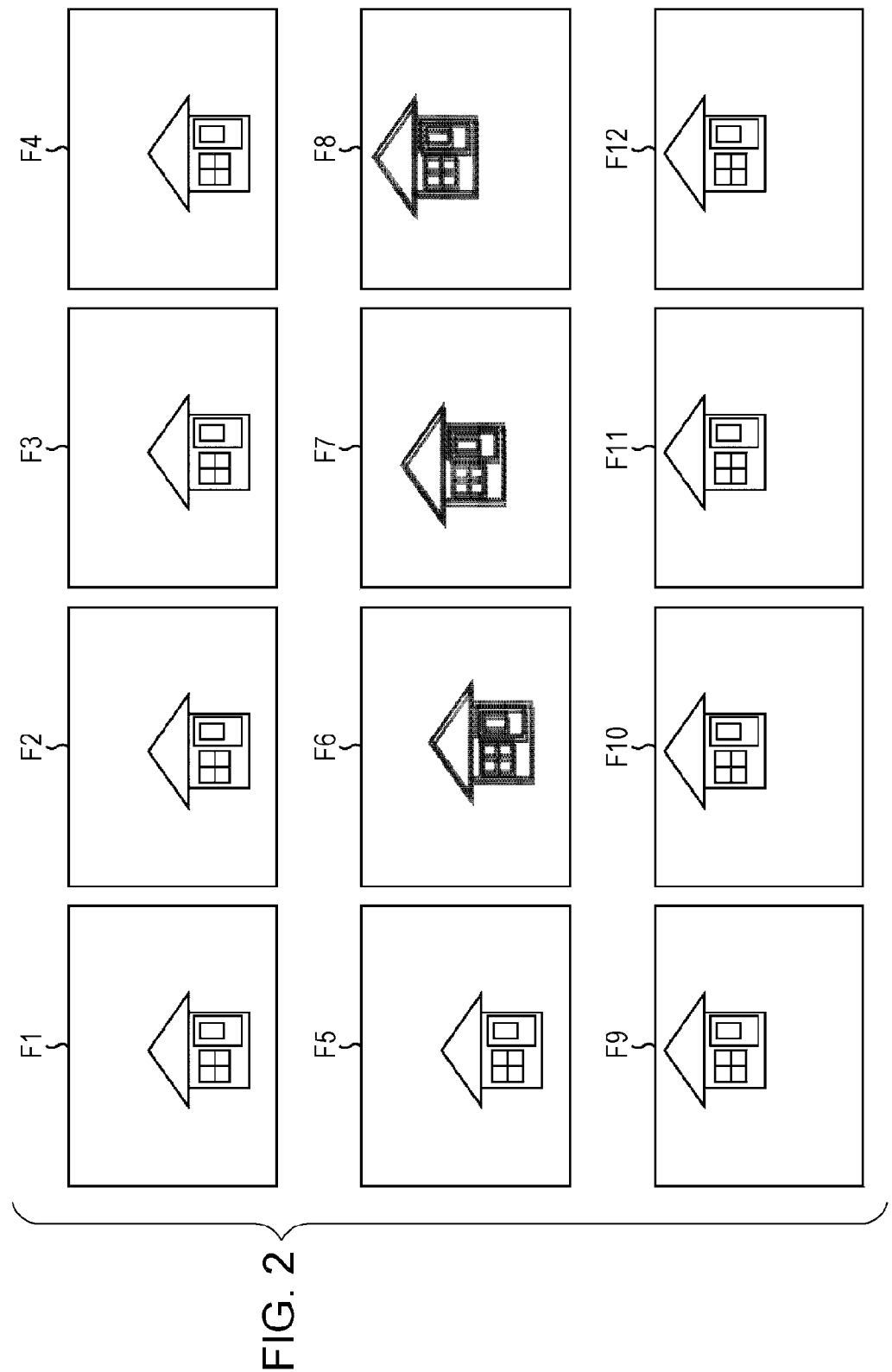
FIG. 2 is a diagram for describing the fact that an image in which a sense of discomfort is caused due to occurrence of a blur is generated.

That is, as shown in FIG. 2, during a period of time in which frames F1 to F5 and frames F9 to F12 are imaged, a subject (a house in FIG. 2) is assumed to be imaged without incidentally changing the imaging direction of a camera. On the other hand, during a period of time in which frames F6 to F8 are imaged, the imaging direction of the imaging device is assumed to be moved downward due to being handheld (the house which is the subject is moved relatively upward in the frames) and the subject is assumed to be imaged. In this case, in the frames F6 to F8, a blur occurs since the subject is moved in the moving image within an exposure time.

Meanwhile, when the moving image corresponding to 12 frames expressed as the frames F1 to F12 is reproduced, a viewer can recognize that the blur occurs in that the imaging direction of the imaging device is changed at timings of the frames F6 to F8 and thus the subject is moved relatively in the frames. Therefore, the viewer does not feel a sense of discomfort when viewing the moving image. In FIG. 2, images corresponding to the 12 frames of the frames F1 to F12 in the moving image captured by handholding are shown chronologically.

However, when the subject in the moving image is stabilized in the frames while correcting the rolling shutter phenomenon, the viewer may feel the sense of discomfort of the blur. Here, the term "stabilizing" means that the positions of projected images of a subject remaining stationary are located at constant positions in frames by performing position adjustment between the frames.

Figure 3:
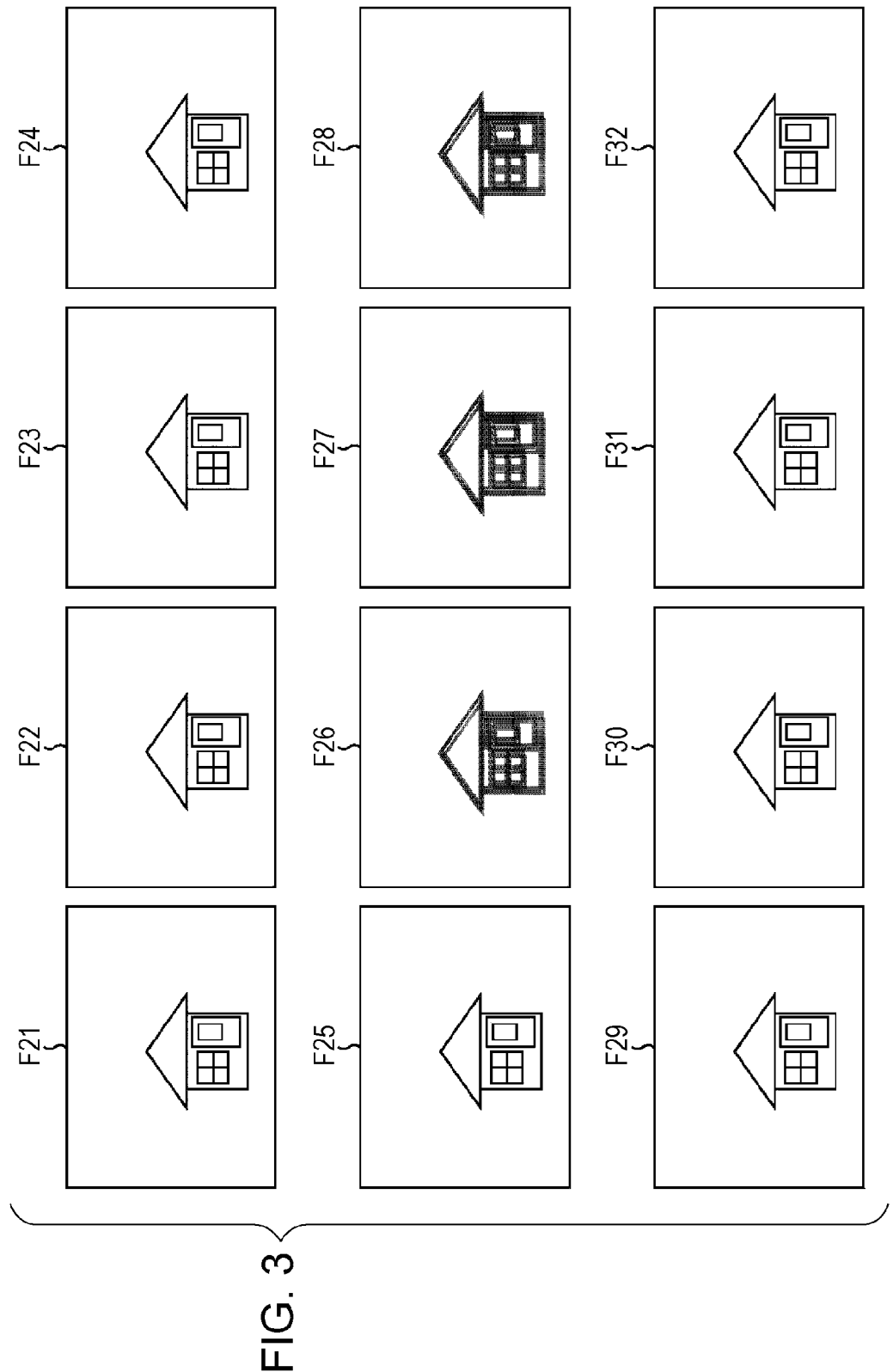
FIG. 3 is a diagram for describing the fact that an image in which a sense of discomfort is caused due to occurrence of a blur is generated.

In FIG. 3, the images in FIG. 2 are shown as images corresponding to 12 frames of the moving image when the house which is the subject is stabilized in the frames.

The images of the frames F21 to F32 shown in FIG. 3 are images corresponding to the frames F1 to F12 in FIG. 2, respectively. Here, the subject is stabilized in the images of the frames F21 to F32 in FIG. 3 with respect to the images of the frames F1 to F12 in FIG. 2. That is, a motion of the camera is corrected and the house which is the subject is fixed at the constant positions in the frames. Accordingly, as shown in FIG. 3, the house which is the subject is set to be present at substantially the same position on the image in all of the frames F21 to F32.

However, when the moving image corresponding to the 12 frames of the frames F21 to F32 is reproduced, the blur occurs only in the times of the frames F26 to F28 in spite of the fact that the house which is the subject constantly remains stationary in the frames. Therefore, the viewer may feel the sense of discomfort when viewing the moving image.

Overview of Imaging Method by Image Sensor to which Embodiment of the Present Technology is Applied Next, an overview of an imaging method by an image sensor configured to reduce a sense of discomfort, when a viewer views a moving image at the time of reproduction of the moving image, without using a frame memory by applying an embodiment of the present technology will be described.

Hereinafter, when the imaging method by an imaging device including the image sensor to which an embodiment of the present technology is applied is described, a coordinate system specifying a pixel arrangement in the image sensor is assumed to be defined as in FIG. 4.

Figure 4:
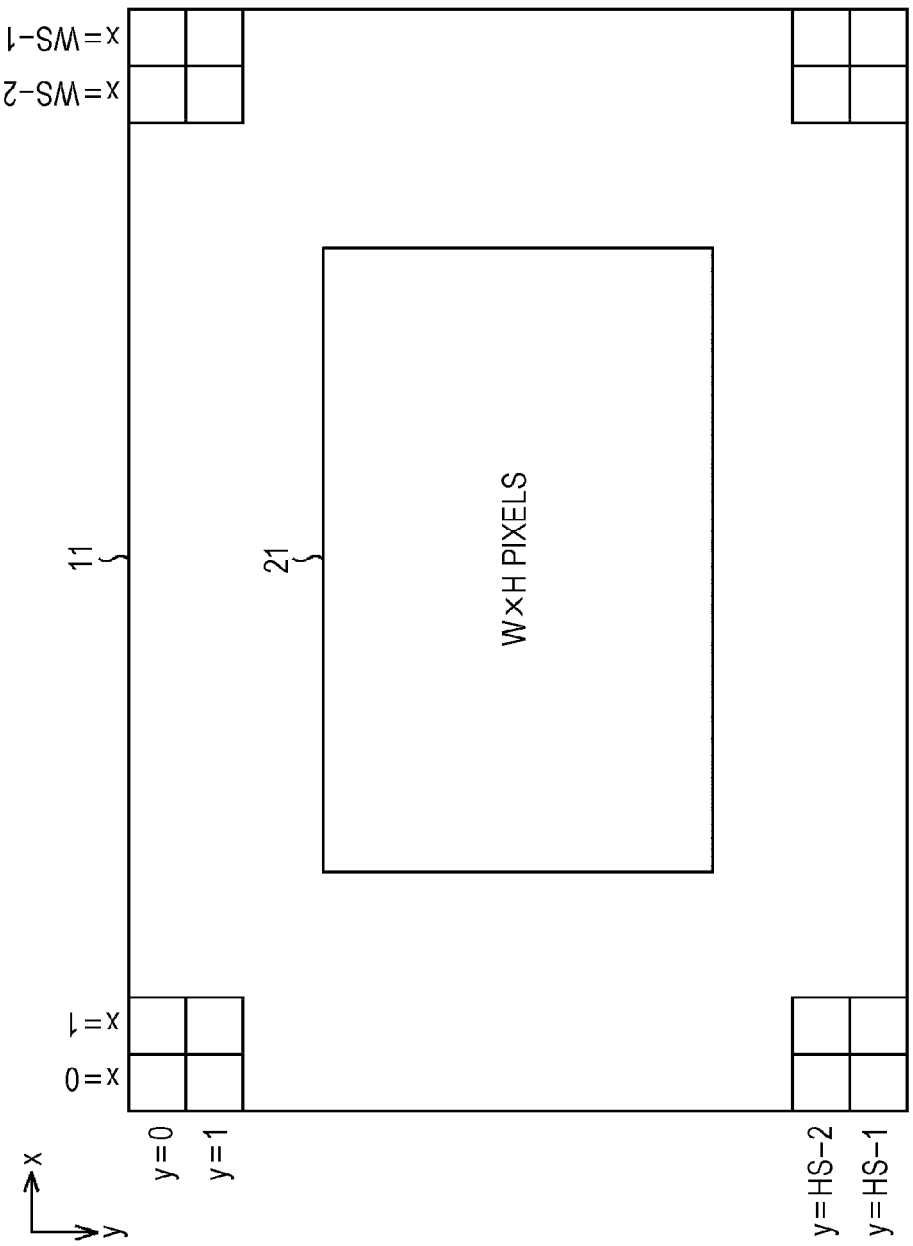
FIG. 4 is a diagram for describing a coordinate system of an image sensor.

That is, the pixels of an image sensor 11 in FIG. 4 are assumed to be arranged such that the number of pixels in the horizontal direction (x-axis direction) is WS and the number of pixels in the vertical direction (y-axis direction) is HS. A region 21 forming 1 frame of a moving image captured in the pixels is assumed to have the number of pixels in the horizontal direction×the number pixels in the vertical direction=W×H at 60 fps. In the case of a full-high definition (HD) moving image, for example, the number of pixels W in the horizontal direction is assumed to be 1920 pixels and the number of pixels H in the vertical direction is assumed to be 1080 pixels. Hereinafter, the description will be made on the assumption of the numbers of pixels, but it is needless to say that other numbers of pixels may be used. The number of pixels W is less than the number of pixels WS (where W<WS) and the number of pixels H is less than the number of pixels HS (where H<HS). A range in which a moving image can be captured by the image sensor 11 is assumed to be a range WS×HS greater than the range W×H of the region 21.

Case of Imaging with Fixed Camera without Camera Shake

First, a timing at which pixel data is read when imaging is performed with a fixed camera (imaging device) without camera shake will be described with reference to FIG. 5.

Figure 5:
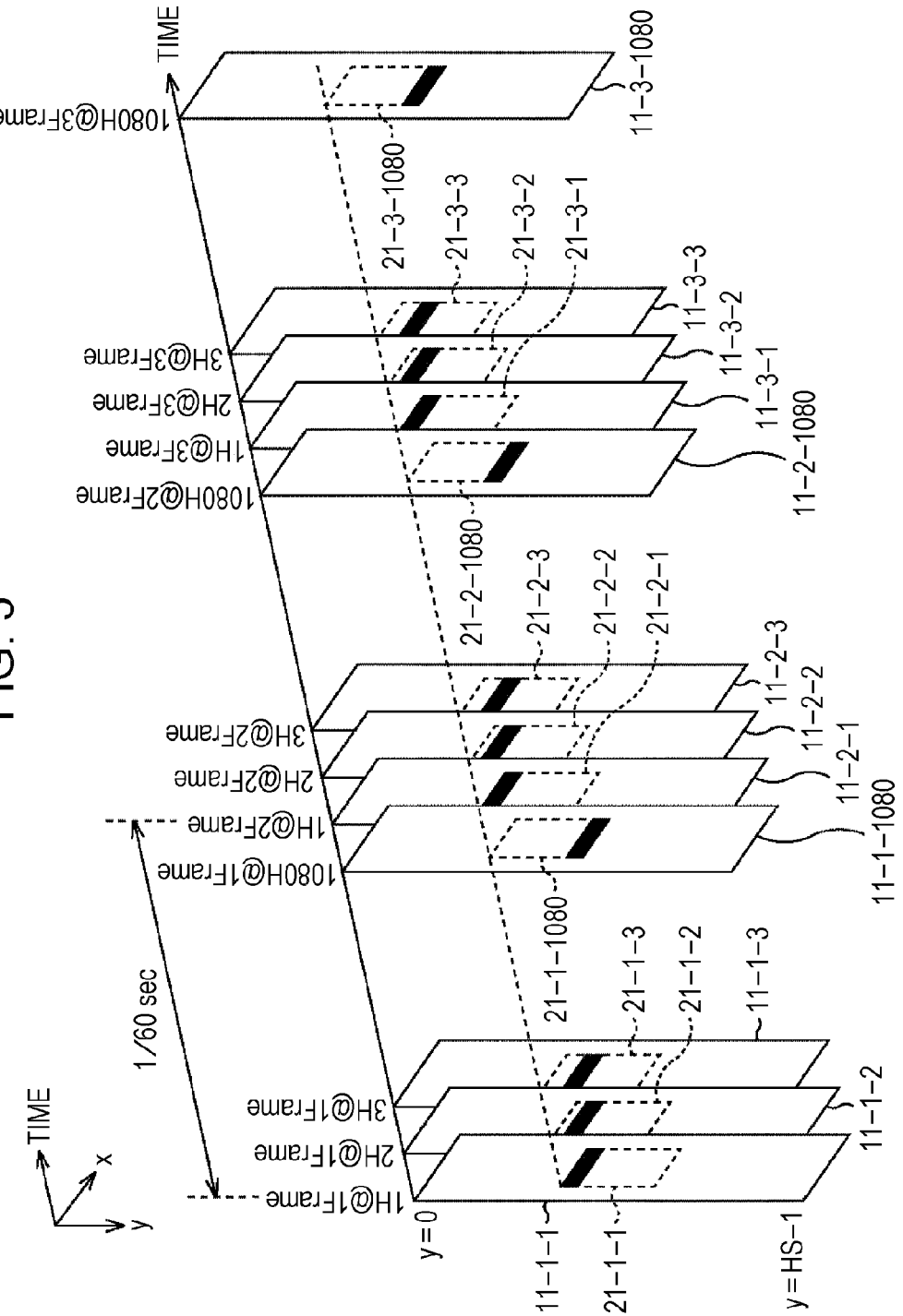
FIG. 5 is a diagram for describing a reading sequence for the purpose of suppressing a rolling shutter phenomenon and stabilizing a moving image.

Here, FIG. 5 is a timing chart showing ranges and timings at which pixel data is transmitted in the image sensor when a moving image corresponding to 3 frames is captured. In the timing chart of FIG. 5, the vertical direction of the drawing is the horizontal direction (y-axis direction) of the image sensor 11 and the region 21 and the right direction of the drawing is a time direction.

In FIG. 5, within a time of 1/60 seconds, pixel data corresponding to 1 line in the vertical direction and indicated by thick lines of regions 21-1-1 to 21-1-1080 shown in dotted-line rectangular regions in the drawing in image sensors 11-1-1 to 11-1-1080 indicated by solid-line frames are respectively read at timings of times 1H@1 Frame to 1080H@1 Frame in the vertical direction of a 1st frame.

Likewise, in a 2nd frame, pixel data corresponding to 1 line in the vertical direction and indicated by thick lines of regions 21-2-1 to 21-2-1080 of image sensors 11-2-1 to 11-2-1080 in the drawing are respectively read at timings of times 1H@2 Frame to 1080H@2 Frame in the vertical direction.

Likewise, in a 3rd frame, pixel data corresponding to 1 line in the vertical direction and indicated by thick lines of regions 21-3-1 to 21-3-1080 of image sensors 11-3-1 to 11-3-1080 in the drawing are respectively read at timings of times 1H@3 Frame to 1080H@3 Frame in the vertical direction.

When it is not particularly necessary to distinguish the regions 21-1-1 to 21-1-1080, the regions 21-2-1 to 21-2-1080, and the regions 21-3-1 to 21-3-1080 from each other, the regions 21-1-1 to 21-1-1080, the regions 21-2-1 to 21-2-1080, and the regions 21-3-1 to 21-3-1080 are simply referred to as the regions 21 and are similarly referred in other configurations.

That is, the pixel data corresponding to 1 line (the uppermost line of the region 21 indicated by the dotted-line rectangular region) indicated by the thick line in the drawing is read at the 1st time 1H@1 Frame.

The pixel data corresponding to 1 line (the 2nd line from the upper side of the region 21 indicated by the dotted-line rectangular region) indicated by the thick line in the drawing is read at a subsequent time 2H@1 Frame.

Further, the pixel data corresponding to 1 line (the 3rd line from the upper side of the region 21 indicated by the dotted-line rectangular region) indicated by the thick line in the drawing is read at a subsequent time 3H@1 Frame.

Subsequently, the pixel data corresponding to 1 line (the lowermost line of the region 21 indicated by the dotted-line rectangular region) indicated by the thick line in the drawing is likewise read at the final time 1080H@1 Frame of the 1st frame.

The same applies to frames subsequent to the 2nd frame. In this way, the pixel data is read from the image sensor line by line at time intervals (1/(60×1080) seconds) of each line, and an image corresponding to 1 frame is formed by the read pixel data corresponding to 1080 lines.

Here, for example, in the case of "time 1H@1 Frame," notation of a time means a time in which pixel data corresponding to 1 line of a 1st line in the vertical line of the 1st frame is transmitted. Accordingly, a time is displaced at the same interval in the order of a time 1H@1 Frame, a time 2H@1 Frame, . . . , and a time 1080H@1 Frame, a time 1H@2 Frame, a time 2H@2 Frame, . . . , and a time 1080H@2 Frame, and a time 1H@3 Frame, a time 2H@3 Frame, . . . , and a time 1080H@3 Frame.

Reading Timing and Reset Timing in Case of Imaging with Fixed Camera without Camera Shake Next, a reading timing and a reset timing in the case of imaging with a fixed camera without camera shake will be described with reference to FIG. 6.

Figure 6:
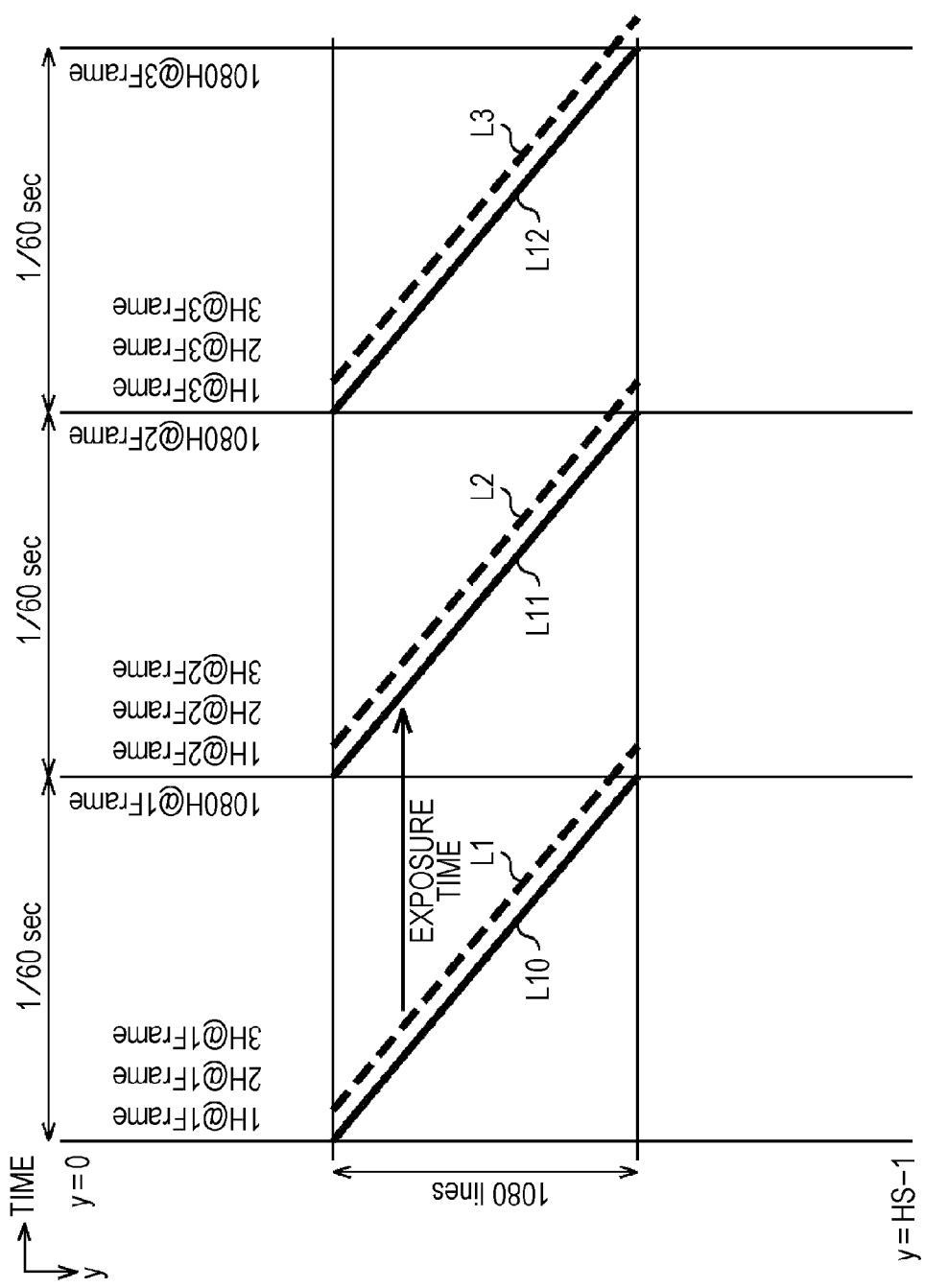
FIG. 6 is a diagram for describing a reading sequence for the purpose of suppressing a rolling shutter phenomenon and stabilizing a moving image.

Here, FIG. 6 is a timing chart in which the timing chart indicating a transmission timing of the pixel data shown in FIG. 5 is projected in the x-axis direction. The vertical direction in the drawing is the y-axis direction in which a line in the vertical direction of an image is specified, and y=0 to y=HS−1 correspond to pixel arrangement in the vertical direction of the image sensor 11. Further, the horizontal direction in the drawing is a time axis.

That is, as shown in FIG. 6, the pixel data corresponding to 1080 lines in the middle portions of the pixels of the image sensor 11 are sequentially read. Straight lines L10 to L12 indicated by thick solid lines in the drawing represent timings at which the pixel data of the pixel lines is read. Since the pixel data is read line by line for a time corresponding to each time 1H, the thick solid line becomes a straight line (the position of the y axis has a proportional relation with respect to the time axis) in the drawing. Further, straight lines L1 to L3 indicated by thick dotted lines in the drawing represent timings at which the pixels are reset. For the pixels (to be exact, a plurality of pixels disposed in one row in the horizontal direction included in each line) of each line, a time from a resetting time to a reading time (for example, a time of the straight lines L1 to L11) is considered to be an exposure time.

When Camera Shake is Corrected in Case of Imaging with Camera Shake

Next, a timing at which the pixel data is read when camera shake is corrected in the case of imaging (imaging when a blur occurs due to being handheld) with camera shake will be described with reference to FIG. 7. Here, to facilitate the description, an imaging direction of the image sensor 11 is assumed to be moved normally in a downward direction due to occurrence of camera shake. That is, in general, the image sensor 11 is moved at random in the upward, downward, right, or left direction due to camera shake. However, since the drawing is complicated, the image sensor 11 is assumed to be moved only in one direction, i.e., a downward direction. It is needless to say that camera shake occurs in other directions.

Figure 7:
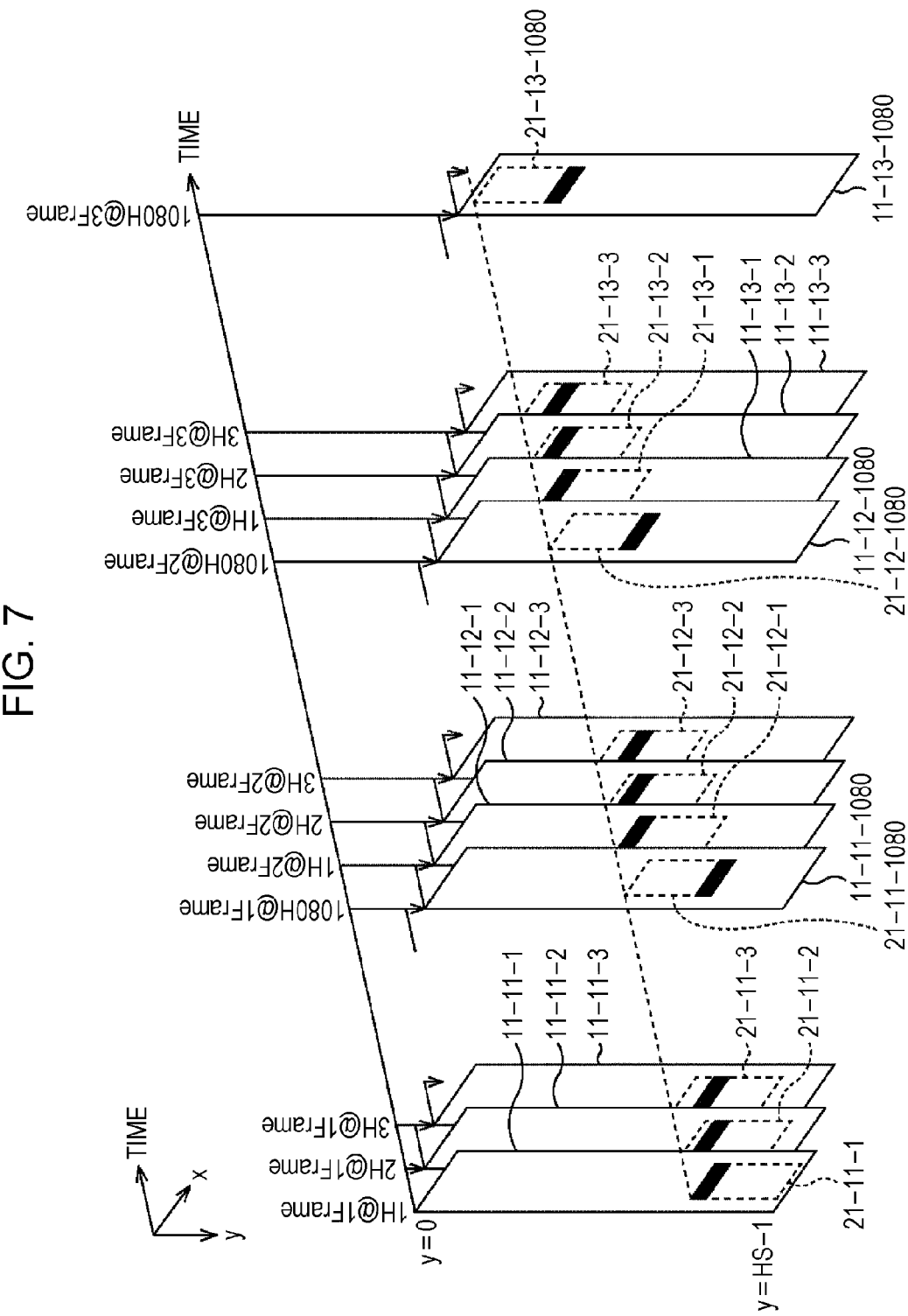
FIG. 7 is a diagram for describing a reading sequence for the purpose of suppressing a rolling shutter phenomenon and stabilizing a moving image.

In FIG. 7, a time (3/60 seconds) corresponding to 3 frames including a 1st frame 1 Frame to a 3rd frame 3 Frame is shown as in FIG. 5. Further, image sensors 11-11-1 to 11-11-1080, 11-12-1 to 11-12-1080, and 11-13-1 to 11-13-1080 and regions 21-11-1 to 21-11-1080, 21-12-1 to 21-12-1080, and 21-13-1 to 21-13-1080 correspond to the image sensors 11-1-1 to 11-1-1080, 11-2-1 to 11-2-1080, and 11-3-1 to 11-3-1080 and the regions 21-1-1 to 21-1-1080, 21-2-1 to 21-2-1080, and 21-3-1 to 21-3-1080 in FIG. 5, respectively.

Here, as described above, the imaging direction of the image sensor 11 is moved in the downward direction due to camera shake. Therefore, as in FIG. 5, when the position of the region 21 shown in the normally identical rectangular region in the image sensor 11 is read, the rolling shutter phenomenon occurs in each frame, and thus a subject is not stabilized between the frames.

Accordingly, as shown in FIG. 7, the region 21 which is a dotted line rectangular region is moved in the opposite direction to the direction in which the imaging direction of the image sensor 11 is moved. In the region 21 which is the dotted line rectangular region, the pixel data corresponding to 1 line (the uppermost line of the region 21 shown in the dotted line rectangular region) indicated by the thick line in the drawing is read at the 1st time 1H@1 Frame.

The pixel data corresponding to 1 line (the 2nd line from the upper side of the dotted line rectangular region) indicated by the thick line in the drawing is read at a subsequent time 2H@1 Frame.

Further, the pixel data corresponding to 1 line (the 3rd line from the upper side of the dotted line rectangular region) indicated by the thick line in the drawing is read at a subsequent time 3H@1 Frame.

Subsequently, the pixel data corresponding to 1 line (the lowermost line of the dotted-line rectangular region) indicated by the thick line in the drawing is likewise read at the final time (a time 1080H@1 Frame in the drawing) of the 1st frame. The same applies to frames subsequent to the 2nd frame. In this way, the pixel data corresponding to 1 line is each read from the image sensor 11 for a time (1/(60×1080) seconds) corresponding to each 1H, and 1 frame is formed by the read pixel data of 1080 lines. Thus, the rolling shutter phenomenon is corrected and a subject in the moving image can be stabilized.

Reading Timing when Camera Shake is Corrected in Case of Imaging with Camera Shake Next, a reading timing and a reset timing when camera shake is corrected in the case of imaging with camera shake will be described with reference to FIGS. 8 and 9.

Figure 8:
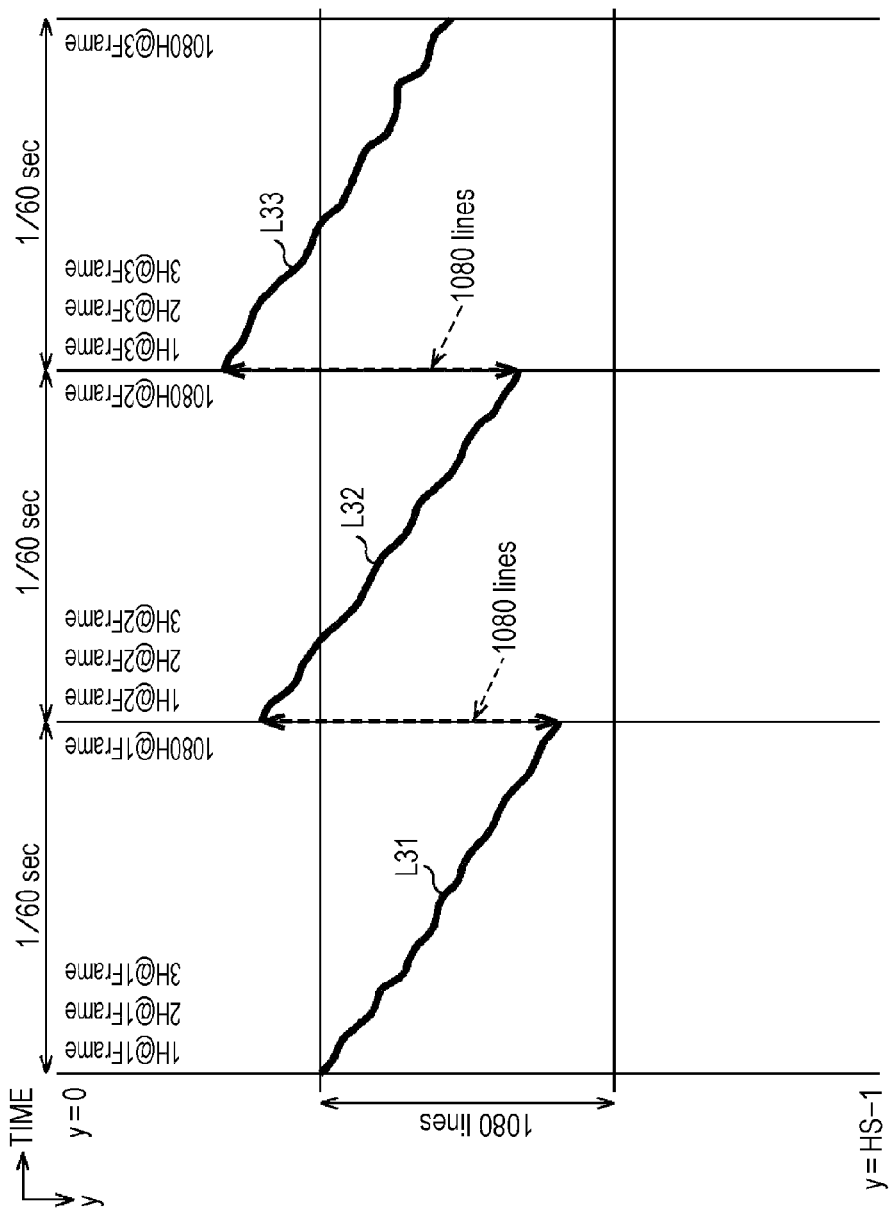
FIG. 8 is a diagram for describing a reading sequence for the purpose of suppressing a rolling shutter phenomenon and stabilizing a moving image.

Here, FIG. 8 is a timing chart in which the timing chart indicating a transmission timing of the pixel data shown in FIG. 7 is projected in the x-axis direction. Straight lines L31 to L33 indicated by thick solid lines in the drawing represent timings at which the pixel data of the lines is read. The vertical direction in the drawing is the y-axis direction in which a line in the vertical direction of an image is specified, and y=0 to y=HS−1 correspond to pixel arrangement in the vertical direction of the image sensor 11. Further, the horizontal direction in the drawing is a time axis.

Figure 9:
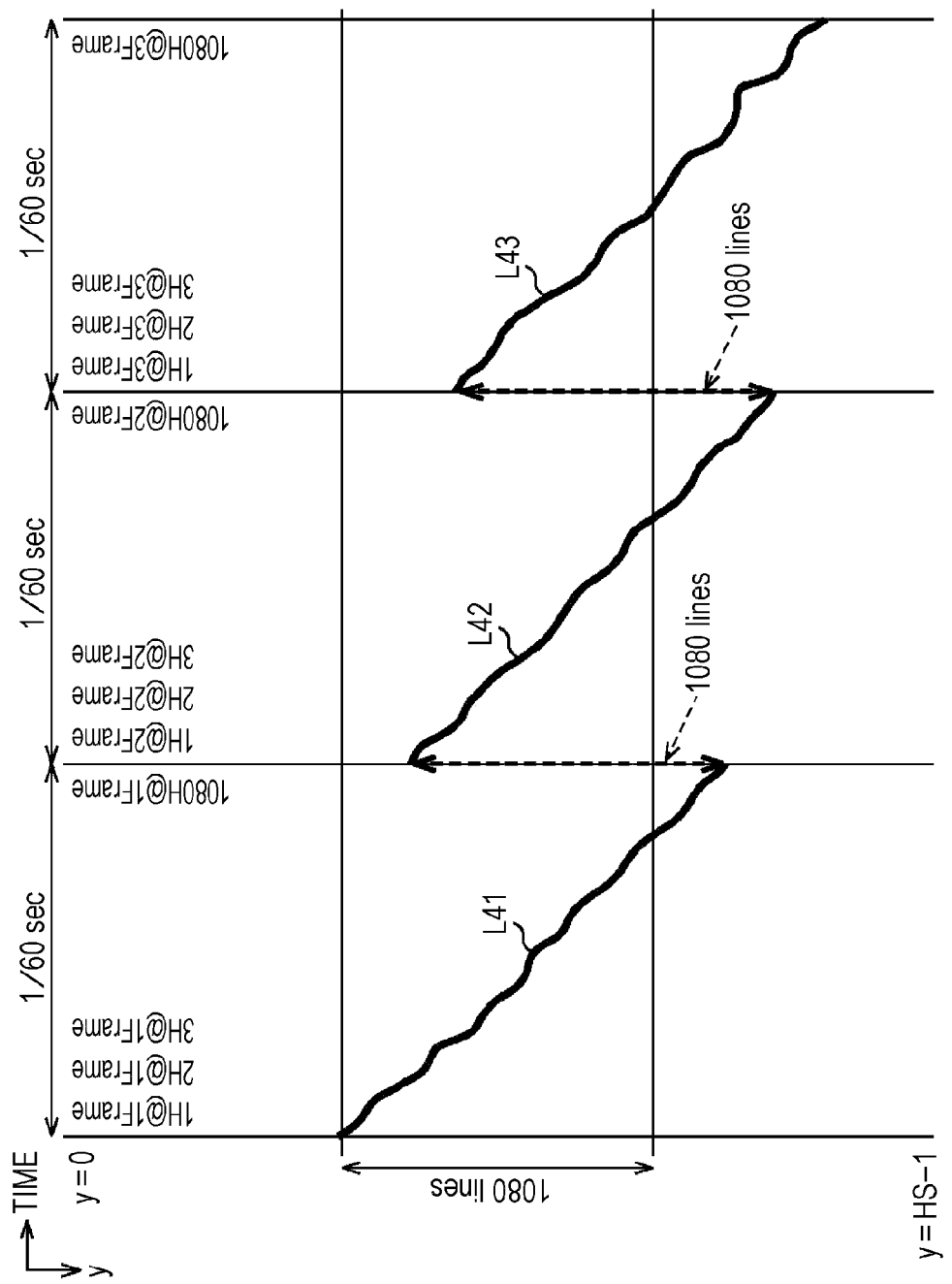
FIG. 9 is a diagram for describing a reading sequence for the purpose of suppressing a rolling shutter phenomenon and stabilizing a moving image.

FIG. 9 is a timing chart when the imaging direction of the image sensor 11 is moved normally in the upward direction due to camera shake. Straight lines L41 to L43 indicated by thick solid lines in the drawing represent timings at which the pixel data of the lines is read.

That is, as shown in FIGS. 8 and 9, when camera shake is corrected in the case of imaging with camera shake, the pixel data is sequentially read by 1080 lines from the final line from the upper line (FIG. 8) and the lower line (FIG. 9) at a timing after reading of the final line forming the region 21 to correct the degree of blur occurring due to the camera shake.

More specifically, in the case of FIG. 8, a reading line is moved upward by 1080 lines at a time (a time of the 1st 1H of each frame) at which a frame is moved to a subsequent frame. That is, for example, as shown in FIG. 7, a timing at which the pixel data corresponding to 1 line which is the final line of the 1st frame indicated by the thick line in the region 21-11-1080 is read at the time 1080H@1 Frame can be considered. Then, at the time 1H@2 Frame which is a subsequent timing, 1 line indicated by the thick line above 1080 lines and shown in the region 21-12-1 is read as the pixel data of the beginning line of the 2nd frame.

By allowing the positions of the upper left portions in the drawing in the regions 21-11-1 to 21-11-1080, 21-12-1 to 21-12-1080, and 21-13-1 to 21-13-1080 in FIG. 7 to be uniform to positions conforming with a dotted line parallel to the time axis through such an operation, it is possible to suppress occurrence of a blur due to the camera shake.

Likewise, in the case of FIG. 9, a reading line is moved downward by 1080 lines at a time (a time of the 1st 1H of each frame) at which a frame is moved to a subsequent frame.

Through such an operation, it is possible to realize the correction of the blur of the subject on the image sensor 11 with the camera shake.

When Camera Shake is Corrected in Case of Imaging with Panning

Next, a timing at which the pixel data is read when camera shake is corrected in the case of imaging with panning will be described with reference to FIG. 10. Here, to facilitate the description, the imaging direction of the image sensor 11 is assumed to be moved normally in the downward direction by panning which is based on an intention of a photographer. That is, in general, the image sensor 11 is moved in the upward, downward, right, or left direction by panning according to an intention of a photographer. However, since the drawing is complicated, the image sensor 11 is assumed to be moved in one direction. It is needless to say that the image sensor 11 may be panned in other directions.

Figure 10:
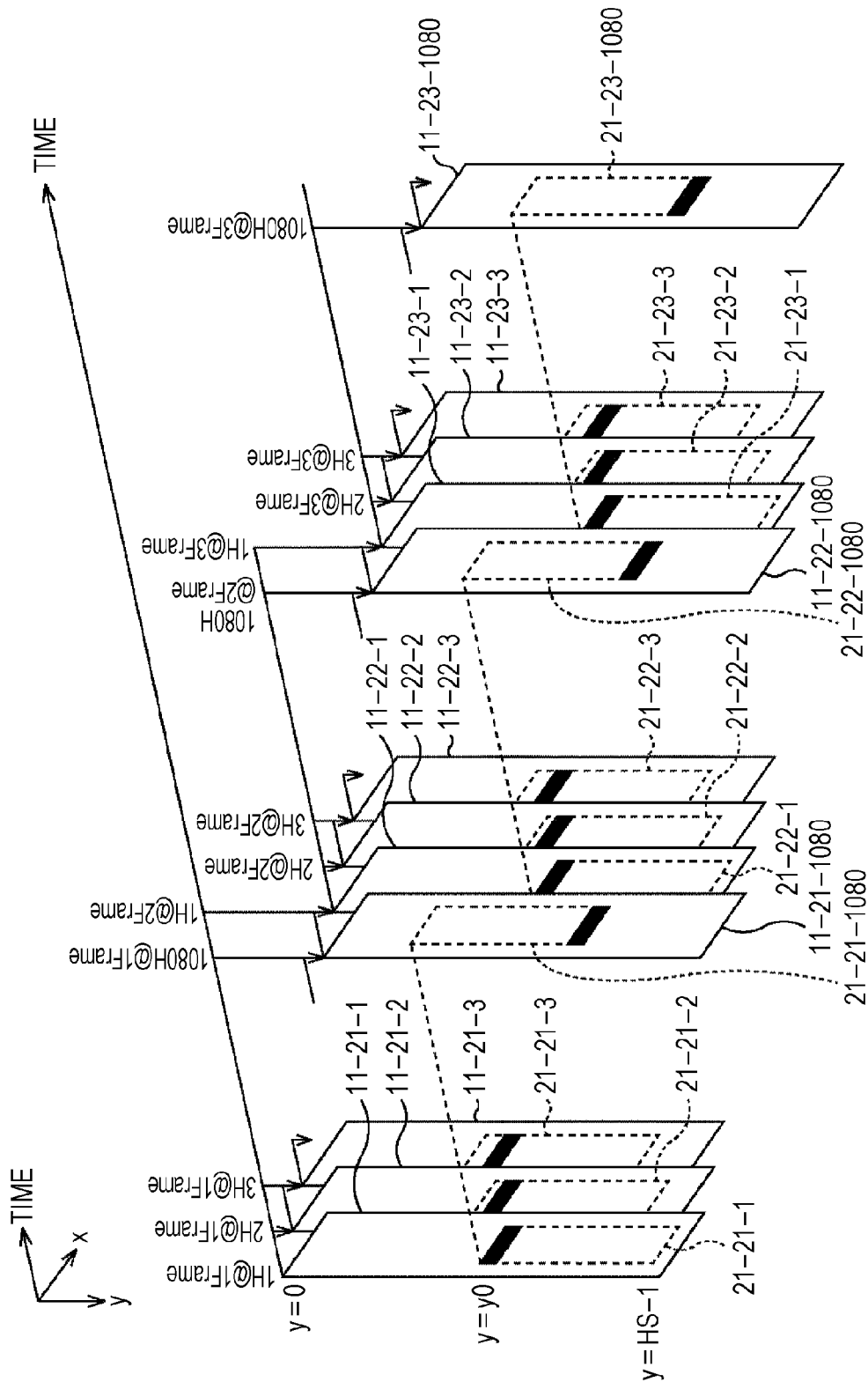
FIG. 10 is a diagram for describing a reading sequence for the purpose of suppressing a rolling shutter phenomenon and stabilizing a moving image.

That is, movement in the downward direction by the panning in FIG. 10 is a motion intended by a photographer unlike the case of FIG. 7 and it is necessary to reproduce a captured moving image to follow the motion. In this case, the rolling shutter phenomenon is corrected by moving the regions 21 which are dotted-line rectangular regions in the opposite direction to a direction in which the image sensor 11 is moved within 1 frame. Further, by fixing the regions 21 which are the dotted-line rectangular regions to the same position on the image sensor 11 (reading a line of y=y0 at the time of 1H of each frame) between frames, the panning can be performed without stabilizing a subject.

In FIG. 10, a time (3/60 seconds) corresponding to 3 frames including a 1st frame 1 Frame to a 3rd frame 3 Frame is shown as in FIG. 5. Further, image sensors 11-21-1 to 11-21-1080, 11-22-1 to 11-22-1080, and 11-23-1 to 11-23-1080 and regions 21-21-1 to 21-21-1080, 21-22-1 to 21-22-1080, and 21-23-1 to 21-23-1080 correspond to the image sensors 11-1-1 to 11-1-1080, 11-2-1 to 11-2-1080, and 11-3-1 to 11-3-1080 and the regions 21-1-1 to 21-1-1080, 21-2-1 to 21-2-1080, and 21-3-1 to 21-3-1080 in FIG. 5, respectively.

Reading Timing when Camera Shake is Corrected in Case of Imaging with Panning

Next, a reading timing and a reset timing when camera shake is corrected in the case of imaging with panning will be described with reference to FIGS. 11 and 12.

Figure 11:
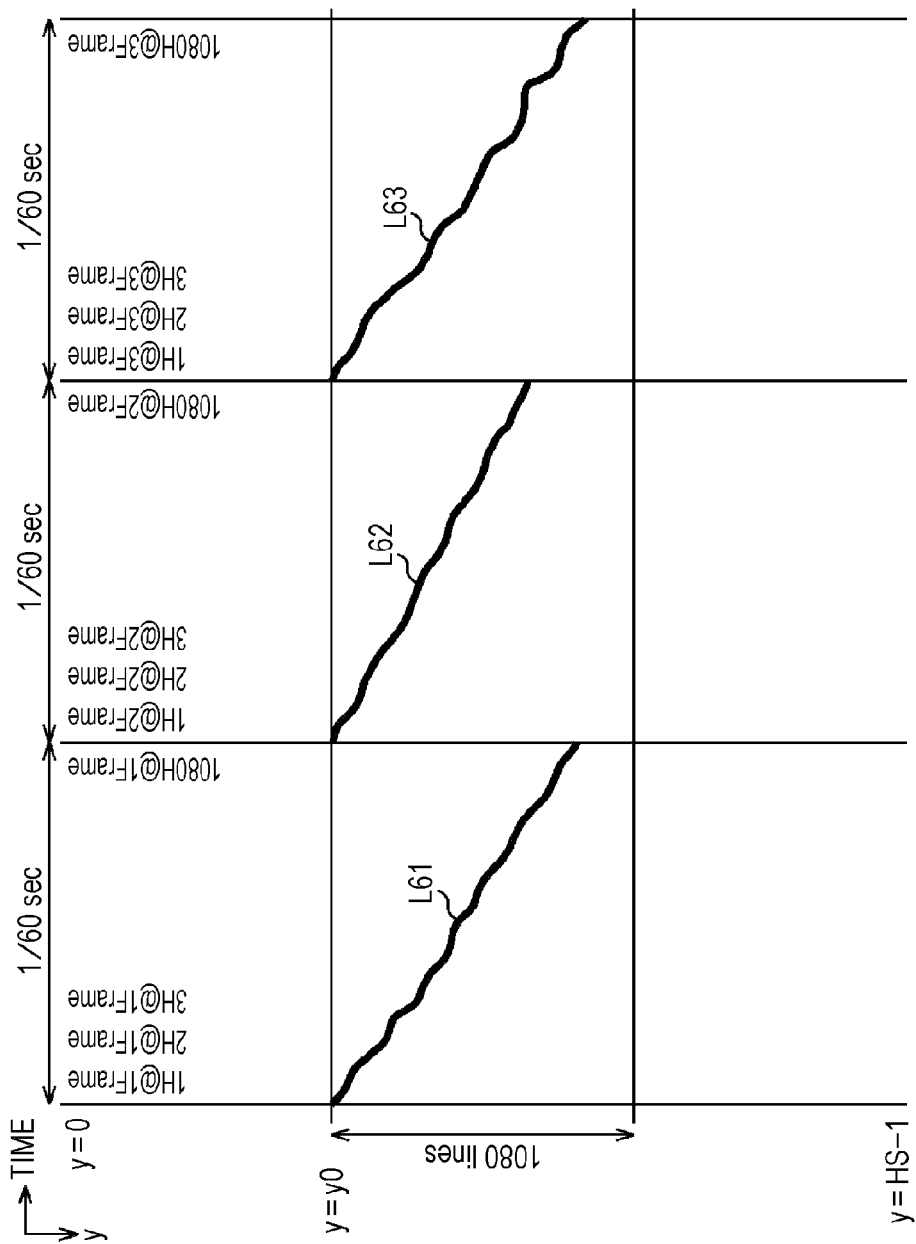
FIG. 11 is a diagram for describing a reading sequence for the purpose of suppressing a rolling shutter phenomenon and stabilizing a moving image.

Here, FIG. 11 is timing chart in which the timing chart indicating a transmission timing of the pixel data shown in FIG. 10 is projected in the x-axis direction. The vertical direction in the drawing is the y-axis direction in which a line in the vertical direction of an image is specified, and y=0 to y=HS−1 correspond to pixel arrangement in the vertical direction of the image sensor 11. Further, the horizontal direction in the drawing indicates a time axis. Distributions L61 to L63 indicated by thick solid lines in the drawing represent reading timings. FIG. 12 is a timing chart showing a transmission timing of each line when a camera (image sensor) is normally moved in the upward direction by panning. Distributions L71 to L73 indicated by thick solid lines represent reading timings.

Figure 12:
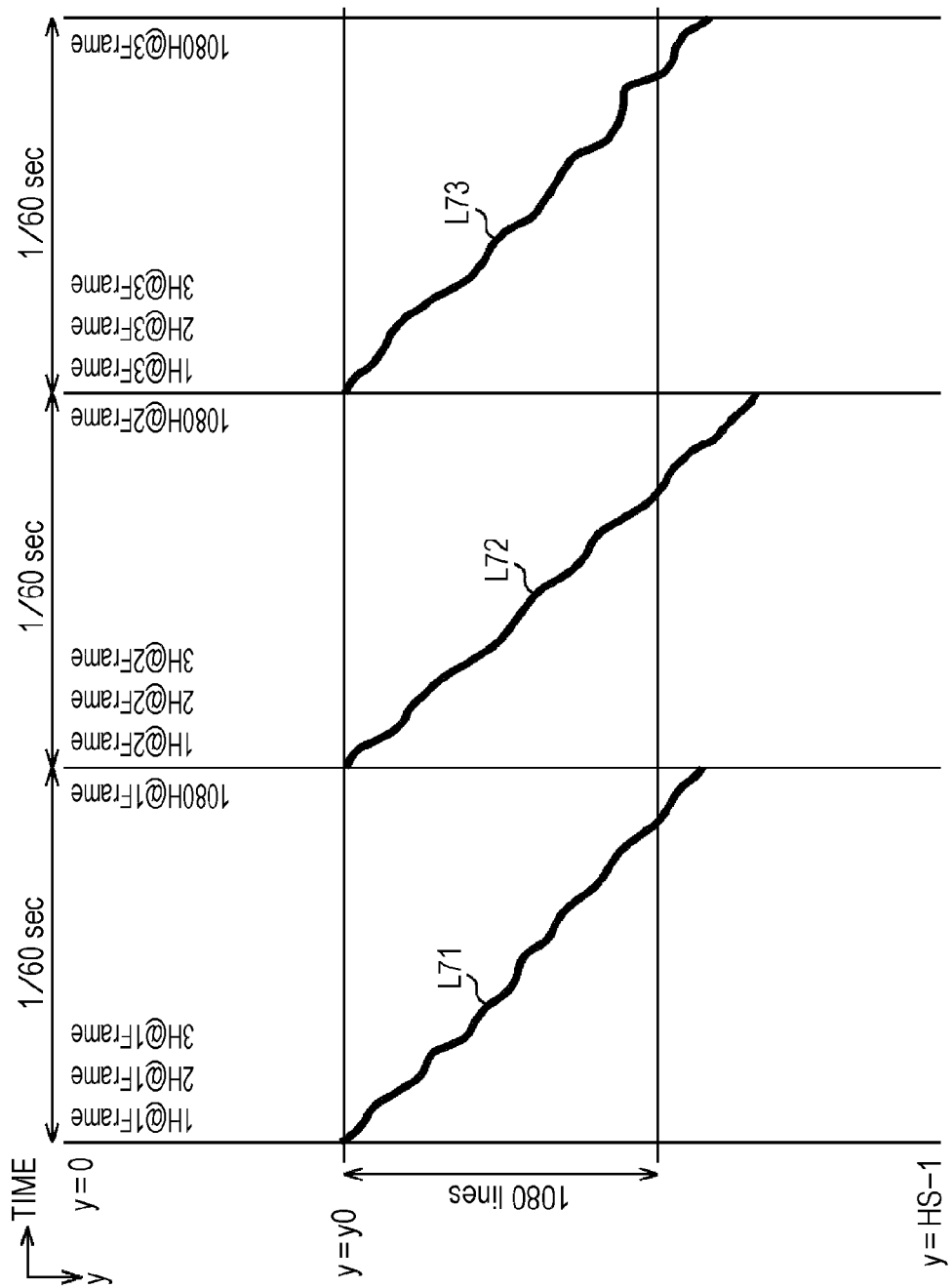
FIG. 12 is a diagram for describing a reading sequence for the purpose of suppressing a rolling shutter phenomenon and stabilizing a moving image.

As shown in FIGS. 11 and 12, for a pixel line transmitting the pixel data, a reading line is moved normally to the same position (y=y0) at a time (a time of the 1st 1H of each frame) at which a frame is moved to a subsequent frame. That is, the imaging direction of the image sensor 11 is panned according to the intention of the photographer. Therefore, by locating the beginning lines of the frames forming the region 21 to the same position according to the panning, it is possible to realize correction to an image with no sense of discomfort.

Operation of Combining Correction Operation for Camera Shake and Correction Operation for Panning That is, the motion of the image sensor 11 described with reference to FIGS. 7 to 9 indicates an operation in the case of only the camera shake rather than the panning and the motion of the image sensor 11 described with reference to FIGS. 10 to 12 indicates an operation in the case of the only the panning rather than the camera shake.

However, a case of one of the panning and the camera shake occurs less and a case of combination of the panning and the camera shake generally occurs. Accordingly, correction according to an embodiment of the present technology is considered as an operation of combining the correction operation for the camera shake and the correction operation for the panning described with reference to FIGS. 8 and 9 and FIGS. 11 and 12.

Figure 13:
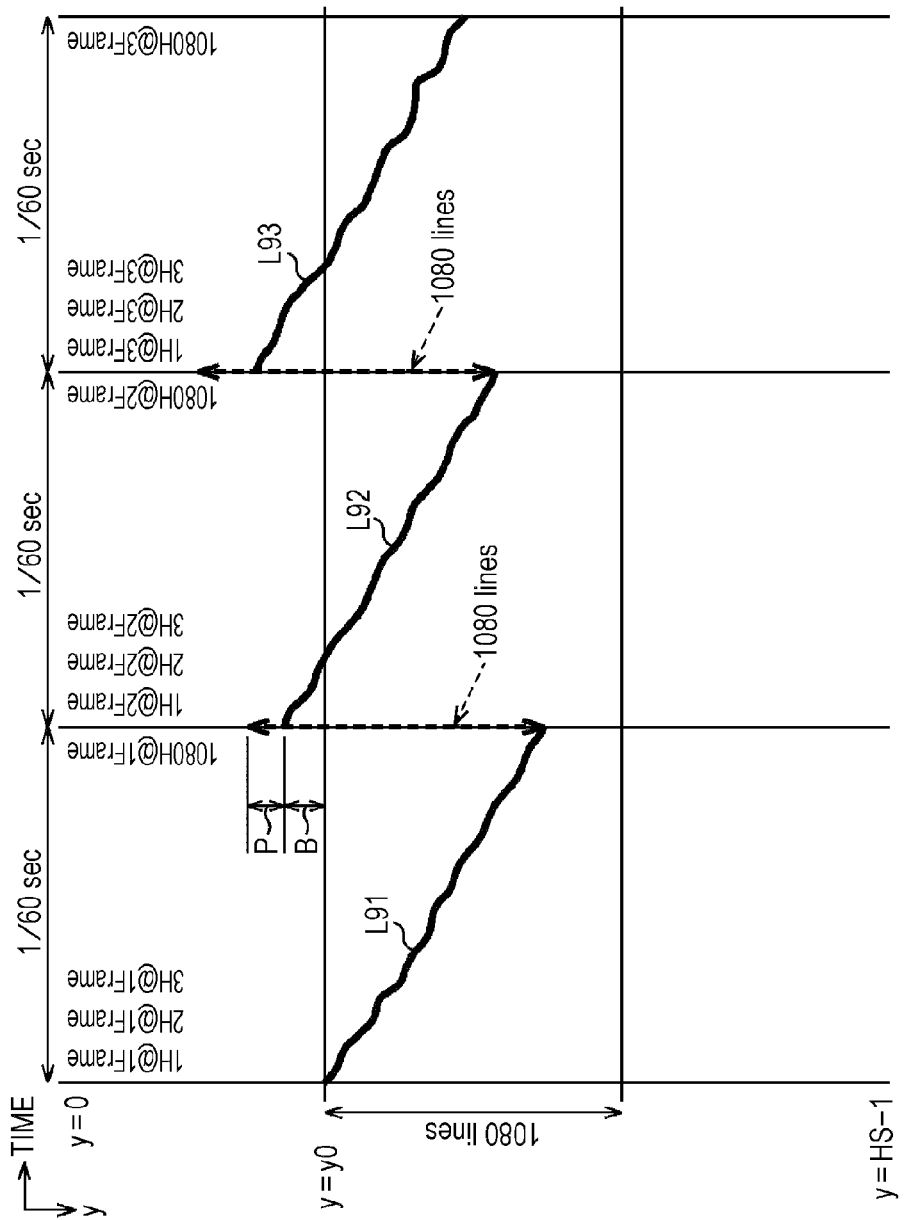
FIG. 13 is a diagram for describing a reading sequence for the purpose of suppressing a rolling shutter phenomenon and stabilizing a moving image.
Figure 14:
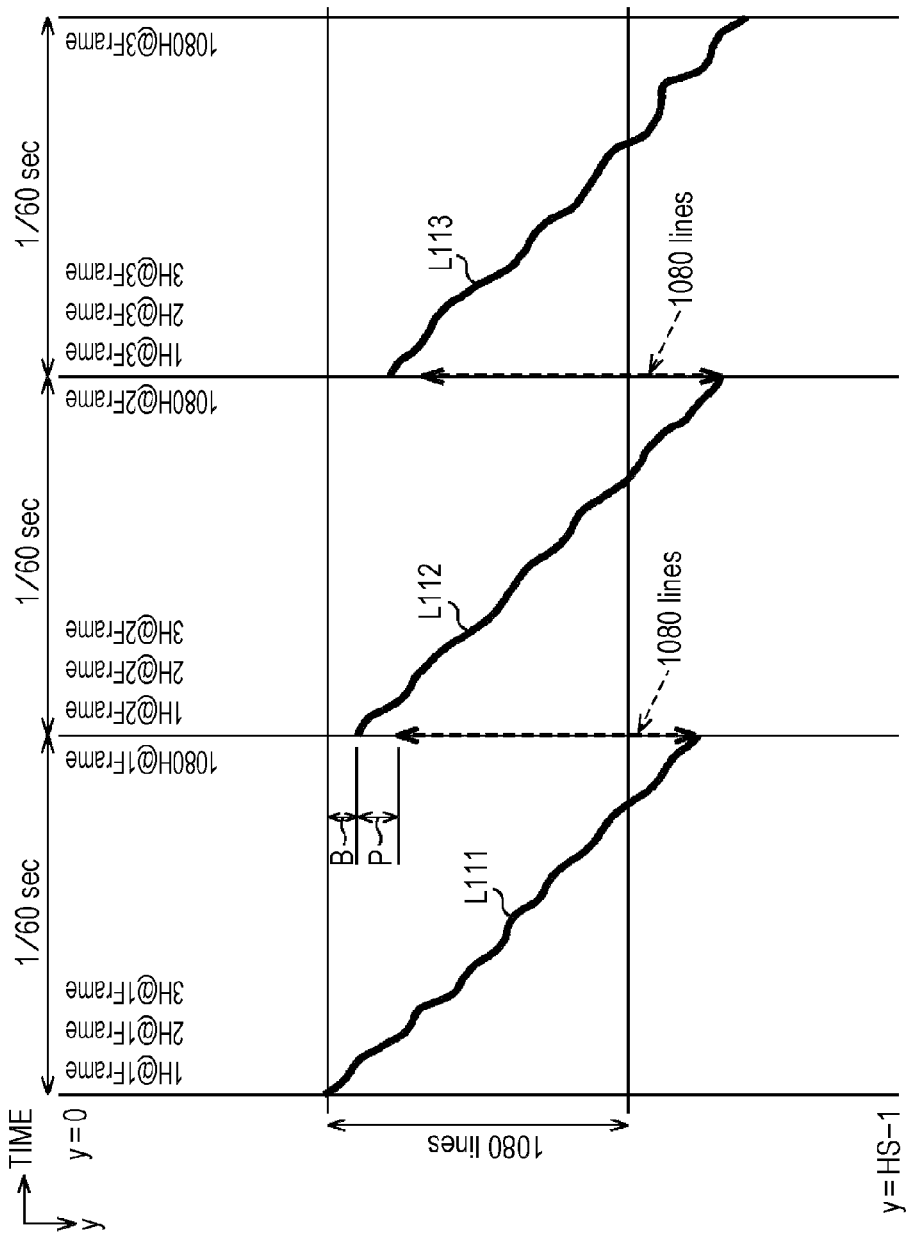
FIG. 14 is a diagram for describing a reading sequence for the purpose of suppressing a rolling shutter phenomenon and stabilizing a moving image.

More specifically, for example, an operation of combining the operations described with reference to FIGS. 8 and 11, as shown in FIG. 13, or an operation of combining the operations described with reference to FIGS. 9 and 12, as shown in FIG. 14, is performed.

That is, in FIG. 13, at a time 1H@2 Frame at which reading of 2 Frame which is the start of the 2nd frame, a reading start position is corrected from a position located by 1080 lines above the position of the 1080th line of 1 Frame for correction of the camera shake and a position of y=y0 for correction of the panning to a position prorated by panning: blur=P:B which is "a ratio between panning and a blur."

Likewise, in FIG. 14, at a time 1H@2 Frame at which reading of 2 Frame which is the start of the 2nd frame, a reading start position is corrected from a position located by 1080 lines above the position of the 1080th line of 1 Frame for correction of the camera shake and a position of y=y0 for correction of the panning to a position prorated by panning: blur=P:B which is "a ratio between panning and a blur."

"The ratio between panning and a blur" can be acquired according to a technology (control method) of the related art. For example, when a considerable change occurs compared to a previous imaging direction of the image sensor 11, the change is processed as a motion intended by a photographer, i.e., panning, and the ratio of the panning is set to be large. In contrast, when a considerable change does not occur compared to a previous imaging direction of the image sensor 11, the change is considered to be a motion unintended by a photographer (a blur occurring due to camera shake) and the ratio of the blur is set to be large.

As another method of controlling "the ratio between panning and a blur," when a reading position of a current frame of the image sensor 11 becomes close to the end of the image sensor 11, there is a probability of a position to be read in a subsequent frame exceeding the region of the image sensor 11, and thus the ratio of panning is set to be large. When the ratio of panning is set to be large in this way, the reading position can be forcibly set to a position at which 1080 lines are read from y=y0. In contrast, when a middle portion of the image sensor is read, the ratio of a blur is set to be large. Through such an operation, it is possible to correct the blur occurring due to the camera shake with higher precision.

Correcting Camera Shake by Setting Different Exposure Times for Each Line

In imaging of a moving image in which camera shake is contained, to cancel the camera shake, the camera shake is corrected by combining pixel data obtained by dividing the pixels into two groups and setting a normal exposure time for the pixels of one group and changing an exposure time for the pixels of the other group according to a blur amount.

Thereafter, the description will be made setting the pixels belonging to even lines to the pixels of the one group and setting the pixels belonging to odd lines to the pixels of the other group. However, a method of dividing the lines is not limited to the even and odd lines. Other methods of dividing the lines may be used. For example, the pixels may be grouped using not only the lines in the horizontal direction but also units of columns in the vertical direction, or may be set to belong to different groups in every other line in a raster scanning direction.

In regard to the blur amount, for example, data of a gyro sensor (not shown) embedded in an imaging device including the image sensor 11 may be used, or a blur amount of each pixel within an exposure time from resetting to reading may be predicted in a subsequent frame by detecting a motion of each pixel through image analysis as will be described below.

Here, the blur amount refers to an amount indicating by how many pixels the pixels belonging to a stationary subject projected to the image sensor are moved due to camera shake within an exposure time. The gyro sensor is referred to an angular velocity sensor.

More specifically, when the blur amount is less than 2 pixels, a reset timing from an exposure start time is adjusted so that exposure times of both of the even lines (to be exact, the pixels belonging to the even lines) and the odd lines (to be exact, the pixels belonging to the odd lines) become a proper exposure time.

Figure 15:
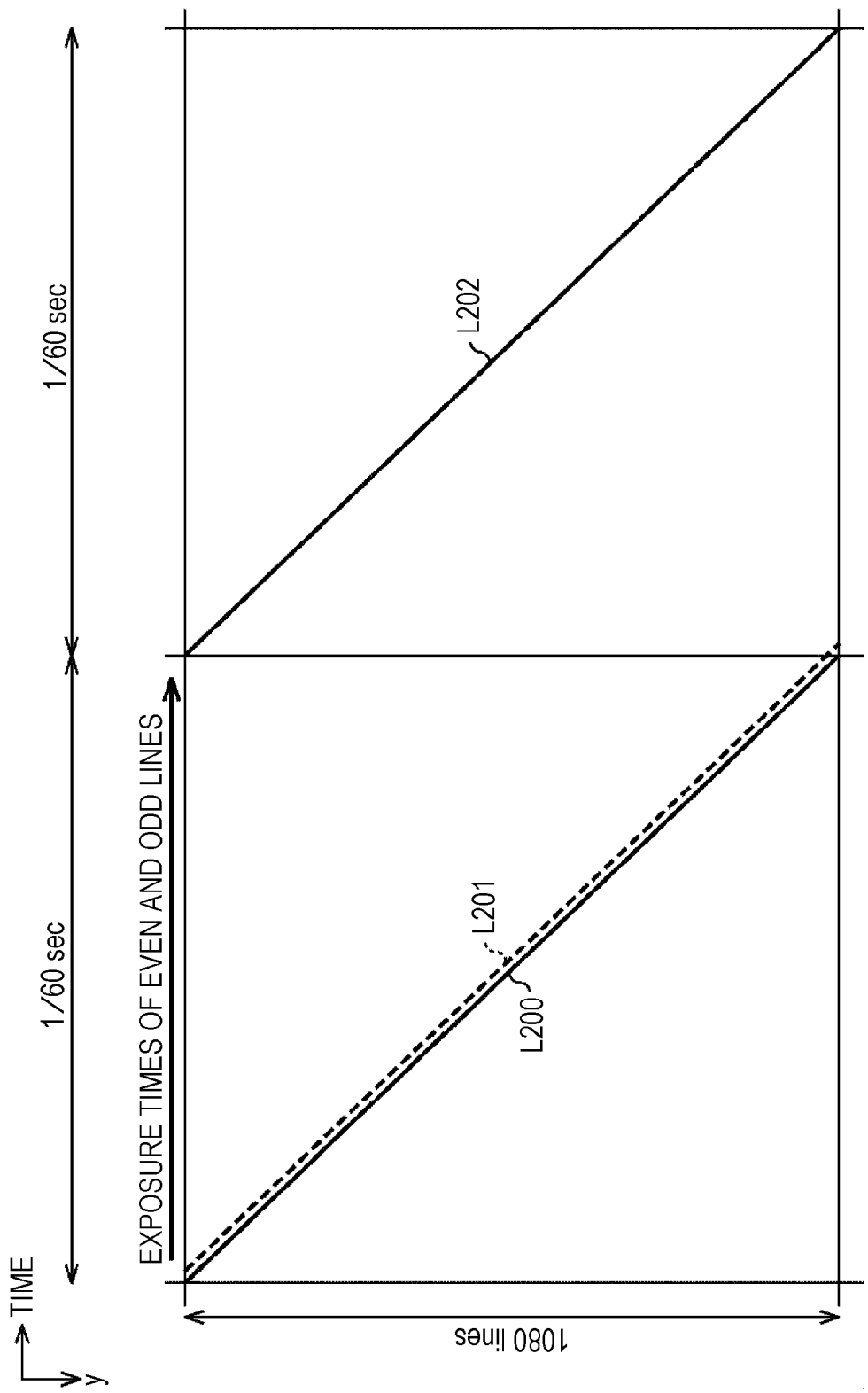
FIG. 15 is a diagram for describing a reset timing and a reading timing of the pixels of even lines.

That is, as shown in FIG. 15, each line is reset to a previous time by the proper exposure time from the reading time. More specifically, the pixels of the even line are sequentially read from the pixel of an upper portion in the drawing, as indicated by a solid line L200, and are reset at a timing indicated by a dotted line L201 which is a timing immediately after the reading. Then, the pixels are read at the timing in a straight line L202 indicated by a solid line after 1/60 seconds, i.e., a normal exposure time, from the reset timing that has passed.

That is, in this case, the same image as that of the related art is generated by the same reading as that of the related art. However, since the blur amount is a slight amount less than 2 pixels, the influence of the camera shake is very small. Therefore, the camera shake rarely substantially influences viewing even when correction is not performed.

Figure 16:
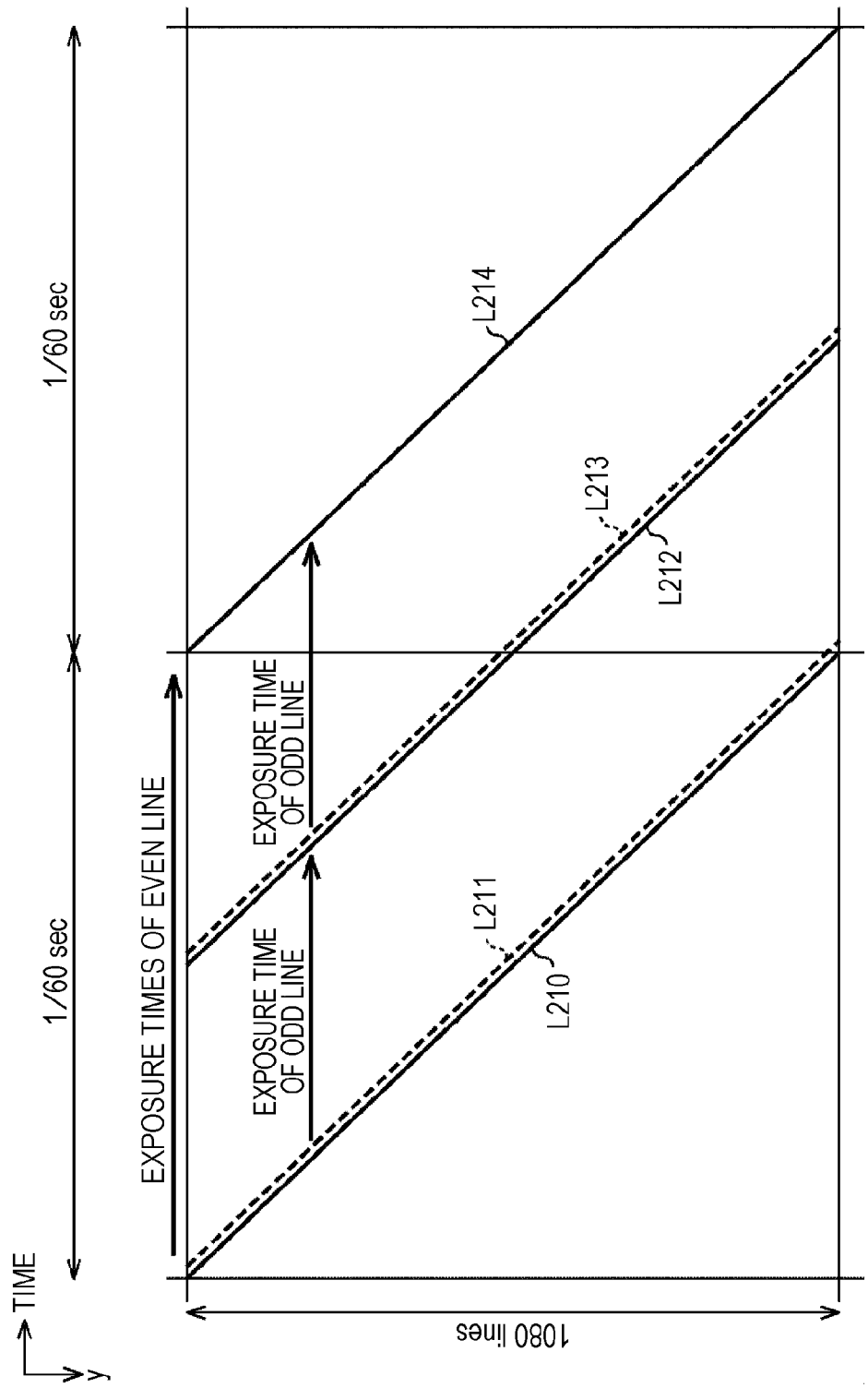
FIG. 16 is a diagram for describing an example in which 2 images of odd lines are captured during an exposure time shorter than that of even lines between a reset timing and a reading timing when the pixels of the even lines are captured.

Further, when the blur amount is equal to or greater than 2 pixels and less than 4 pixels, as shown in FIG. 16, the pixels are sequentially reset from the upper side of the drawing at a timing in a straight line L211 which is a timing immediately after a straight line L210 indicated by a solid line and serving as an immediately previous reading timing so that the exposure time of the even line is properly exposed, and are read after the proper exposure time has passed in the pixels on each line. That is, the imaging is performed so that the pixels on the even line are read, after the normal exposure time has passed from the resetting.

As shown in FIG. 16, when the pixels are reset for the odd line immediately after the "immediately previous reading time" of the even line indicated by the straight line L211, a timing indicated by a straight line L212 in which the time of substantially half of the proper exposure time has passed is considered to be a 1st reading time. Further, when the pixels are reset at a timing indicated by a dotted line L213 immediately after the 1st reading time, 2nd reading is performed again at a timing indicated by a solid line L214 in which the time of substantially half of the proper exposure time has passed. That is, for the pixels of the odd line, the resetting and the reading are performed twice at substantially equal intervals within the proper exposure time.

When the imaging is performed in this way, the resetting and the reading are performed for the same exposure time as that of the related art in regard to an image formed by the pixels of the even lines in the frame. Therefore, the same image as that of the related art is generated. That is, an image in which about 2 to 4 pixels are blurred as the blur amount is captured.

On the other hand, in regard to an image formed by the pixels of the odd lines, since an exposure time is merely a half of the time of the proper exposure time (the exposure time of the related art), the blur amount is also half. Therefore, the image in which about 1 or 2 pixels are blurred is generated. However, the exposure time of the image formed by the pixels of the odd lines is a half of the proper exposure time and it is necessary to increase a gain twice. Accordingly, since noise is doubled, noise is somewhat present in the image.

As a result, by combining the image which is formed by the pixels of the even lines and in which a blur is present and the image (odd lines) which is formed by the pixels of the odd lines and in which noise is present but a blur is not present, it is possible to generate an image in which the blur is suppressed to some extent and the noise is suppressed to some extent.

Figure 17:
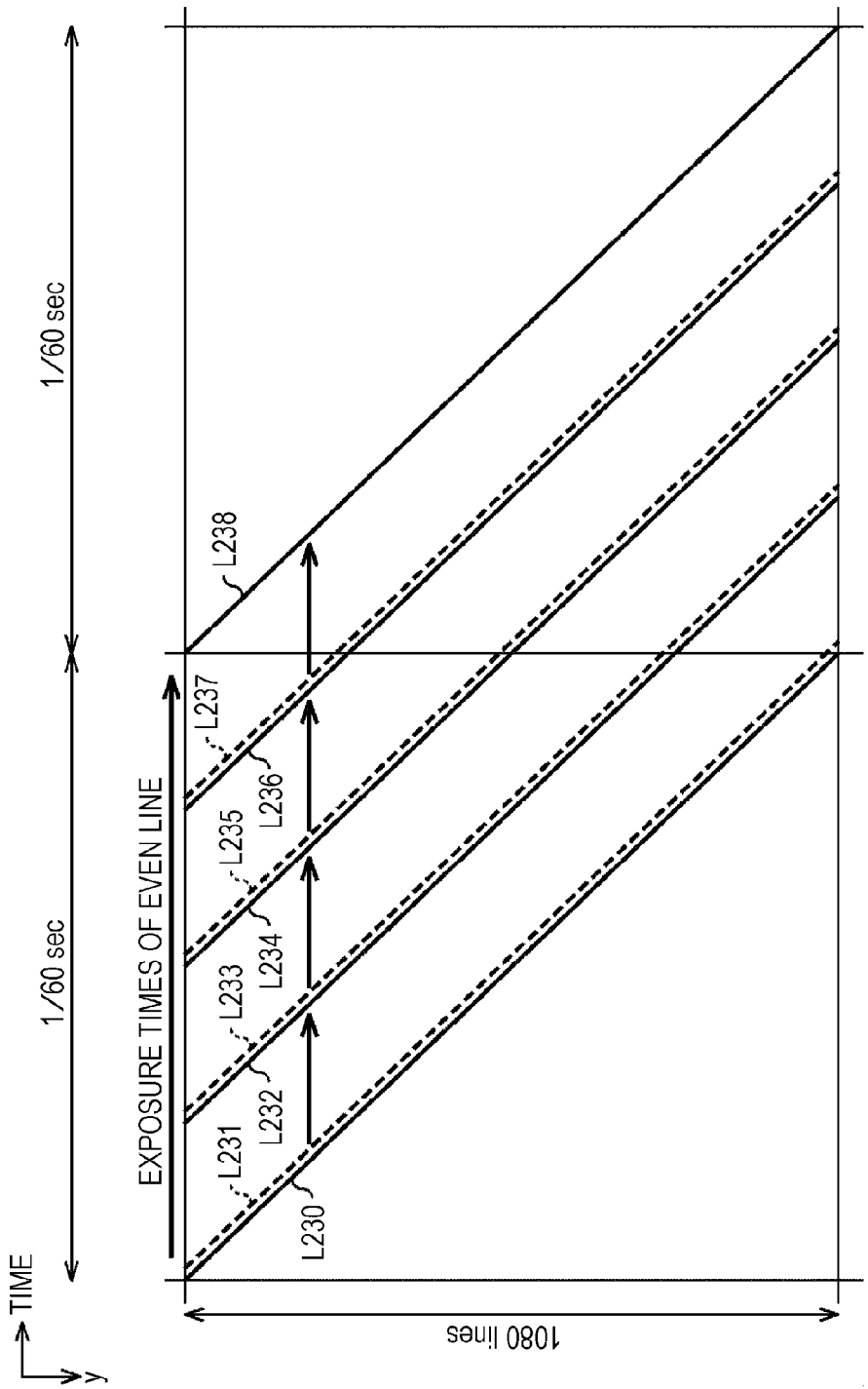
FIG. 17 is a diagram for describing an example in which 4 images of odd lines are captured during an exposure time shorter than that of even lines between a reset timing and a reading timing when the pixels of the even lines are captured.

Furthermore, when the blur amount is equal to or greater than 4 pixels, as shown in FIG. 17, the pixels of the even line are reset at a timing indicated by a dotted line L231 immediately after an immediately previous reading timing of a straight line indicated by a solid line L230 so that the pixels are properly exposed. Then, the pixel data of the pixels belonging to the even line is read at a timing which is indicated by a solid line L238 and at which a proper exposure time has passed.

On the other hand, for the pixels of the odd line, the resetting and the reading are performed 4 times at substantially equal intervals during the proper exposure time according to the same method as the method of the case in which the blur amount is 2 to 4 pixels. That is, when the pixels belonging to the odd line are reset immediately after the "immediately previous reading time" of the even line indicated by the straight line L231, a timing indicated by a solid line L232 in which substantially a time of ¼ of the proper exposure time has passed is considered to be a 1st reading time. When the pixels are reset at a timing indicated by a dotted line L233 immediately after the 1st reading, 2nd reading is performed again at a timing indicated by a solid line L234 in which a time of substantially ¼ of the proper exposure time has passed. Hereinafter, likewise, when the pixels are reset at a timing indicated by a dotted line L235 immediately after the 2nd reading, a timing indicated by a solid line L236 in which a time of substantially ¼ of the proper exposure time has passed is considered as a 3rd reading time. When the pixels are reset at a timing indicated by a dotted line L237 immediately after the 3rd reading, 4th reading is performed again at a timing indicated by a solid line L238 in which a time of substantially ¼ of the proper exposure time has passed.

Accordingly, since the pixel data of the pixels of the even lines is read after the resetting and after elapse of the proper exposure time as in the related art, the same image as that of the related art, i.e., an image in which the blur amount is blurred by about 4 pixels, is captured. On the other hand, since an exposure time of the pixels of the odd lines is an exposure time of substantially ¼ of the proper exposure time which is the exposure time of the related art, an image in which the blur amount is about ¼, i.e., the blur amount is about 1 pixel, is captured. However, since the exposure time is substantially ¼, it is necessary to increase a gain 4 times. Accordingly, since noise is quadrupled, noise is somewhat present in the image.

As a result, by combining the image which is captured by the pixels of the even lines and in which a blur is present and the image which is captured by the pixels of the odd lines and in which noise is present but a blur is small, it is possible to generate an image in which the blur is suppressed and the noise is suppressed.

Hereinafter, the process of exposing and reading all of the pixels of the even lines and the pixels of the odd lines for the proper exposure time, as described with reference to FIG. 15, is referred to as an equal reading process. Further, the process of repeating the resetting and the reading twice on the pixels of the odd lines for the exposure time of substantially half of the proper exposure time whereas exposing the pixels of the even lines for the proper exposure time, as described with reference to FIG. 16, is referred to as a double reading process of the odd lines with respect to the even lines. Furthermore, the process of repeating the resetting and the reading 4 times on the pixels of the odd lines for the exposure time of substantially ¼ of the proper exposure time whereas exposing the pixels of the even lines for the proper exposure time, as described with reference to FIG. 17, is referred to as a quadruple reading process of the odd lines with respect to the even lines.

For example, an exposure time of the pixels of the odd lines may be set to an exposure time shorter than substantially ¼ of the proper exposure time and the resetting and the reading may be repeated 4 times or more, as long as this exposure time is within the proper exposure time for the even lines. Accordingly, the process of repeating the resetting and the reading at N equal intervals within the proper exposure time is referred to as a N-time reading process of the odd lines with respect to the even lines.

However, for example, when the proper exposure time is divided into 8 and the resetting and the reading are repeated 8 times, the number of read frames means that the frames are read at 60×8=480 fps, for example, in the reading of 8 times. Accordingly, when high-speed reading is performed, power consumption increases. Therefore, from the viewpoint of the power consumption, the number of times the resetting and the reading are repeated is restricted to a certain number of times.

When the above-described double reading process or quadruple reading process of the odd lines with respect to the even lines is performed, the reading amounts of data are doubled and quadrupled with respect to the reading amounts of the pixels of the even lines. However, the amounts of data are too considerable. Therefore, when a transmission speed exceeds a physical limit, a word length of each pixel data of the odd lines may be shortened and the amount of data may be reduced.

As a specific example, when a word length of each pixel data of the even lines is 12 bits (data divided by 4096 between values 0.0 and 1.0 to be quantized), the word length of each pixel data of the odd lines is set to 12 bits in the case of the equal reading process. However, in the case of the double reading process, the word length of each pixel data of the odd lines may be set to about 10 bits (data divided by 1024 between values 0.0 and 1.0 to be quantized) for the pixel data of the odd lines. In the case of the quadruple reading process, the word length of each pixel data of the odd lines may be set to about 8 bits (data divided by 256 between values 0.0 and 1.0 to be quantized).

Accordingly, the blur amount within the proper exposure time is predicted and the number of times N of the resetting and the reading of the odd lines is specified according to the predicted blur amount. Then, the N-time reading process is performed based on the specified number of times N. The number of times N is adaptively switched depending on the blur amount. By combining an image which is captured by the pixels belonging to the even lines and in which a blur is present and an image (odd lines) which is captured by the pixels belonging to the odd lines and in which noise is present but a blur is not present, it is possible to generate an image in which the blur and the noise are suppressed in a well-balanced manner.

Method of Omitting Frame Memory by Adjusting Reading Timing from Image Sensor

Figure 18:
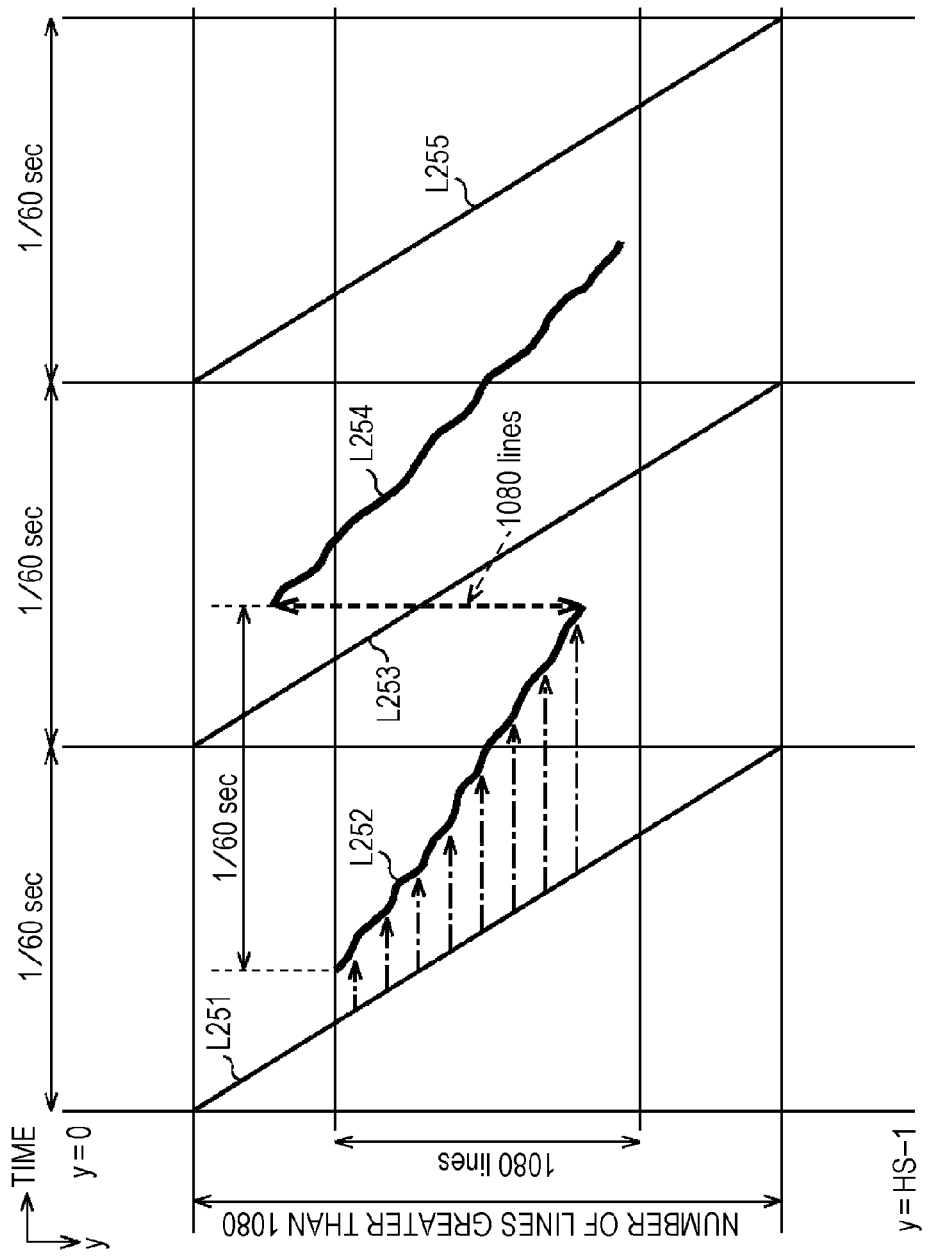
FIG. 18 is a diagram for describing reset and reading timings when a frame memory is used.

Here, a method of suppressing the rolling shutter phenomenon and stabilizing a moving image in the related art will be described with reference to FIG. 18.

As described with reference to FIG. 8 and the like, the lines to be read are determined at a time after a subsequent 1H by using data of a gyro sensor (not shown) embedded in an imaging device such as a camera or data of a motion detected through image analysis. Then, for example, by sequentially reading the pixels of the determined lines at a timing indicated by a solid line L251 (or L253) of FIG. 18, the rolling shutter phenomenon is corrected and a subject in a moving image is stabilized in a frame.

To realize such a process, in the related art, pixel data of the lines more than 1080 lines are read and stored in a frame memory once, and then the stored pixel data is read from the frame memory at a timing indicated by a thick solid line L252 (or L254). The thick solid lines L252 and L254 indicate the timing at which the pixels of the lines read to correct the rolling shutter phenomenon and stabilize a moving image are read.

On the other hand, in an embodiment of the present technology, the lines to be read at a time after a subsequent 1H are determined by using data of a gyro sensor (not shown) embedded in an imaging device such as a camera or data of a motion detected through image analysis, as will be described below. Then, the pixel data of the lines determined to be read is read from the image sensor.

For the pixels of the line from which the current pixel data is read, a time until reading of a subsequent line is calculated and the subsequent line is not read until the time comes.

In this way, by determining the line to be read based on a motion of the image sensor (to be exact, a motion by camera shake of a stationary subject projected to the image sensor within a subsequent 1H time) or changing a reading timing, the rolling shutter phenomenon is corrected and a moving image is stabilized.

In other words, each pixel (a capacitor of a light-receiving element) of the image sensor 11 is substituted for a frame memory. That is, in the related art, a timing at which the pixel data is read is adjusted by a frame memory. In an embodiment of the present technology, however, each pixel (a capacitor of a light-receiving element) of the image sensor 11 adjusts the timing at which the pixel data is read.

Figure 19:
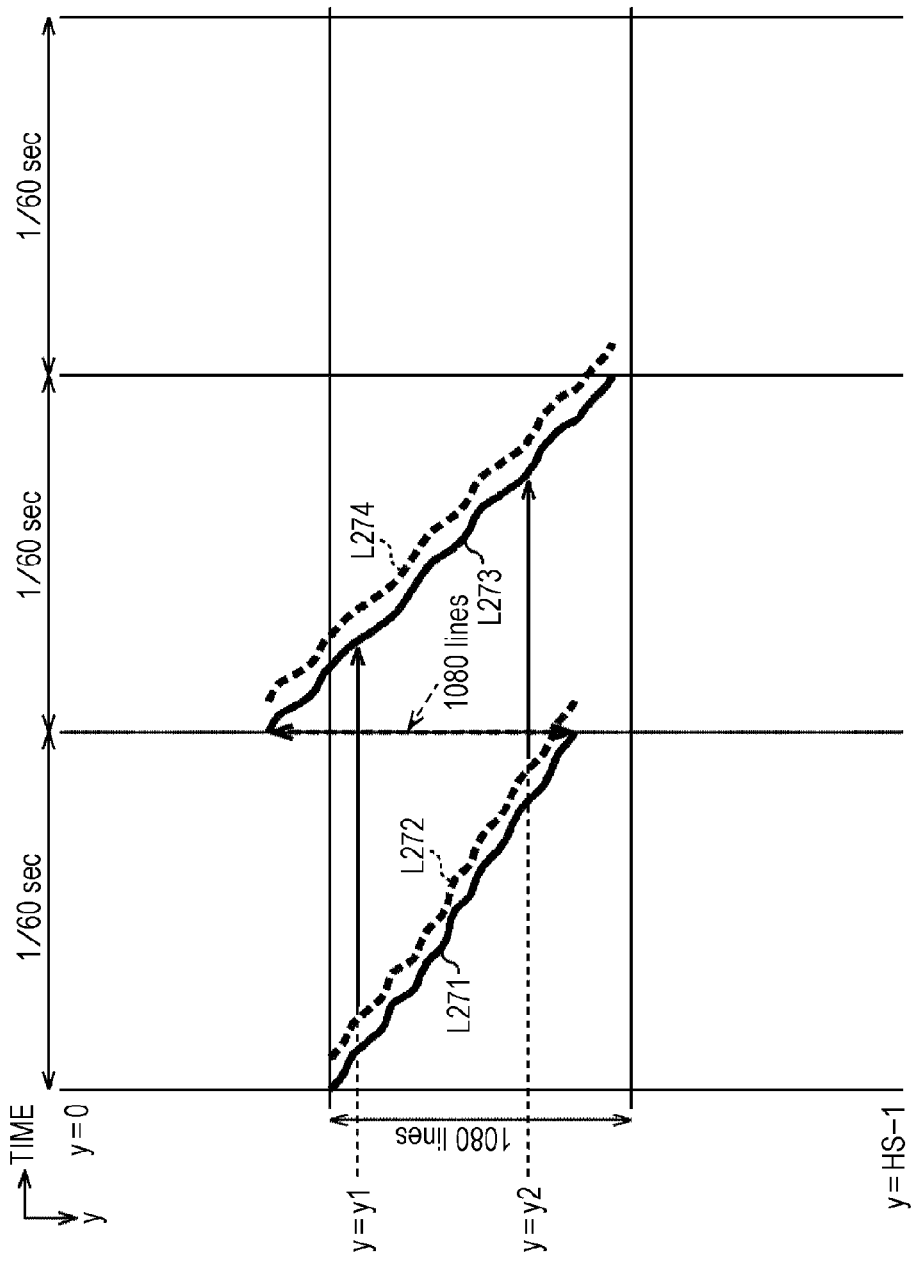
FIG. 19 is a diagram for describing reset and reading timings when a frame memory to which an embodiment of the present technology is applied is not used.

More specifically, as shown in FIG. 19, when the pixel data is sequentially read at a solid line L271, the pixel data is reset at an immediately subsequent timing indicated by a dotted line L272. Further, when the pixel data is reset, the pixel data of a subsequent frame is read at a timing indicated by a solid line L273. The pixel data is reset at an immediately subsequent timing indicated by a dotted line L274.

Through such a process, each pixel of the image sensor 11 functions as a frame memory. Therefore, it is not necessary to use a frame memory, and consequently cost can be reduced.

For example, an exposure time (a length of an arrow in the drawing) is different between a line of y=y1 and a line of y=y2, as shown in FIG. 19. Therefore, as will be described below, it is necessary to perform a correction of adjusting a gain of the pixel data of each line by multiplying a coefficient inversely proportional to a difference between a resetting time and a reading time of each line.

Precautions when Operation of Combining Correction Operations for Camera Shake and Panning and Method of Omitting Frame Memory are Used Together Next, precautions when the operation of combining the correction operations for the blur and the panning and the method of omitting the frame memory are used together will be described.

In FIG. 16, the reading timing of the even line which is linear (the position of the y axis has a proportional relation with respect to the time axis) has been described.

Figure 20:
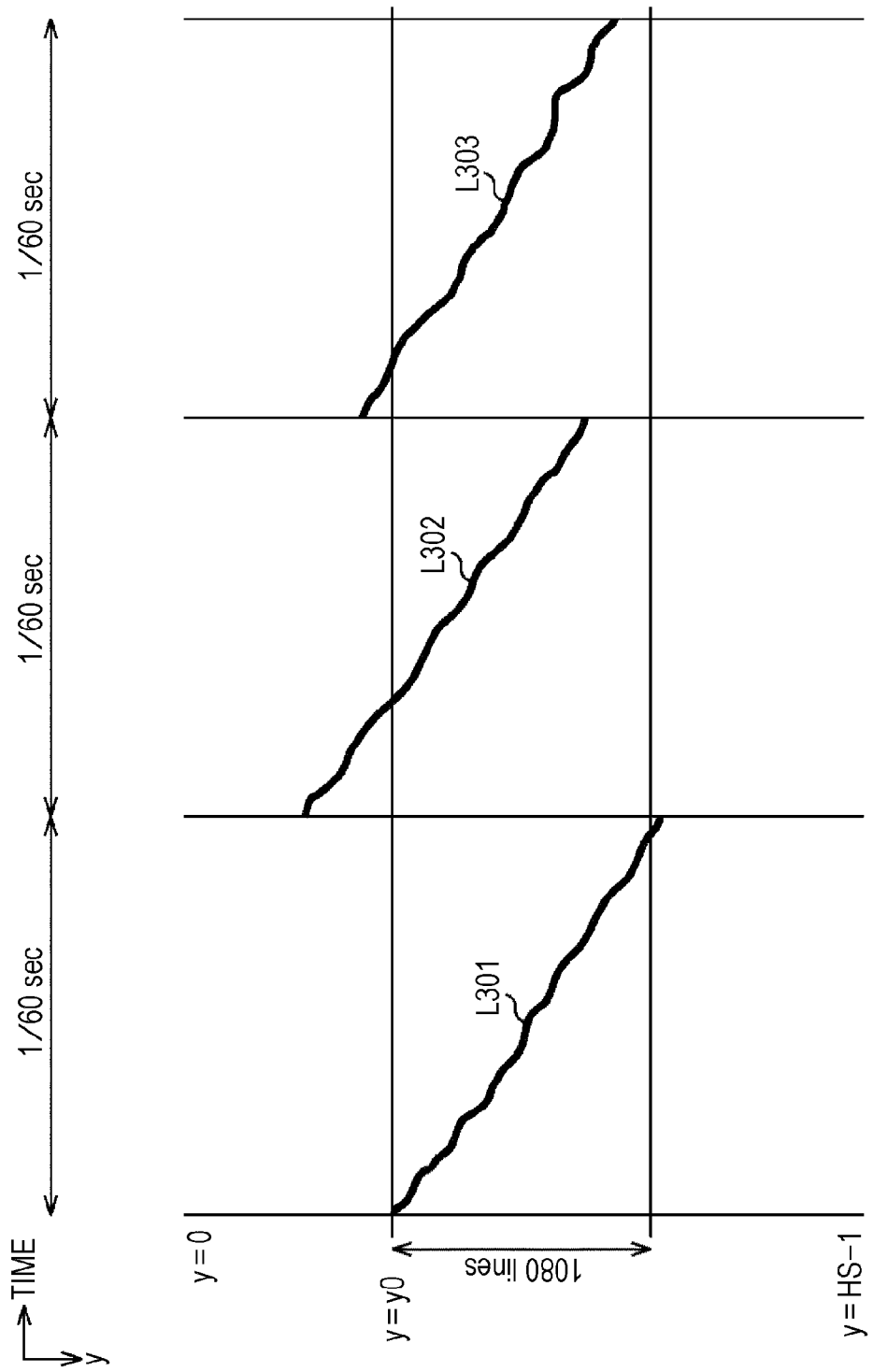
FIG. 20 is a diagram for describing a reading timing of the even lines.

However, when a frame memory is configured not to be used, a reading time of the even lines is generally changed in a curved form, as indicated by solid lines L301 to L303 of FIG. 20. Accordingly, for the pixels of the odd lines, the resetting and the reading are performed twice at time intervals of substantially half of the proper exposure time, for example, in the double reading process in the proper exposure time of the even lines. Thus, in the double reading process, the resetting and the reading are considered to be performed in the odd lines 2 times, which are twice the number of readings of the even lines, by halving the immediately previous reading time and the current reading time of the pixels of the even lines and performing the resetting and the reading at the halved time intervals.

Figure 21:
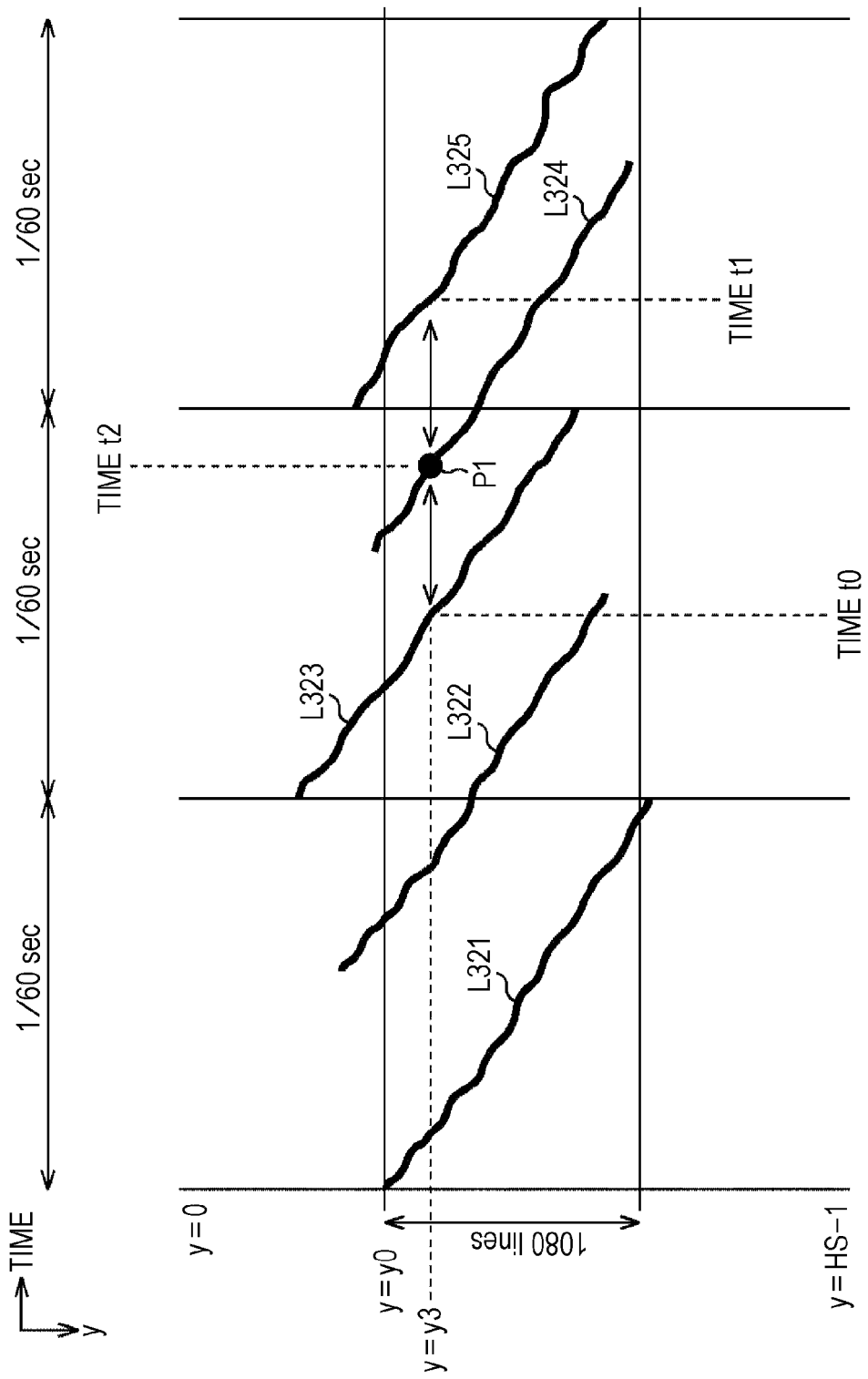
FIG. 21 is a diagram for describing an example in which a reading timing of the odd lines is obtained from the waveform of the reading timing of the even lines.

When such consideration is taken, the reading time of the odd lines is obtained by halving the previous and subsequent reading times of the even lines which are curved lines at the time of the double reading process, as shown in FIG. 21. For example, as shown in FIG. 21, when a pixel belongs to a line y=y3 which is an odd line and is a pixel P1 at a time t2, reading times of the even line at the previous and subsequent timings are assumed to be a time t0 and a time t1 corresponding to the pixel P1 in each of solid lines L323 and L325. In this case, the pixel P1 on the line y=y3 which is an odd line may be read at a time t2 which is a middle point of the 2 times t0 and t1.

However, at the time t2, the reading time t1 of the even line is not decided and the time t2 may not be specified using the reading time t1 of the pixels on the even line corresponding to the pixel P1. That is, since a motion of the image sensor by future camera shake may not be predicted, the future reading time t1 of the even line may not be specified. Consequently, the reading time t2 of the pixel P1 on the line y=y3 which is an odd line may not be specified.

In FIG. 21, the solid lines L321, L323, and L325 indicate the reading times of the pixel data belonging to the even and odd lines, and solid lines L322 and L324 indicate reading times of the pixel data belonging to the odd lines. In FIG. 21, the solid lines L322 and L324 are disposed at the positions at which the intervals of the solid lines L321, L323, and L325 are halved equally.

As described above, the reading times of the pixel data of the odd lines are obtained through approximation based on the reading times of the pixel data of the previous even lines.

More specifically, as described with reference to FIG. 21, the reading times of the pixel data of the odd lines have been obtained by halving the reading times equally in the time direction. However, since the reading times of the subsequent even lines may not be specified, the reading times of the odd lines are obtained through the approximation in which the reading times are halved equally in the space direction.

Figure 22:
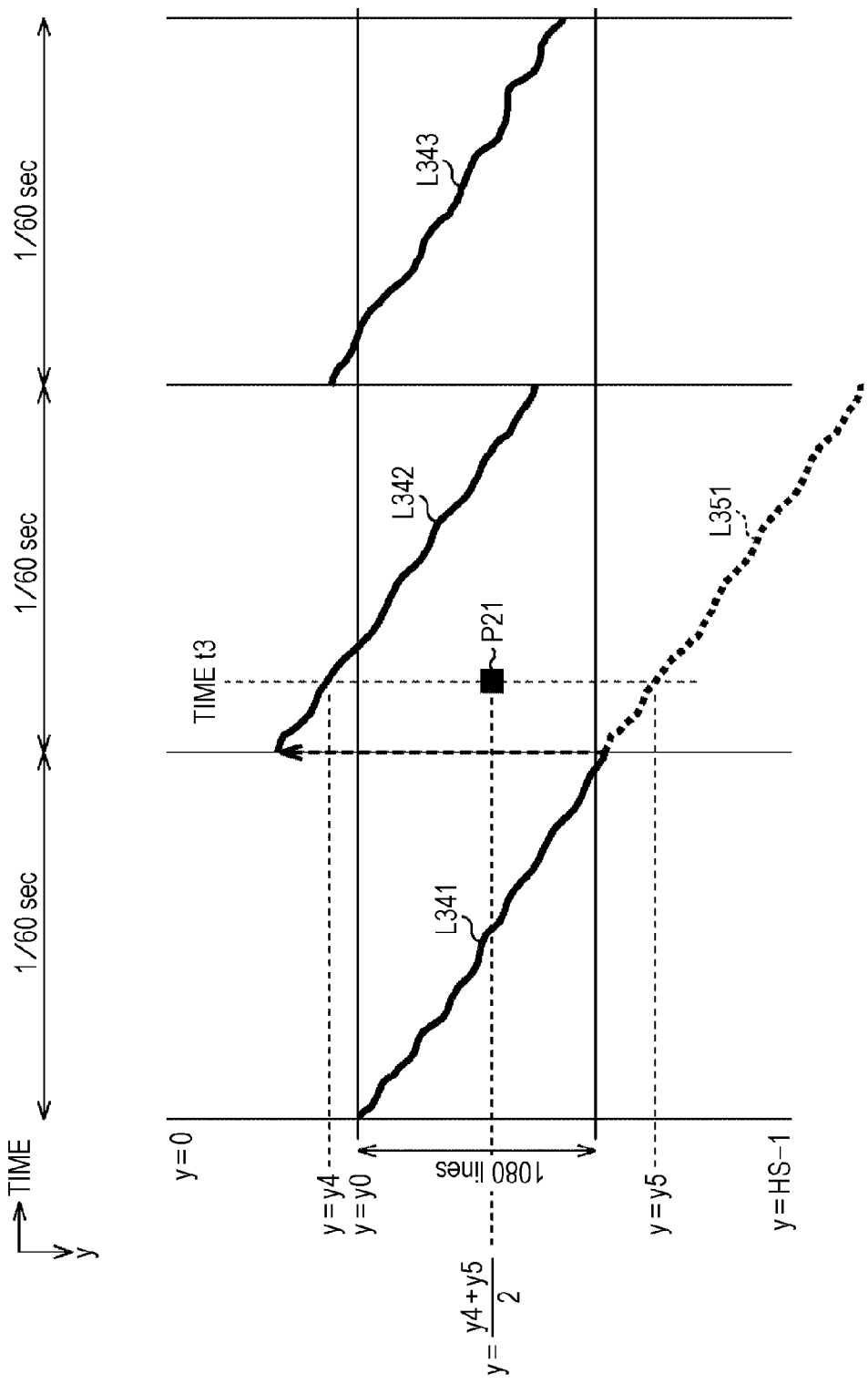
FIG. 22 is a diagram for describing a waveform extending a previous waveform of the reading timing of an even line.

That is, for example, as shown in FIG. 22, the pixel data of the even line up to y=y4 in a solid line L342 is read at a time t3. Accordingly, a time after the time t3 is a future time and a reading time is not decided at the time point of the time t3. At this time, at a reading time of the even line of the current frame including the time t3, a dotted line L351 extending to a solid line L341 indicating the reading time of the current frame from the immediately previous frame is considered.

That is, the dotted line L351 is an imaginary extension line of the solid line L341 indicating the reading time of the pixel data of the even line of the immediately previous frame. Accordingly, a line (y=(y4+y5)/2) of a pixel P21 indicated by a black square in the drawing at a middle point of a line (y=y4) corresponding to the reading time t3 of the pixel data of the even line of the current frame and a line (y=y5) corresponding to the time t3 in the imaginary extension line of the reading time of the pixel data of the even line of the immediately previous frame is approximated as a line of the pixel data of the odd line to be read at the time t3.

Through the above-described process, it is possible to calculate a reading time in a positive space of the y axis from the solid line L342 indicating the reading time of the even line of the current frame. Further, the same applies to the solid line L341 and a solid line L343.

On the other hand, the same method can also be used for the upper side (a negative direction of the y axis) from the reading time of the even line of the current frame.

Figure 23:
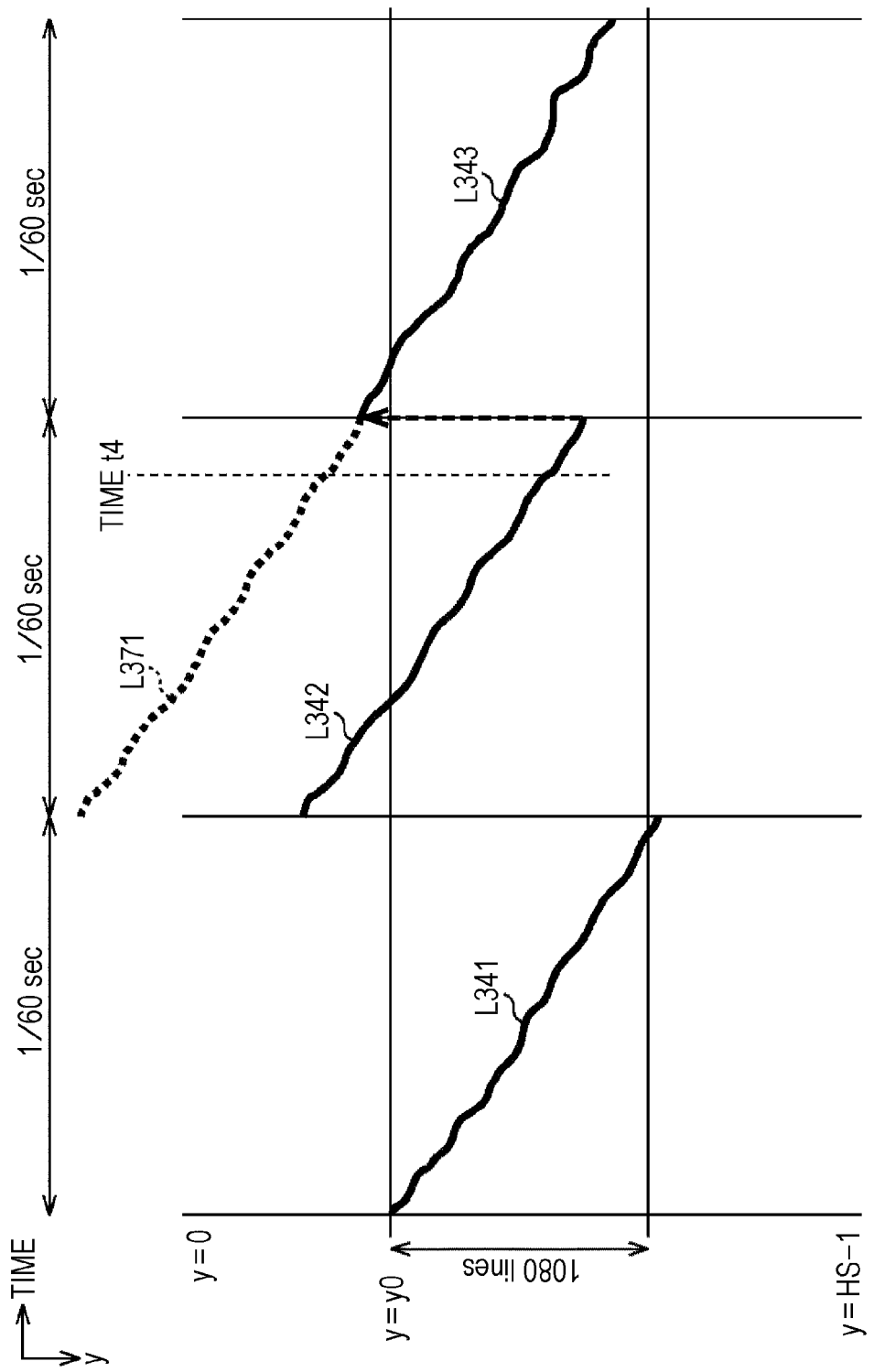
FIG. 23 is a diagram for describing a waveform extending a subsequent waveform of the reading timing of an even line.

That is, as shown in FIG. 23, when the current time is a time t4, the pixel data of the line up to the time t4 on the solid line L342 indicating the reading time of the pixel data of the even line is read. However, a time after the time t4 is a future time and a reading time is not decided at the time t4.

Here, at a reading time of the pixel data of the even line of the current frame including the time t4, a dotted line L371 is considered which is obtained by adding a movement amount (an upward dotted line arrow in FIG. 23) to the uppermost line of a future frame to the solid line L342indicating the reading time of an immediately subsequent frame of the current frame.

When the dotted line L371 can be obtained, a time at which the pixel data of the odd line is read can be obtained by using the even line L342 together up to the present time. At the time t4, however, the upward dotted line arrow in FIG. 23 is a future event and the magnitude of the dotted line arrow is an unknown value. Accordingly, the time may not be obtained as in the reading time in the line in the positive direction of the y axis from the solid line L342 of the reading time of the even line of the current frame.

Accordingly, at a time at which the current frame starts, the dotted line L371 is obtained by adding "a ratio between panning and a blur" in a subsequent frame (immediately subsequent frame) to the solid line L342indicating the reading time of the pixel data in the current even line.

Since "the ratio between the panning and the blur" is information supplied from the outside and is a value obtainable according to an existing technology (control method) of the related art, the description thereof will be simply made.

That is, for example, when a motion of the image sensor is considerably different from a previous motion, this motion is considered to be a motion (that is, panning) intended by a photographer and the ratio of the panning is set to be large. In contrast, when a motion of the image sensor is similar to a previous motion, this motion is considered to be a motion (camera shake) unintended by the photographer and the ratio of the blur is set to be large.

As another method of controlling "the ratio between the panning and the blur," when the reading position of the current frame of the image sensor is close to the end of the image sensor 11, there is a probability of a position to be read in a subsequent frame exceeding the region of the image sensor 11, and thus the ratio of the panning is set to be large. When the ratio of the panning is set to be large in this way, the reading position can be forcibly set to a position at which 1080 lines are read from y=y0. In contrast, when a middle portion of the image sensor is read, the ratio of the blur is set to be large.

Figure 24:
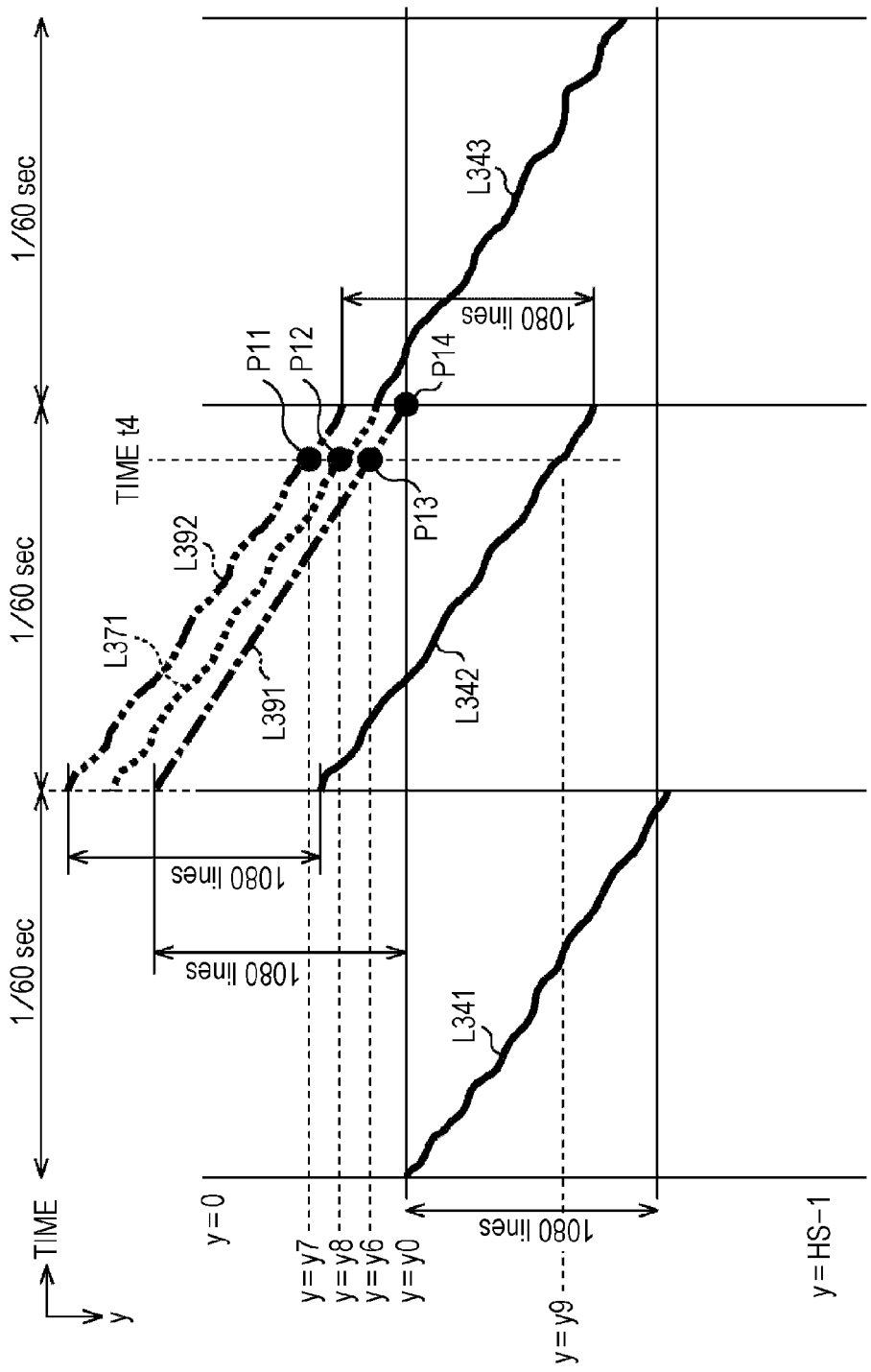
FIG. 24 is a diagram for describing an example in which the waveform of an odd line is interpolated and generated from a subsequent waveform of an even line and a current waveform of the even line.

On the other hand, as shown in FIG. 24, a one-dot chain line L391 indicating a reading time of the even line of the immediately subsequent frame is obtained when a motion of the image sensor is assumed to be panning. As shown in FIG. 24, a two-dot chain line L392 indicating a reading time of the even line of the immediately subsequent frame is obtained when a motion of the image sensor is assumed to be a blur.

That is, when a motion of the image sensor is completely panning, as described with reference to FIGS. 11 and 12, the line y=y0 is read at a start time of the immediately subsequent frame, irrespective of the dotted line L371 indicating the reading time of the current frame. Accordingly, "y=y0−1080" is satisfied at the time of the start of the current frame and a one-dot chain line L391 in which "y=y0" is satisfied is obtained at the final time (that is, the start time of the immediately subsequent frame) of the current frame. That is, the one-dot chain line L391 is an imaginary extension line of the reading time of the even line of the immediately subsequent frame when a motion of the image sensor is assumed to be panning.

When a motion of the image sensor is completely a blur by camera shake, as described with reference to FIGS. 8 and 9, a line located by 1080 lines above the final of the reading curve of the current frame is a start line of the immediately subsequent frame. Accordingly, a two-dot chain line L392 indicating a line located normally by 1080 lines above the dotted line L371 indicating the reading time of the even line of the current frame is obtained. That is, the two-dot chain line L392 is an imaginary extension line of the reading time of the even line of the immediately subsequent frame when the motion of the image sensor is a blur by the camera shake.

By performing proration at the obtained ratio of the panning and the camera shake using the one-dot chain line L391 and the two-dot chain line L392, the dotted line L371which is the imaginary extension line of the reading time of the even line of the immediately subsequent frame is obtained. When "the ratio between the panning and the blur" is obtained completely by the panning, the dotted line 371 is identical with the one-dot chain line L391. In contrast, when "the ratio between the panning and the blur" is obtained completely by the blur by the camera shake, the dotted line 371 is identical with the two-dot chain line L392.

Figure 25:
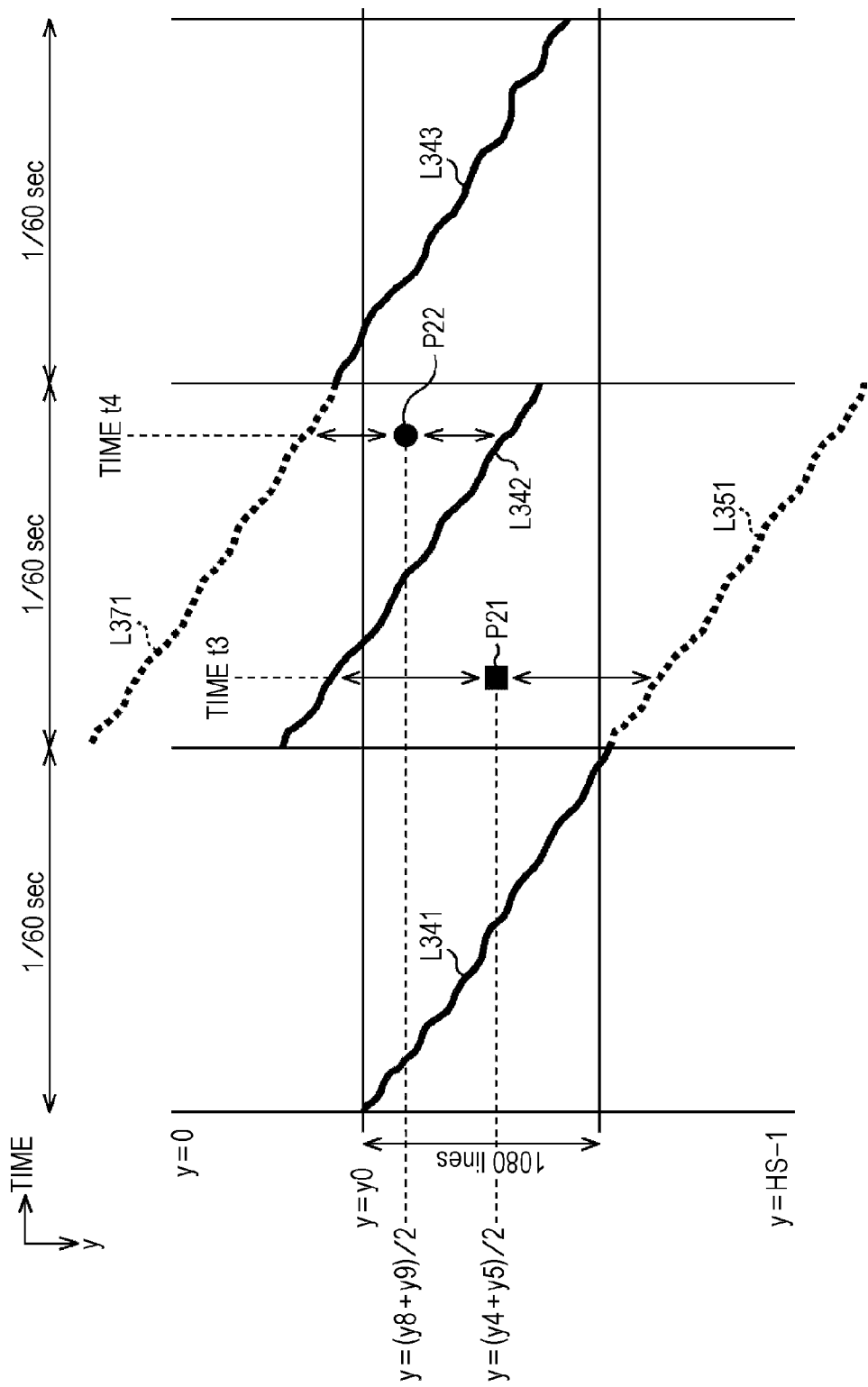
FIG. 25 is a diagram for describing an example in which odd lines are interpolated and generated from the waveforms of previous even lines and subsequent even lines and the waveforms of current even lines.

By obtaining the dotted line L371 in this way, for example, a pixel P13 in which the line on the imaginary extension line of the reading time of the even line of the immediately subsequent frame is y=y6 is obtained at the time t4 in FIG. 25 when a motion of the image sensor is assumed to be the panning. A pixel P11 in which the line on the imaginary extension line of the reading time of the even line of the immediately subsequent frame is y=y7 is obtained when a motion of the image sensor is assumed to be the camera shake. At this time, a line y=y8 of a pixel P12 on the dotted line L371 which is the imaginary extension line of the reading time of the even line of the immediately subsequent frame is obtained as a line y=y8 of the pixel P12 in which the lines y=y6 and y7 in the pixels P11 and P13 are prorated at the ratio between the panning and the camera shake.

After the dotted line L371 which is the imaginary extension line of the reading time of the even line of the immediately subsequent frame is decided in this way, the reading time can be calculated as in the method for the line in the negative direction of the y axis from the solid line L342 of the reading time of the even line of the current frame. That is, a line y=(y8+y9)/2 of a pixel P22 indicated by a black circle at a middle point between the line y=y9 in which the reading time of the even line of the current frame is the time t4 and the line y=y8 corresponding to the time t4 of the imaginary extension line of the reading time of the even line of the immediately subsequent frame becomes a reading line of the pixel data of the odd line at the time t4.

In the above description, the case has been described in which the interval of the immediately previous reading time and the current reading time of the even line is halved and the resetting and the reading are performed twice in regard to the reading time of the odd line. In regard to the odd line, the same applies to the case of the quadruple reading process of quartering the interval between the immediately previous reading and the current reading of the even line and performing the resetting and the reading 4 times.

Signals Supplied to Imaging Device

Hereinafter, the configurations of clocks necessary in control of an operation of the imaging device and signals input to the imaging device will be described when an example of the configuration of the imaging device is described.

For example, when the description is made with reference to FIG. 11, the pixel data less than 1080 lines is read for 1/60 seconds. On the other hand, when the description is made with reference to FIG. 12, the pixel data equal to or greater than 1080 lines is read. Accordingly, to cope with both of the cases, it is necessary to perform an operation at a higher speed than when the pixel data corresponding to 1 line is read for normal 1/(60×1080) seconds.

Figure 26:
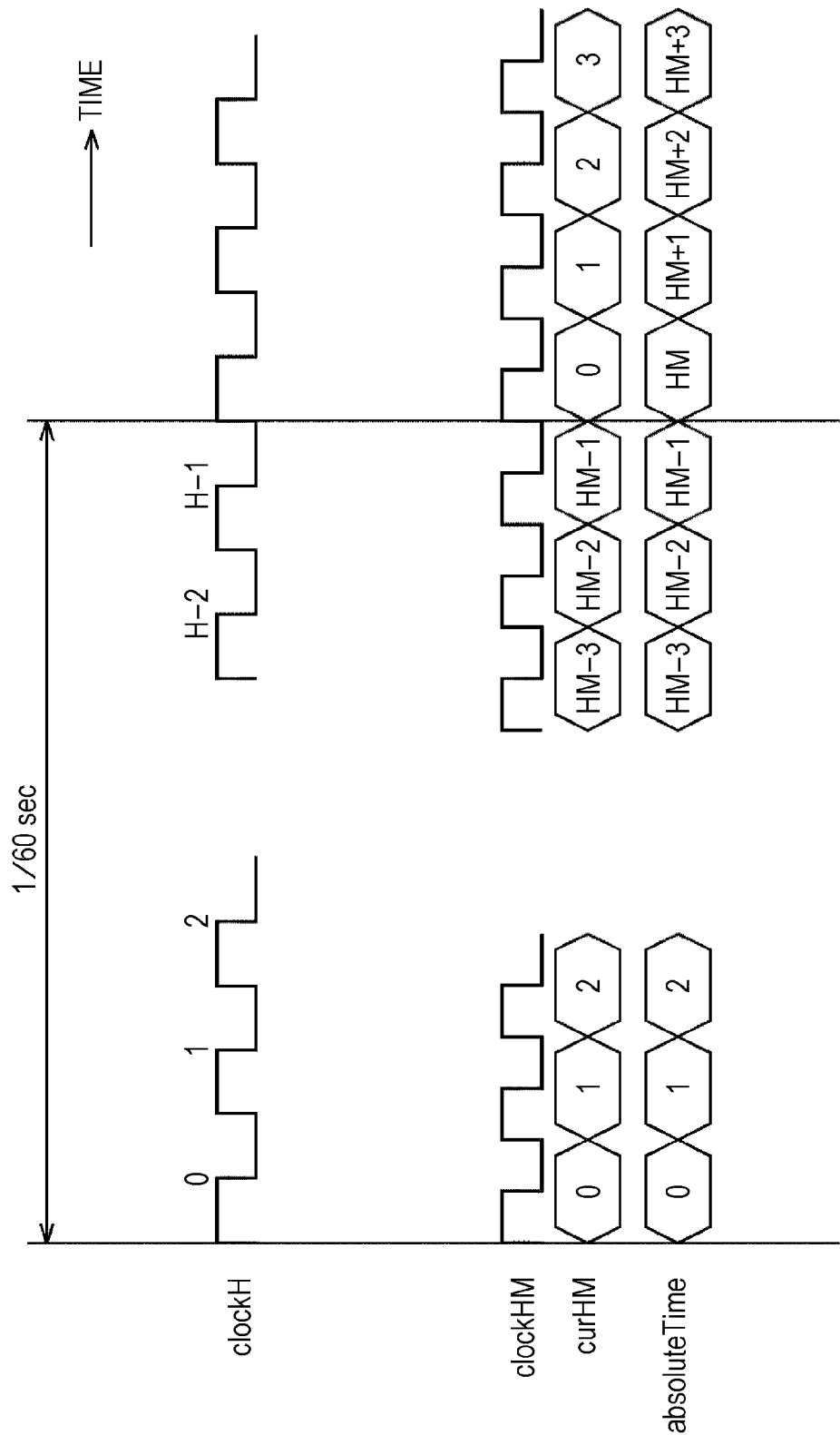
FIG. 26 is a diagram for describing a clock used in an imaging device to which an embodiment of the present technology is applied.

Accordingly, as shown in FIG. 26, a clock signal generation unit (not shown) that generate both of a clock clockH of (60×1080) Hz and a clock clockHM faster than the clock clockH is installed. Thus, in the imaging device, the clocks clockH and clockHM are assumed to be normally generated and supplied.

Accordingly, for example, the resetting or the reading of each pixel of the image sensor 11 is performed in synchronization with the clock clockHM. However, finally, it is necessary to perform synchronization with the clock clockH in the generation of an image of 1 frame. In FIG. 26, the value of H is 1080 and the value of HM is set to be about 1080×1.2, for example, to allow a margin of 20%.

In an embodiment of the present technology, since an absolute time is also necessary, the clock signal generation unit is assumed to also generate data called an absolute time absoluteTime which increases by one in synchronization with the clock clockHM.

Since a line number corresponding to a current time is also necessary, the clock signal generation unit (not shown) is assumed to also generate a line number curHM (reset to 0 for each 1/60 seconds) which increases by one in synchronization with the clock clockHM.

Accordingly, the clock clockH, the clock clockHM, the line number curHM, and the absolute time absoluteTime are shown from the upper side of FIG. 26. In this example, H is assumed to be 1080 and MH is assumed to be H×1.2, but other values may be used.

Figure 27:
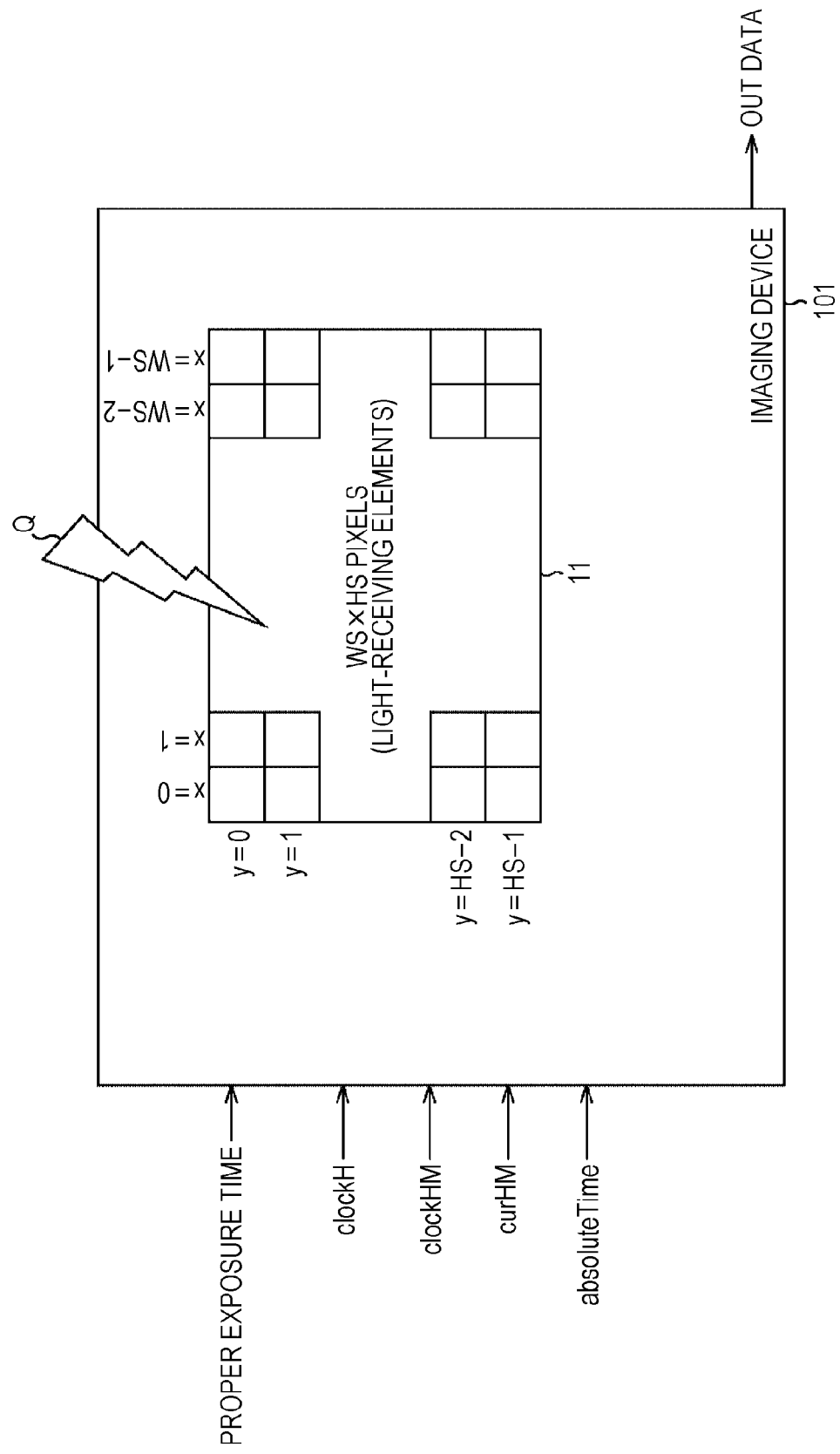
FIG. 27 is a diagram for describing signals input to and output from the imaging device to which an embodiment of the present technology is applied.

As shown in FIG. 27, an imaging device 101 including an image sensor to which an embodiment of the present technology is applied is supplied with information regarding a proper exposure time (unit: second) in addition to the clock clockH, the clock clockHM, the line number curHM, and the absolute time absoluteTime described with reference to FIG. 26. For example, the proper exposure time (unit: second) is obtained from a general exposure meter or the like (not shown).

As shown in FIG. 27, the imaging device 101 includes the above-described image sensor 11 that includes WS×HS pixels (light-receiving elements). Light Q from a subject is incident on each pixel (light-receiving element) via a lens (not shown) and is subjected to photoelectric conversion. At this time, through the series of processes described above, a moving image in which the rolling shutter phenomenon is corrected and the blur is suppressed is output from the imaging device 101.

Figure 28:
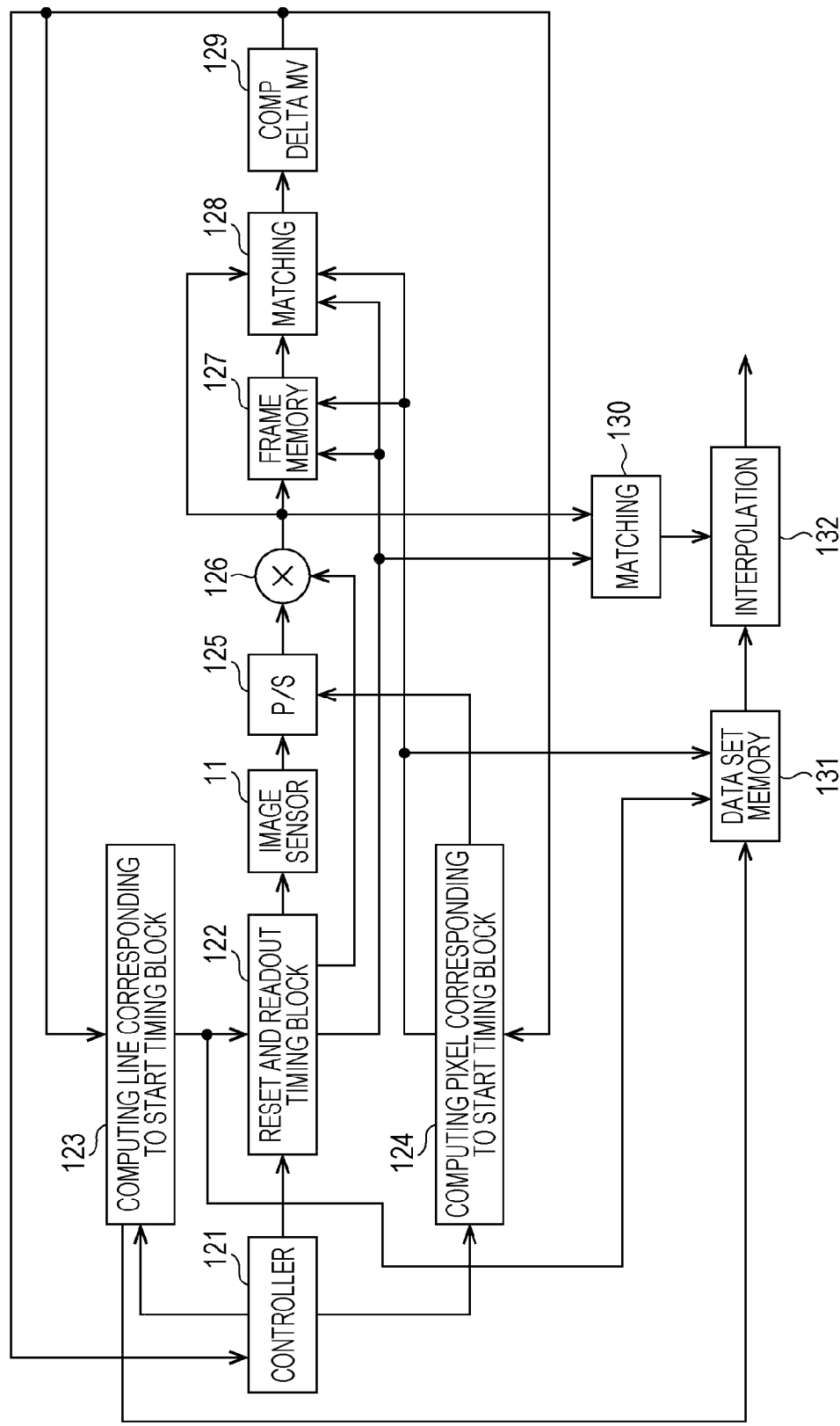
FIG. 28 is a diagram for describing an example of the configuration of the imaging device including an image sensor to which an embodiment of the present technology is applied.

Example of Configuration of Imaging Device Including Image Sensor to which Embodiment of the Present Technology is Applied Next, an example of the configuration of the imaging device including the image sensor to which an embodiment of the present technology described above is applied will be described with reference to FIG. 28.

The imaging device 101 includes a control unit (controller) 121, a timing control unit (Reset and Readout Timing block) 122, a vertical control unit (Computing Line Corresponding to Start Timeblock) 123, a horizontal control unit (Computing Pixel Corresponding to Start Time block) 124, an image sensor (Image Sensor) 11, a parallel/serial conversion unit (P/S) 125, a multiplication unit 126, a frame memory (Frame Memory) 127, a matching unit (Matching) 128, a motion detection unit (Comp Delta MV) 129, a line memory (Line Memory) 130, a data set memory (Data Set Memory) 131, and an interpolation unit (Interpolation) 132.

The control unit 121 controls all of the operations of the imaging device 101. More specifically, the control unit 121 controls operations of the timing control unit 122, the vertical control unit 123, and the horizontal control unit 124. A detailed operation of the control unit 121 will be described below in detail with reference to FIG. 29.

The vertical control unit 123 is controlled by the control unit 121 and supplies information specifying a pixel position in the vertical direction to be reset and a pixel position in the vertical direction to be read to the timing control unit 122 and the data set memory 131 based on information regarding a motion for each pixel supplied from the motion detection unit 129. An operation of the vertical control unit 123 will be described below in detail with reference to FIG. 30.

The timing control unit 122 is controlled by the control unit 121 and controls resetting and reading on each pixel of the image sensor 11 based on information which is supplied from the vertical control unit 123 and specifies a pixel position in the vertical direction to be reset and a pixel position in the vertical direction to be read. The timing control unit 122 supplies the multiplication unit 126 with a coefficient used to adjust a difference in an exposure time in units of pixels based on information regarding timings of the resetting and the reading. The timing control unit 122 supplies the frame memory 127 and the matching unit 128 with the information regarding the timings of the resetting and the reading. An operation of the timing control unit 122 will be described below in detail with reference to FIG. 30.

The image sensor 11 supplies pixel data generated through the photoelectric conversion as a parallel signal to the parallel/serial conversion unit (P/S) 125 at a predetermined exposure time by performing the resetting and the reading based on information which is the information supplied from the timing control unit 122 and is the information regarding the timing for each pixel position in the vertical direction of each pixel. The details of the configuration of the image sensor 11 will be described below with reference to FIG. 31.

The horizontal control unit 124 is controlled by the control unit 121 and supplies information specifying a pixel position in the horizontal direction to be read to the parallel/serial conversion unit 125 and the data set memory 131 based on information which is the information supplied from the motion detection unit 129 and is information regarding a motion of each pixel. An operation of the horizontal control unit 124 will be described below in detail with reference to FIG. 30.

The parallel/serial conversion unit (P/S) 125 converts the pixel data supplied as the parallel signal from the image sensor 11 into a serial signal and supplies the multiplication unit 126 with only the pixel data of the pixel position to be read based on the information specifying the pixel position in the horizontal direction from the horizontal control unit 124. The configuration and an operation of the parallel/serial conversion unit (P/S) 125 will be described below in detail with reference to FIG. 31.

The multiplication unit 126 multiples each of the pixel data converted into the serial signal by the coefficient supplied from the timing control unit 122 and used to adjust the difference in the exposure time in the units of pixels, adjusts the exposure time, and supplies the pixel data to the frame memory 127, the matching unit 128, and the line memory 130. The configuration and an operation of the multiplication unit 126 will be described below in detail with reference to FIG. 31.

The frame memory 127 temporarily stores the pixel data supplied from the multiplication unit 126 in units of frames and properly supplies the pixel data to the matching unit 128. The details of an operation of the frame memory 127 will be described below with reference to FIG. 32.

The matching unit 128 performs matching in the units of pixels using the pixel data of the current frame supplied from the multiplication unit 126 and the pixel data of the immediately previous frame supplied from the frame memory 127 and supplies a matching result to the motion detection unit 129. The details of an operation of the matching unit 128 will be described below with reference to FIG. 32.

The motion detection unit 129 detects a motion in the units of pixels based on the matching result of the matching unit 128 and supplies a detection result to the vertical control unit 123 and the horizontal control unit 124. The details of an operation of the motion detection unit 129 will be described below with reference to FIG. 32.

The interpolation unit 132 reads the pixel data read in units of clock clockHM faster than the clock clockH which is the same as a frame frequency stored in the line memory 130 based on a data set stored in the data set memory 131, and then interpolates, generates, and outputs pixel data in units of clock clockH. The details of an operation of the interpolation unit 132 will be described below with reference to FIG. 33.

Input Signals and Output Signals of Control Unit

Figure 29:
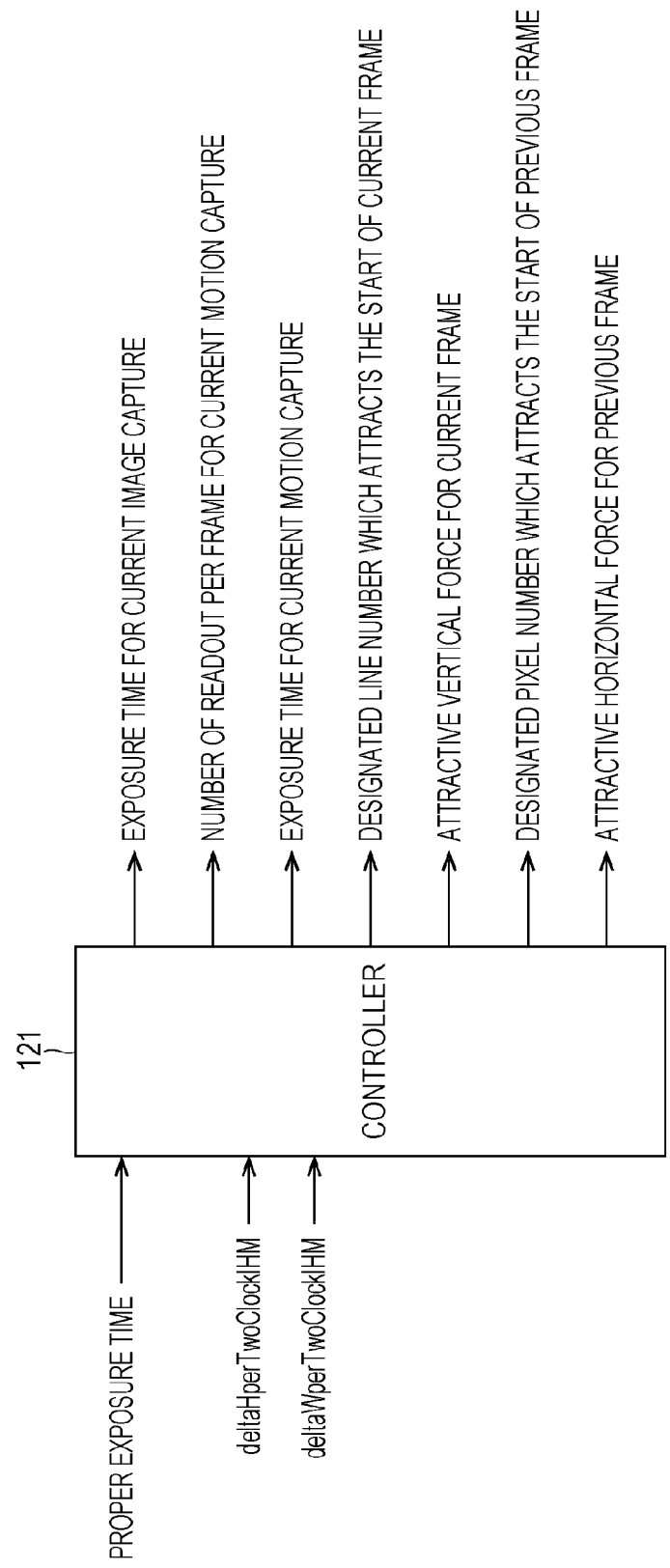
FIG. 29 is a diagram for describing input and output signals of a control unit in FIG. 28.

Next, input signals and output signals of the control unit 121 will be described with reference to FIG. 29.

A signal for the proper exposure time based on information regarding peripheral outside light supplied from an exposure meter or the like (not shown) is input to the control unit 121. Signals for a horizontal movement amount deltaWperTwoClockHM and a vertical movement amount deltaHperTwoClockHM supplied from the motion detection unit 129 are input to the control unit 121.

The horizontal movement amount deltaWperTwoClockHM indicates, at a current time, the number of pixels representing how many pixels in the right direction (x-axis direction) are read after a time corresponding to 2 cycles of the clock clockHM.

The vertical movement amount deltaHperTwoClockHM indicates, at a current time, the number of lines representing how many lines in the downward direction (y-axis direction) are read after a time corresponding to 2 cycles of the clock clockHM.

As described with reference to FIGS. 19 to 21, a motion is detected for each time of 1H (=a time corresponding to the clock clockH=1) and a line to be read is decided. However, the motion detection unit 129 detects a motion at each time corresponding to 2 cycles of the clock clockHM and decides the line (the pixel position in the x-axis direction) to be read. As will be described below, this is because the process is also performed at each time corresponding to 2 cycles of the clock clockHM since the even and odd lines are alternately read at even-th and odd-th cycles of the clock clockHM.

The vertical movement amount deltaHperTwoClockHM indicates a line Ynext to be read after a time corresponding to 2 cycles of the clock clockHM with respect to a currently read line Ycurrent in the vertical direction (y coordinate). That is, "Ynext=Ycurrent+deltaHperTwoClockHM" is satisfied.

The horizontal movement amount deltaWperTwoClockHM indicates a pixel position Xnext to be read after a time corresponding to 2 cycles of the clock clockHM with respect to a currently read pixel position Xcurrent in the horizontal direction (x coordinate). That is, "Xnext=Xcurrent+deltaWperTwoClockHM" is satisfied.

When a moving image is captured with the imaging device 101 without a blur by camera shake (for example, fixed by a tripod), as described with reference to FIGS. 5 and 6, "W×H pixels=1980×1080 pixels" (fixed region) of a middle portion in the image sensor 11 are normally extracted. When the x coordinate in the horizontal direction is focused on, "X=Xcurrent" is satisfied since 1980 pixels are normally read from the value of the same coordinate normally in any line. On the other hand, when the y coordinate is focused on, a subsequent line is read at each 1H (each cycle time of the clock clockH).

That is, a line lowered by 2×H/HM is read for every 2 cycles of the clock clockHM. Accordingly, "Ynext=Ycurrent+2×H/HM" is satisfied and "the vertical movement amount deltaHperTwoClockHM=2×H/HM" is satisfied.

To sum up, when a moving image is captured with a camera without a blur by camera shake (for example, fixed by a tripod), the process satisfying "the horizontal movement amount deltaWperTwoClockHM=0.0" and "the vertical movement amount deltaHperTwoClockHM=2×H/HM" is performed in the image sensor 11. Here, the value of the vertical movement amount deltaHperTwoClockHM is not 0, whereas the horizontal movement amount deltaWperTwoClockHM is 0. That is, for example, when a projected image projected to the image sensor 11 is deviated to the left side by 0.1 pixel and to the downward side by 0.2 pixel due to the blur by the camera shake for 2 cycles of the clock clockHM, "the horizontal movement amount deltaWperTwoClockHM=−0.1" is satisfied and "the vertical movement amount deltaHperTwoClockHM=(2×H/HM)+0.2" is satisfied.

The control unit 121 receives inputs of the proper exposure time, the horizontal movement amount deltaWperTwoClockHM, and the vertical movement amount deltaHperTwoClockHM. Based on these inputs, the control unit 121 outputs a current frame even-line exposure time "exposure time for current image capture," a current odd frame reading number-of-times "number of readout per frame for current motion capture," a current frame odd-line exposure time "exposure time for current motion capture," a current vertical reference position "designated line number which attract the start of current frame," a current vertical panning-blur ratio "attractive vertical force for current frame," an immediately previous horizontal reference position "designated pixel number which attracts the start of previous frame," and an immediately previous horizontal panning-blur ratio "attractive horizontal force for previous frame."

The current frame even-line exposure time "exposure time for current image capture" means the proper exposure time set using the clock clockHM of each pixel in the even line of the current frame as a unit time. That is, the current even frame reading number is a value obtained by multiplying the proper exposure time (unit: second), which is information supplied from an external exposure meter, by (60×HM). The even line of the current frame is controlled such that the even line is exposed by a time indicated by this value.

The current odd frame reading number-of-times "number of readout per frame for current motion capture" indicates the number of times the resetting and the reading of the pixel data of the odd line is performed at a time interval between a reading time of the pixel data of the immediately previous even line and a reading time of the pixel data of the current even line. Here, the current odd frame reading number is one of 1, 2, and 4, but other number of times may be used.

The current frame odd-line exposure time "exposure time for current motion capture" means the proper exposure time set using the clock clockHM of each pixel in the odd line of the current frame as a unit time.

The current vertical reference position "designated line number which attract the start of current frame" and the immediately previous horizontal reference position "designated pixel number which attracts the start of previous frame" respectively indicate the y coordinate of the current frame and the x coordinate of the immediately previous frame that specify a position in the vertical direction of an upper left pixel serving as a reference when the region 21 with "W×H pixels=1980×1080 pixels" forming an image is extracted from the image sensor 11. That is, the immediately previous horizontal reference position "designated pixel number which attracts the start of previous frame=(WS−W)/2" is satisfied and the current vertical reference position "designated line number which attract the start of current frame=(HS−H)/2" is satisfied.

The current vertical panning-blur ratio "attractive vertical force for current frame" and the immediately previous horizontal panning-blur ratio "attractive horizontal force for previous frame" respectively indicate the ratios between the panning and the blur in the vertical direction of the current frame and the horizontal direction of the immediately previous frame and are both a value equal to or greater than 0.0 and equal to or less than 1.0. As the value is smaller, a motion of the camera is a blur by the camera shake, and thus correction is strongly performed. Conversely, as the value is larger, a motion of the camera is done by panning, and thus the correction is weakly performed. The correction mentioned here means a process of reading the line located above by 1080 lines or reading the line y=y0 forcibly at the initial time of each frame. The same applies to the horizontal direction.

Figure 30:
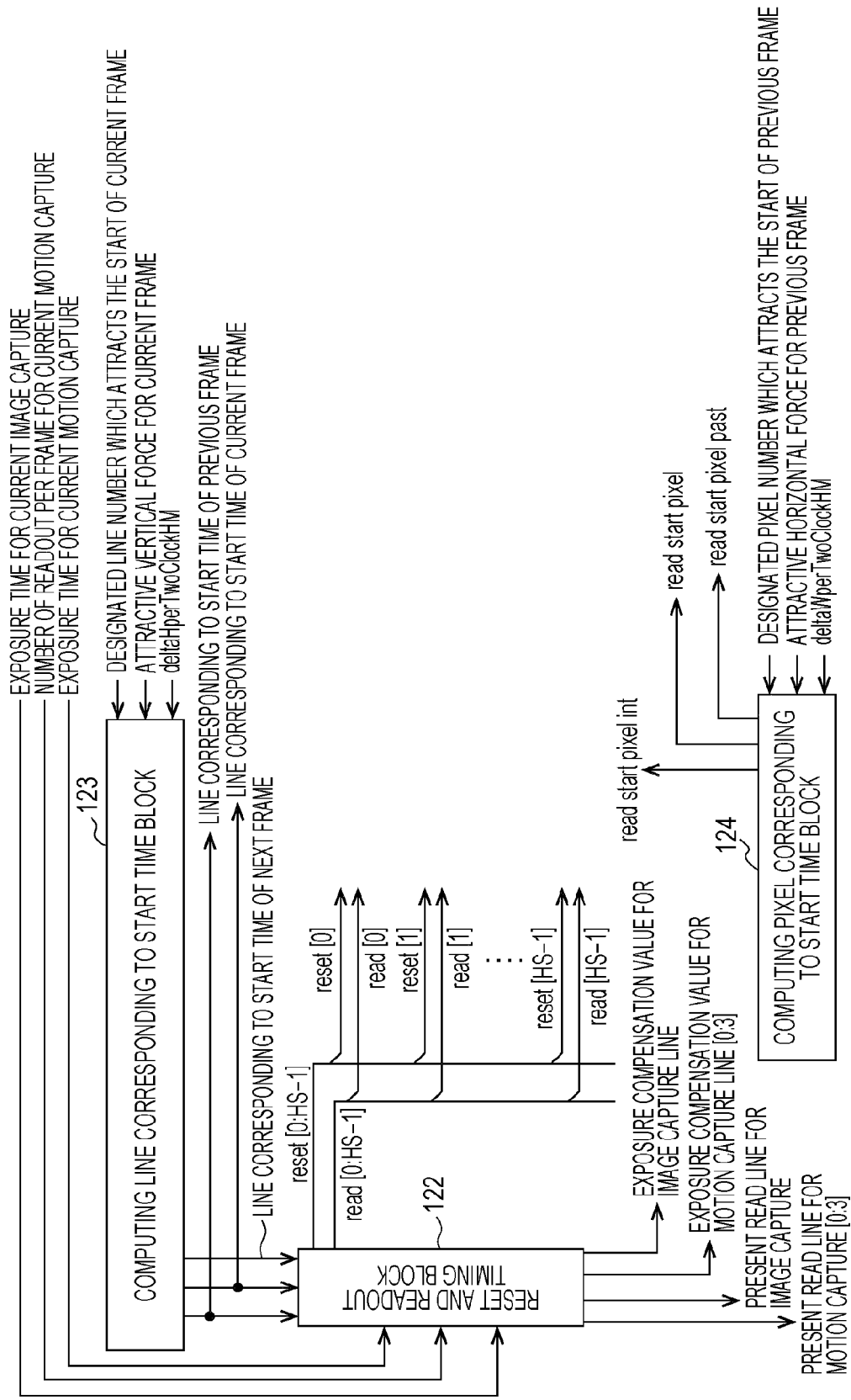
FIG. 30 is a diagram for describing input signals and output signals of a timing control unit, a vertical control unit, and a horizontal control unit in FIG. 28.

Input Signals and Output Signals of Timing Control Unit, Vertical Control Unit, and Horizontal Control Unit Next, input signals and output signals of the timing control unit 122, the vertical control unit 123, and the horizontal control unit 124 will be described with reference to FIG. 30.

First, the vertical control unit 123 will be described.

The current vertical reference position "designated line number which attracts the start of current frame" and the current vertical panning-blur ratio "attractive vertical force for current frame" supplied from the control unit 122 and the vertical movement amount deltaHperTwoClockHM supplied from the motion detection unit 129 are input to the vertical control unit 123.

Based on the inputs, the vertical control unit 123 outputs an immediately previous frame even-line extension line reading vertical coordinate "line corresponding to start time of previous frame," a current frame even-line reading vertical coordinate "line corresponding to start time of current frame," and a subsequent frame even-line extension line reading vertical coordinate "line corresponding to start time of next frame."

The immediately previous frame even-line extension line reading vertical coordinate "line corresponding to start time of previous frame" indicates, for example, the value of the y coordinate at the current time in the dotted line L351 which is the imaginary extension line of the reading time of the even line of the immediately previous frame described with reference to FIG. 25.

The current frame even-line reading vertical coordinate "line corresponding to start time of current frame" indicates, for example, the value of the y coordinate at the current time on the solid line L342 indicating the reading time of the even line of the current frame described with reference to FIG. 25.

The subsequent frame even-line extension line reading vertical coordinate "line corresponding to start time of next frame" indicates the value of the y coordinate at the current time on the dotted line L371 which is the imaginary extension line of the reading time of the even line of the immediately subsequent frame described with reference to FIG. 25.

Next, the timing control unit 122 will be described. The immediately previous frame even-line extension line reading vertical coordinate "line corresponding to start time of previous frame," the current frame even-line reading vertical coordinate "line corresponding to start time of current frame," and the subsequent frame even-line extension line reading vertical coordinate "line corresponding to start time of next frame" are input from the vertical control unit 123 to the timing control unit 122.

The current frame even-line exposure time "exposure time for current image capture," the current odd frame reading number-of-times "number of readout per frame for current motion capture," and the current frame odd-line exposure time "exposure time for current motion capture" are input from the control unit 121 to the timing control unit 122.

Based on the input signals, the timing control unit 122 outputs a reset signal reset[0:HS−1] and a reading signal read[0:HS−1] to control exposure of each pixel of the image sensor 11. Based on the input signals, the timing control unit 122 outputs an even line coefficient "exposure compensation value for image capture line," an odd line coefficient "exposure compensation value for motion capture line[0:3]," a current time reading even-line "present read line for image capture," and a current time reading odd-line "present read line for motion capture[0:3]" to the frame memory 127, the matching unit 128, and the line memory 130. Here, [0:3] indicates [0] to [3] and is also expressed as [i] (where i=0 to 3) below.

Here, the reset signal reset[0:HS−1] is a signal that designates a line at a position in the vertical direction to be reset at the current time in the WS×HS pixels (light-receiving elements) of the image sensor 11.

The reading signal read[0:HS−1] is a signal that designates a line at a position in the vertical direction to be read at the current time in the WS×HS pixels (light-receiving elements) of the image sensor 11.

The even line coefficient "exposure compensation value for image capture line" designates a coefficient to be multiplied to the pixel data of the even line read at the current time and is a value of a gain inversely proportional to a difference between a resetting time and a reading time of each line.

The odd line coefficient "exposure compensation value for motion capture line[0:3]" designates a coefficient to be multiplied to the pixels of the odd line read at the current time.

More specifically, the odd line coefficient "exposure compensation value for motion capture line[0]" is a coefficient to be multiplied to the pixels of the odd line in which the 1st reading is performed on the odd line among 4-time readings in the case of the quadruple reading process of performing the resetting and the reading on the odd line 4 times at time intervals quartered from an interval between the immediately previous reading time and the current reading time of the even line.

The odd line coefficient "exposure compensation value for motion capture line[1]" is a coefficient to be multiplied to the pixels of the odd line in which the 2nd reading is performed on the odd line in the case of the quadruple reading process of performing the resetting and the reading on the odd line 4 times at time intervals quartered from an interval between the immediately previous reading time and the current reading time of the even line. Further, the odd line coefficient "exposure compensation value for motion capture line[1]" is a coefficient to be multiplied to the pixels of the odd line in which the 1st-half reading is performed on the odd line in the case of the double reading process of performing the resetting and the reading on the odd line twice at time intervals halved from an interval between the immediately previous reading time and the current reading time of the even line.

The odd line coefficient "exposure compensation value for motion capture line[2]" is a coefficient to be multiplied to the pixels of the odd line in which the 3rd reading is performed on the odd line in the case of the quadruple reading process of performing the resetting and the reading on the odd line 4 times at time intervals quartered from an interval between the immediately previous reading time and the current reading time of the even line.

The odd line coefficient "exposure compensation value for motion capture line[3]" is a coefficient to be multiplied to the pixels of the odd line in which the 4th (final) reading is performed on the odd line in the case of the quadruple reading process of performing the resetting and the reading on the odd line 4 times at time intervals quartered from an interval between the immediately previous reading time and the current reading time of the even line.

Further, the odd line coefficient "exposure compensation value for motion capture line[3]" is a coefficient to be multiplied to the pixels of the odd line in which the 2nd-half reading is performed on the odd line in the case of the double reading process of performing the resetting and the reading on the odd line twice at time intervals halved from an interval between the immediately previous reading time and the current reading time of the even line.

Furthermore, the odd line coefficient "exposure compensation value for motion capture line[3]" is a coefficient to be multiplied to the pixels of the odd line in which the reading is performed in the case of the equal reading process of performing the same resetting and reading as the resetting and reading of the even line on the odd line.

The current time reading even-line "present read line for image capture" indicates a position (y coordinate) in the vertical direction of the even line read at the current time in the WS×HS pixels (light-receiving elements) of the image sensor 11.

The current time reading odd-line "present read line for motion capture[0:3]" indicates a position (y coordinate) of the odd line read at the current time in the WS×HS pixels (light-receiving elements) of the image sensor 11.

More specifically, the current time reading odd-line "present read line for motion capture[0]" indicates a position (y coordinate) of the odd line subjected to the 1st reading among 4-time reading in the case of the quadruple reading process of performing the resetting and the reading on the odd line 4 times at time intervals quartered from an interval between the immediately previous reading time and the current reading time of the pixel data of the even line.

The current time reading odd-line "present read line for motion capture[1]" indicates a position (y coordinate) of the odd line subjected to the 2nd reading in the case of the quadruple reading process of performing the resetting and the reading on the odd line 4 times at time intervals quartered from an interval between the immediately previous reading time and the current reading time of the pixel data of the even line.

The current time reading odd-line "present read line for motion capture[1]" indicates a position (y coordinate) of the odd line subjected to the 1st-half reading in the case of the double reading process of performing the resetting and the reading on the odd line twice at time intervals halved from an interval between the immediately previous reading time and the current reading time of the even line.

The current time reading odd-line "present read line for motion capture[2]" indicates a position (y coordinate) of the odd line subjected to the 3rd reading in the case of the quadruple reading process of performing the resetting and the reading on the odd line 4 times at time intervals quartered from an interval between the immediately previous reading time and the current reading time of the even line.

The current time reading odd-line "present read line for motion capture[3]" indicates a position (y coordinate) of the odd line subjected to the 4th (final) reading in the case of the quadruple reading process of performing the resetting and the reading on the odd line 4 times at time intervals quartered from an interval between the immediately previous reading time and the current reading time of the even line.

The current time reading odd-line "present read line for motion capture[3]" indicates a position (y coordinate) of the odd line subjected to the 2nd-half reading in the case of the double reading process of performing the resetting and the reading on the odd line twice at time intervals halved from an interval between the immediately previous reading time and the current reading time of the even line.

The current time reading odd-line "present read line for motion capture[3]" indicates a position (y coordinate) of the odd line subjected to reading in the case of the equal reading process of performing the resetting and the reading on the odd line at the same time interval of the resetting time and the reading time of the even line.

Next, the horizontal control unit 124 will be described.

A horizontal change amount deltaHperTwoClockHM supplied from the motion detection unit 129, the immediately previous horizontal reference position "designated pixel number which attracts the start of previous frame" from the control unit 121, and an immediately previous vertical panning-blur ratio "attractive vertical force for previous frame" are input to the horizontal control unit 124.

Based on the input signals, the horizontal control unit 124 outputs a horizontal direction reading start position "read start pixel," an integer horizontal direction reading start position "read start pixel int," and a previous horizontal direction reading start position "read start pixel past."

The horizontal direction reading start position "read start pixel" is a coordinate (x coordinate) of a pixel position Xnext in the horizontal direction to be read after a time corresponding to 2 cycles of the clock clockHM from the current time. The horizontal direction reading start position "read start pixel" generally has a small number portion.

The integer horizontal direction reading start position "read start pixel int" is a value obtained by truncating the horizontal direction reading start position "read start pixel" to the integer. That is, since the pixel data from the WS×HS pixels (light-receiving elements) of the image sensor 11 is designated and read in units of integers, the integer horizontal direction reading start position "read start pixel int" is necessary as an integer value obtained by truncating a value after the decimal point of the horizontal direction reading start position "read start pixel."

Input Signals and Output Signals in Image Sensor, Parallel-Serial Transform Unit, and Multiplication Unit Next, the configurations of the image sensor 11, the parallel/serial conversion unit 125, and the multiplication unit 126 and input signals and output signals in the configurations will be described with reference to FIG. 31.

The image sensor 11 reads the pixel data of the pixels at corresponding positions from each information of a matrix form based on the reset signal reset[0:HS−1] and the reading signal read[0:HS−1] supplied from the timing control unit 122 and sequentially transmits the pixel data as parallel signals to supply the pixel data to the parallel/serial conversion unit 125.

Figure 31:
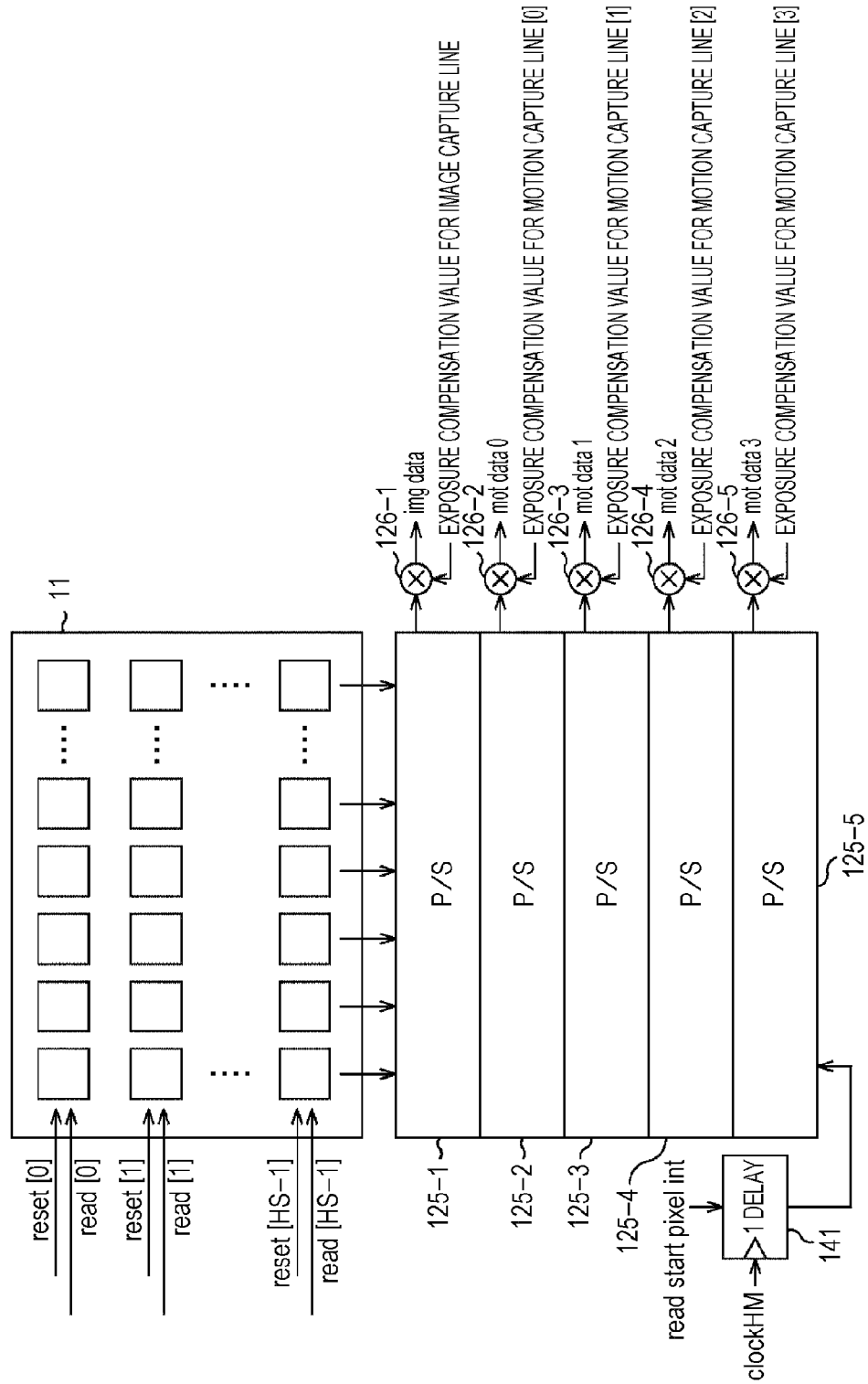
FIG. 31 is a diagram for describing input signals and output signals of an image sensor, a serial-parallel conversion unit, and a multiplication unit in FIG. 28.

Specifically, the parallel/serial conversion unit 125 includes parallel/serial transform units 125-1 to 125-5, as shown in FIG. 31. The pixel data input from the image sensor 11 is input to the parallel/serial conversion units 125-1 to 125-5. The parallel/serial conversion units 125-1 to 125-5 perform parallel/serial conversion on the pixel data which are the input parallel signals and supply the converted signals as serial signals to multiplication units 126-1 to 126-5.

Through such an operation, the pixel data of one even line is read for a time (a time corresponding to 1 cycle of the clock clockHM) in which the value of the line number curHM is even. The pixel data of this even line is input as the parallel signal to the parallel/serial conversion unit 125-1.

The pixel data corresponding to maximum 4 lines among the odd lines is read for a time (a time corresponding to 1 cycle of the clock clockHM) in which the value of the line number curHM is odd. The pixel data of the odd lines corresponding to the 4 lines is input as the parallel signals to the parallel/serial conversion units 125-2 to 125-5.

More specifically, at the current time, the pixel data corresponding to 1 line (odd line) read from the WS×HS pixels (light-receiving elements) of the image sensor 11 by the 1st reading among the pixel data of the 4-time reading is input as the parallel signal to the parallel/serial conversion unit 125-1 in the case of the quadruple reading process of performing the resetting and the reading on the odd line 4 times at time intervals quartered from an interval between the immediately previous reading time and the current reading time of the pixel data of the even line.

At the current time, the pixel data corresponding to 1 line (odd line) read from the WS×HS pixels (light-receiving elements) of the image sensor 11 by the 2nd reading among the pixel data of the 4-time reading is input as the parallel signal to the parallel/serial conversion unit 125-3 in the case of the quadruple reading process of performing the resetting and the reading on the odd line 4 times at time intervals quartered from an interval between the immediately previous reading time and the current reading time of the pixel data of the even line.

At the current time, the pixel data corresponding to 1 line (odd line) read from the WS×HS pixels (light-receiving elements) of the image sensor 11 by the 1st (1st-half) reading among the pixel data of the 2-time reading is input as the parallel signal to the parallel/serial conversion unit 125-3 in the case of the double reading process of performing the resetting and the reading on the odd line twice at time intervals halved from an interval between the immediately previous reading time and the current reading time of the pixel data of the even line.

At the current time, the pixel data corresponding to 1 line (odd line) read from the WS×HS pixels (light-receiving elements) of the image sensor 11 by the 3rd reading among the pixel data of the 4-time reading is input as the parallel signal to the parallel/serial conversion unit 125-4 in the case of the quadruple reading process of performing the resetting and the reading on the odd line 4 times at time intervals quartered from an interval between the immediately previous reading time and the current reading time of the pixel data of the even line.

At the current time, the pixel data corresponding to 1 line (odd line) read from the WS×HS pixels (light-receiving elements) of the image sensor 11 by the 4th (final) reading among the pixel data of the 4-time reading is input as the parallel signal to the parallel/serial conversion unit 125-5 in the case of the quadruple reading process of performing the resetting and the reading on the odd line 4 times at time intervals quartered from an interval between the immediately previous reading time and the current reading time of the pixel data of the even line.

At the current time, the pixel data corresponding to 1 line (odd line) read from the WS×HS pixels (light-receiving elements) of the image sensor 11 by the 2nd (2nd-half) reading of the 2-time reading is input as the parallel signal to the parallel/serial conversion unit 125-5 in the case of the double reading process of performing the resetting and the reading on the odd line twice at time intervals halved from an interval between the immediately previous reading time and the current reading time of the even line.

At the current time, the pixel data corresponding to 1 line (odd line) read from the WS×HS pixels (light-receiving elements) of the image sensor 11 is input in parallel to the parallel/serial conversion unit 125-3 in the case of the equal reading process performed on the odd line which the resetting time and the reading of the even line are the same.

For the pixel data input to the parallel/serial conversion units 125-1 to 125-5, the pixels on the right side (positive direction of the x coordinate) from a position (position of the x coordinate) indicated by a value of the integer horizontal direction reading start position "read start pixel int" supplied in a delay manner by a delay unit (1 delay) 141 are read pixel by pixel as serial signals. The pixel data which is the read serial signals is supplied to the multiplication units 126-1 to 126-5.

The multiplication unit 126-1 multiplies an even line coefficient "exposure compensation value for image capture line" inversely proportional to a time which is a difference between the resetting time and the reading time and outputs the pixel data as even line data "img data."

The multiplication units 126-2 to 126-5 multiply an odd line coefficient "exposure compensation value for motion capture line[0:3]" inversely proportional to a time which is a difference between the resetting time and the reading time and output the pixel data as odd line data "mot data 0, mot data 1, mot data 2, and mot data 3."

Hereinafter, when it is not necessary to distinguish the parallel/serial conversion units 125-1 to 125-5 from each other and distinguish the multiplication units 126-1 to 126-5 from each other, the parallel/serial conversion units 125-1 to 125-5 and the multiplication units 126-1 to 126-5 are simply referred to as the parallel/serial conversion units 125 and the multiplication units 126 and the same applies to other configurations.

Configurations of Frame Memory, Matching Unit, and Motion Detection Unit

Figure 32:
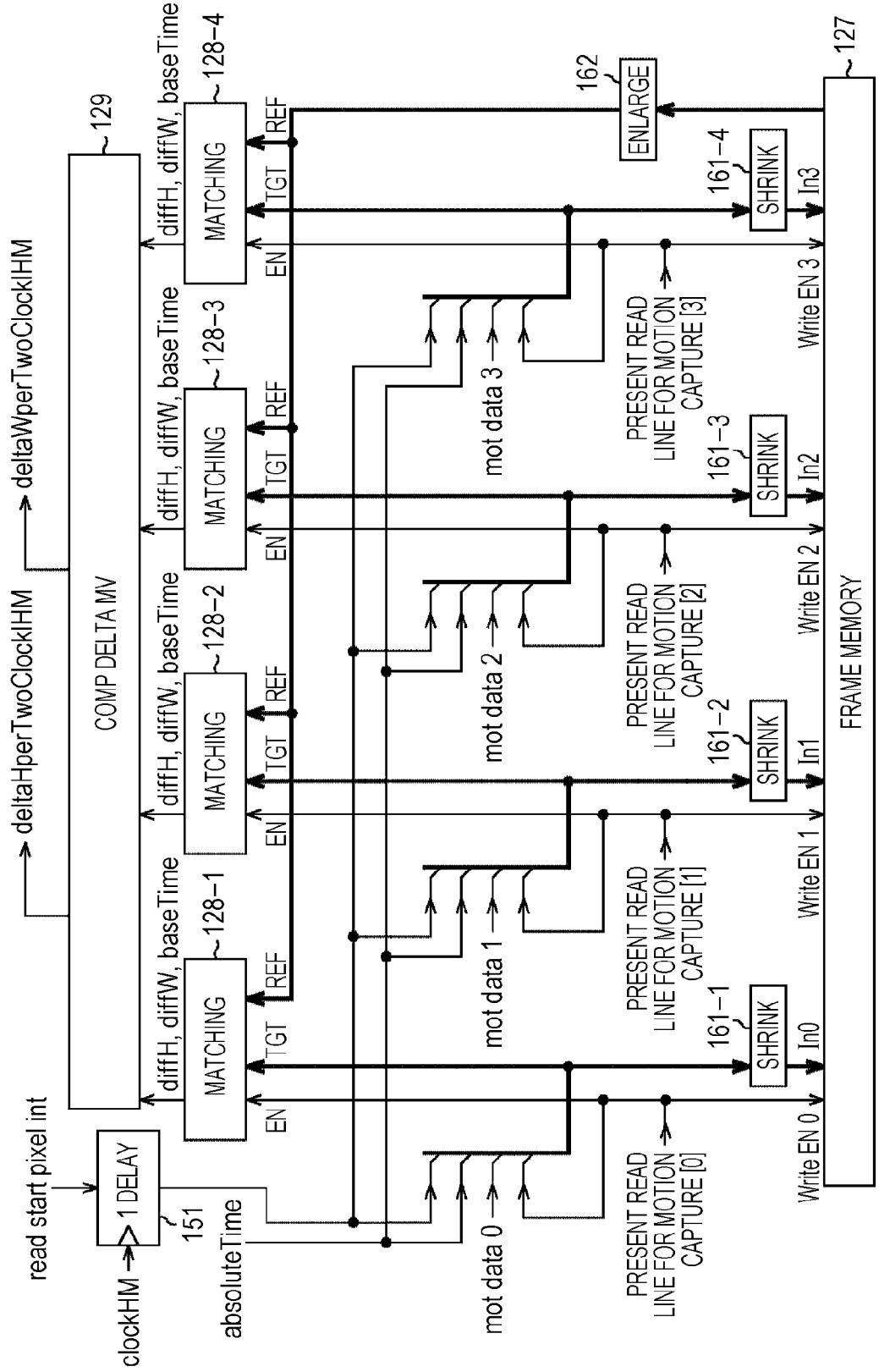
FIG. 32 is a diagram for describing input signals and output signals of a motion detection unit and a frame memory in FIG. 28.

Next, input signals and output signals of the frame memory, the matching unit, and the motion detection unit will be described with reference to FIG. 32.

First, the frame memory 127 will be described.

The frame memory 127 stores the odd line data "mot data [i]" (where i=0 to 3) compressed by compression units (shrink) 161-1 to 161-4. At this time, when enable signals "present read line for motion capture [i]" (Write EN[i]) (where i=0 to 3) input in correspondence to the compression units 161-1 to 161-4 are signals indicating validity, the frame memory 127 stores the compressed odd line data "mot data [i]" (where i=0 to 3) input to an In0 terminal, an In1 terminal, and an In2 terminal, and an In3 terminal. The frame memory 127 stores information regarding the absolute time absoluteTime and the integer horizontal direction reading start position "read start pixel int" delayed by about 1 clock clockHM by the delay unit (1 delay) 151.

The matching unit 128 includes matching units 128-1 to 128-4. The matching units 128-1 to 128-4 perform processes corresponding to the odd line data "mot data [i]" (where i=0 to 3), respectively. More specifically, when the enable signals "present read line for motion capture [i]" (Write EN[i]) (where i=0 to 3) input from the corresponding EN terminals are signals indicating validity, the matching units 128-1 to 128-4 receive inputs of the currently read odd line data "mot data [i]" and the corresponding previous odd line data "mot data [i]" read from the frame memory 127 and decompressed by a decompression unit (enlarge) 162. The matching units 128-1 to 128-4 receive the current odd line data "mot data [i]" and target data "target data" from TCT terminals and retrieve the positions of the pixel arrangement of the lines with high correlation on the mutual lines by matching by setting the previous odd line data "mot data [0:3]" supplied from the decompression unit 162 and REF terminals as reference data referencedata. Then, the matching units 128-1 to 128-4 supplies a vertical direction difference diffH, a horizontal direction difference diffW, and a reference time baseTime as the retrieval result of the matching to the motion detection unit 129.

The motion detection unit 129 detects each horizontal movement amount deltaWperTwoClockHM and each vertical movement amount deltaHperTwoClockHM as motions based on the vertical direction difference diffH, the horizontal direction difference diffW, and the reference time baseTime of each of the odd line data "mot data [0]" to "mot data [3]" and outputs the detection result.

Here, the compression unit 161 compresses the input pixel data to a data amount of, for example, about ⅛ and stores the compressed pixel data in the frame memory 127. The decompression unit 162 decompresses the compressed pixel data stored in the frame memory 127 to a data amount of, for example, about 8 times. Since the pixel data stored in the frame memory 127 is used only for the matching by the matching units 128, the image may not necessarily be an image with a large data amount and high definition. Therefore, for the frame memory 127, a small capacity suffices, and thus a capacity generally necessary to store pixel data corresponding to 1 frame output from the image sensor 11 is not necessary.

Data Set Memory, Line Memory, and Interpolation Unit

Figure 33:
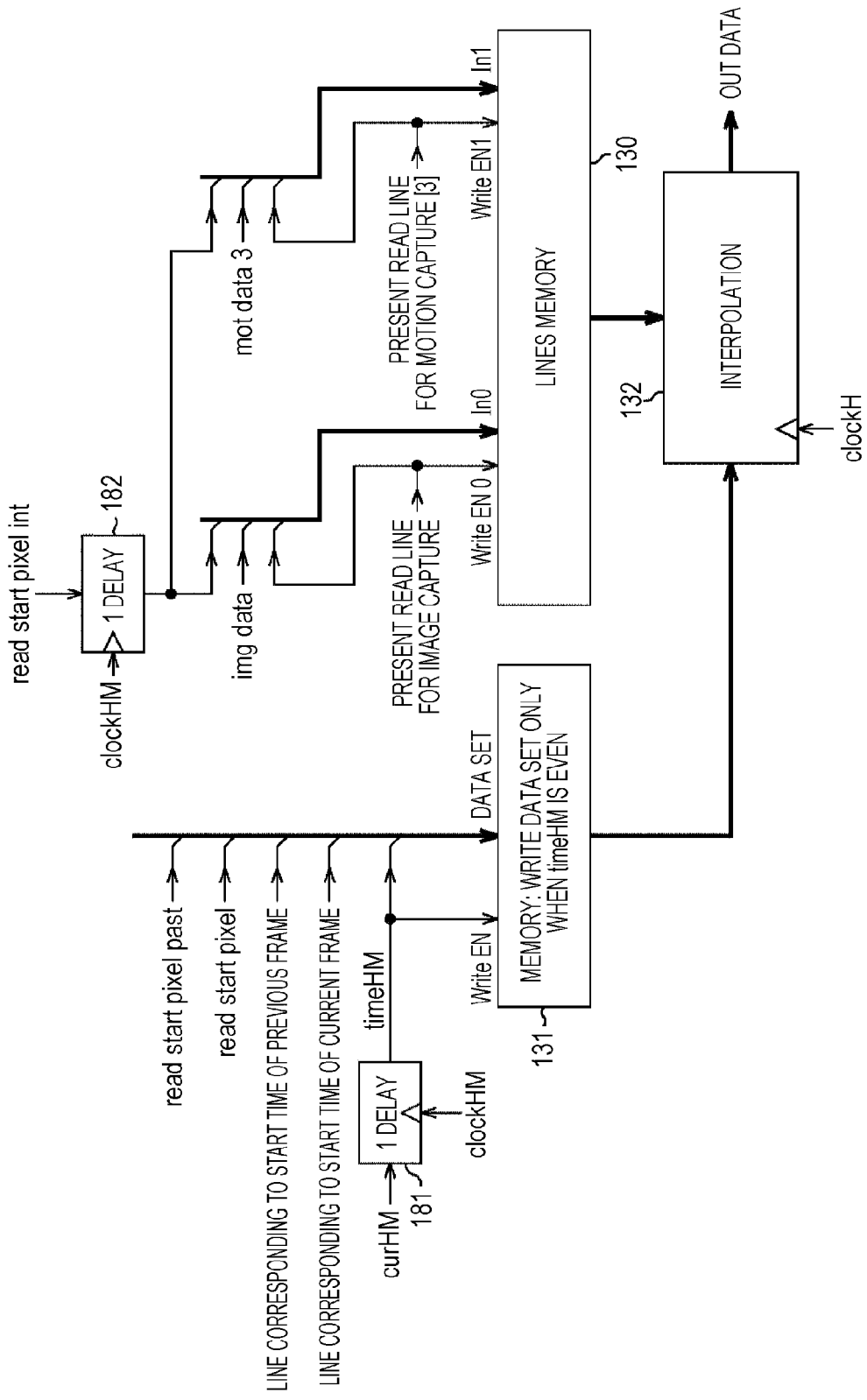
FIG. 33 is a diagram for describing input signals and output signals of a line memory, a data set memory, and an interpolation unit in FIG. 28.

Next, the configurations of the line memory 130, the data set memory 131, and the interpolation unit 132 will be described with reference to FIG. 33.

The data set memory (Memory: Write Data Set only when timeHM is even) 131 stores, as a pair of packed data set, the previous horizontal direction reading start position "read start pixel past," the horizontal direction reading start position "read start pixel," the immediately previous frame even-line extension line reading vertical coordinate "line corresponding to start time of previous frame," the current frame even-line reading vertical coordinate "line corresponding to start time of current frame," and the clock timeHM (a value via the delay unit (1 delay) 181 of the clock curHM) input via a Data Set terminal, when an enable signal is input to a Write EN terminal.

The data set is updated once at 2 cycles of the clock clockHM, as will be described below. Therefore, the data set is processed to be recorded only when the clock timeHM is odd. The data set is information indicating which pixel of which line is read at a current time in synchronization with the clock clockHM.

Next, the line memory 130 will be described.

The line memory 130 receives the even line data "img data" from the In0 terminal and packs the information indicating from which position (x coordinate) of which line (y coordinate) the data is read in the WS×HS pixels (light-receiving elements) of the image sensor 11, i.e., a value via the delay unit (1 delay) 182 of the integer horizontal direction reading start position "read start pixel int" and the current time reading even-line "present read line for image capture," together to store the data. When the line is a line in which the current time reading even-line "present read line for image capture" corresponds to the Write EN0 terminal, the line memory 130 considers the data as valid data and stores the even line data "img data."

The line memory 130 receives the odd line data "mot data 3" via the In1 terminal and packs the information indicating from which position (x coordinate) of which line (y coordinate) the data is read in the WS×HS pixels (light-receiving elements) of the image sensor 11, i.e., a value via the delay unit (1 delay) 182 of the integer horizontal direction reading start position "read start pixel int" and the current time reading odd-line "present read line for motion capture [3]," together to store the data. When the line is a line in which the current time reading odd-line "present read line for motion capture[3]" corresponds to the Write EN1 terminal, the line memory 130 considers the data as valid data and stores the odd line data "mot data 3."

Next, the interpolation unit 132 will be described.

In synchronization with the clock clockHM, the interpolation unit 132 obtains information indicating which pixel of which line is good to read at each time synchronized with the clock clockH from the information which is stored in the data set memory 131 and indicates which pixel of which line is good to read, at a given time (timeHM described above). Then, based on this information, the interpolation unit 132 accesses the line memory 130, interpolates and generates the pixels of the line corresponding to the current clock clockH using the corresponding even line data "img data" and the odd line data "mot data 3," and outputs the result as output data "Out Data."

Image Data Output Process

Figure 34:
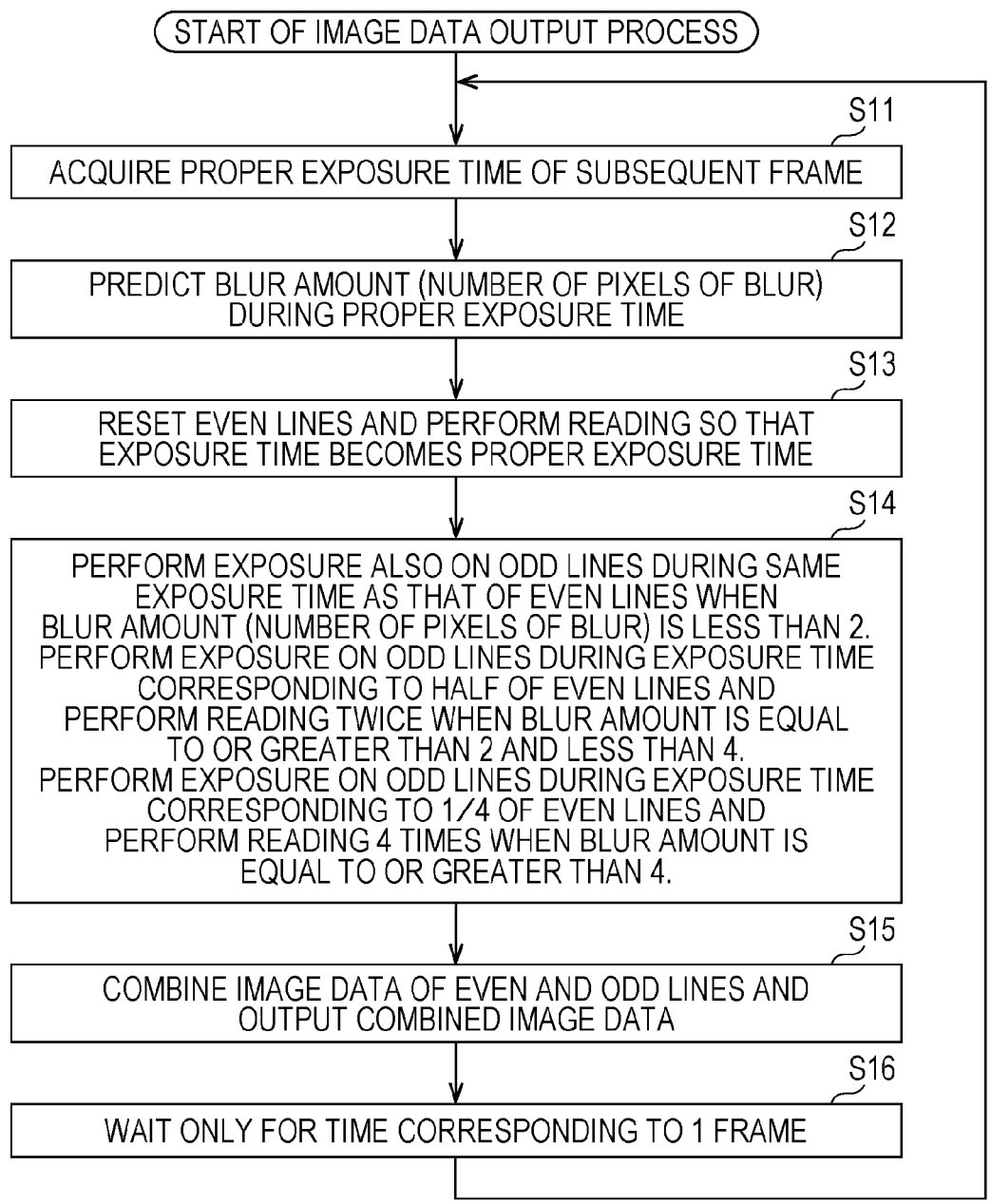
FIG. 34 is a flowchart for describing an image data output process.

Next, an image data output process of the imaging device 101 will be described with reference to the flowchart of FIG. 34.

In step S11, the control unit 121 acquires information regarding the proper exposure time of an imaged region measured by an exposure meter or the like (not shown).

In step S12, the motion detection unit 129 measures a blur amount during the proper exposure time. That is, the motion detection unit 129 detects a motion of the pixels in the units of lines and outputs the detection result as the blur amount to the vertical control unit 123 and the horizontal control unit 124. Based on information regarding the blur amount, the vertical control unit 123 generates information regarding the reading start position on the image sensor 11 and supplies the generated information to the timing control unit 122 and the data set memory 131. The data set memory 131 stores the supplied information regarding the reading start position in the horizontal direction. A process of obtaining the horizontal movement amount deltaWperTwoClockHM and the vertical movement amount deltaHperTwoClockHM which are the blur amounts will be described below in detail with reference to FIGS. 70 to 72.

In step S13, the timing control unit 122 supplies a reset signal to the even line so that the exposure time becomes the proper exposure time based on the information regarding the reading start position on the image sensor 11 and causes the reading to be performed by making an instruction of a reading signal at an appropriate timing. The image sensor 11 outputs the reset signal and the pixel data of the line corresponding to the reading signal to the even line based on this instruction. At this time, the data set memory 131 stores information regarding the coordinates of the line of the supplied read pixels.

In step S14, the control unit 121 specifies the number of times the resetting and the reading of the odd line are repeated according to the blur amount, specifies the specified number of repetitions, i.e., one of the equal reading process, the double reading process, and the quadruple reading process, and supplies information regarding the specified number of times to the timing control unit 122.

More specifically, when the blur amount is less than 2 pixels, the timing control unit 122 assumes that the equal reading process is performed. The timing control unit 122 is supplied with information indicating that the equal reading process in which the numbers of readings of the pixel data of the odd line and the pixel data of the even line are the same is performed once.

Likewise, when the blur amount is equal to or greater than 2 pixels and less than 4 pixels, the timing control unit 122 assumes that the double reading process is performed. The timing control unit 122 is supplied with information indicating that the exposure time of the pixel data of the odd line and the pixel data of the even line is halved and the resetting and the reading are performed twice.

When the blur amount is equal to or greater than 4 pixels, the timing control unit 122 assumes that the quadruple reading process is performed. The timing control unit 122 is supplied with information indicating that the exposure time of the pixel data of the odd line and the pixel data of the even line is quartered and the resetting and the reading are performed 4 times.

Through such processes, the timing control unit 122 supplies the reset signal so that one of the equal reading process, the double reading process, and the quadruple reading process is performed on the odd line based on the information regarding the reading start position on the image sensor 11 and causes the reading to be performed by making an instruction of a reading signal at an appropriate timing. The image sensor 11 outputs the reset signal and the pixel data of the line corresponding to the reading signal to the odd line based on this instruction.

The pixel data sequentially output through the foregoing processes is supplied to the parallel/serial conversion unit 125, is converted from the parallel signal to the serial signal, and is supplied to the multiplication unit 126. The multiplication unit 126 multiplies a coefficient adjusting the exposure time supplied from the timing control unit 122 to adjust the gain of each pixel and supplies the adjusted result to the frame memory 127, the matching unit 128, and the line memory 130. More detailed processes related to the resetting and the reading of the even and odd lines will be described below with reference to FIGS. 47 to 64.

Figure 73:
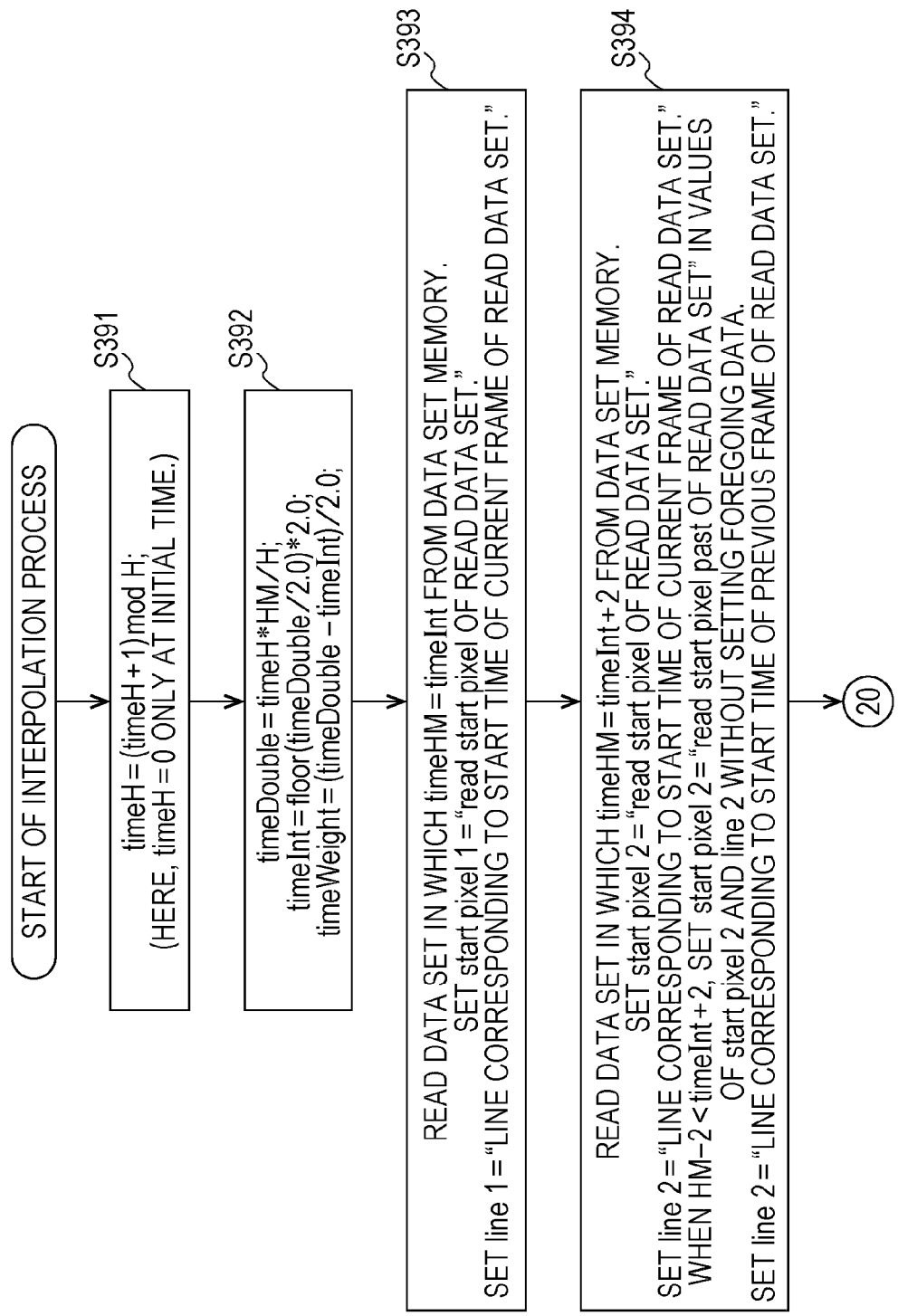
FIG. 73 is a flowchart for describing a process of the interpolation unit.
Figure 74:
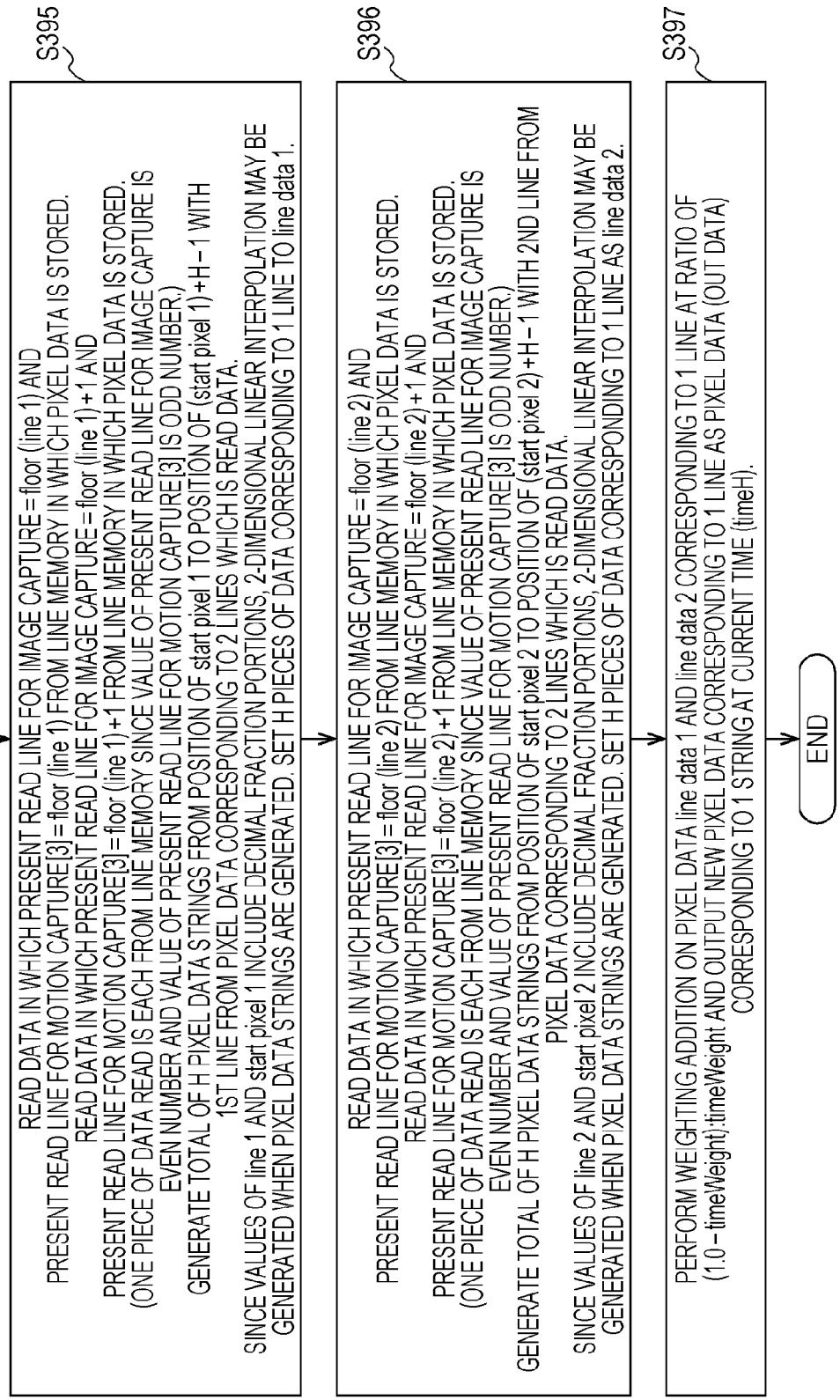
FIG. 74 is a flowchart for describing a process of the interpolation unit.

In step S15, the interpolation unit 132 combines the pixel data of the even line and the pixel data of the odd line to form an image based on the information regarding the data set stored in the data set memory 131 and the pixel data in the units of lines stored in the line memory 130 and outputs the image. Processes of the interpolation unit 132 will be described below in detail with reference to FIGS. 73 to 75.

In step S16, the control unit 121 stops the process until a time for the process corresponding to a predetermined 1-frame passes. When the initial time has passed, the process returns to step S11 and the subsequent processes are repeated.

Through the foregoing processes, an image of the normal proper exposure time is acquired from the even lines, an image of the exposure time according to the blur amount is acquired from the odd lines, and these images are combined, so that an image in which the blur is suppressed can be generated. The detailed operation of each process will be described below with reference to the drawings subsequent to FIG. 36.

Reading Line Control Process

Figure 35:
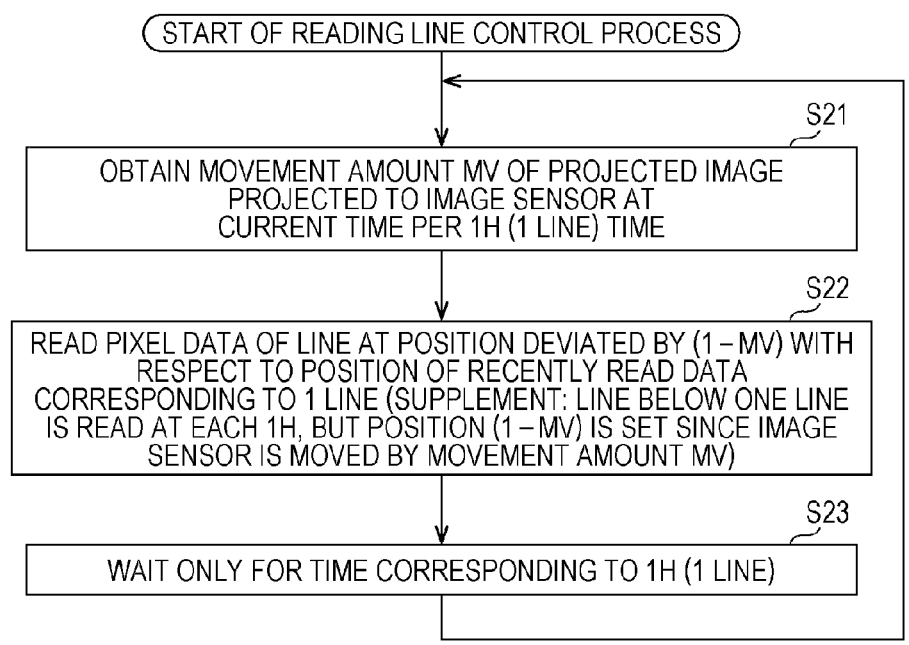
FIG. 35 is a flowchart for describing a reading line control process.

Next, a reading line control process will be described with reference to FIG. 35.

In step S21, the matching unit 128 performs a matching process of matching the pixel data of the currently read odd line and the pixel data, which is the pixel data of the odd line read from the frame memory 127 and is the pixel data of the odd line decompressed by the decompression unit 162, to detect a position with a high correlation and supplies the detection result to the motion detection unit 129. The motion detection unit 129 obtains a movement amount MV in a processing time of 1H (corresponding to 1 line) based on a movement distance in the vertical direction in each frame of the pixel data of the odd lines with the high correlation and supplies the movement amount MV to the vertical control unit 123. The movement amount MV corresponds to the horizontal movement amount deltaWperTwoClockHM and the vertical movement amount deltaHperTwoClockHM described above.

In step S22, the vertical control unit 123 sets the pixel data of the line deviated by (1-MV) with respect to the immediately previous read line to be located at the reading start position based on the movement amount MV and supplies the pixel data to the timing control unit 122.

In step S23, the matching unit 128 waits until the process corresponding to 1H (1 line) ends. When the process corresponding to 1H ends, the process returns to step S21 and the subsequent processes are repeated.

That is, through the foregoing processes, as described with reference to FIG. 19, the image data can be read only by adjusting the resetting and the reading of the image sensor 11 even when a frame memory temporarily storing the pixel data imaged by the image sensor 11 is not provided.

Here, only points have been described in order to describe the fact that the image data can be read only by adjusting the resetting and the reading of the image sensor 11 even when a frame memory is not provided. However, the detailed description will be made below with reference to FIGS. 47 to 64.

Process of Horizontal Control Unit

Figure 36:
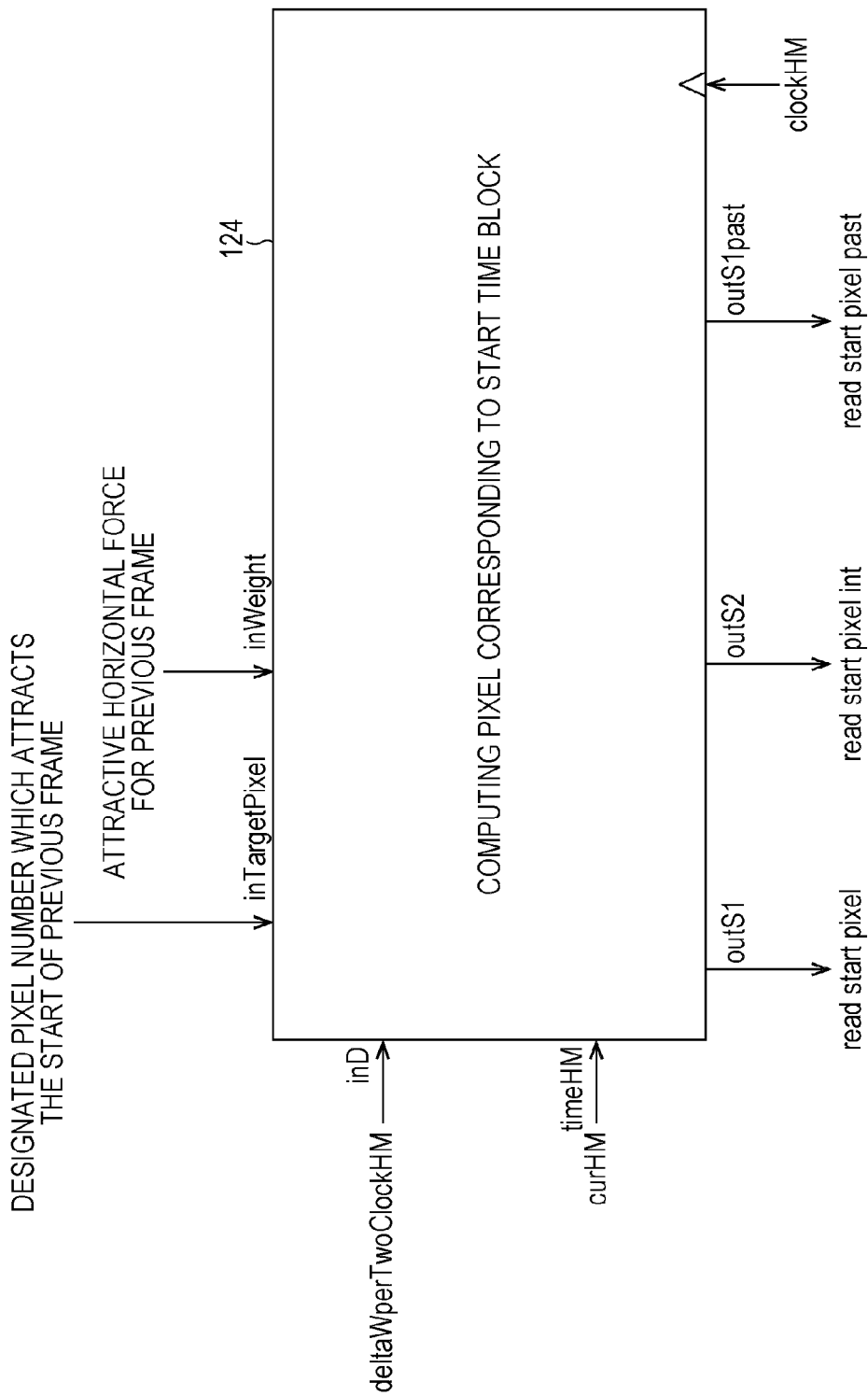
FIG. 36 is a diagram for describing a correspondent relation between input and output signals of the horizontal control unit and notation in a syntax used in flowcharts to be described below.
Figure 37:
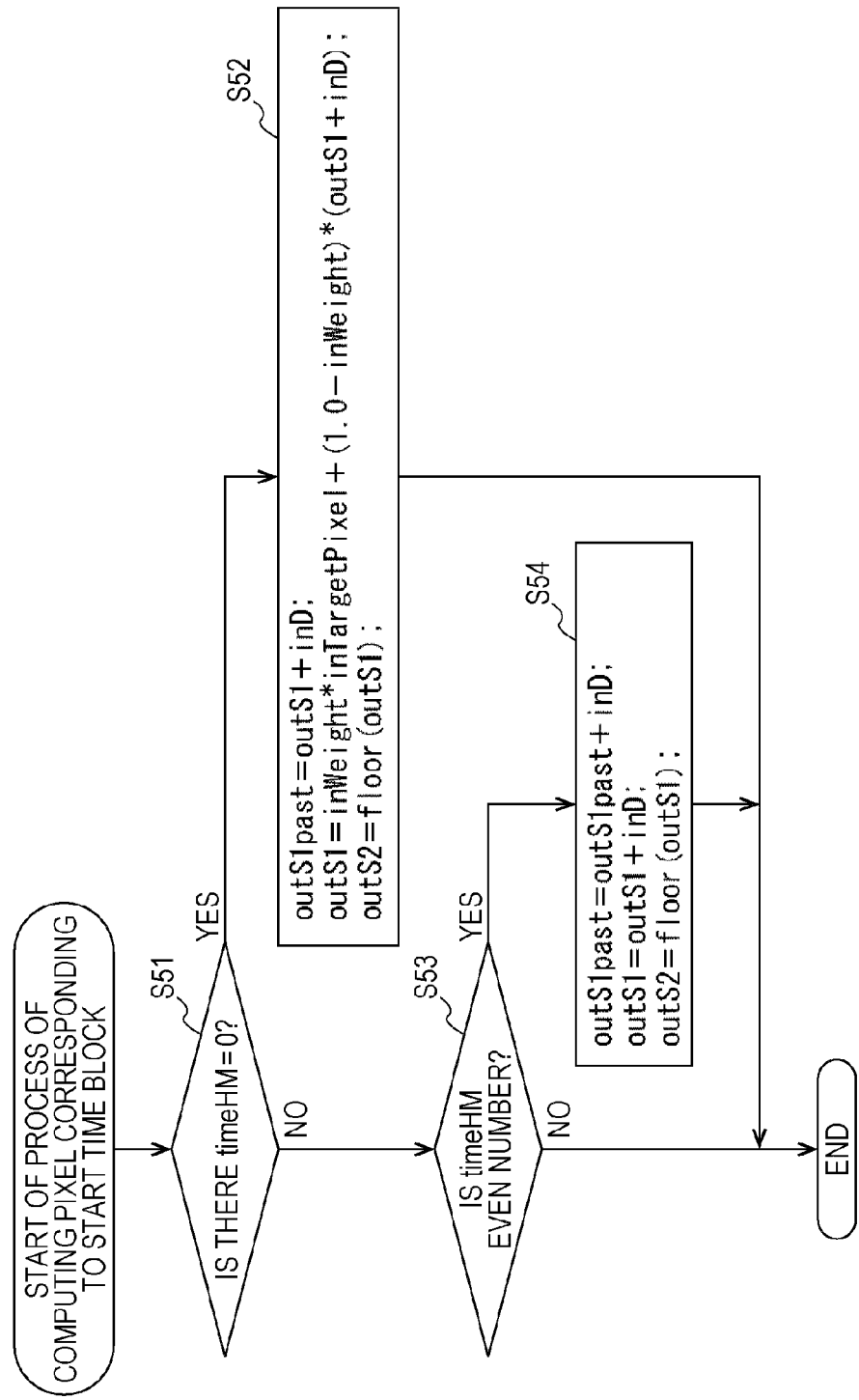
FIG. 37 is a flowchart for describing a process of the horizontal control unit.

Next, a process of the horizontal control unit 124 will be described with reference to FIGS. 36 and 37. In the flowchart of FIG. 37, some portions to be described with reference to descriptions using a syntax are present. Since some portions are different between the names of parameters in the syntax and the names of the parameter described above, the correspondent relation will be described with reference to FIG. 36.

The immediately previous horizontal panning-blur ratio "attractive horizontal force for previous frame," the immediately previous horizontal reference position "designated pixel number which attracts the start of previous frame," the horizontal movement amount deltaWperTwoClockHM, the clock clockHM, and the line number curHM are input to the horizontal control unit 124. Based on these input signals, the horizontal control unit 124 outputs a horizontal direction reading start position "read start pixel," an integer horizontal direction reading start position "read start pixel int," and a previous horizontal direction reading start position "read start pixel past."

In the flowchart of FIG. 37, in the syntax, the immediately previous horizontal panning-blur ratio "attractive horizontal force for previous frame" is written as in Weight and the immediately previous horizontal reference position "designated pixel number which attracts the start of previous frame" is written as in TargetPixel. The horizontal movement amount deltaWperTwoClockHM is written as in D and the line number curHM is written as timeHM. The horizontal direction reading start position "read start pixel" is written as outS1, the integer horizontal direction reading start position "read start pixel int" is written as outS2, and the previous horizontal direction reading start position "read start pixel past" is written as outS1past.

Here, a process of the horizontal control unit 124 will be described with reference to the flowchart of FIG. 37.

In step S51, the horizontal control unit 124 determines whether timeHM which is the line number curHM is 0. That is, it is determined whether the line is the beginning line of the supplied frame. For example, when the line is the beginning line, the process proceeds to step S52.

In step S52, the horizontal control unit 124 updates outS1past which is the new previous horizontal direction reading start position "read start pixel past" by adding in D which is the horizontal movement amount deltaWperTwoClockHM to outS1 which is the horizontal direction reading start position "read start pixel."

The horizontal control unit 124 obtains outS1 which is the new horizontal direction reading start position "read start pixel" to which the panning and the camera shake are mutually added by weighting in TargetPixel, which is a coordinate in the horizontal direction considered to be the panning, and (outS1+inD), which is a coordinate of the horizontal direction to which the camera shake is added, by in Weight (weight of the panning) which is the immediately previous horizontal panning-blur ratio "attractive horizontal force for previous frame."

The horizontal control unit 124 calculates outS2 which is the coordinate of an integer by truncating a value after the decimal point of outS1, which is the obtained new horizontal direction reading start position "read start pixel," by a floor function.

Conversely, when it is determined in step S51 that timeHM which is the line number curHM is not 0 and the line is not the beginning line of the supplied frame, the process proceeds to step S53.

In step S53, the horizontal control unit 124 determines whether timeHM which is the line number curHM is an even number. That is, it is determined whether the line of the supplied frame is an even number. For example, when the line is the even number, the process proceeds to step S54.

In step S54, the horizontal control unit 124 updates outS1past which is the new previous horizontal direction reading start position "read start pixel past" by adding in D which is the horizontal movement amount deltaWperTwoClockHM to outS1past which is the previous horizontal direction reading start position "read start pixel past."

The horizontal control unit 124 updates outS1 which is the new horizontal direction reading start position "read start pixel" by adding in D which is the horizontal movement amount deltaWperTwoClockHM to outS1 which is the horizontal direction reading start position "read start pixel."

The horizontal control unit 124 calculates outS2 which is the coordinate of an integer by truncating a value after the decimal point of outS1, which is the obtained new horizontal direction reading start position "read start pixel," by a floor function.

When timeHM which is the line number curHM is not the even number in step S53, the process ends.

That is, through the foregoing processes, this process is performed once at 1 cycle in synchronization with the clock clockHM, so that in D which is the horizontal movement amount deltaWperTwoClockHM is added sequentially for each even line after outS1 which is the horizontal direction reading start position "read start pixel" is set in the beginning line of the frame according to the ratio between the panning and the camera shake.

Since the camera shake and the panning are added with a good balance through such processes, the rolling shutter phenomenon can be corrected.

Process of Vertical Control Unit

Figure 38:
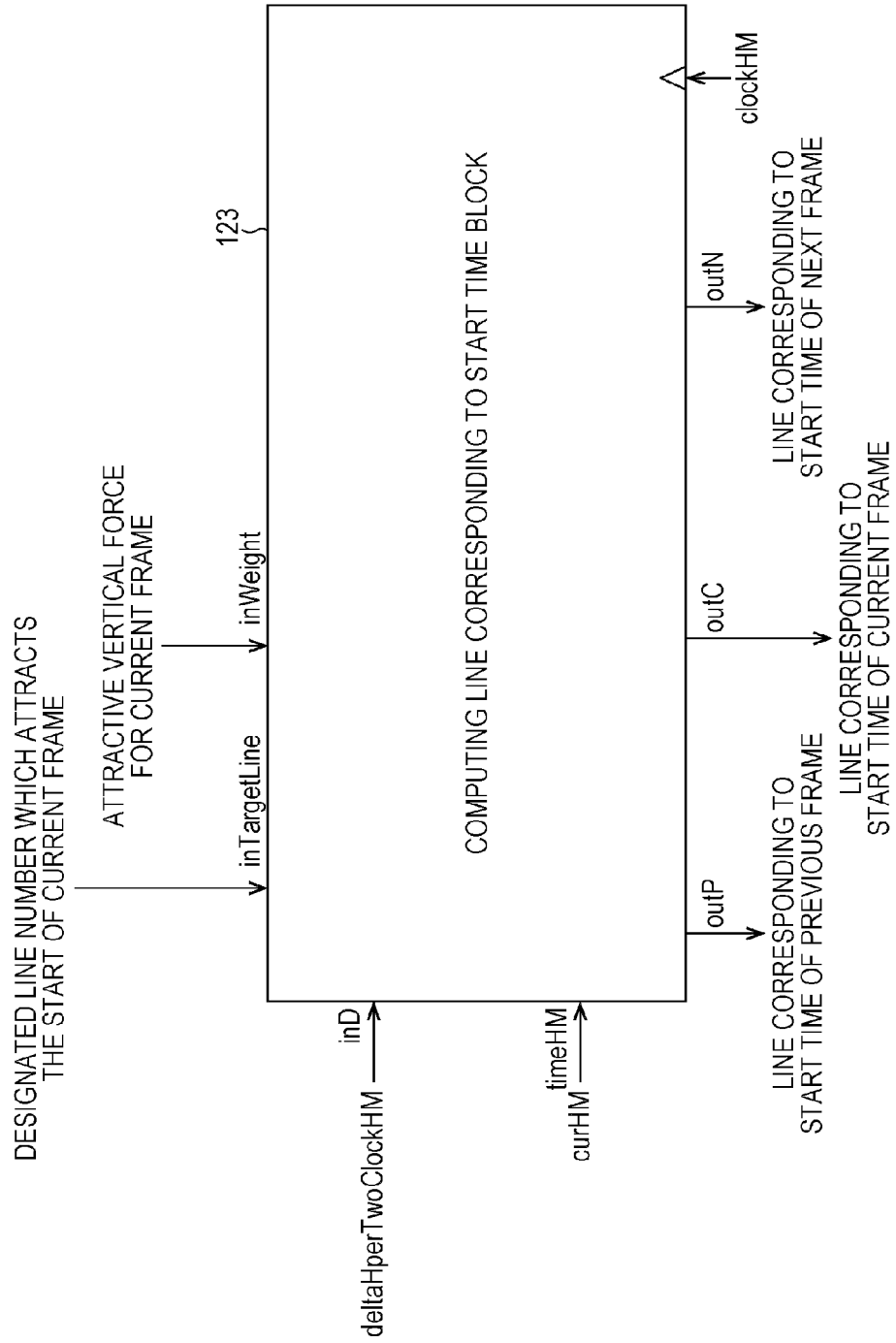
FIG. 38 is a diagram for describing a correspondent relation between input and output signals of the vertical control unit and notation in a syntax used in flowcharts to be described below.
Figure 39:
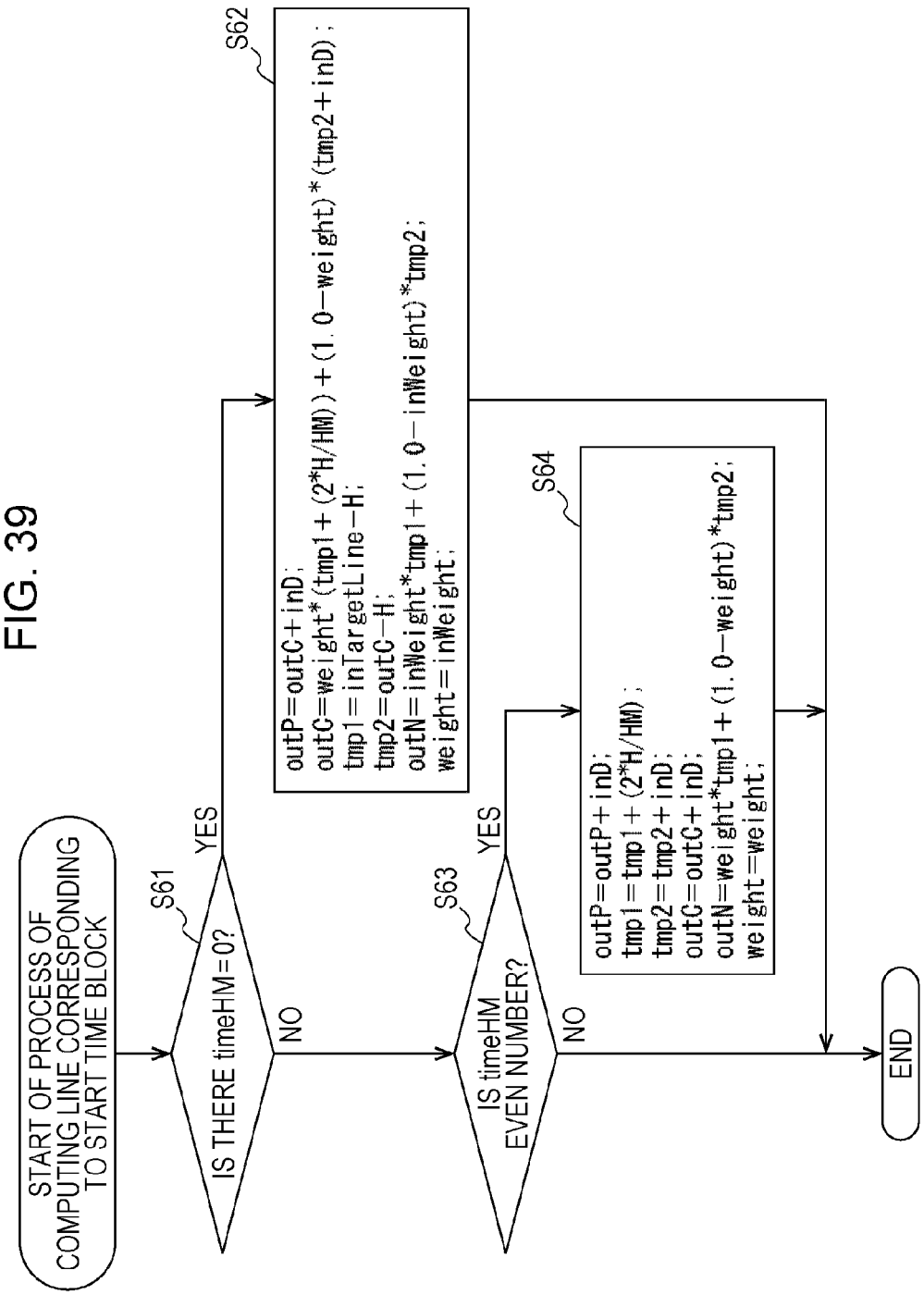
FIG. 39 is a flowchart for describing a process of the vertical control unit.

Next, a process of the vertical control unit 123 will be described with reference to FIGS. 38 and 39. In the flowchart of FIG. 39, some portions to be described with reference to descriptions using a syntax are present. Since some portions are different between the names of parameters in the syntax and the names of the parameter described above, the correspondent relation will be described with reference to FIG. 38.

The current vertical panning-blur ratio "attractive vertical force for current frame," the current vertical reference position "designated line number which attracts the start of current frame," the vertical movement amount deltaHperTwoClockHM," the clock clockHm, and the line number curHM are input to the vertical control unit 123. The vertical control unit 123 outputs the immediately previous frame even-line extension line reading vertical coordinate "line corresponding to start time of previous frame," the current frame even-line reading vertical coordinate "line corresponding to start time of current frame," and the subsequent frame even-line extension line vertical coordinate "line corresponding to start time of next frame."

Here, in the flowchart of FIG. 39, in the syntax, the current vertical panning-blur ratio "attractive vertical force for current frame" is written as in Weight and the current vertical reference position "designated line number which attracts the start of current frame" is written as in TargetLine. The vertical movement amount deltaHperTwoClockHM is written as in D and the line number curHM is written as timeHM. The immediately previous frame even-line extension line reading vertical coordinate "line corresponding to start time of previous frame" is written as outP and the current frame even-line reading vertical coordinate "line corresponding to start time of current frame" is written as outC, and the subsequent frame even-line extension line vertical coordinate "line corresponding to start time of next frame" is written as outN.

Here, a process of the vertical control unit 123 will be described with reference to the flowchart of FIG. 39.

In step S61, the vertical control unit 123 determines whether timeHM which is the line number curHM is 0. That is, it is determined whether the line is the beginning line of the supplied frame. For example, when the line is the beginning line, the process proceeds to step S62.

In step S62, the vertical control unit 123 newly updates outP, which is the immediately previous frame even-line extension line reading vertical coordinate "line corresponding to start time of previous frame," by adding in D, which is the vertical movement amount deltaHperTwoClockHM, to outC which is the current frame even-line reading vertical coordinate "line corresponding to start time of current frame."

Here, tmp1 is a value obtained by subtracting a width H of the frame in the vertical direction from in TargetLine which is the current vertical reference position "designated line number which attracts the start of current frame" before 1 frame. Further, tmp2 is a value obtained by subtracting then width H of the frame in the vertical direction from outC which is the current frame even-line reading vertical coordinate "line corresponding to start time of current frame" before 1 frame. Furthermore, weight is in Weight before 1 frame.

That is, (tmp1+(2×H/HM)) is a line specified by the panning at the time of movement in the vertical direction by 2 cycles of the clock clockHM and is, for example, the line of the pixel P13 in FIG. 24. Further, (tmp2+inD) is a line specified by the camera shake and is, for example, the line of the pixel P11 in FIG. 24.

The vertical control unit 123 obtains outC, which is the current frame even-line reading vertical coordinate "line corresponding to start time of current frame," by weighting (tmp1+(2×H/HM)), which is a coordinate in the vertical direction by the panning, and (tmp2+inD), which is a coordinate in the vertical direction to which the camera shake is added, by in Weight (a weight of the panning) which is the current vertical panning-blur ratio "attractive vertical force for current frame."

The vertical control unit 123 calculates outN which is the subsequent frame even-line extension line vertical coordinate "line corresponding to start time of next frame," to which the panning and the camera shake are mutually added, using tmp1 as the coordinate in the vertical direction by the panning, using tmp2 as the coordinate in the vertical direction by the camera shake, and using in Weight (the weight of the panning) which is the current vertical panning-blur ratio "attractive vertical force for current frame."

That is, outP which is the immediately previous frame even-line extension line reading vertical coordinate "line corresponding to start time of previous frame" is the coordinate in the vertical direction on the dotted line L351 in FIG. 25. Further, outC which is the current frame even-line reading vertical coordinate "line corresponding to start time of current frame" is the coordinate in the vertical direction on the solid line L342 in FIG. 25. Furthermore, outN which is the subsequent frame even-line extension line vertical coordinate "line corresponding to start time of next frame" is the coordinate in the vertical direction on the dotted line L371 in FIG. 25. That is, in this way, the coordinates in the vertical direction at the previous time, the current time, and the subsequent time in the even line are obtained.

Conversely, when it is determined in step S61 that timeHM which is the line number curHM is not 0 and the line is not the beginning line of the supplied frame, the process proceeds to step S63.

In step S63, the vertical control unit 123 determines whether timeHM which is the line number curHM is an even number. That is, it is determined whether the line of the supplied frame is an even number. For example, when the line is the even number, the process proceeds to step S64.

In step S64, the vertical control unit 123 newly updates outP which is the immediately previous frame even-line extension line reading vertical coordinate "line corresponding to start time of previous frame" by adding in D which is the vertical movement amount deltaHperTwoClockHM to outP which is the immediately previous frame even-line extension line reading vertical coordinate "line corresponding to start time of previous frame."

The vertical control unit 123 performs updating by adding (2×H/HM) to be considered by 2 cycles of the clock clockHM to tmp1 and performs updating by adding in D which the vertical movement amount deltaHperTwoClockHM to be considered by 2 cycles of the clock clockHM to tmp2 and outC.

The vertical control unit 123 weights the coordinate tmp1 in the vertical direction in which the panning corresponding to 2 cycles is considered and the coordinate tmp2 in the vertical direction in which the camera shake corresponding to 2 cycles is considered by the weight "weight" and updates outN which is the subsequent frame even-line extension line vertical coordinate "line corresponding to start time of next frame" to which the panning and the camera shake are mutually added.

When timeHM which is the line number curHM is not the even number in step S63, the process ends.

That is, through the foregoing processes, this process is performed once at 1 cycle in synchronization with the clock clockHM, so that outP which is the immediately previous frame even-line extension line reading vertical coordinate "line corresponding to start time of previous frame," outC which is the current frame even-line reading vertical coordinate "line corresponding to start time of current frame," and outN which is the subsequent frame even-line extension line vertical coordinate "line corresponding to start time of next frame" are updated for the beginning line of the frame according to the ratio between the panning and the camera shake.

Since the camera shake and the panning are added with a good balance through such processes, the rolling shutter phenomenon can be corrected.

1st Process of Timing Control Unit

Figure 40:
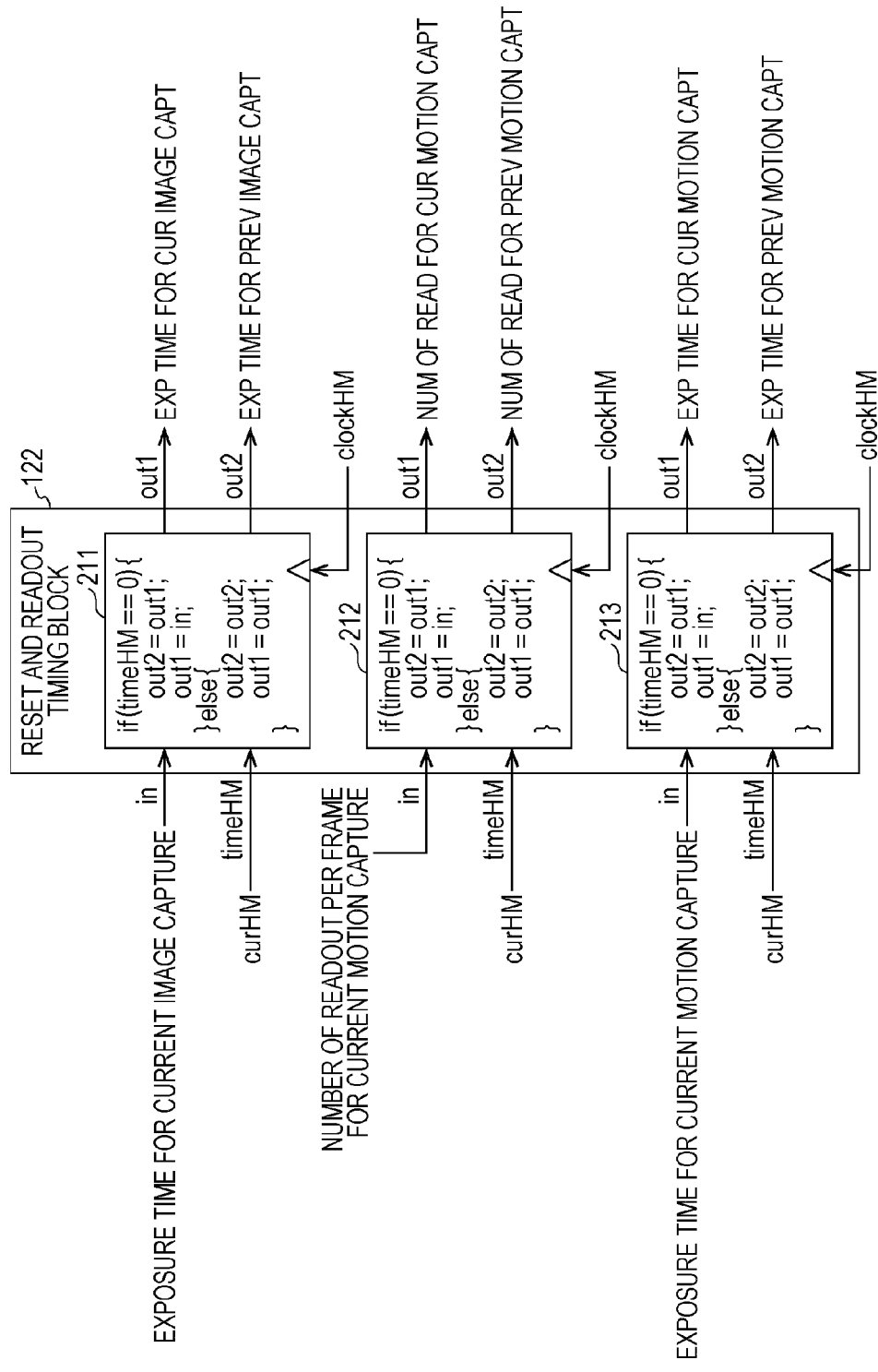
FIG. 40 is a diagram for describing a correspondent relation between input and output signals in a sub-calculation block performing a 1st process of the timing control unit and notation in a syntax used in flowcharts to be described below.
Figure 41:
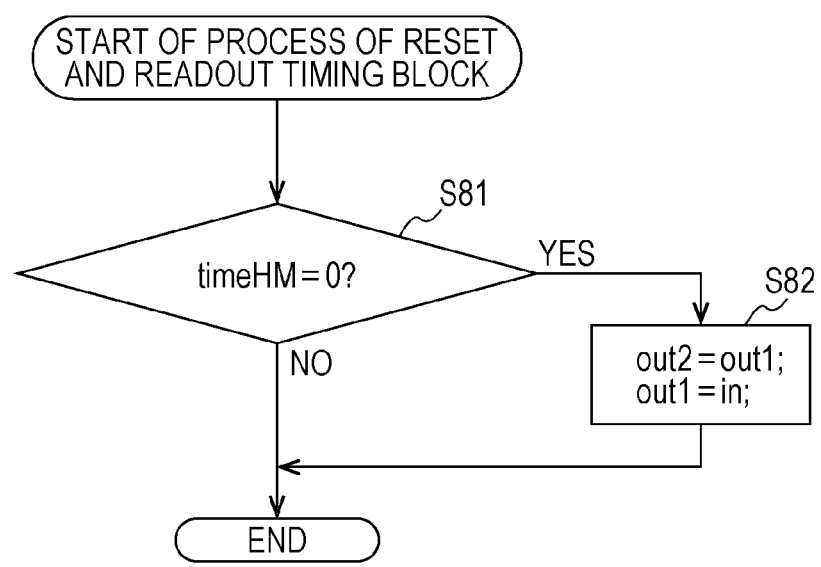
FIG. 41 is a flowchart for describing the 1st process of the timing control unit.

Next, the 1st process of the timing control unit 122 will be described with reference to FIGS. 40 and 41. In the flowchart of FIG. 41, some portions to be described with reference to description using a syntax are present. Since some portions are different between the names of parameters in the syntax and the names of the parameter described above, the correspondent relation will be described with reference to FIG. 40.

The timing control unit 122 includes sub-calculation blocks 211 to 213, and thus each process is performed once at 1 cycle of the clock clockHM in synchronization with the clock clockHM.

The current frame even-line exposure time "exposure time for current image capture," the line number curHM, and the clock clockHM are input to the sub-calculation block 211. Based on the input signals, the sub-calculation block 211 outputs a current frame even-line exposure time "exp time for cur image capt" and an immediately previous frame even-line exposure time "exp time for prev image capt."

Here, in the syntax of FIG. 41, the current frame even-line exposure time "exposure time for current image capture" is written as in and the line number curHM is written as timeHM. Further, the current frame even-line exposure time "exp time for cur image capt" is written as out1 and the immediately previous frame even-line exposure time "exp time for prev image capt" is written as out2.

A current odd frame reading number-of-times "number of readout per frame for current motion capture," the line number curHM, and the clock clockHM are input to the sub-calculation block 212. Based on the input signals, the sub-calculation block 212 outputs a current odd frame reading number-of-times "num of read for cur motion capt" and an immediately previous odd frame reading number-of-times "num of read for prev motion capt."

Here, in the syntax of FIG. 41, the current odd frame reading number-of-times "number of readout per frame for current motion capture" is written as in and the line number curHM is written as timeHM. Further, the current odd frame reading number-of-times "num of read for cur motion capt" is written as out1 and the immediately previous odd frame reading number-of-times "num of read for prev motion capt" is written as out2.

A current frame odd-line exposure time "exposure time for current motion capture," the line number curHM, and the clock clockHM are input to the sub-calculation block 213.

Based on the input signals, the sub-calculation block 213 outputs a current frame odd-line exposure time "exp time for cur motion capt" and an immediately previous frame odd-line exposure time "exp time for prev motion capt."

Here, in the syntax of FIG. 41, the current frame odd-line exposure time "exposure time for current motion capture" is written as in, the line number curHM is written as timeHM. The current frame odd-line exposure time "exp time for cur motion capt" is written as out1 and the immediately previous frame odd-line exposure time "exp time for prev motion capt" is written as out2.

Next, the 1st process of the timing control unit 122 will be described with reference to the flowchart of FIG. 41.

In step S81, the sub-calculation block 211 determines whether timeHM which is the line number curHM is 0. That is, it is determined whether the line is the beginning line of the supplied frame. For example, when the line is the beginning line, the process proceeds to step S82.

In step S82, the sub-calculation block 211 substitutes out1 which is the current frame even-line exposure time "exp time for cur motion capt" to out2 which is the immediately previous frame even-line exposure time "exp time for prev image capt." Further, the sub-calculation block 211 substitutes in which is the current frame even-line exposure time "exposure time for current image capture" to out1 which is the current frame even-line exposure time "exp time for cur image capt."

The process of step S82 is different between the sub-calculation blocks 212 and 213.

That is, in step S82 of the case of the sub-calculation block 212, the sub-calculation block 212 substitutes out1 which is the current odd frame reading number-of-times "num of read for cur motion capt" to out2 which is the immediately previous odd frame reading number-of-times "num of read for prev motion capt." Further, the sub-calculation block 212 substitutes in which is the current odd frame reading number-of-times "number of readout per frame for current motion capture" to out1 which is the current odd frame reading number-of-times "num of read for cur motion capt."

In step S82 of the case of the sub-calculation block 213, the sub-calculation block 213 substitutes out1 which is the current frame odd-line exposure time "exp time for cur motion capt" to out2 which is the immediately previous frame odd-line exposure time "exp time for prev motion capt." Further, the sub-calculation block 213 substitutes in which is the current frame odd-line exposure time "exposure time for current motion capture" to out1 which is the current frame odd-line exposure time "exp time for cur motion capt."

That is, the sub-calculation blocks 211 to 213 repeatedly perform the above-described processes once at 1 cycle of the clock clockHM in synchronization with the clock clockHM.

2nd Process and 3rd Process of Timing Control Unit

Next, a 2nd process and a 3rd process of the timing control unit 122 will be described with reference to FIGS. 42 to 45. In the flowchart of FIG. 45, some portions to be described with reference to description using a syntax are present. Since some portions are different between the names of parameters in the syntax and the names of the parameter described above, the correspondent relation will be described with reference to FIGS. 42 to 44.

Figure 42:
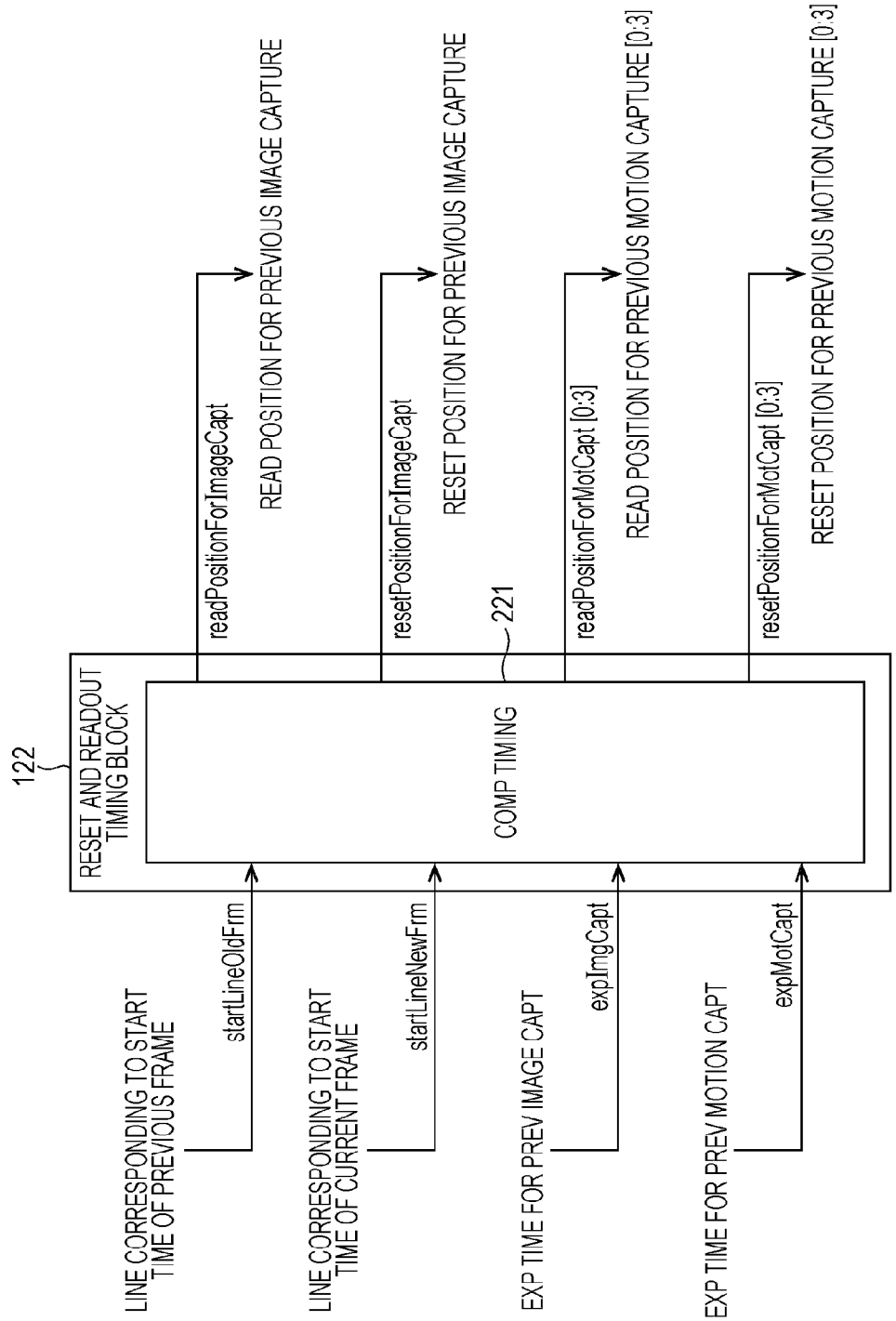
FIG. 42 is a diagram for describing a correspondent relation between input and output signals in the sub-calculation block performing a 2nd process of the timing control unit and notation in a syntax used in flowcharts to be described below.

As shown in FIG. 42, the timing control unit 122 includes a sub-calculation block (Comp Timing) 221 in order to perform the 2nd process.

An immediately previous frame even-line extension line reading vertical coordinate "line corresponding to start time of previous frame" and a current frame even-line reading vertical coordinate "line corresponding to start time of current frame" are input to the sub-calculation block 221.

Further, an immediately previous frame even-line exposure time "exp time for prev image capt" and an immediately previous frame odd-line exposure time "exp time for prev motion capt" are input to the sub-calculation block 221.

Based on these input signals, the sub-calculation block 221 outputs an immediately previous read even-line position "read position for previous image capture" and an immediately previous reset even-line position "reset position for previous image capture."

Further, the sub-calculation block 221 outputs an immediately previous read odd-line position "read position for previous motion capture[0:3]" and an immediately previous reset odd-line position "reset position for previous motion capture[0:3]."

Here, in the syntax of FIG. 45, the immediately previous frame even-line extension line reading vertical coordinate "line corresponding to start time of previous frame" is written as startLineOldFrm and the current frame even-line reading vertical coordinate "line corresponding to start time of current frame" is written as startLineNewFrm. Further, the immediately previous frame even-line exposure time "exp time for prev image capt" is written as expImgCapt and the immediately previous frame odd-line exposure time "exp time for prev motion capt" is written as expMotCapt.

The immediately previous read even-line position "read position for previous image capture" is written as readPositionForImageCapt and the immediately previous reset even-line position "reset position for previous image capture" is written as resetPositionForImageCapt. Further, the immediately previous read odd-line position "read position for previous motion capture[0:3]" is written as readPositionForMotCapt[0:3] and the immediately previous reset odd-line position "reset position for previous motion capture[0:3]" is written as resetPositionForMotCapt[0:3].

Figure 43:
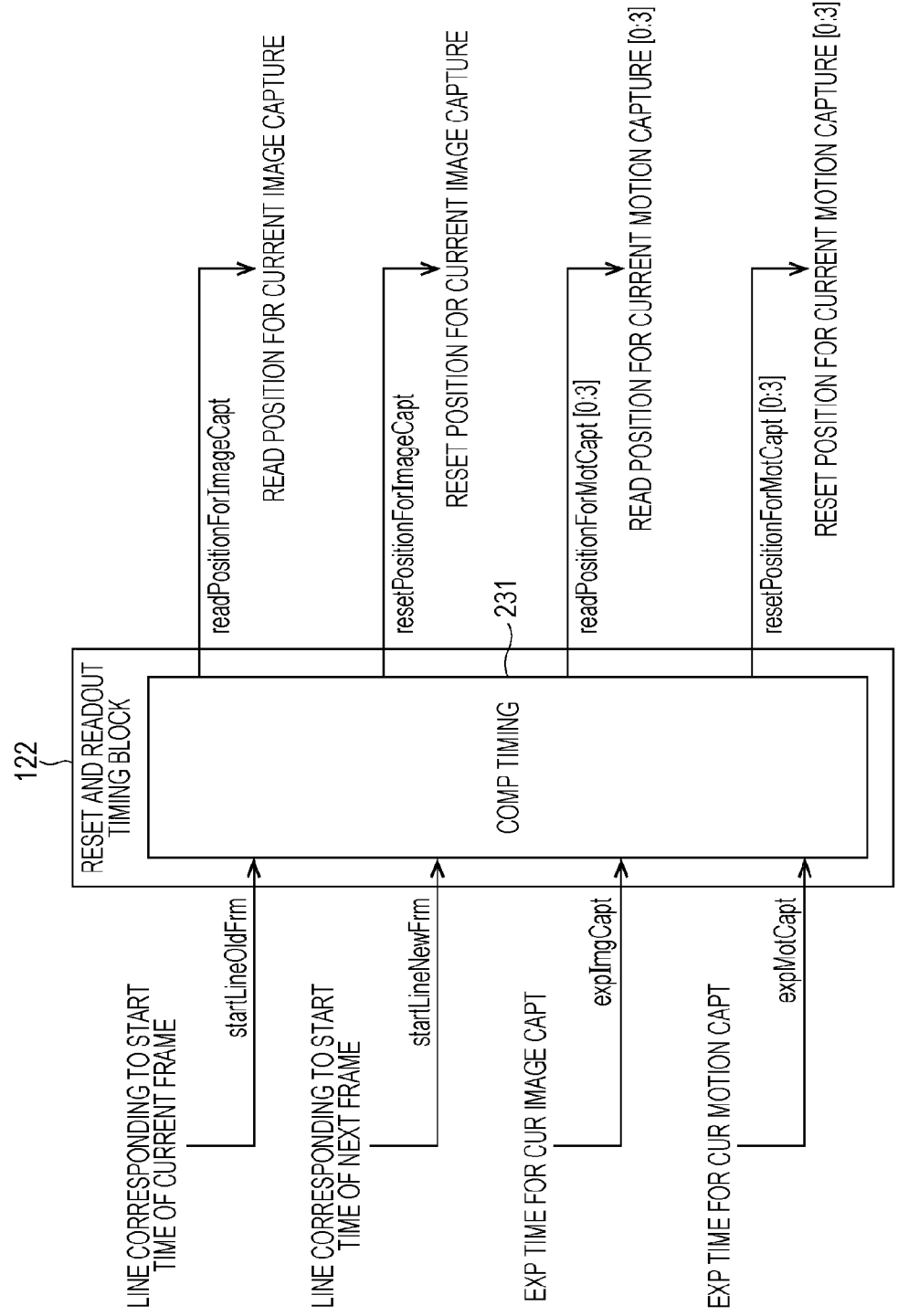
FIG. 43 is a diagram for describing a correspondent relation between input and output signals in the sub-calculation block performing a 3rd process of the timing control unit and notation in a syntax used in flowcharts to be described below.

As shown in FIG. 43, the timing control unit 122 includes a sub-calculation block (Camp Timing) 231 in order to perform the 3rd process.

A current frame even-line extension line reading vertical coordinate "line corresponding to start time of current frame" and a subsequent frame even-line reading vertical coordinate "line corresponding to start time of next frame" are input to the sub-calculation block 231. Further, a current frame even-line exposure time "exp time for cur image capt" and a current frame odd-line exposure time "exp time for cur motion capt" are input to the sub-calculation block 231.

Based on the input signals, the sub-calculation block 231 outputs a current reading even-line position "read position for current image capture" and a current reset even-line position "reset position for current image capture." Further, the sub-calculation block 231 outputs a current reading odd-line position "read position for current motion capture[0:3]" and a current reset odd-line position "reset position for current motion capture[0:3]."

Here, in the syntax of FIG. 45, the current frame even-line extension line reading vertical coordinate "line corresponding to start time of current frame" is written as startLinOldFrm and the subsequent frame even-line reading vertical coordinate "line corresponding to start time of next frame" is written as startLineNewFrm. Further, the current frame even-line exposure time "exp time for cur image capt" is written as expImgCapt and the current frame odd-line exposure time "exp time for cur motion capt" is written as expMotCapt.

The current reading even-line position "read position for current image capture" is written as readPositionForImageCapt and the current reset even-line position "reset position for current image capture" is written as resetPositionForImageCapt. Further, the current reading odd-line position "read position for current motion capture[0:3]" is written as readPositionForMotCapt[0:3] and the current reset odd-line position "reset position for current motion capture[0:3]" is written as resetPositionForMotCapt[0:3].

Figure 44:
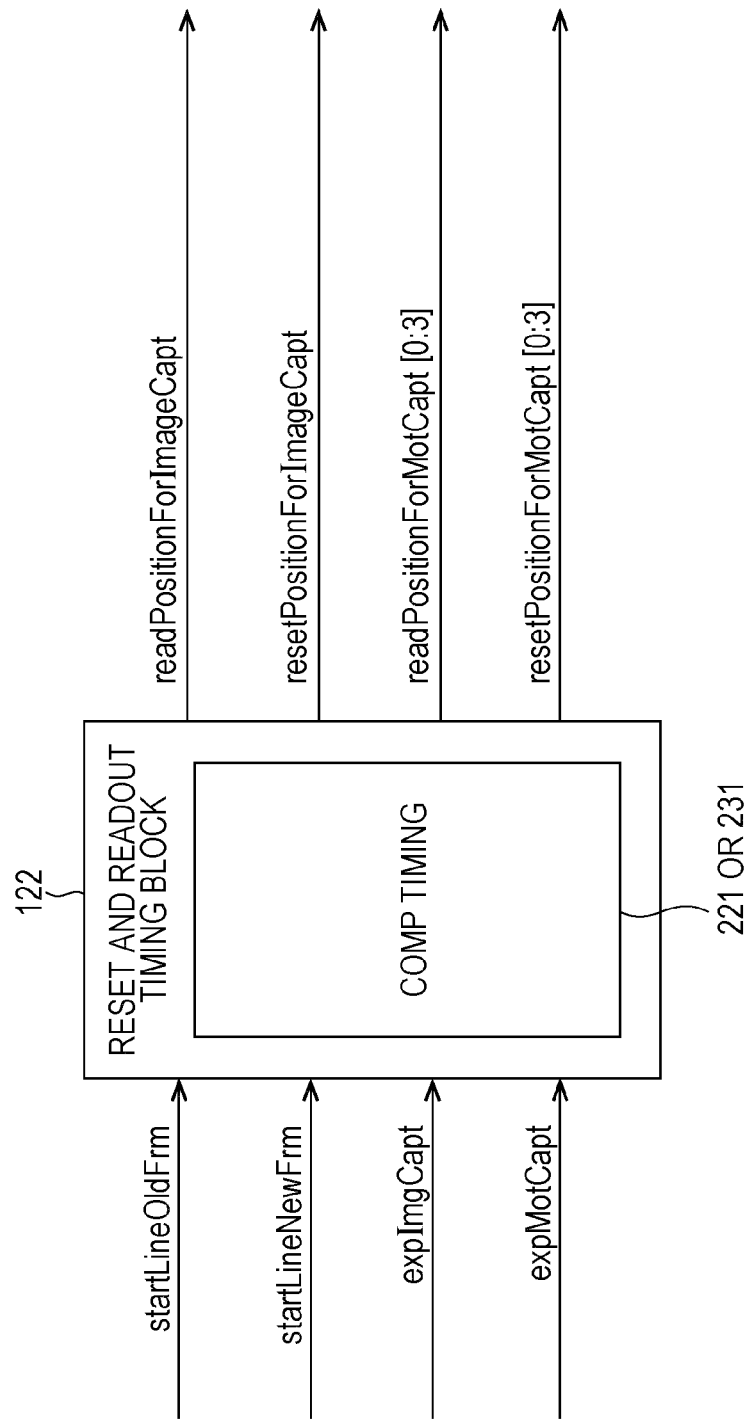
FIG. 44 is a diagram for describing a correspondent relation between input and output signals in the sub-calculation block performing the 2nd and 3rd processes of the timing control unit and notation in a syntax used in flowcharts to be described below.
Figure 45:
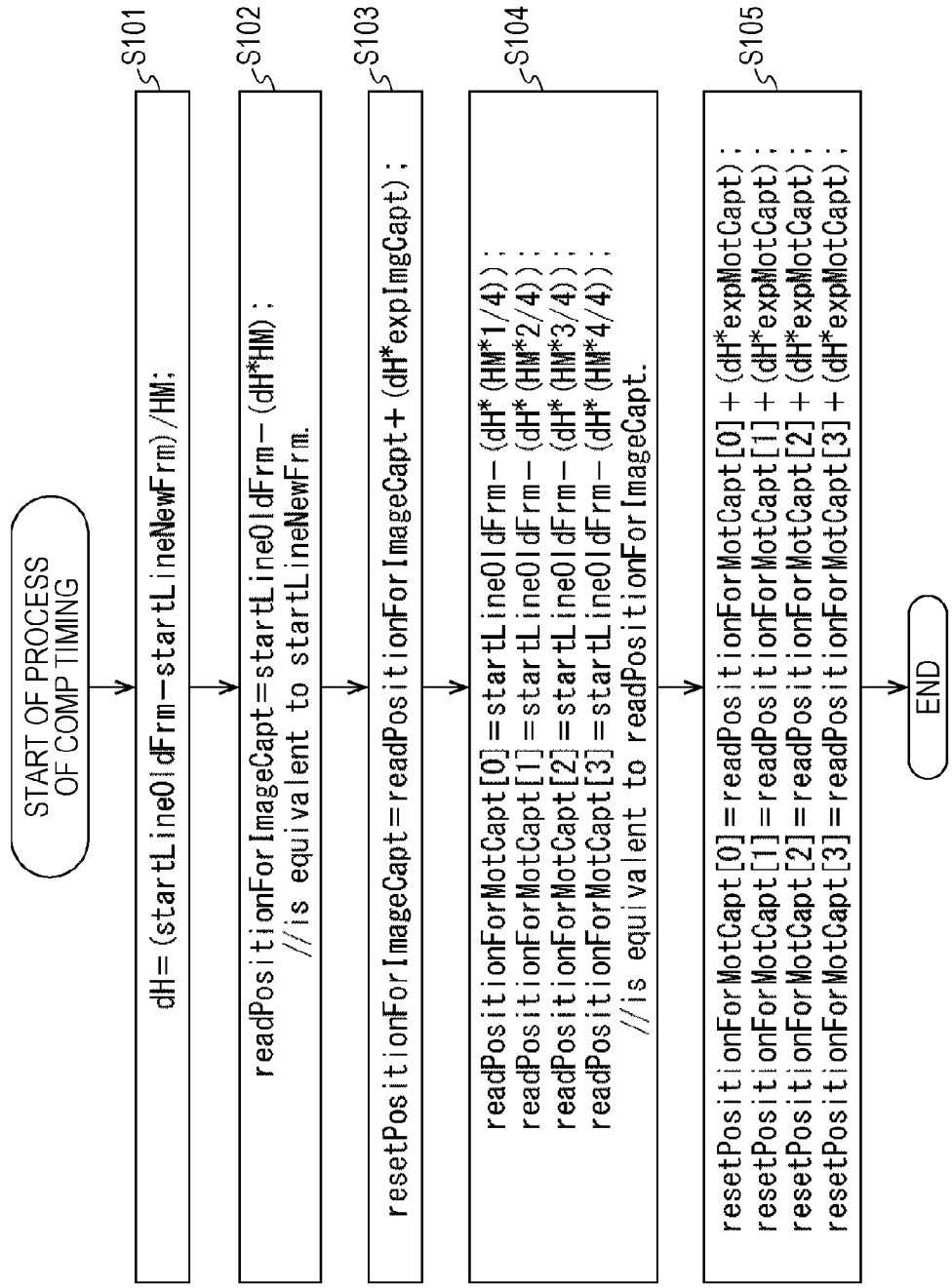
FIG. 45 is a flowchart for describing the 2nd and 3rd processes of the timing control unit.

That is, both of the sub-calculation blocks 221 and 231 perform the same process, as shown in FIG. 44. That is, startLineOldFrm, startLineNewFrm, expImgCapt, and expMotCapt of the parameters written in the syntax are input to both of the sub-calculation blocks 221 and 231. Further, based on the input signals, both of the sub-calculation blocks 221 and 231 output readPositionForImageCapt, resetPositionForImageCapt, readPositionForMotCapt[0:3], and resetPositionForMotCapt[0:3].

Next, a process of the sub-calculation block 221 will be described with reference to the flowchart of FIG. 45.

In step S101, the sub-calculation block 221 calculates a change amount dH in the vertical direction by subtracting startLineNewFrm which is the current frame even-line reading vertical coordinate "line corresponding to start time of current frame" from startLineOldFrm which is the immediately previous frame even-line extension line reading vertical coordinate "line corresponding to start time of previous frame" and dividing the subtracted value by HM.

In step S102, the sub-calculation block 221 calculates readPositionForImageCapt which is the immediately previous read even-line position "read position for previous image capture" by subtracting a value, obtained by multiplying the variation amount dH in the vertical direction per clock clockHM by HM, from startLineOldFrm which is the immediately previous frame even-line extension line reading vertical coordinate "line corresponding to start time of previous frame."

In step S103, the sub-calculation block 221 calculates resetPositionForImageCapt which is the immediately previous reset even-line position "reset position for previous image capture" by adding a value, obtained by multiplying expImgCapt which is the immediately previous frame even-line exposure time "exp time for prev image capt" by the change amount dH in the vertical direction per clock clockHM, to readPositionForImageCapt which is the immediately previous read even-line position "read position for previous image capture."

In step S104, the sub-calculation block 221 calculates readPositionForMotCapt[0:3] which is the immediately previous read odd-line position "read position for previous motion capture[0:3]" by subtracting values, obtained by multiplying the change amount dH in the vertical direction per clock clockHM and HM as the odd lines in the quadruple reading process by ¼, 2/4, ¾, and 4/4, from startLineOldFrm which is the immediately previous frame even-line extension line reading vertical coordinate "line corresponding to start time of previous frame."

In step S105, the sub-calculation block 221 calculates resetPositionForMotCapt[0:3] which is the immediately previous reset odd-line position "reset position for previous motion capture[0:3]" by adding values, obtained by multiplying expMotCapt which is the immediately previous frame odd-line exposure time "exp time for prev motion capt" by the change amount dH in the vertical direction, to readPositionForMotCapt[0:3] which is the immediately previous read odd-line position "read position for previous motion capture[0:3]."

Likewise, a process of the sub-calculation block 231 is performed in the same way.

That is, in step S101, the sub-calculation block 231 calculates a change amount dH in the vertical direction by subtracting startLineNewFrm which is the subsequent frame even-line reading vertical coordinate "line corresponding to start time of next frame" from startLineOldFrm which is the current frame even-line extension line reading vertical coordinate "line corresponding to start time of current frame" and dividing the subtracted value by HM.

In step S102, the sub-calculation block 231 calculates resetPositionForImageCapt which is the current reset even-line position "reset position for current image capture" by subtracting a value, obtained by multiplying the change amount dH in the vertical direction, from startLineNewFrm which is the subsequent frame even-line reading vertical coordinate "line corresponding to start time of next frame."

In step S103, the sub-calculation block 231 calculates resetPositionForImageCapt which is the current reset even-line position "reset position for current image capture" by adding a value, obtained by multiplying expImgCapt which is the current frame even-line exposure time "exp time for cur image capt" by the change amount dH in the vertical direction, to readPositionForImageCapt which is the current reset even-line position "read position for current image capture."

In step S104, the sub-calculation block 231 calculates readPositionForMotCapt[0:3] which is the current read odd-line position "read position for current motion capture[0:3]" by subtracting values, obtained by multiplying the change amount dH in the vertical direction per clock clockHM and HM as the odd lines in the quadruple reading process by ¼, ²⁄₄, ¾, and ⁴⁄₄, from startLineOldFrm which is the current frame even-line extension line reading vertical coordinate "line corresponding to start time of current frame."

In step S105, the sub-calculation block 231 calculates resetPositionForMotCapt[0:3] which is the current reset odd-line position "reset position for current motion capture[0:3]" by adding values, obtained by multiplying expMotCapt which is the current frame odd-line exposure time "exp time for cur motion capt" by the change amount dH in the vertical direction, to readPositionForMotCapt[0:3] which is the current read odd-line position "read position for current motion capture[0:3]."

Through the foregoing processes, it is possible to set the reset and read positions of the even lines and the odd lines corresponding to the quadruple reading process.

4th Process of Timing Control Unit

Next, a 4th process of the timing control unit 122 will be described with reference to FIGS. 46 to 50. In the flowcharts of FIGS. 47 to 51, some portions to be described with reference to description using a syntax are present. Since some portions are different between the names of parameters in the syntax and the names of the parameter described above, the correspondent relation will be described with reference to FIG. 46.

Figure 46:
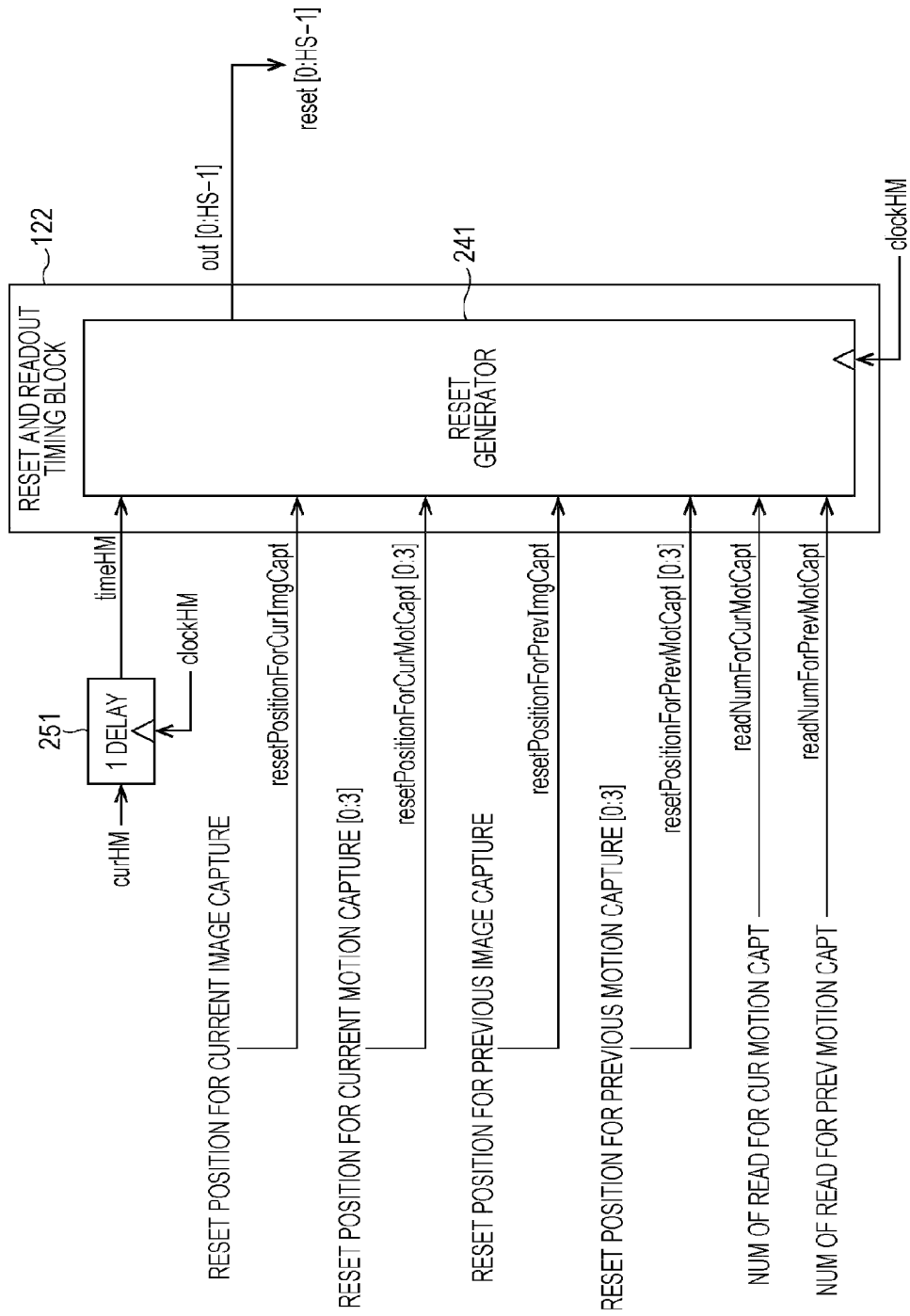
FIG. 46 is a diagram for describing a correspondent relation between input and output signals in the sub-calculation block performing a 4th process of the timing control unit and notation in a syntax used in flowcharts to be described below.

As shown in FIG. 46, the timing control unit 122 includes a sub-calculation block (Reset Generator) 241 in order to perform the 4th process.

The line number curHM delayed by 1 cycle by the clock clockHM via the delay unit (1 delay) 251, a current reset even-line position "reset position for current image capture," a current reset odd-line position "reset position for current motion capture[0:3]," an immediately previous reset even-line position "reset position for previous image capture," an immediately reset odd-line position "reset position for previous motion capture[0:3]," a current odd frame reading number-of-times "num of read for cur motion capt," a clock clockHM, and an immediately previous odd frame reading number-of-times "num of read for prev motion capt" are input to the sub-calculation block 241.

Based on the input signals, the sub-calculation block 241 output a reset signal reset[0:HS-1].

Here, in the syntax of the flowcharts of FIGS. 47 to 50, the line number curHM is written as timeHM and the current reset even-line position "read position for current image capture" is written as resetPositionForImageCapt. The current reset odd line position "reset position for current motion capture[0:3]" is written as resetPositionForCurMotCapt[0:3]. The immediately previous reset even-line position "reset position for previous image capture" is written as resetPositionForPrevImgCapt. The immediately reset odd-line position "reset position for previous motion capture[0:3]" is written as resetPositionForPrevMotCapt[0:3].

The current odd frame reading number-of-times "num of read for cur motion capt" is written as readNumForCurMotCapt and the immediately previous odd frame reading number-of-times "num of read for prev motion capt" is written as readNumForPrevMotCapt. The reset signal reset[0:HS-1] is written as out[0:HS-1].

Next, a process of the sub-calculation block 241 will be described with reference to the flowcharts of FIGS. 47 to 50.

In step S121, the sub-calculation block 241 initialize out[0:HS-1] which is the reset signal reset[0:HS-1] and sets out[0:HS-1] to NoReset, i.e., to a non-reset state.

In step S122, the sub-calculation block 241 determines whether timeHM which is the line number curHM is 0. That is, it is determined whether the line is the beginning line of the supplied frame. For example, when the line is the beginning line, the process proceeds to step S123.

In step S123, the sub-calculation block 241 substitutes and updates a latest immediately previous reset even-line position latestRestForPrevImgCapt to a latest current reset even-line position latestResetForCurImgCapt up to the current time. Further, the sub-calculation block 241 substitutes and updates the latest current reset even-line position latestResetForCurImgCapt to a value obtained by rounding off a 1st digit of an integer portion with a binary representation of resetPositionForImageCapt which is the current reset even-line position "reset position for current image capture" (inserting a value obtained by adding 1.0 and dividing 2.0 into the floor function and multiplying 2).

In step S124, the sub-calculation block 241 substitutes and updates a latest immediately previous reset odd-line position latestResetForPrevMotCapt[0:3] to the latest current reset odd-line position latestResetForCurMotCapt[0:3] up to the current time. Further, the sub-calculation block 241 substitutes and updates the latest current reset odd-line position latestResetForCurMotCapt[0:3] to a value obtained by rounding off a 1st digit of an integer portion with a binary representation of resetPositionForCurMotCapt[0:3] which is the current reset odd-line position "reset position for current motion capture[0:3]" (inserting a value obtained by adding 1.0 and dividing 2.0 into the floor function and multiplying 2).

When timeHM which is the line number curHM is not 0 in step S122, the processes of step S123 and S124 are skipped.

Figure 48:
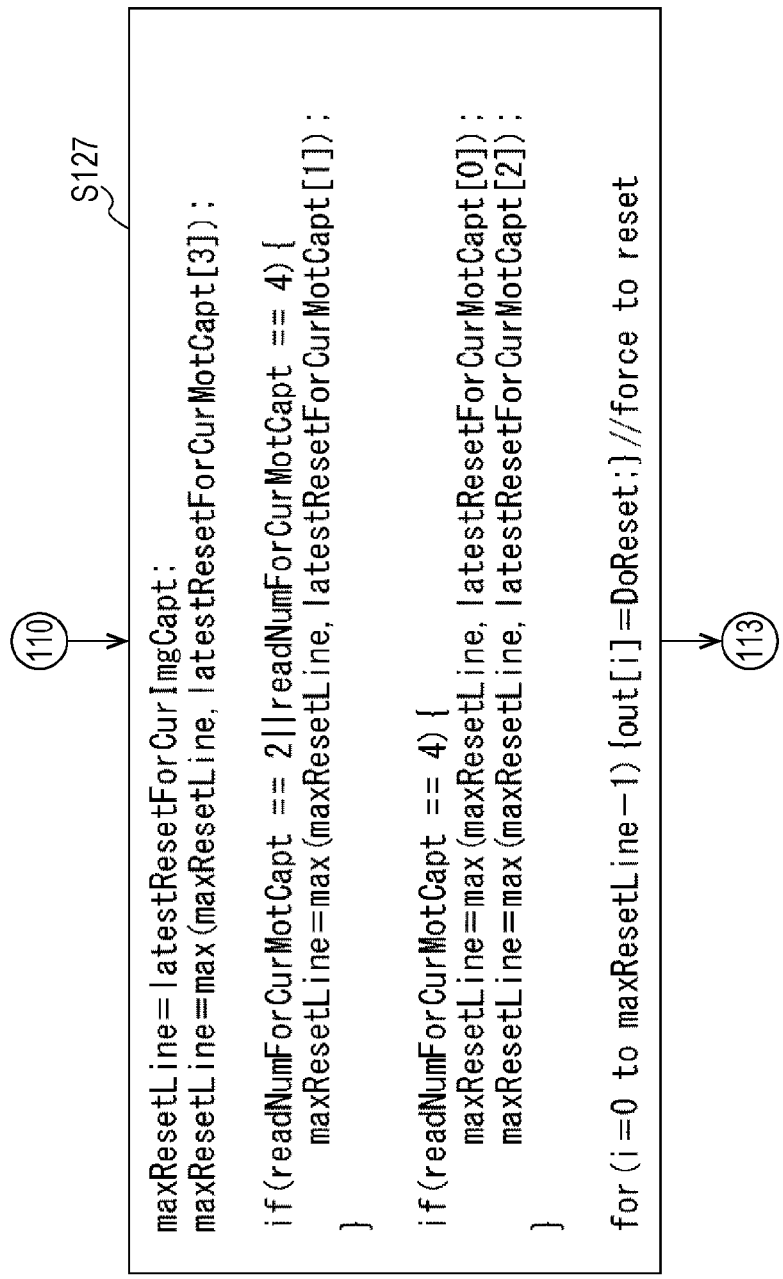
FIG. 48 is a flowchart for describing the 4th process of the timing control unit.

In step S125, the sub-calculation block 241 determines whether timeHM which is the line number curHM is 0. That is, it is determined whether the line is the beginning line of the supplied frame. For example, when the line is the beginning line, the process proceeds to step S127 (FIG. 48).

In step S127 (FIG. 48), the sub-calculation block 241 substitutes and updates the maximum value maxResetLine of the line to be reset to a latest current reset even-line position latestResetForCurImgCapt. Further, the sub-calculation block 241 sets a larger value by comparison between the maximum value maxResetLine of the line to be reset and the latest current reset odd-line position latestResetForCurMotCapt[3] of the odd line read at the 4th time at intervals between the even lines, as the maximum value maxResetLine of the line to be reset.

When readNumForCurMotCapt which is the current odd frame reading number-of-times "num of read for cur motion capt" is twice or 4 times, the sub-calculation block 241 sets a larger value determined by comparison between the maximum value maxResetLine of the line to be reset and the latest current reset odd-line position latestResetForCurMotCapt[1] of the odd line read at the 2nd time at intervals between the even lines, as the maximum value maxResetLine of the line to be reset.

When readNumForCurMotCapt which is the current odd frame reading number-of-times "num of read for cur motion capt" is 4 times, the sub-calculation block 241 sets a larger value determined by comparison between the maximum value maxResetLine of the line to be reset and the latest current reset odd-line position latestResetForCurMotCapt[0] of the odd line read at the 1st time at intervals between the even lines, as the maximum value maxResetLine of the line to be reset. Further, the sub-calculation block 241 sets a larger value by comparison between the maximum value maxResetLine of the line to be reset and the latest current reset odd-line position latestResetForCurMotCapt[2] of the odd line read at the 3rd time at intervals between the even lines, as the maximum value maxResetLine of the line to be reset.

Figure 47:
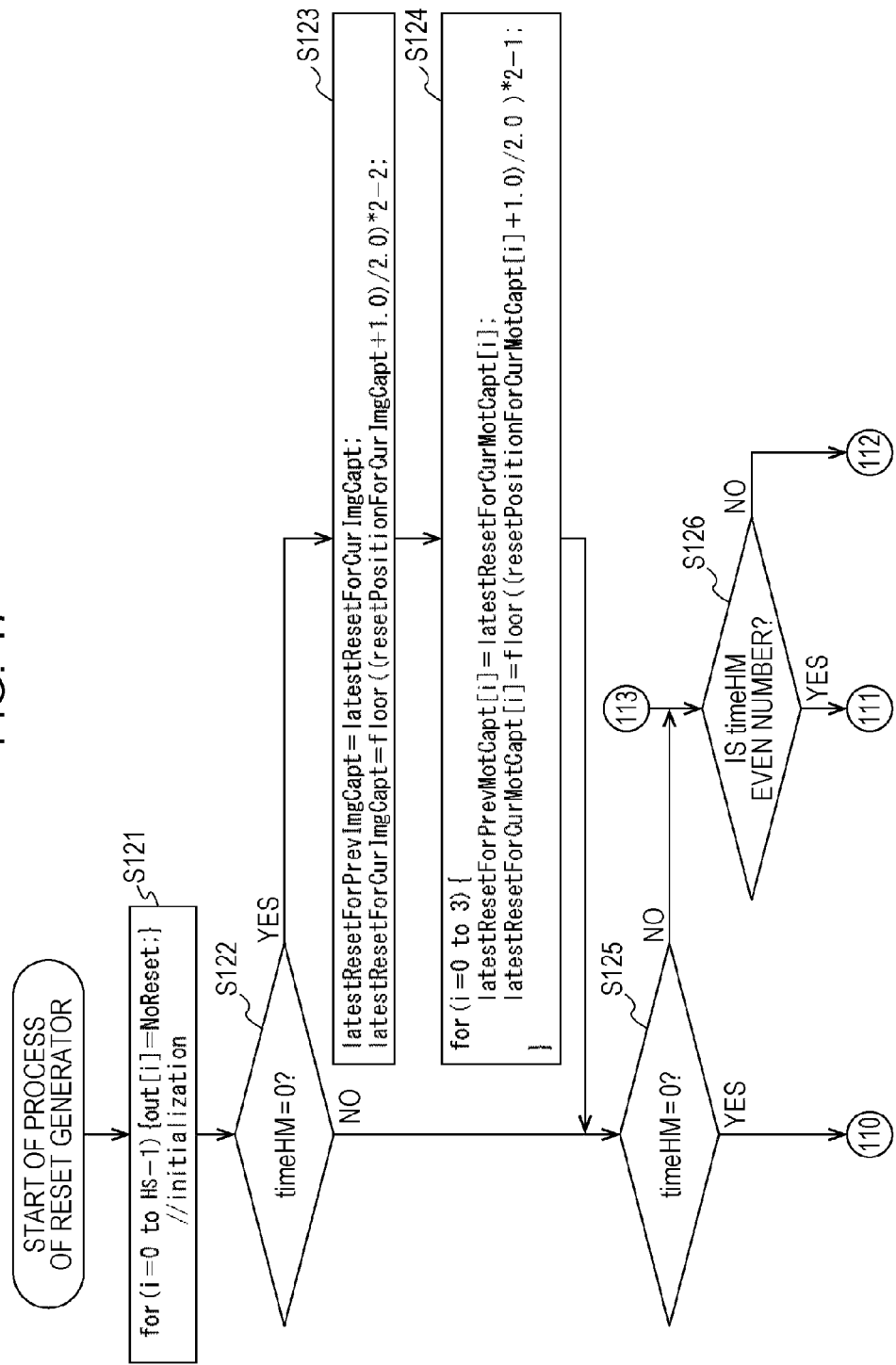
FIG. 47 is a flowchart for describing the 4th process of the timing control unit.

The sub-calculation block 241 sets the pixels belonging to all of the lines from the top line of the image sensor 11 to a line located above by 1 line from the maximum value maxResetLine of the line to be reset in out[0:HS−1] which is the reset signal reset[0:HS−1] to a reset state by setting out[0:HS−1] which is the reset signal reset[0:HS−1] to DoReset. Then, the process proceeds to step S126 (FIG. 47).

Conversely, when timeHM which is the line number curHM is not 0 in step S125, the process proceeds to step S126.

Figure 49:
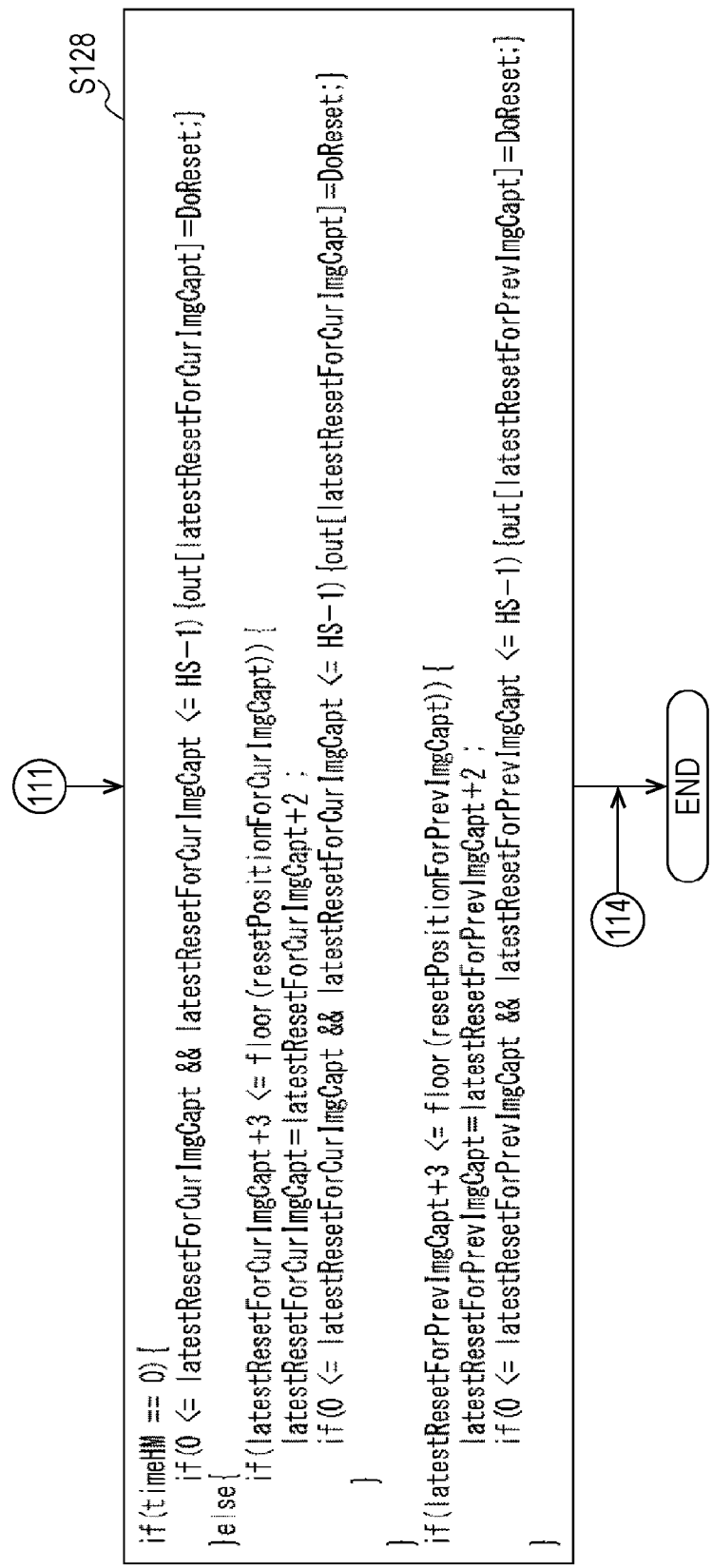
FIG. 49 is a flowchart for describing the 4th process of the timing control unit.

In step S126, the sub-calculation block 241 determines whether timeHM which is the line number curHM is an even number. For example, when timeHM which is the line number curHM is an even number in step S126, the process proceeds to step S128 (FIG. 49).

In step S128 (FIG. 49), when timeHM which is the line number curHM is 0 and the latest current reset even-line position latestResetForCurImgCapt is in the range of the vertical direction of the image sensor 11, i.e., equal to or greater than 0 and equal to or less than HS−1, the sub-calculation block 241 sets the pixels out [lastestResetForCurImgCapt] corresponding to the latest current reset even-line position latestResetForCurImgCapt to DoReset and gives a reset instruction.

Conversely, when timeHM which is the line number curHM is not 0 and a value obtained by adding 3 to the latest current reset even-line position latestResetForCurImgCapt is equal to or less than a value obtained by truncating a value after a decimal point of resetPositionForImageCapt which is the current reset even-line position "reset position for current image capture" by the floor function, the sub-calculation block 241 increases the latest current reset even-line position latestResetForCurImgCapt by 2.

When the latest current reset even-line position latestResetForCurImgCapt is in the range of the vertical direction of the image sensor 11, the sub-calculation block 241 sets the pixels out[latestResetForCurImgCapt] corresponding to the latest current reset even-line position latestResetForCurImgCapt to DoReset and gives a reset instruction.

When the value obtained by adding 3 to a latest immediately previous reset even-line position latestResetForPrevImgCapt is equal to or less than a value obtained by truncating a value after a decimal point of resetPositionForPrevCapt which is an immediately previous reset even-line position "reset position for previous image capture" by the floor function, the sub-calculation block 241 increases the latest immediately previous reset even-line position latestResetForPrevImgCapt by 2.

When the latest immediately previous reset even-line position latestResetForPrevImgCapt is in the range of the vertical direction of the image sensor 11, the sub-calculation block 241 sets the pixels out[latestResetForPrevImgCapt] corresponding to the latest immediately previous reset even-line position latestResetForPrevImgCapt to DoReset and gives a reset instruction.

Figure 50:
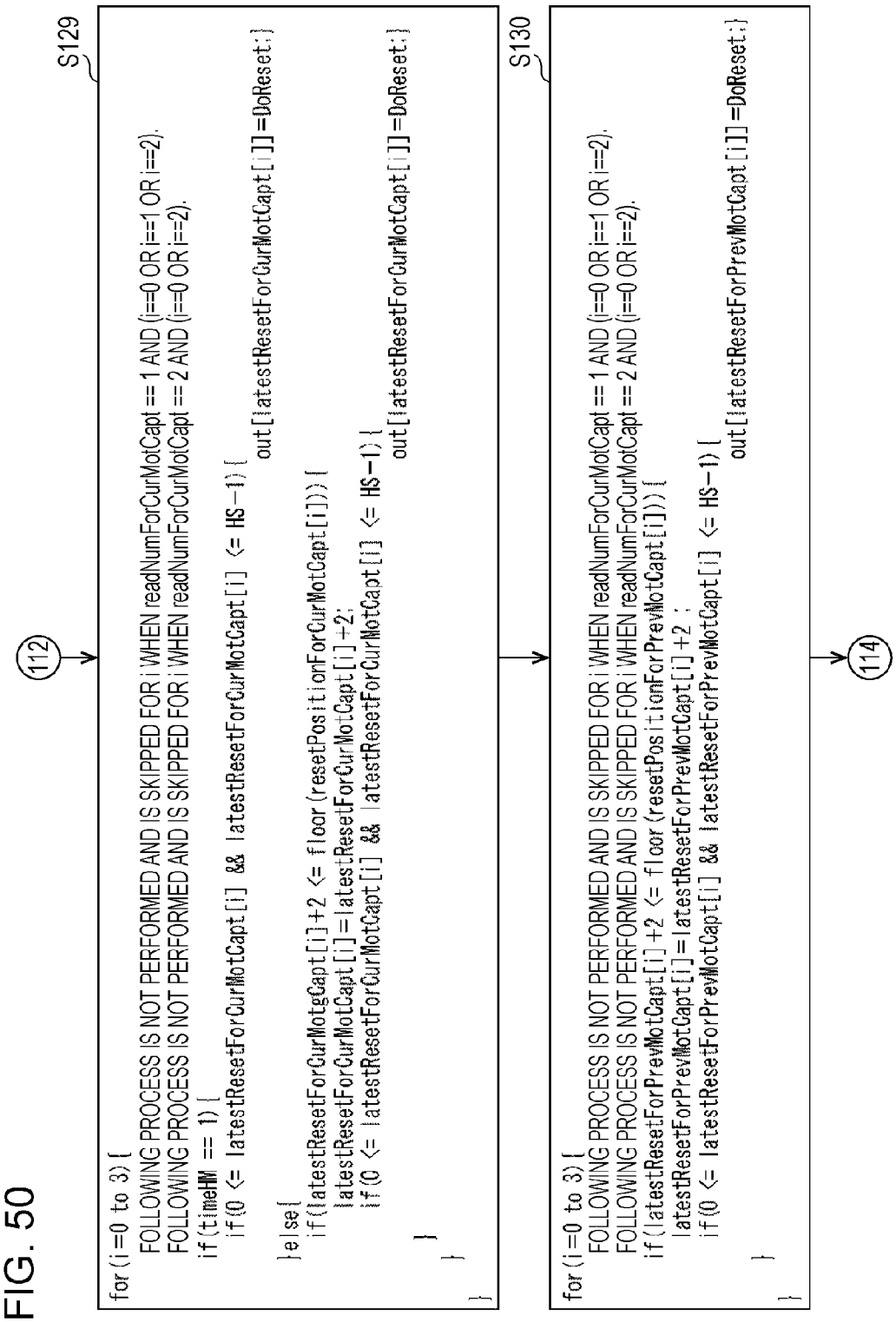
FIG. 50 is a flowchart for describing the 4th process of the timing control unit.

Conversely, when timeHM which is the line number curHM is not the even number in step S126 (FIG. 47), the process proceeds to step S129 (FIG. 50).

In step S129, when timeHM which is the line number curHM is 1 and the latest current reset odd-line position latestResetForCurMotCapt[i] is in the range of the vertical direction of the image sensor 11, i.e., equal to or greater than 0 and equal to or less than HS−1, the sub-calculation block 241 sets the pixels out [lastestResetForCurMotCapt[i]] corresponding to the latest current reset odd-line position latestResetForCurMotCapt[i] to DoReset, i.e., gives a reset instruction.

Conversely, when timeHM which is the line number curHM is not 1 and a value obtained by adding 2 to the latest current reset odd-line position latestResetForCurMotCapt[i] is equal to or less than a value obtained by truncating a value after a decimal point of resetPositionForCurMotCapt[i] which is the current reset odd-line position "reset position for current motion capture[i]," the sub-calculation block 241 increases the latest current reset odd-line position latestResetForCurMotCapt[i] by 2.

Further, when the latest current reset odd-line position latestResetForCurMotCapt[i] is in the range of the vertical direction of the image sensor 11, the sub-calculation block 241 sets the pixels out [lastestResetForCurMotCapt] corresponding to the latest current reset odd-line position latestResetForCurMotCapt[i] to DoReset and gives a reset instruction.

Here, the process of step S129 is performed only for i=3 when readNumForCurMotCapt which is the current odd frame reading number-of-times "num of read for cur motion capt" is 1 and is performed only for i=1 and 3 when readNumForCurMotCapt which is the current odd frame reading number-of-times "num of read for cur motion capt" is 2. Further, the process of step S129 is performed all for i=0 to 3 when readNumForCurMotCapt is 4.

In step S130, when a value obtained by adding 2 to the latest current reset odd-line position latestResetForCurMotCapt[i] is equal to or less than a value obtained by truncating a value after a decimal point of resetPositionForPrevMotCapt[i] which is the immediately previous reset odd-line position "reset position for previous motion capture" by the floor function, the sub-calculation block 241 increases the latest immediately previous reset odd-line position latestResetForPrevMotCapt[i] by 2.

When the latest immediately previous reset odd-line position latestResetForPrevMotCapt[i] is in the range of the vertical direction of the image sensor 11, the sub-calculation block 241 sets the pixels out [lastestResetForPrevMotCapt[i]] corresponding to the latest immediately previous reset odd-line position latestResetForPrevMotCapt[i] to DoReset and gives a reset instruction.

Here, the process of step S130 is performed only for i=3 when readNumForCurMotCapt which is the current odd frame reading number-of-times "num of read for cur motion capt" is 1 and is performed only for i=1 and 3 when readNumForCurMotCapt which is the current odd frame reading number-of-times "num of read for cur motion capt" is 2. Further, the process of step S130 is performed all for i=0 to 3 when readNumForCurMotCapt is 4.

5th Process of Timing Control Unit

Next, a 5th process of the timing control unit 122 will be described with reference to FIGS. 51 to 60. In the flowchart of FIGS. 52 to 60, some portions to be described with reference to description using a syntax are present. Since some portions are different between the names of parameters in the syntax and the names of the parameter described above, the correspondent relation will be described with reference to FIG. 51.

Figure 51:
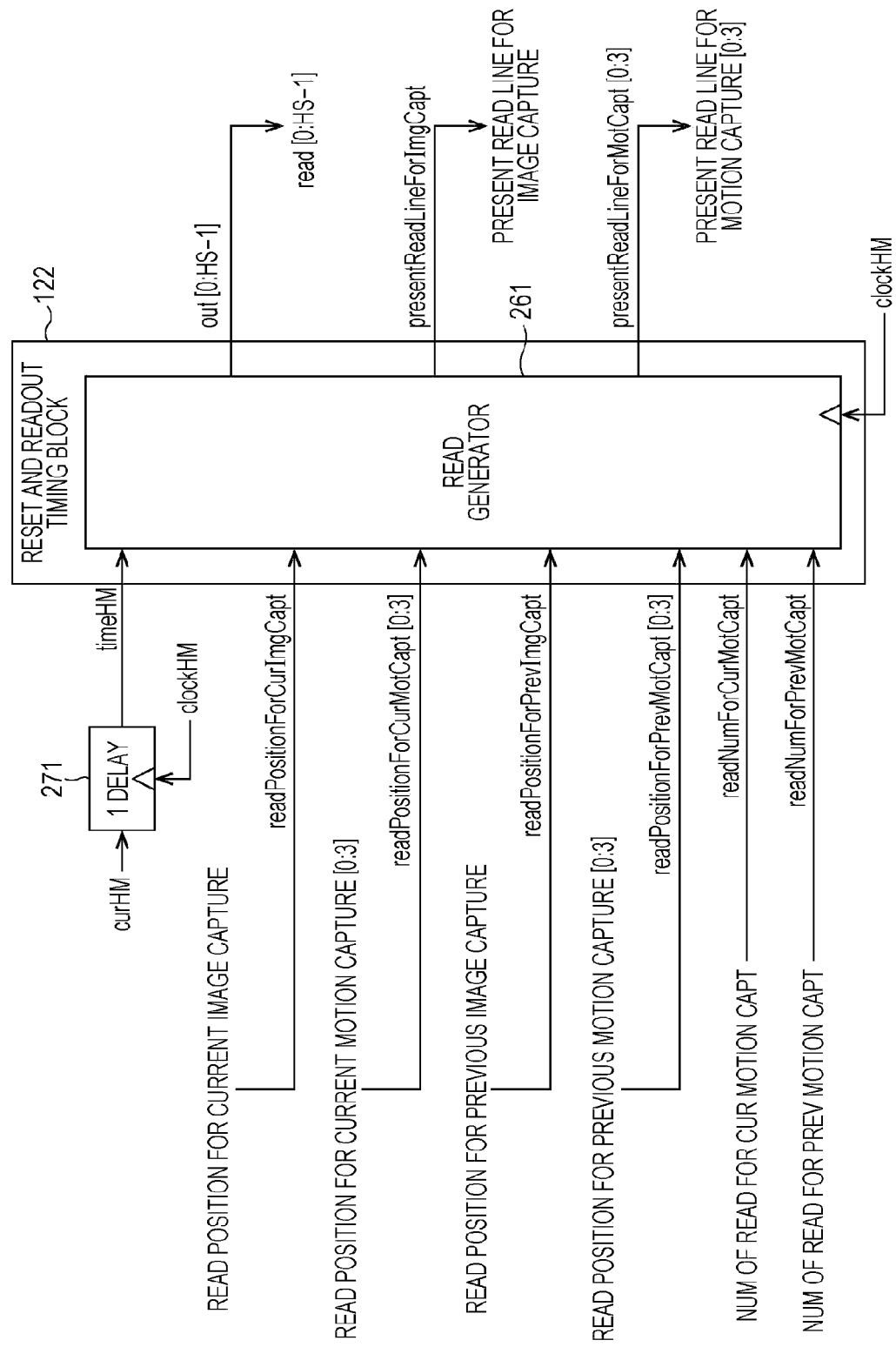
FIG. 51 is a diagram for describing a correspondent relation between input and output signals in the sub-calculation block performing a 5th process of the timing control unit and notation in a syntax used in flowcharts to be described below.
Figure 52:
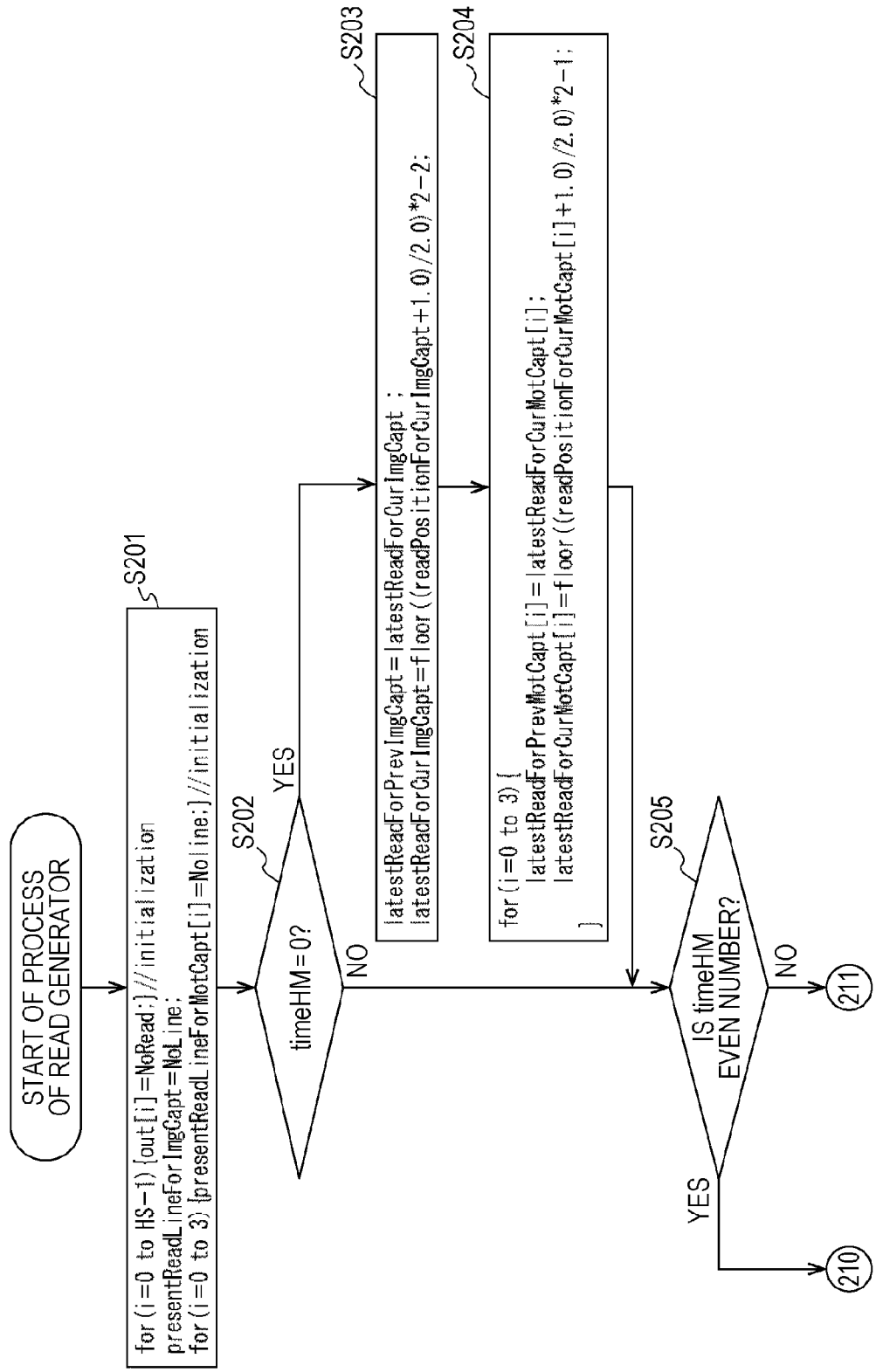
FIG. 52 is a flowchart for describing the 5th process of the timing control unit.

As shown in FIG. 51, the timing control unit 122 includes a sub-calculation block (Reset Generator) 261 in order to perform the 5th process.

The line number curHM delayed by 1 cycle by the clock clockHM via a delay unit (1 delay) 271, a current reading even-line position "read position for current image capture," a current reading odd-line position "read position for current motion capture[0:3]," an immediately previous reading even-line position "read position for previous image capture," an immediately previous reading odd-line position "read position for previous motion capture[0:3]," a current odd frame reading number-of-times "num of read for cur motion capt," a clock clockHM, and an immediately previous odd frame reading number-of-times "num of read for prev motion capt" are input to the sub-calculation block 261.

Based on the input signals, the sub-calculation block 261 outputs a reading signal read[0:HS−1], a current time reading even-line "present read line for image capture," and a current time reading odd-line "present read line for motion capture[0:3]."

Here, in the syntax of the flowcharts of FIGS. 52 to 60, the line number curHM is written as timeHM and the current reading even-line position "read position for current image capture" is written as readPositionForImageCapt. The current reading odd line position "read position for current motion capture[0:3]" is written as readPositionForCurMotCapt[0:3]. The immediately previous reading even-line position "read position for previous image capture" is written as readPositionForPrevImgCapt.

The immediately reading odd-line position "read position for previous motion capture[0:3]" is written as readPositionForPrevMotCapt[0:3]. The current odd frame reading number-of-times "num of read for cur motion capt" is written as readNumForCurMotCapt and the immediately previous odd frame reading number-of-times "num of read for prev motion capt" is written as readNumForPrevMotCapt.

The reading signal read[0:HS−1] is written as out[0:HS−1], the present time reading even-line "present read line for image capture" is written as presentReadLineForImgCapt, and a current time reading odd-line "present read line for motion capture[0:3]" is written as presentReadLineForMotCapt[0:3].

Next, a process of the sub-calculation block 261 will be described with reference to the flowcharts of FIGS. 52 to 60.

In step S201, the sub-calculation block 261 initialize out[0:HS−1] which is the reading signal read[0:HS−1] and sets NoRead, i.e., to a non-reading state. The sub-calculation block 261 sets presentReadLineForImgCapt which is the present time reading even-line "present read line for image capture" to NoLine, i.e., a state in which the reading even line is not present at the current timing. The sub-calculation block 261 sets presentReadLineForMotCapt[0:3] which is the current time reading odd-line "present read line for motion capture[0:3]" to Noline, i.e., to a state in which the current time reading odd-line "present read line for motion capture[0:3]" is not present.

In step S202, the sub-calculation block 261 determines whether timeHM which is the line number curHM is 0. That is, it is determined whether the line is the beginning line of the supplied frame. For example, when the line is the beginning line, the process proceeds to step S203.

In step S203, the sub-calculation block 261 substitutes and updates a latest immediately previous reading even-line position latestReadForPrevImgCapt to a latest current reading even-line position latestReadForCurImgCapt up to the current time. Further, the sub-calculation block 261 substitutes and updates the latest current reading even-line position latestReadForCurImgCapt to a value obtained by rounding off a 1st digit of an integer portion with a binary representation of readPositionForImgCapt which is the current reading even-line position "read position for current image capture" (inserting a value obtained by adding 1.0 and dividing 2.0 into the floor function and multiplying 2).

In step S204, the sub-calculation block 261 substitutes and updates a latest immediately previous reading odd-line position latestReadForPrevMotCapt[0:3] to the latest current reading odd-line position latestReadForCurMotCapt[0:3] up to the current time. Further, the sub-calculation block 261 substitutes and updates the latest current reading odd-line position latestReadForCurMotCapt[0:3] to a value obtained by rounding off a 1st digit of an integer portion with a binary representation of readPositionForCurMotCapt[0:3] which is the current reading odd-line position "read position for current motion capture[0:3]" (inserting a value obtained by adding 1.0 and dividing 2.0 into the floor function and multiplying 2).

When timeHM which is the line number curHM is not 0 in step S202, the processes of step S203 and S204 are skipped.

Figure 53:
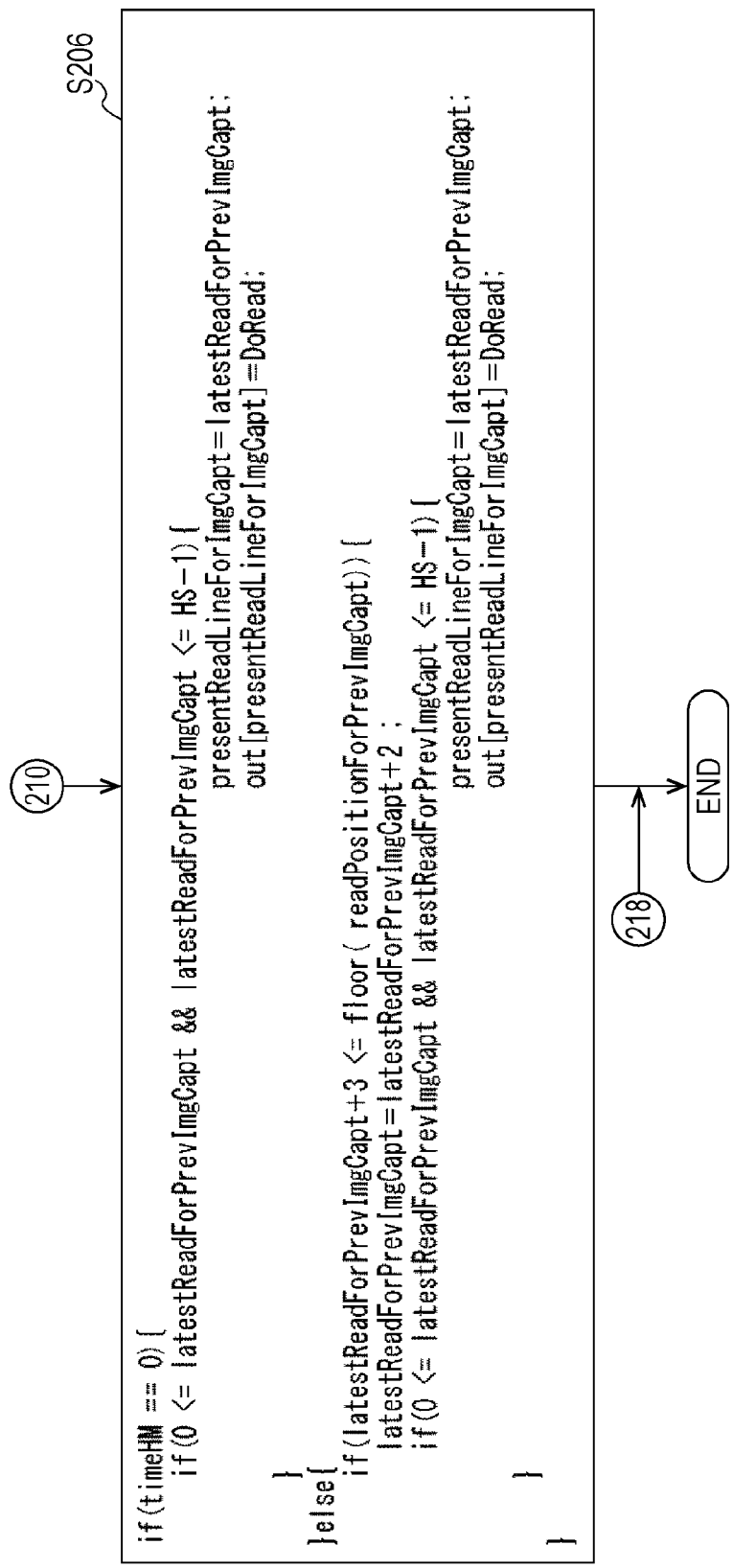
FIG. 53 is a flowchart for describing the 5th process of the timing control unit.

In step S205, the sub-calculation block 261 determines whether timeHM which is the line number curHM is an even number. For example, when it is determined in step S205 that timeHM is an even number, the process proceeds to step S206 (FIG. 53).

In step S206 (FIG. 53), when timeHM which is the line number curHM is 0 and the latest immediately previous reading even-line position latestReadForPrevImgCapt is in the range of the vertical direction of the image sensor 11, i.e., equal to or greater than 0 and equal to or less than HS−1, the sub-calculation block 261 sets presentReadLineForImgCapt which is the present time reading even-line "present read line for image capture" to the immediately previous reading even-line position latestReadForPrevImgCapt and sets the pixels out [presentReadLineForImgCapt] corresponding to the immediately previous reading even-line position latestReadForCurImgCapt to DoRead, i.e., gives a reading instruction.

Conversely, when timeHM which is the line number curHM is not 0 and a value obtained by adding 3 to the latest immediately previous reset even-line position latestResetForPrevImgCapt is equal to or less than a value obtained by truncating a value after a decimal point of readPositionForImageCapt which is the current reading even-line position "read position for current image capture" by the floor function, the sub-calculation block 261 increases the latest immediately previous reset even-line position latestResetForPrevImgCapt by 2.

When the latest immediately previous reading even-line position latestReadForPrevImgCapt is in the range of the vertical direction of the image sensor 11, the sub-calculation block 261 sets presentReadLineForImgCapt which is the present time reading even-line "present read line for image capture" to the latest immediately previous reading even-line position latestReadForPrevImgCapt and sets the pixels out [presentReadLineForImgCapt] corresponding to the latest immediately previous reading even-line position latestReadForPrevImgCapt to DoRead, i.e., gives a reading instruction, and then the process ends.

Figure 54:
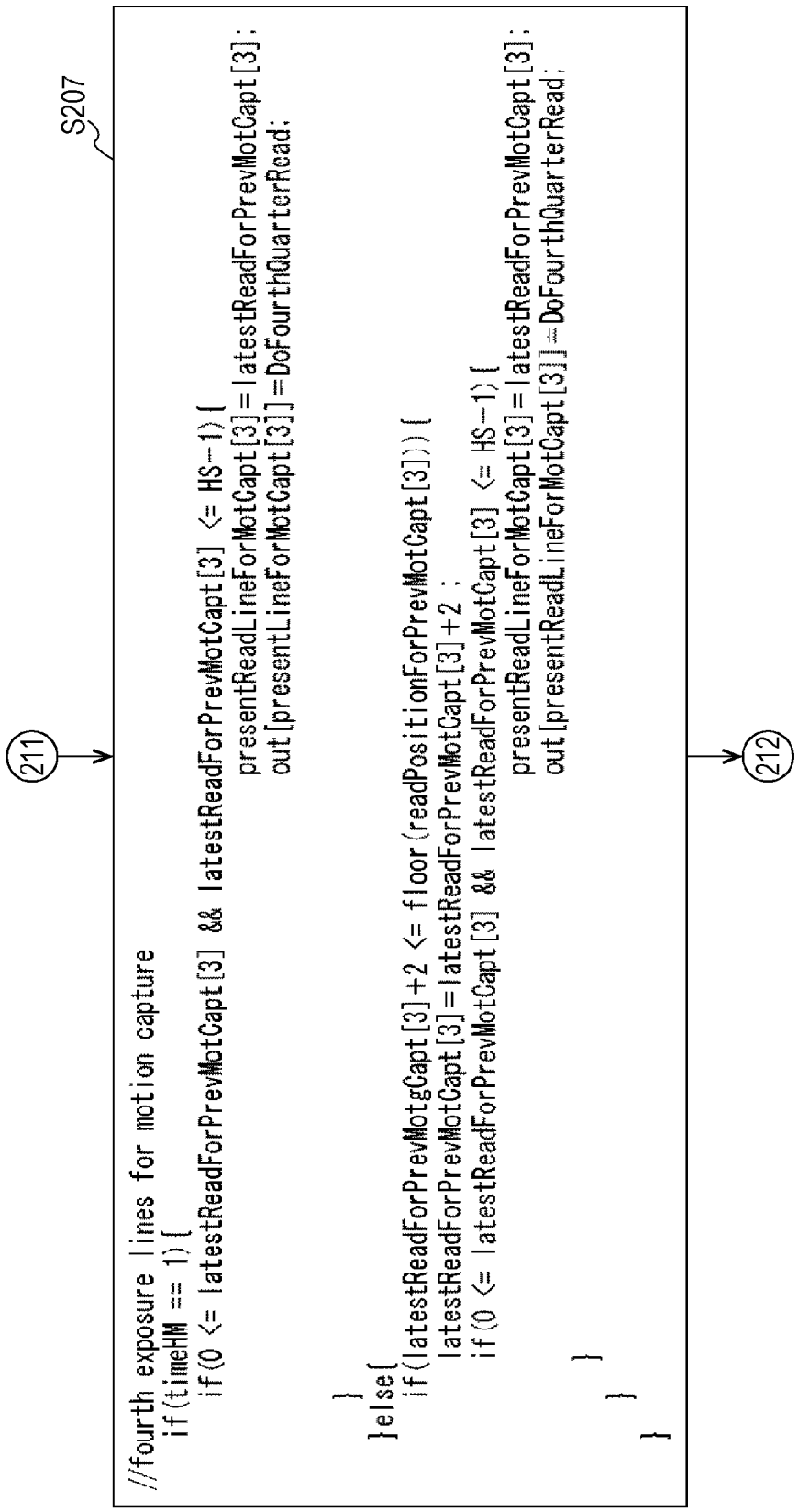
FIG. 54 is a flowchart for describing the 5th process of the timing control unit.
Figure 55:
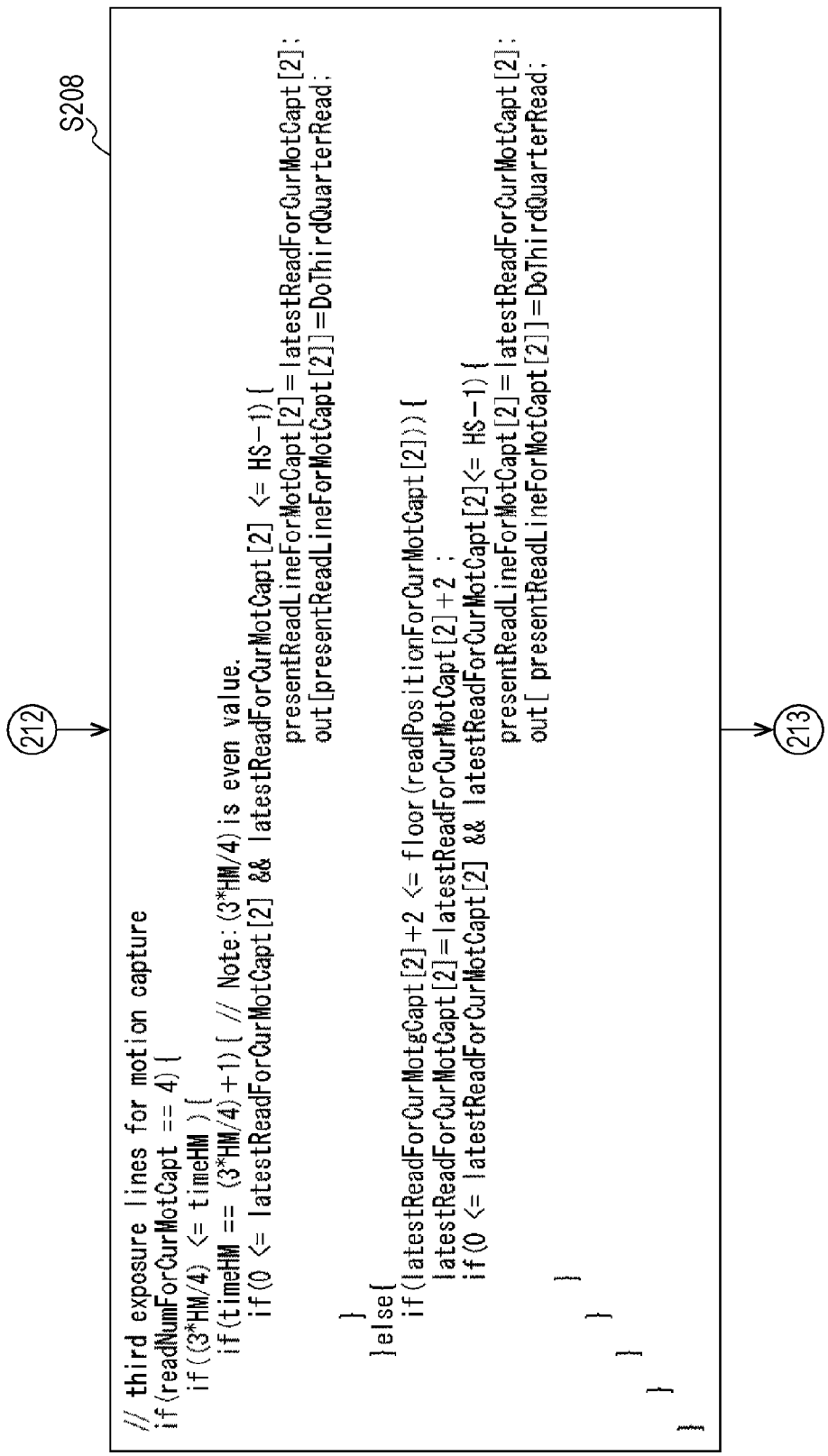
FIG. 55 is a flowchart for describing the 5th process of the timing control unit.
Figure 56:
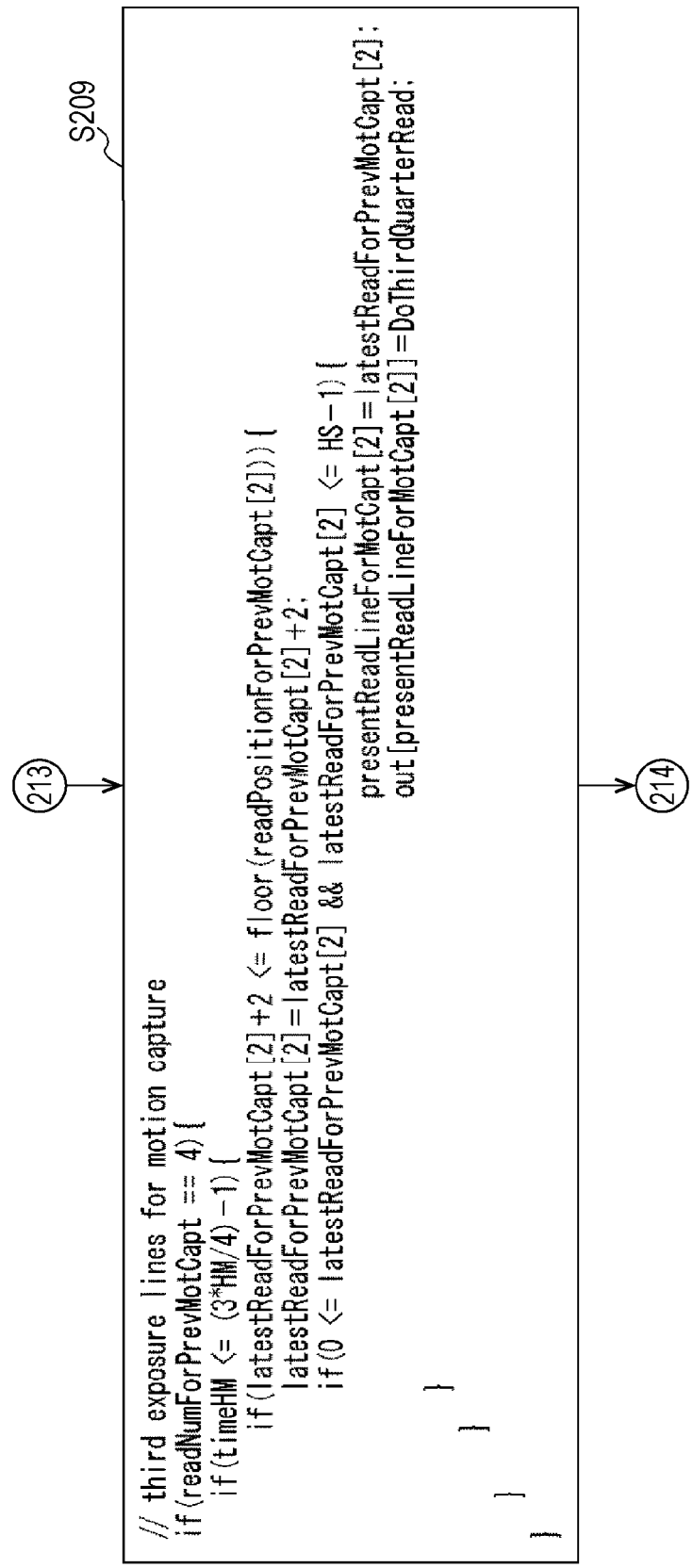
FIG. 56 is a flowchart for describing the 5th process of the timing control unit.
Figure 57:
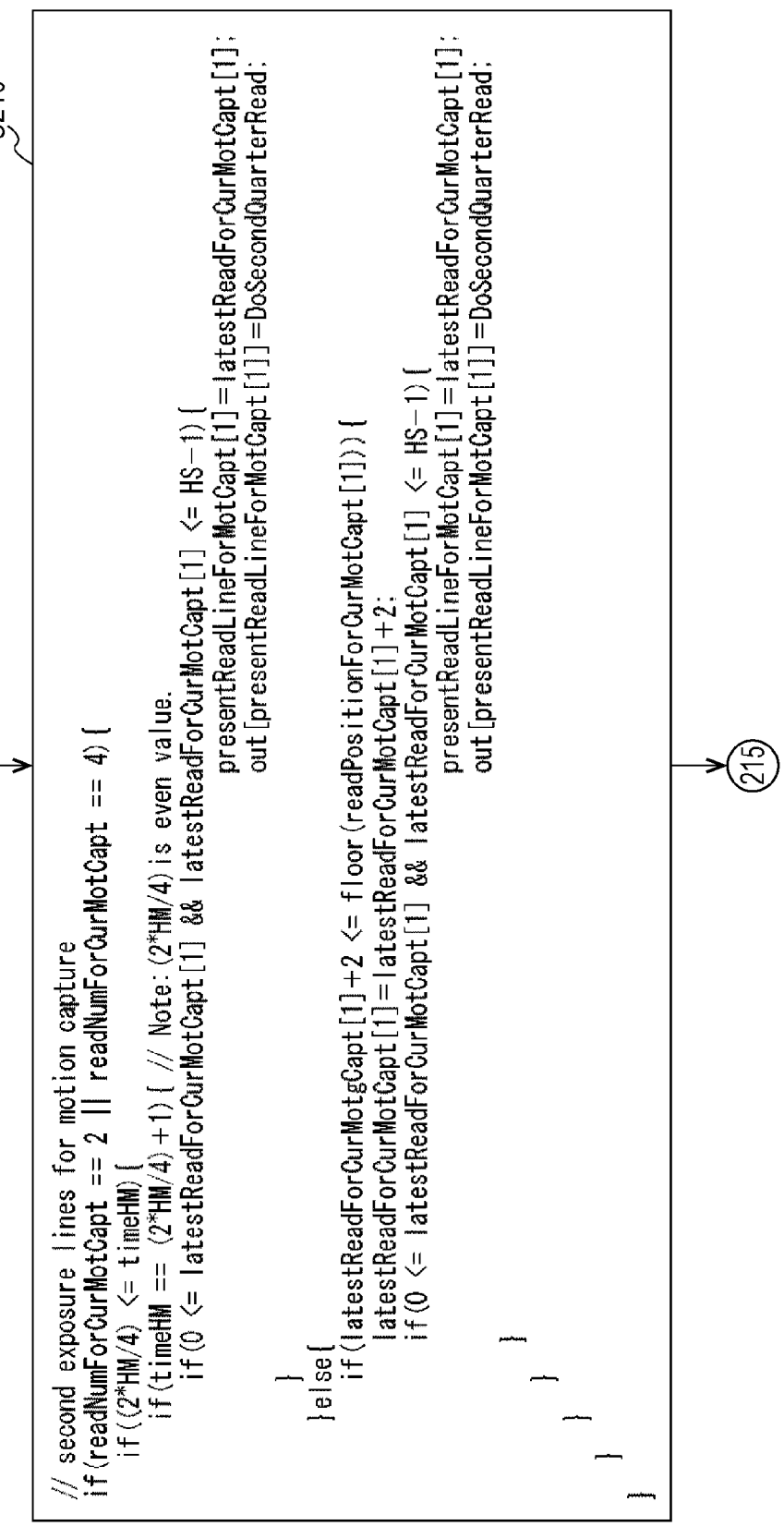
FIG. 57 is a flowchart for describing the 5th process of the timing control unit.
Figure 58:
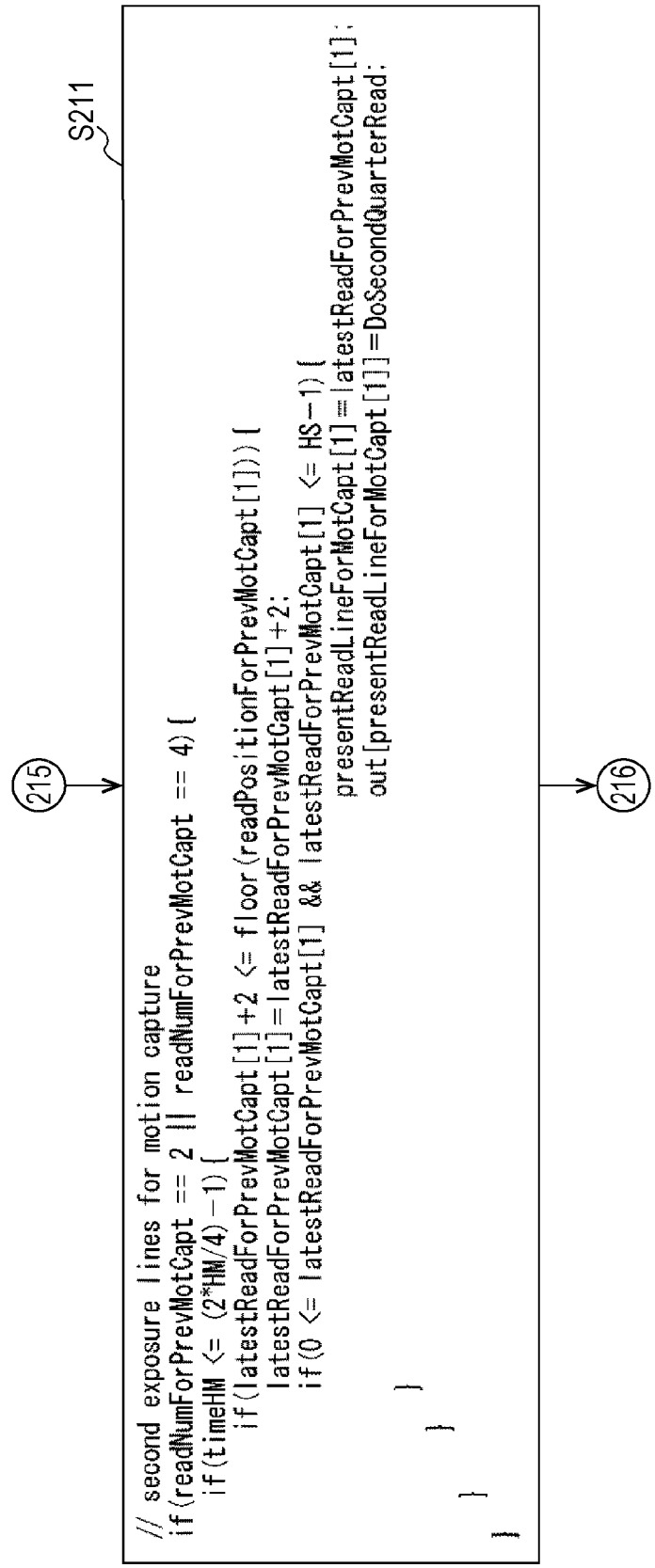
FIG. 58 is a flowchart for describing the 5th process of the timing control unit.
Figure 60:
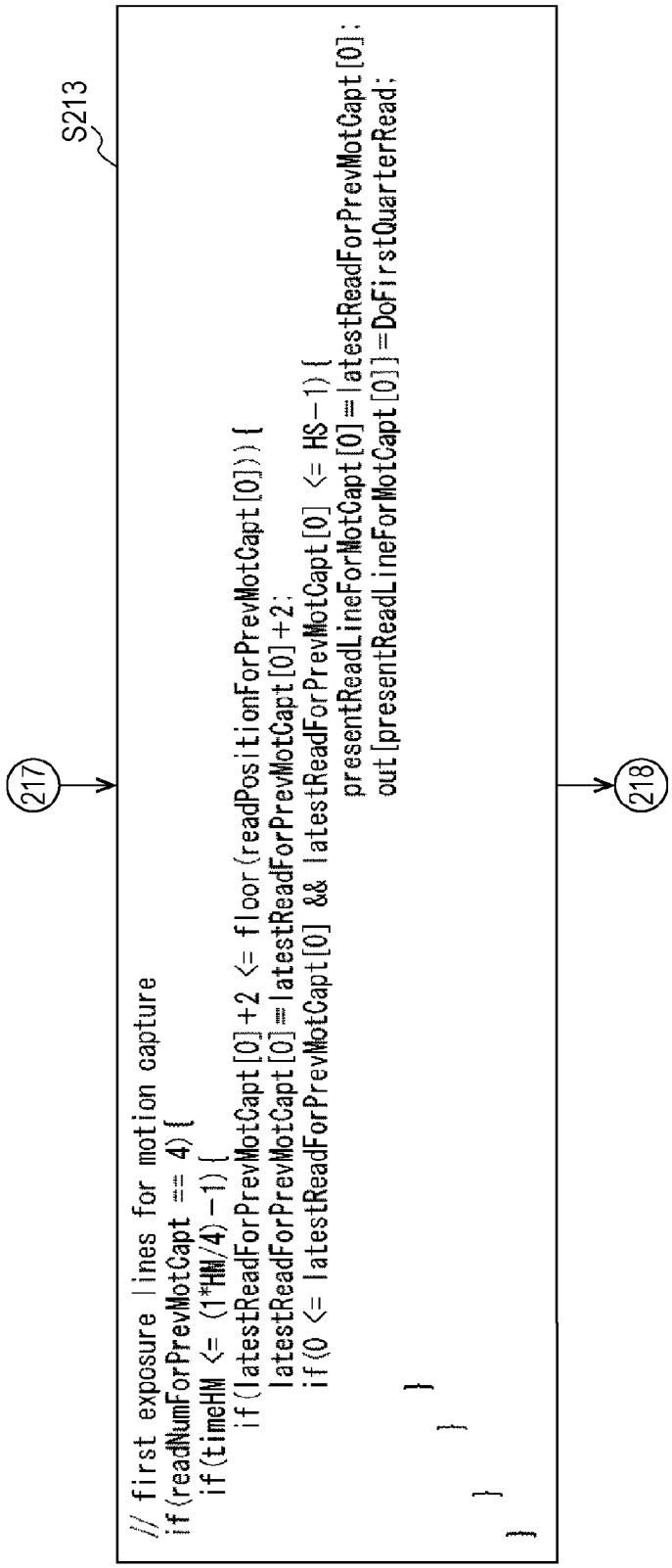
FIG. 60 is a flowchart for describing the 5th process of the timing control unit.

Conversely, when timeHM which is the line number curHM is not the even number in step S205 (FIG. 52), the process proceeds to step S207 (FIG. 54).

In step S207 (FIG. 54), when timeHM which is the line number curHM is 1 and the latest immediately previous reading odd-line position latestReadForPrevMotCapt[3] is in the range of the vertical direction of the image sensor 11, i.e., equal to or greater than 0 and equal to or less than HS−1, the sub-calculation block 261 sets presentReadLineForMotCapt[3] which is the current time reading odd-line "present read line for motion capture" to the latest current reset odd-line position latestReadForCurMotCapt[3].

Further, the sub-calculation block 261 sets the pixels out[latestReadforPrevMotCapt[3]] corresponding to presentReadLineForMotCapt[3] which is the current time reading odd-line "present read line for motion capture" to DofourthQuaterRead, i.e., gives an instruction of the 4th reading of the odd line.

Conversely, when timeHM which is the line number curHM is not 1 and a value obtained by adding 2 to the latest immediately previous reading odd-line position latestReadForPrevMotCapt[3] is equal to or less than a value obtained by truncating a value after a decimal point of readPositionForPrevMotCapt[3] which is the immediately previous reading odd-line position "reset position for previous motion capture[3]" by the floor function, the sub-calculation block 261 increases the latest immediately previous reading odd-line position latestReadForPrevMotCapt[3] by 2.

The sub-calculation block 261 sets presentReadLineForMotCapt[3] which is the current time reading odd-line "present read line for motion capture" to the latest current reset odd-line position latestReadForPrevMotCapt[3].

Further, when the latest immediately previous reading odd-line position latestReadForPrevMotCapt[3] is in the range of the vertical direction of the image sensor 11, the sub-calculation block 261 sets the pixels out[presentReadLineForMotCapt[3]] corresponding to presentReadLineForMotCapt[3] which is the current time reading odd-line "present read line for motion capture" to DofourthQuaterRead, i.e., gives the 4th reading of the odd line.

In step S208 (FIG. 55), when readNumForCurMotCapt which is the current odd frame reading number-of-times "num of read for cur motion capt" is 4, timeHM which is the line number curHM is equal to or greater than 3*HM/4 and is 3*HM/4+1, and the latest current reading odd-line position latestReadForCurMotCapt[2] is in the range of the vertical direction of the image sensor 11, i.e., equal to or greater than 0 and equal to or less than HS−1, the sub-calculation block 261 sets the pixels out[presentReadLineForMotCapt[2]] corresponding to presentReadLineForMotCapt[2] which is the current time reading odd-line "present read line for motion capture[2]" to DoThirdQuaterRead, i.e., gives an instruction of the 3rd reading of the odd line.

Conversely, when timeHM which is the line number curHM is not 3HM/4+1 and a value obtained by adding 2 to the latest current reading odd-line position latestReadForCurMotCapt[2] is equal to or less than a value obtained by truncating a value after a decimal point of readPositionForCurMotCapt[2] which is the current reading odd-line position "read position for current motion capture[2]" by the floor function, the sub-calculation block 261 increases the latest current reading odd-line position latestReadForCurMotCapt[2] by 2.

When the latest current reading odd-line position latestReadForCurMotCapt[2] is in the range of the vertical direction of the image sensor 11, the sub-calculation block 261 sets presentReadLineForMotCapt[2] which is the current time reading odd-line "present read line for motion capture" to the latest immediately previous reading odd-line position latestReadForPrevMotCapt[2].

The sub-calculation block 261 sets the pixels out[presentReadLineForMotCapt[2]] corresponding to presentReadLineForMotCapt[2] which is the current time reading odd-line "present read line for motion capture" to DoThirdQuaterRead, i.e., gives an instruction of the 3rd reading of the odd line.

In step S209 (FIG. 56), when readNumForCurMotCapt which is the current odd frame reading number-of-times "num of read for cur motion capt" is 4, timeHM which is the line number curHM is equal to or less than 3*HM/4-1 and a value obtained by adding 2 to the latest immediately previous reading odd-line position latestReadForPrevMotCapt[2] is equal to or less than a value obtained by truncating a value after a decimal point of readPositionForPrevMotCapt[2] which is the immediately previous reading odd-line position "read position for current motion capture [2]" by the floor function, the sub-calculation block 261 increases the latest current reading odd-line position latestReadForCurMotCapt[2] by 2.

When the latest current reading odd-line position latestReadForCurMotCapt[2] is in the range of the vertical direction of the image sensor 11, i.e., is equal to or greater than 0 and equal to or less than HS−1, the sub-calculation block 261 sets presentReadLineForMotCapt[2] which is the current time reading odd-line "present read line for motion capture[2]" to the latest immediately previous reading odd-line position latestReadForPrevMotCapt[2].

The sub-calculation block 261 sets the pixels out[presentReadLineForMotCapt[2]] corresponding to the latest current reading odd-line position presentReadLineForMotCapt[2] to DoThirdQuaterRead, i.e., gives an instruction of the 3rd reading of the odd line.

In step S210 (FIG. 57), when readNumForCurMotCapt which is the current odd frame reading number-of-times "num of read for cur motion capt" is 2 or 4, timeHM which is the line number curHM is equal to or greater than 2*HM/4 and is 2*HM/4+1, and the latest current reading odd-line position latestReadForCurMotCapt[1] is in the range of the vertical direction of the image sensor 11, i.e., equal to or greater than 0 and equal to or less than HS−1, the sub-calculation block 261 sets the current time reading odd-line "present read line for motion capture" to the latest current reading odd-line position latestReadForCurMotCapt[1].

The sub-calculation block 261 sets the pixels out[presentReadLineForMotCapt[1]] corresponding to presentRead- LineForMotCapt[1] which is the current time reading odd-line "present read line for motion capture" to DoSecondQuaterRead, i.e., gives an instruction of the 2nd reading of the odd line.

Conversely, when timeHM which is the line number curHM is not 2HM/4+1 and a value obtained by adding 2 to the latest current reading odd-line position latestReadForCurMotCapt[1] is equal to or less than a value obtained by truncating a value after a decimal point of readPositionForCurMotCapt[1] which is the current reading odd-line position "read position for current motion capture[1]" by the floor function, the sub-calculation block 261 increases the latest current reading odd-line position latestReadForCurMotCapt[1] by 2.

When the latest current reading odd-line position latestReadForCurMotCapt[1] is in the range of the vertical direction of the image sensor 11, the sub-calculation block 261 sets presentReadLineForMotCapt[1] which is the current time reading odd-line "present read line for motion capture" to the latest immediately previous reading odd-line position latestReadForPrevMotCapt[1].

The sub-calculation block 261 sets the pixels out[presentReadLineForMotCapt[1]] corresponding to presentReadLineForMotCapt[1] which is the current time reading odd-line "present read line for motion capture" to DoSecondQuaterRead, i.e., gives an instruction of the 2nd reading of the odd line.

In step S211 (FIG. 58), when readNumForCurMotCapt which is the current odd frame reading number-of-times "num of read for cur motion capt" is 2 or 4, timeHM which is the line number curHM is equal to or less than 2*HM/4-1 and a value obtained by adding 2 to the latest immediately previous reading odd-line position latestReadForPrevMotCapt[1] is equal to or less than a value obtained by truncating a value after a decimal point of readPositionForPrevMotCapt[1] which is the immediately previous reading odd-line position "read position for previous motion capture [1]" by the floor function, the sub-calculation block 261 increases the latest current reading odd-line position latestReadForCurMotCapt[1] by 2.

When the latest current reading odd-line position latestReadForCurMotCapt[1] is in the range of the vertical direction of the image sensor 11, i.e., is equal to or greater than 0 and equal to or less than HS−1, the sub-calculation block 261 sets presentReadLineForMotCapt[1] which is the current time reading odd-line "present read line for motion capture[1]" to the latest immediately previous reading odd-line position latestReadForPrevMotCapt[1].

The sub-calculation block 261 sets the pixels out[presentReadLineForMotCapt[1]] corresponding to the present current reading odd-line position presentReadLineForMotCapt[1] to DoSecondQuaterRead, i.e., gives an instruction of the 2nd reading of the odd line.

In step S212 (FIG. 59), when readNumForCurMotCapt which is the current odd frame reading number-of-times "num of read for cur motion capt" is 4, timeHM which is the line number curHM is equal to or greater than 1*HM/4 and is 1*HM/4+1, and the latest current reading odd-line position latestReadForCurMotCapt[0] is in the range of the vertical direction of the image sensor 11, i.e., equal to or greater than 0 and equal to or less than HS−1, the sub-calculation block 261 sets presentReadLineForMotCapt[0] which is the current time reading odd-line "present read line for motion capture" to the latest current reading odd-line position latestReadForCurMotCapt[0].

The sub-calculation block 261 sets the pixels out[presentReadLineForMotCapt[0]] corresponding to presentReadLineForMotCapt[0] which is the current time reading odd-line "present read line for motion capture" to DoFirstQuaterRead, i.e., gives an instruction of the 1st reading of the odd line.

Conversely, when timeHM which is the line number curHM is not 1*HM/4+1 and a value obtained by adding 2 to the latest current reading odd-line position latestReadForCurMotCapt[0] is equal to or less than a value obtained by truncating a value after a decimal point of readPositionForCurMotCapt[0] which is the current reading odd-line position "read position for current motion capture[0]" by the floor function, the sub-calculation block 261 increases the latest current reading odd-line position latestReadForCurMotCapt[0] by 2.

When the latest current reading odd-line position latestReadForCurMotCapt[0] is in the range of the vertical direction of the image sensor 11, the sub-calculation block 261 sets presentReadLineForMotCapt[0] which is the current time reading odd-line "present read line for motion capture" to the latest current reading odd-line position latestReadForCurMotCapt[0].

The sub-calculation block 261 sets the pixels out[presentReadLineForMotCapt[0]] corresponding to presentReadLineForMotCapt[0] which is the current time reading odd-line "present read line for motion capture" to DoFirstQuaterRead, i.e., gives an instruction of the 1st reading of the odd line.

In step S213 (FIG. 60), when readNumForCurMotCapt which is the current odd frame reading number-of-times "num of read for cur motion capt" is 4, timeHM which is the line number curHM is equal to or less than 1*HM/4-1 and a value obtained by adding 2 to the latest immediately previous reading odd-line position latestReadForPrevMotCapt[0] is equal to or less than a value obtained by truncating a value after a decimal point of readPositionForPrevMotCapt[0] which is the immediately previous reading odd-line position "read position for current motion capture [0]" by the floor function, the sub-calculation block 261 increases the latest current reading odd-line position latestReadForCurMotCapt[0] by 2.

When the latest current reading odd-line position latestReadForCurMotCapt[0] is in the range of the vertical direction of the image sensor 11, i.e., is equal to or greater than 0 and equal to or less than HS−1, the sub-calculation block 261 sets presentReadLineForMotCapt[0] which is the current time reading odd-line "present read line for motion capture[0]" to the latest immediately previous reading odd-line position latestReadForPrevMotCapt[0].

The sub-calculation block 261 sets the pixels out[presentReadLineForMotCapt[0]] corresponding to the present current reading odd-line position presentReadLineForMotCapt[0] to DoFirstQuaterRead, i.e., gives the 1st reading of the odd line.

Figure 61:
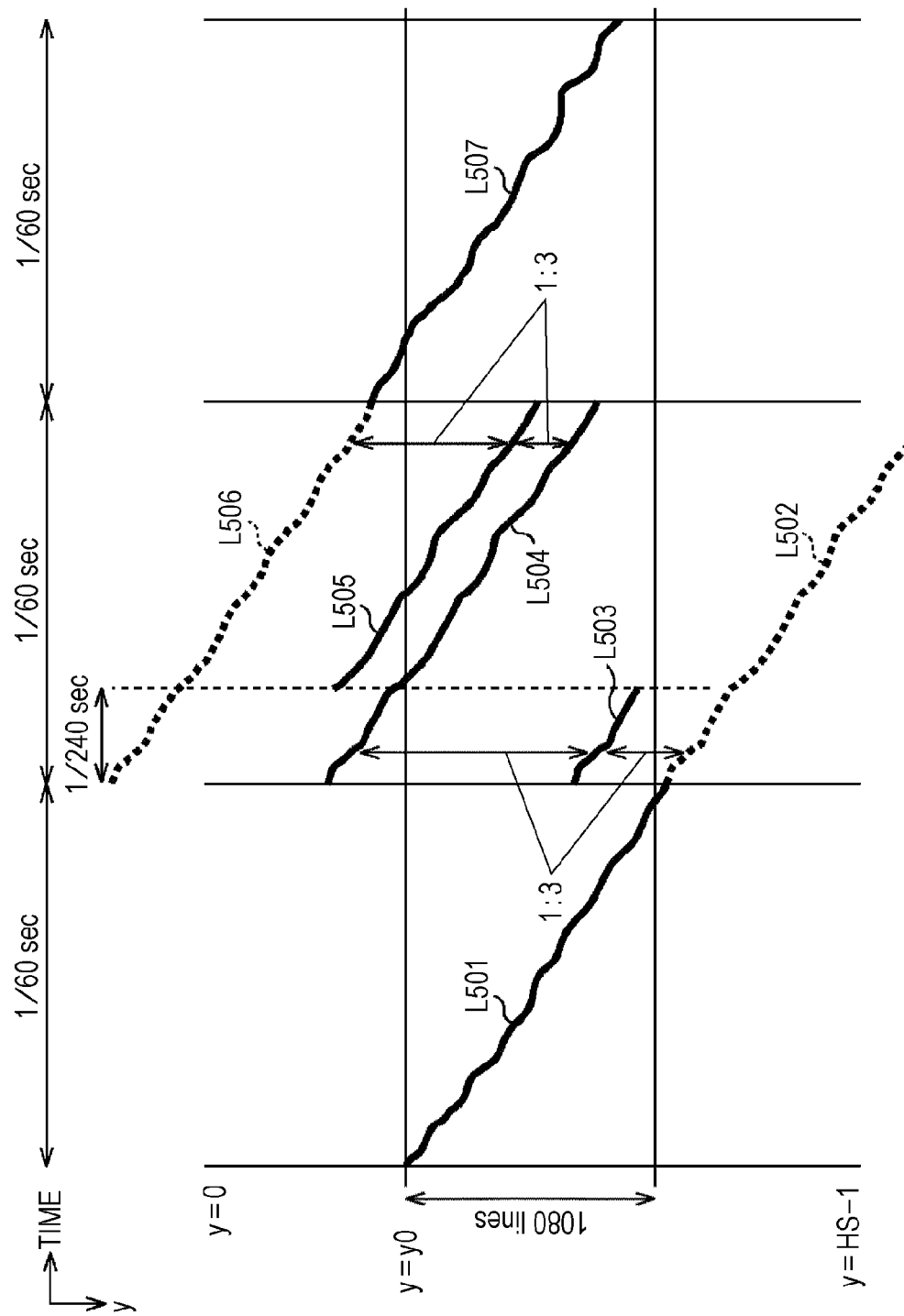
FIG. 61 is a diagram for describing the 5th process of the timing control unit.

That is, in the case of the quadruple reading process of performing the resetting and the reading on the odd line 4 times at time intervals quartered from an interval between the immediately previous reading time and the current reading time of the even line, as shown in FIG. 61, a solid line L503 in the downward direction (the positive direction of the y axis) in the drawing from a solid line L504 indicating the reading time of the even line of the current frame is read for first $1/240$ seconds (that is, first $1/4$ of $1/60$ seconds) in regard to the pixels of the odd line in which the 1st reading is performed among the 4-time readings.

A solid line L505 in the upward direction (the negative direction of the y axis) from the solid line L504 indicating the reading time of the even line of the current frame is read for the remaining 3/240 seconds.

The solid lines L501, L504, and L507 in FIG. 61 are the same as the solid lines L341 to L343 in FIG. 25. Further, dotted lines L502 and L506 in FIG. 61 are the same as the dotted lines L351 and L371 in FIG. 25. The solid line L503 is disposed at a position prorated at 1:3 between the solid line L504 and the dotted line L502. The solid line L505 is disposed at a position prorated at 1:3 between the solid line L504 and the dotted line L506.

Figure 62:
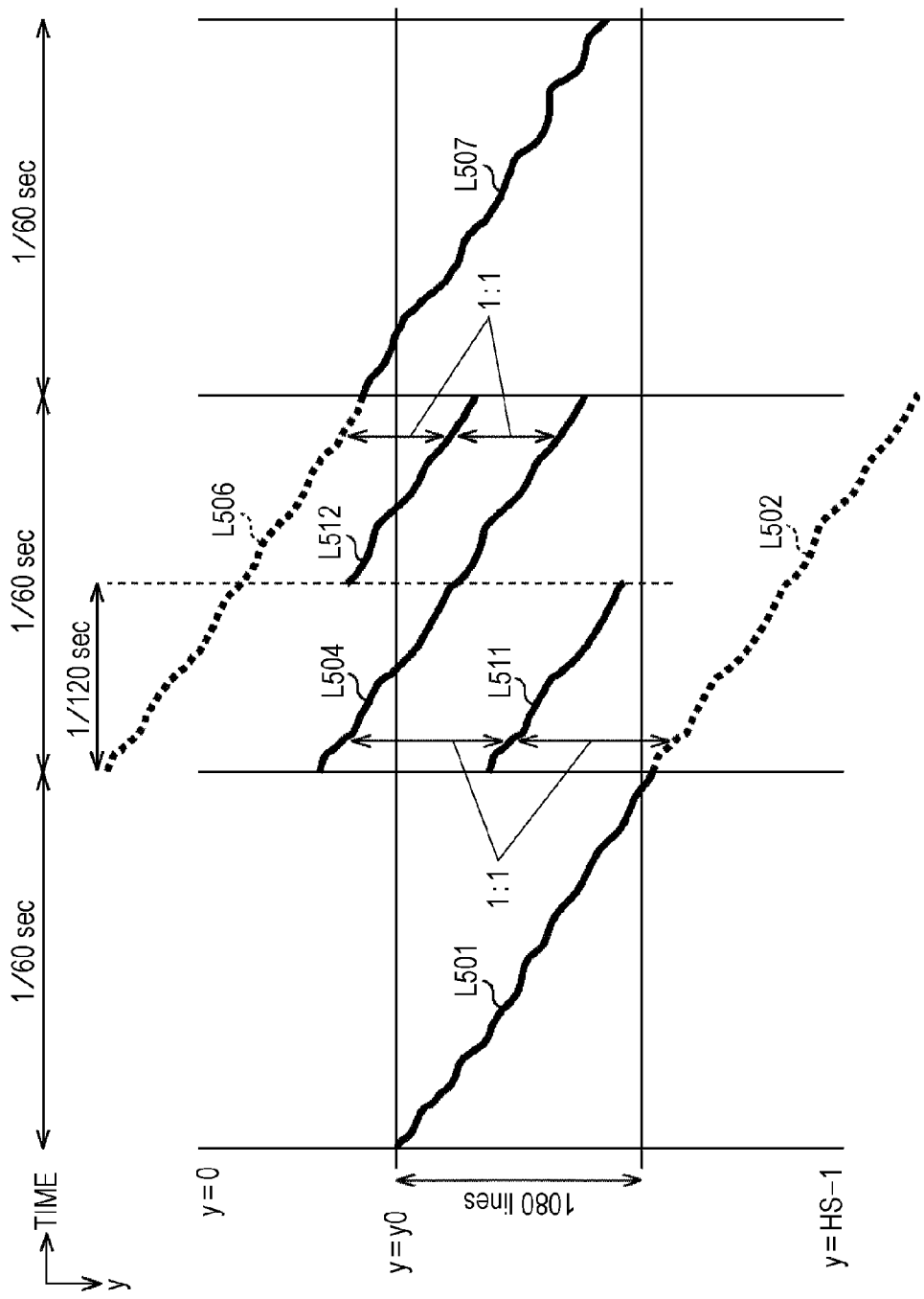
FIG. 62 is a diagram for describing the 5th process of the timing control unit.

In regard to the pixels of the odd line in which the 2nd reading is performed on the odd line, as shown in FIG. 62, in the case of the quadruple reading process of the even line or the pixels of the odd line in which the 1st-half reading is performed on the odd line in the case of the double reading process, a solid line L511 in the downward direction (the positive direction of the y axis) from a solid line L504 indicating the reading time of the even line of the current frame is read for first 1/120 seconds (that is, first 1/2 of 1/60 seconds).

A solid line L512 in the upward direction (the negative direction of the y axis) from the solid line L504 indicating the reading time of the even line of the current frame is read for the remaining 1/120 seconds.

The solid lines L501, L504, and L507 and dotted lines L502 and L506 in FIG. 62 are the same as the solid lines L341 to L343 and the dotted lines L351 and L371 in FIG. 25. The solid line L511 is disposed at a position prorated at 1:1 between the solid line L504 and the dotted line L502. The solid line L512 is disposed at a position prorated at 1:3 between the solid line L504 and the dotted line L506.

Figure 63:
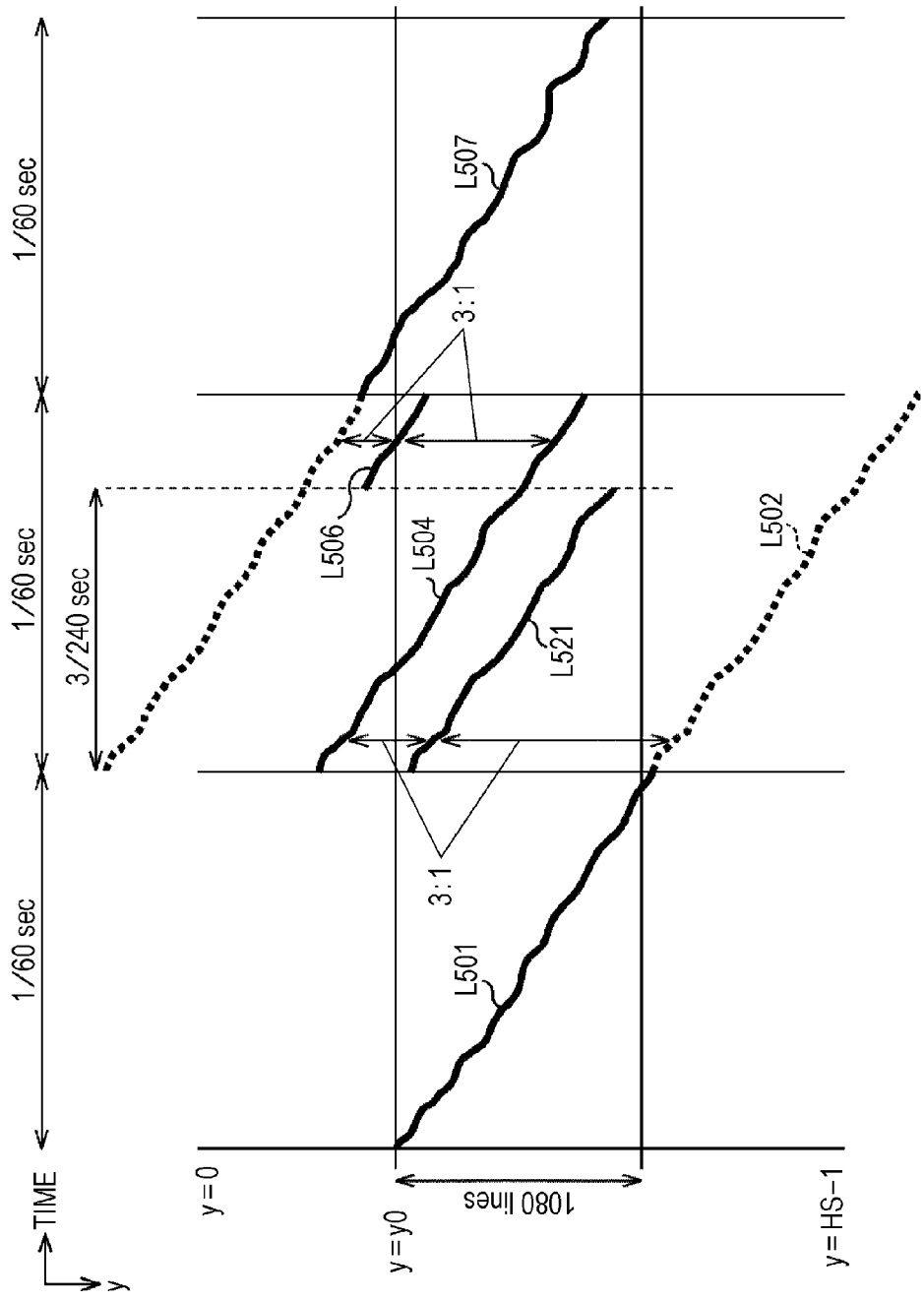
FIG. 63 is a diagram for describing the 5th process of the timing control unit.

In regard to the pixels of the odd line in which the 3rd reading of the quadruple reading process of the even line is performed on the odd line, as shown in FIG. 63, a line on a curve indicated by a solid line 521 in the downward direction (the positive direction of the y axis) from "a curve of the reading time of the even line of the current frame" is read for first 3/240 seconds (that is, first 3/4 of 1/60 seconds). A line on a solid line L522 in the upward direction (the negative direction of the y axis) from the L504 indicating the reading time of the even line of the current frame is read for the remaining 1/240 seconds.

The solid lines L501, L504, and L507 and dotted lines L502 and L506 in FIG. 63 are the same as the solid lines L341 to L343 and the dotted lines L351 and L371 in FIG. 25. The solid line L503 is disposed at a position prorated at 3:1 between the solid line L504 and the dotted line L502. The solid line L505 is disposed at a position prorated at 3:1 between the solid line L504 and the dotted line L506.

6th Process of Timing Control Unit

Figure 65:
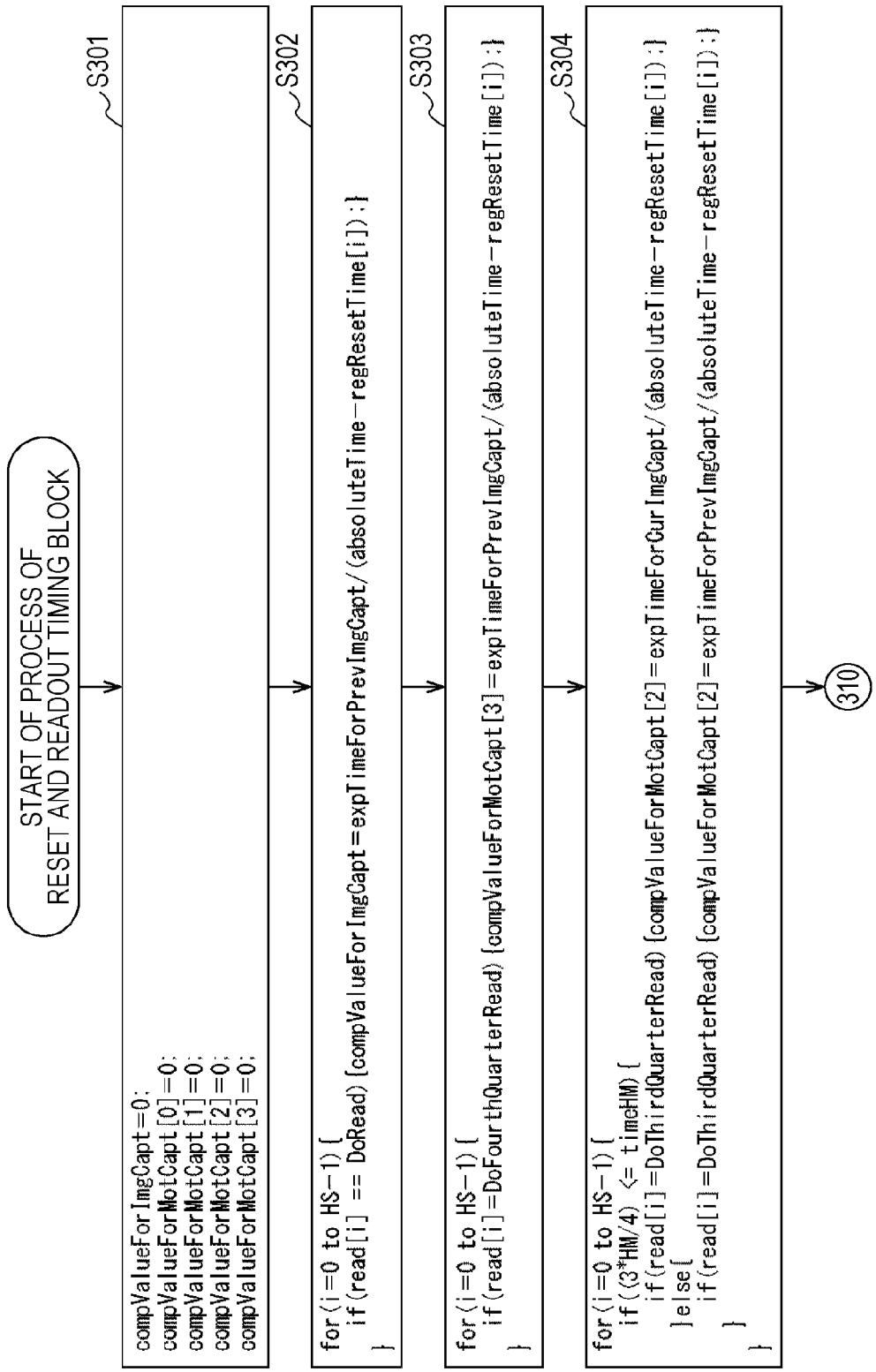
FIG. 65 is a flowchart for describing the 6th process of the timing control unit.
Figure 66:
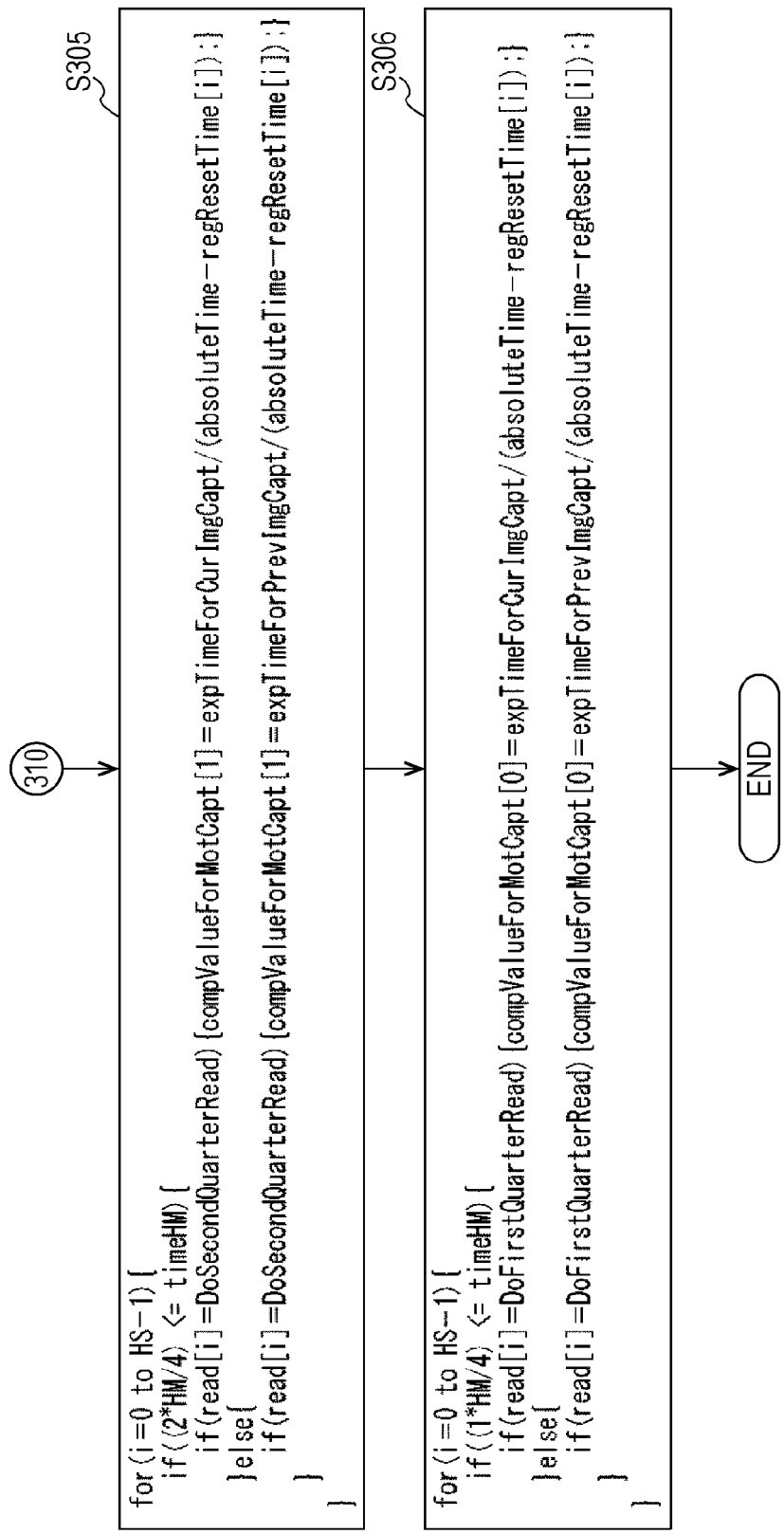
FIG. 66 is a flowchart for describing the 6th process of the timing control unit.

Next, a 6th process of the timing control unit 122 will be described with reference to FIGS. 64 to 66. In the flowcharts of FIGS. 65 to 66, some portions to be described with reference to description using a syntax are present. Since some portions are different between the names of parameters in the syntax and the names of the parameter described above, the correspondent relation will be described with reference to FIG. 64.

Figure 64:
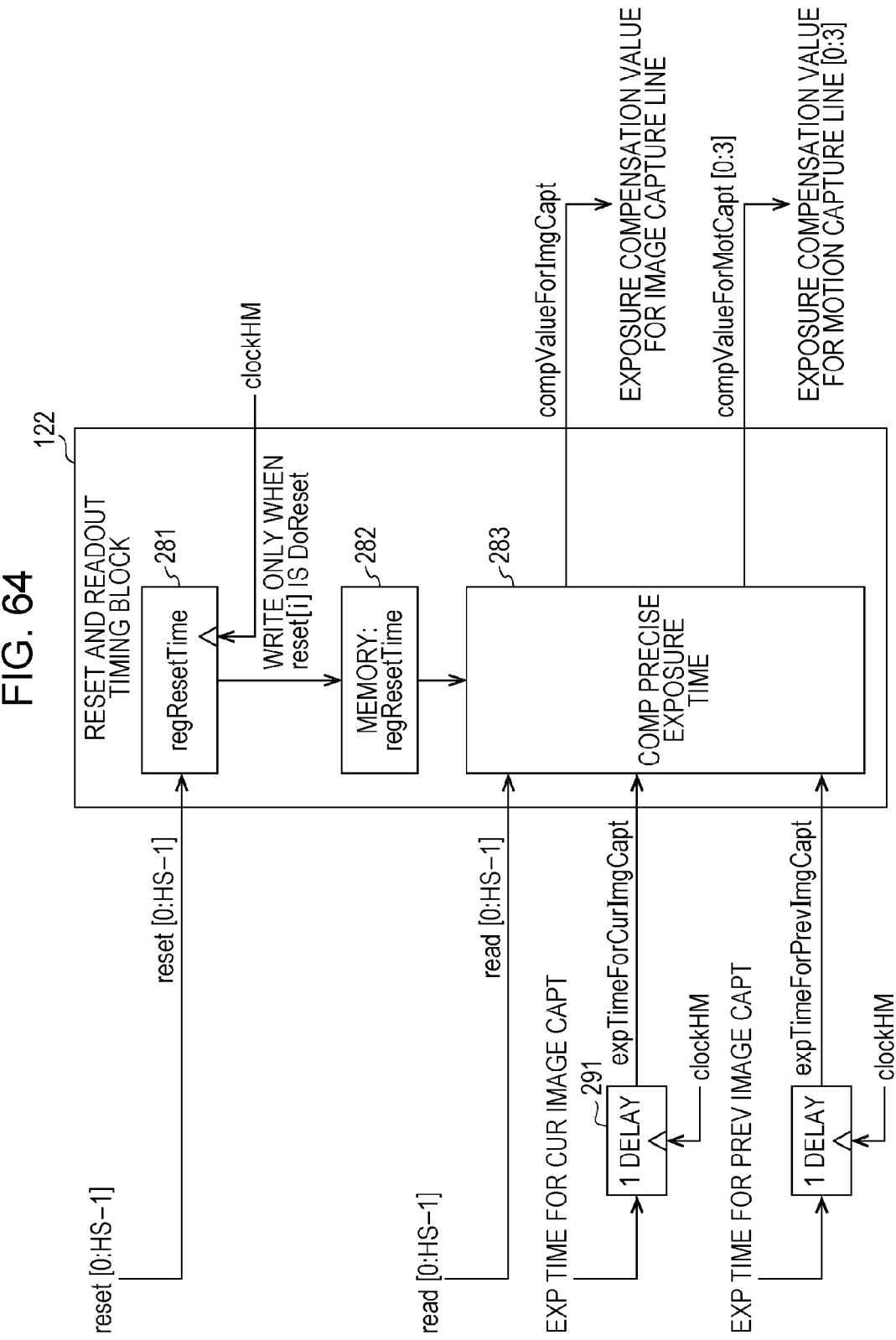
FIG. 64 is a diagram for describing a correspondent relation between input and output signals in the sub-calculation block performing a 6th process of the timing control unit and notation in a syntax used in flowcharts to be described below.

As shown in FIG. 64, the timing control unit 122 includes sub-calculation blocks 281 to 283 in order to perform the 6th process.

When the reset signal reset[0:HS−1] is a signal which is set to DoReset to give an instruction to enter a reset state, the sub-calculation block (RegResetTime) 281 writes the absolute time absoluteTime, at which the reset signal reset[0:HS−1] is supplied, as RegResetTime[i] to the sub-calculation block (Memory) 282 configured by a memory.

The sub-calculation block (Memory) 282 stores the absolute time absoluteTime, at which the reset signal reset[0:HS−1] is supplied, as RegResetTime[i] and properly supplies the absolute time absoluteTime to the sub-calculation block 283.

RegResetTime[i] as which the absolute time absoluteTime at which the reset signal reset[0:HS−1] from the sub-calculation block 282 is supplied is stored, a reading signal read[0:HS−1], a current frame even-line exposure time "exp time for cur image capt," and an immediately previous frame even-line exposure time "exp time for prev image capt" are input to the sub-calculation block (Comp Precise Exposure Time) 283. For the current frame even-line exposure time "exp time for cur image capt" and the immediately previous frame even-line exposure time "exp time for prev image capt," information in which the clock clockHM is delayed by 1 cycle is input via delay units (1 delay) 291 and 292, respectively. Based on these input signals, the sub-calculation block 282 output an even-line coefficient "exposure compensation value for image capture line" and an odd-line coefficient "exposure compensation value for motion capture line[0:3]."

Here, in the flowcharts of FIGS. 65 and 66, the current frame even-line exposure time "exp time for cur image capt" is written as expTimeForCurImgCapt and the immediately previous frame even-line exposure time "exp time for prev image capt" is written as expTimeForPrevImgCapt. The even-line coefficient "exposure compensation value for image capture line" is written as compValueForImgCapt and an odd-line coefficient "exposure compensation value for motion capture line[0:3]" is written as compValueForMotCapt[0:3].

Here, the 6th process performed by the timing control unit 122 will be described with reference to the flowcharts of FIGS. 65 and 66.

In step S301, the sub-calculation block 283 initializes compValueForImgCapt which is the even-line coefficient "exposure compensation value for image capture line" and compValueForMotCapt[0:3] which is the odd-line coefficient "exposure compensation value for motion capture line[0:3]" to 0.

In step S302, when read[i] (where i=0 to HS−1 in FIGS. 65 and 66) which is a reading signal gives a reading instruction for all of the lines, the sub-calculation block 283 calculates compValueForImgCapt which is the even-line coefficient "exposure compensation value for image capture line" by dividing expTimeForPrevImgCapt which is the immediately previous frame even-line exposure time "exp time for prev image capt" by a value obtained by reading RegResetTime[i] stored in the sub-calculation block 282 and obtaining a difference with the current absolute time absoluteTime of the present time.

In step S303, when read[i] which is a reading signal gives a 4th-reading instruction for all of the lines, the sub-calculation block 283 calculates compValueForMotCapt[3] which is the odd-line coefficient "exposure compensation value for motion capture line[3]" through the same calculation as that of step S302.

In step S304, when timeHM which is the line number curHM is equal to or greater than 3/4 of HM and the reading signal read[i] gives a 3rd-reading instruction (DoThirdQuaterRead) for all of the lines, the sub-calculation block 283 calculates compValueForMotCapt[2] which is the odd-line coefficient "exposure compensation value for motion capture line" read at the 3rd time by dividing expTimeForCurImgCapt which is the current frame even-line exposure time "exp time for cur image capt" by a value obtained by reading RegResetTime[i] stored in the sub-calculation block 282 and obtaining a difference with the current absolute time absoluteTime of the present time.

Conversely, when timeHM which is the line number curHM is not equal to or greater than ¾ of HM and the reading signal read[i] gives the 3rd-reading instruction (DoThirdQuaterRead) for all of the lines, the sub-calculation block 283 calculates compValueForMotCapt[2] which is the odd-line coefficient "exposure compensation value for motion capture line" read at the 3rd time by dividing expTimeForPrevImgCapt which is the immediately previous frame even-line exposure time "exp time for prev image capt" by a value obtained by reading RegResetTime[i] stored in the sub-calculation block 282 and obtaining a difference with the current absolute time absoluteTime of the present time.

In step S305 (FIG. 66), when timeHM which is the line number curHM is equal to or greater than ²⁄₄ of HM and the reading signal read[i] gives a 2nd-reading instruction (DoSecondQuaterRead), the sub-calculation block 283 calculates compValueForMotCapt[1] which is the odd-line coefficient "exposure compensation value for motion capture line" read at the 2nd time by dividing expTimeForCurImgCapt which is the current frame even-line exposure time "exp time for cur image capt" by a value obtained by reading RegResetTime[i] stored in the sub-calculation block 282 and obtaining a difference with the current absolute time absoluteTime of the present time.

Conversely, when timeHM which is the line number curHM is not equal to or greater than ²⁄₄ of HM and the reading signal read[i] gives the 2nd-reading instruction (DoSecondQuaterRead) for all of the lines, the sub-calculation block 283 calculates compValueForMotCapt[1] which is the odd-line coefficient "exposure compensation value for motion capture line" read at the 2nd time by dividing expTimeForPrevImgCapt which is the immediately previous frame even-line exposure time "exp time for prev image capt" by a value obtained by reading RegResetTime[i] stored in the sub-calculation block 282 and obtaining a difference with the current absolute time absoluteTime of the present time.

In step S306, when timeHM which is the line number curHM is equal to or greater than ¼ of HM and the reading signal read[i] gives a 1st-reading instruction (DoFirstQuaterRead) for all of the line, the sub-calculation block 283 calculates compValueForMotCapt[0] which is the odd-line coefficient "exposure compensation value for motion capture line" read at the 1st time by dividing expTimeForCurImgCapt which is the current frame even-line exposure time "exp time for cur image capt" by a value obtained by reading RegResetTime[i] stored in the sub-calculation block 282 and obtaining a difference with the current absolute time absoluteTime of the present time.

Conversely, when timeHM which is the line number curHM is not equal to or greater than ¼ of HM and the reading signal read[i] gives the 1st-reading instruction (DoFirstQuaterRead) for all of the lines, the sub-calculation block 283 calculates compValueForMotCapt[0] which is the odd-line coefficient "exposure compensation value for motion capture line" read at the 1st time by dividing expTimeForPrevImgCapt which is the immediately previous frame even-line exposure time "exp time for prev image capt" by a value obtained by reading RegResetTime[i] stored in the sub-calculation block 282 and obtaining a difference with the current absolute time absoluteTime of the present time.

Through the foregoing processes, the even-line coefficient "exposure compensation value for image capture line" and the odd-line coefficient "exposure compensation value for motion capture line[0:3]" are calculated.

Thus, the values of the even-line coefficient "exposure compensation value for image capture line" and the odd-line coefficient "exposure compensation value for motion capture line[0:3]" are values inversely proportional to a time which is a difference between the reset time and the reading time.

Process of Control Unit

Figure 67:
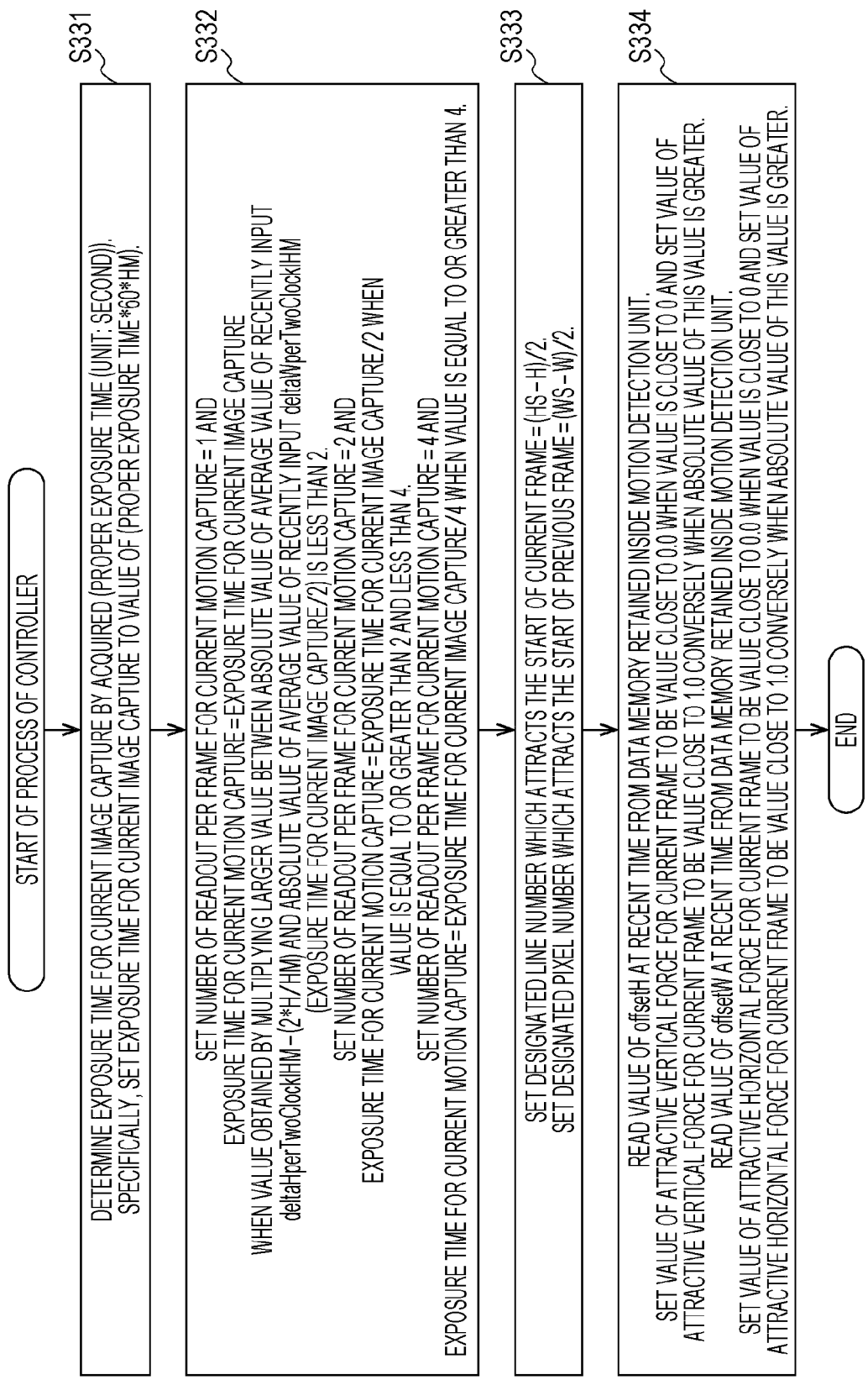
FIG. 67 is a flowchart for describing a process of the control unit.

Next, a process of the control unit 121 will be described with reference to the flowchart of FIG. 67.

In step S331, the control unit 121 acquires information regarding the proper exposure time (unit: second) from an exposure meter (not shown) and determines the current frame even-line exposure time "exposure time for current image capture." More specifically, the control unit 121 sets "proper exposure time×60×HM" as the current frame even-line exposure time "exposure time for current image capture."

In step S332, the control unit 121 determines the current odd frame reading number-of-times "number of readout per frame for current motion capture" according to a calculated value obtained by multiplying a larger value between the absolute value of an average value of a recently input vertical change amount deltaHperTwoClocklHM−(2×H/HM) and the absolute value of an average value of a recently input horizontal change amount deltaWperTwoClocklHM by (the current frame even-number line exposure time "exposure time for current image capture"/2).

More specifically, when the calculated value is less than 2, the control unit 121 sets the current odd frame reading number-of-times "number of readout per frame for current motion capture" to 1 and sets the current frame odd-line exposure time "exposure time for current motion capture" and the current frame even-line exposure time "exposure time for current image capture" to be the same.

When the calculated value is equal to or greater than 2 and less than 4, the control unit 121 sets the current odd frame reading number-of-times "number of readout per frame for current motion capture" to 2 and sets ½ of the current frame odd-line exposure time "exposure time for current motion capture" and the current frame even-line exposure time "exposure time for current image capture" to be the same.

When the calculated value is equal to or greater than 4, the control unit 121 sets the current odd frame reading number-of-times "number of readout per frame for current motion capture" to 4 and sets ¼ of the current frame odd-line exposure time "exposure time for current motion capture" and the current frame even-line exposure time "exposure time for current image capture" to be the same.

In step S333, the control unit 121 sets the current vertical reference position "designated line number which attracts the start of current frame" to (HS−H)/2. The control unit 121 sets the immediately previous horizontal reference position "designated pixel number which attracts the start of previous frame" to (WS−W)/2.

In step S334, the control unit 121 reads the value of a vertical direction offset offsetH at the recent time from the data memory retained in the motion detection unit 129. The vertical direction offset offsetH means that a reading position is closer to an end portion of the image sensor 11 as the absolute value thereof is larger. In contrast, when the absolute value is closer to 0, the absolute value indicates that a middle portion of the image sensor 11 is extracted. The details will be described below with reference to FIG. 72.

When the vertical direction offset offsetH is close to 0, the control unit 121 sets the value of the current vertical panning-blur ratio "attractive vertical force for current frame" to a value close to 0.0. In contrast, when the absolute value of the vertical direction offset offsetH is large, the control unit 121 sets the value of the current vertical panning-blur ratio "attractive vertical force for current frame" to a value close to 1.0.

The control unit 121 reads the value of a horizontal direction offset offsetW at the recent time from the data memory retained in the motion detection unit 129. The horizontal direction offset offsetW means that a reading position is closer to an end portion of the image sensor 11 as the absolute value thereof is larger. In contrast, when the absolute value is closer to 0, the absolute value indicates that a middle portion of the image sensor 11 is extracted. The details will be described below with reference to FIG. 72.

When the horizontal direction offset offsetW is close to 0, the control unit 121 sets the value of the current horizontal panning-blur ratio "attractive horizontal force for previous frame" to a value close to 0.0. In contrast, when the absolute value of the horizontal direction offset offsetW is large, the control unit 121 sets the value of the current horizontal panning-blur ratio "attractive horizontal force for previous frame" to a value close to 1.0.

That is, when the reading position of the current frame of the image sensor 11 becomes close to an end portion of the image sensor 11 through the above-described processes, there is a probability of a position read in a subsequent frame exceeding the region of the image sensor 11. Accordingly, the ratio of the panning is set to increase for the current vertical panning-blur ratio "attractive vertical force for current frame" and the current horizontal panning-blur ratio "attractive horizontal force for previous frame." When the ratio of the panning increases, the reading position can be forcibly set to a position at which 1080 lines are read from y=y0.

In contrast, when a middle portion of the image sensor 11 is read, the ratio of the camera shake is set to increase for the current vertical panning-blur ratio "attractive vertical force for current frame" and the current horizontal panning-blur ratio "attractive horizontal force for previous frame." Therefore, values (a vertical direction offset offsetH and a horizontal direction offset offsetW to be described below) is used which indicates where positions at which 1920×1080 pixels are extracted at the recent time are located among the positions in the WS×HS pixels (light-receiving elements) included in the image sensor 11.

Process of Matching Unit

Figure 68:
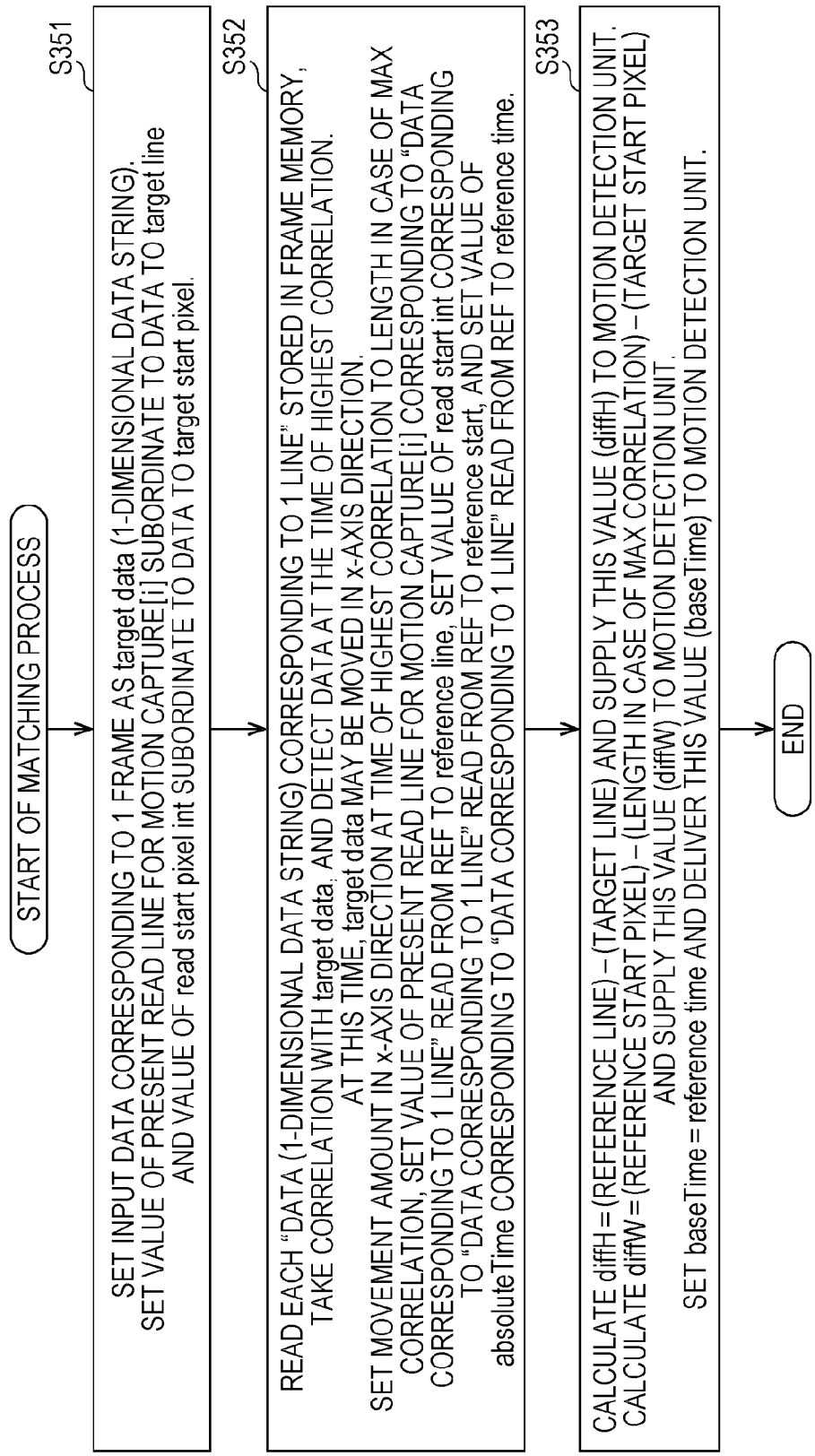
FIG. 68 is a flowchart for describing a process of a matching unit.

Next, a process of the matching unit 128 will be described with reference to the flowchart of FIG. 68.

In step S351, the matching unit 128 acquires the input 1-dimensional pixel data corresponding to 1 line as target data. At this time, the value of the current time reading even-line "present read line for image capture [i]" subordinate to the target data is set to a target line and the value of the integer horizontal direction reading start position "read start pixel int" is set to a target start pixel.

In step S352, the matching unit 128 acquires the data (1-dimensional data string) corresponding to 1 line and stored in the frame memory 127 as reference data. At this time, the decompressed data corresponding to 1 line is decompressed by the decompression unit 162 and is considered to have the same size as the target data. The matching unit 128 takes a correlation with the target data and detects the reference data at the time of the highest correlation. At this time, the target data may be moved in the horizontal direction (x-axis direction).

Here, a movement amount in the x-axis direction at the time of the highest correlation is set to a maximum correlation movement amount "length in case of max correlation." The value of the current time reading odd-line "present read line for motion capture[0:3]" corresponding to "data corresponding to 1 line" read from the reference data is set to a highest correlation line "reference line." The value of the integer horizontal direction reading start position "read start pixel int" corresponding to the data corresponding to 1 line and read from the reference data is set to a reference start pixel position "reference start pixel." The value of a time absoluteTime corresponding to the data corresponding to 1 line and read from the reference data is set to a reference time.

In step S353, the matching unit 128 calculates a difference between the highest correlation line "reference line" and the target line as a vertical direction difference diffH and supplies the vertical direction difference diffH to the motion detection unit 129. The matching unit 128 supplies a value obtained by subtracting the highest correlation movement amount "length in case of max correlation" and the reference start pixel position "reference start pixel" together from the reference start pixel as a horizontal direction difference diffW and supplies the horizontal direction difference diffW to the motion detection unit 129. The matching unit 128 supplies the reference time as a reference time baseTime to the motion detection unit 129.

Figure 69:
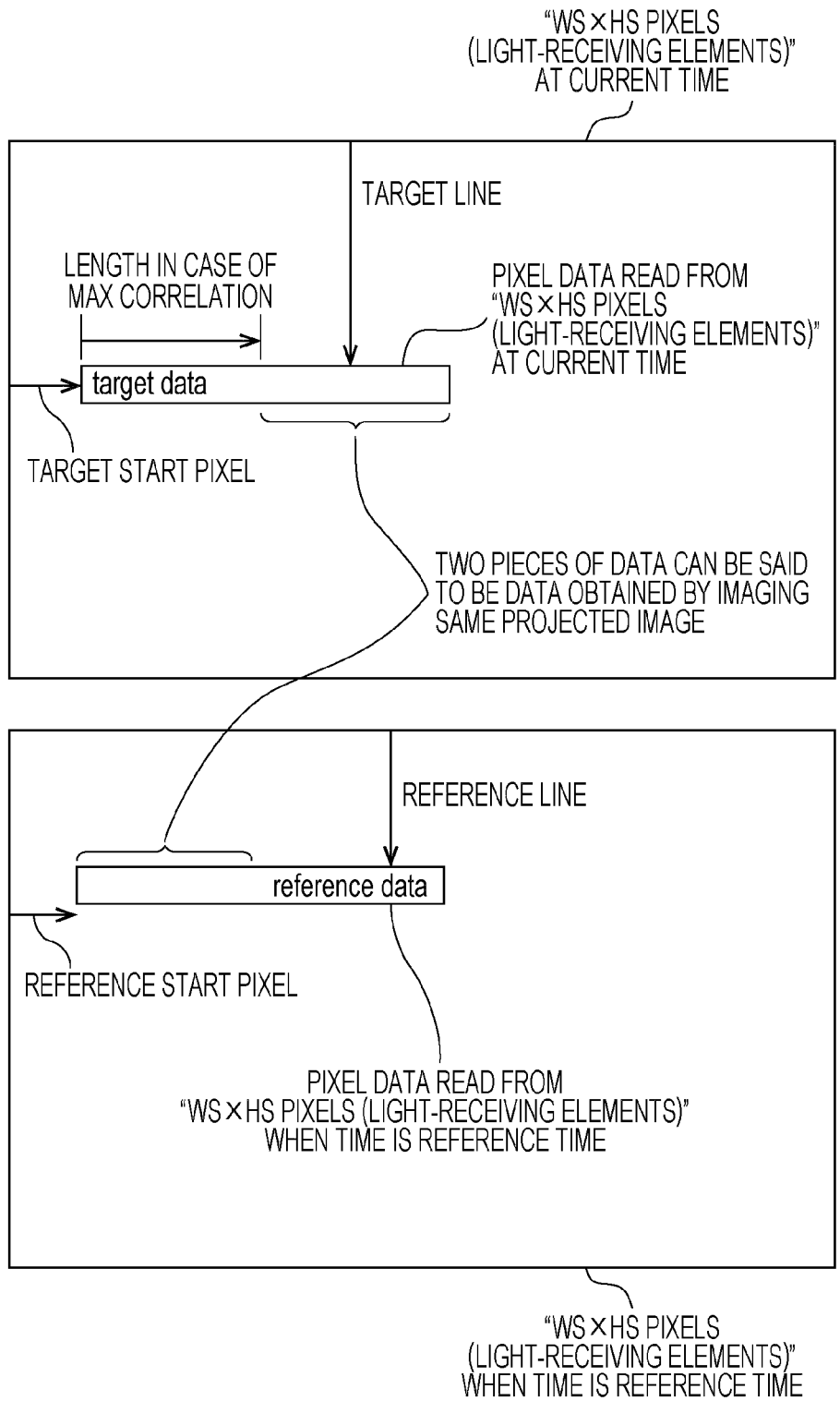
FIG. 69 is a diagram for describing the process of the matching unit.

Through the foregoing processes, a positional relation of portions in which the pixel values are arranged on one line of the WS×HS pixels (light-receiving elements) between the current time and the reference time is obtained as shown in FIG. 69. That is, 1-dimensional data (projected image) in the horizontal direction in which the y coordinate is the target line and the x coordinate starts from (reference start pixel+ the highest correlation movement amount "length in case of max correlation") at the current time and 1-dimensional data (projected image) in the horizontal direction in which the y coordinate is the highest correlation line "reference line" and the x coordinate starts from the reference start pixel at the reference time are considered to be the same projected image.

Accordingly, through the foregoing processes, the vertical direction difference diffH, the horizontal direction difference diffW, and the reference time baseTime are supplied as information indicating a difference in the positional relation between the projected images to the motion detection unit 129.

In regard to the data (1-dimensional data string) corresponding to 1 line and input to each matching unit 128, all of the data input to the In [0:3] terminal of the frame memory 127 are subjected to the process.

Since the process is performed only when the odd line is read, the process is performed once at 2 cycles of the clock clockHM.

In the above description, the matching process using the line (1-dimensional data string) has been described as a specific example, but other matching such as matching of a feature point base or block matching may be used. By using a gyro sensor and using data detected by the gyro sensor, the vertical direction difference diffH, the horizontal direction difference diffW, and the reference time baseTime may be obtained.

The frame memory 127 does not store the pixel data forming an image captured by the image sensor 11 without change, but stores an image compressed by the compression unit 161. The compressed image may be an image used for the matching unit 128 to detect a motion, as described above. Since the compressed image may not be a high-quality image, the frame memory may have a small capacity. Accordingly, since the frame memory 127 is generally a memory having a capacity sufficiently smaller than a memory that temporarily stores an image captured by the image sensor 11 without change, a burden on cost does not increase.

Process of Motion Detection Unit

Figure 70:
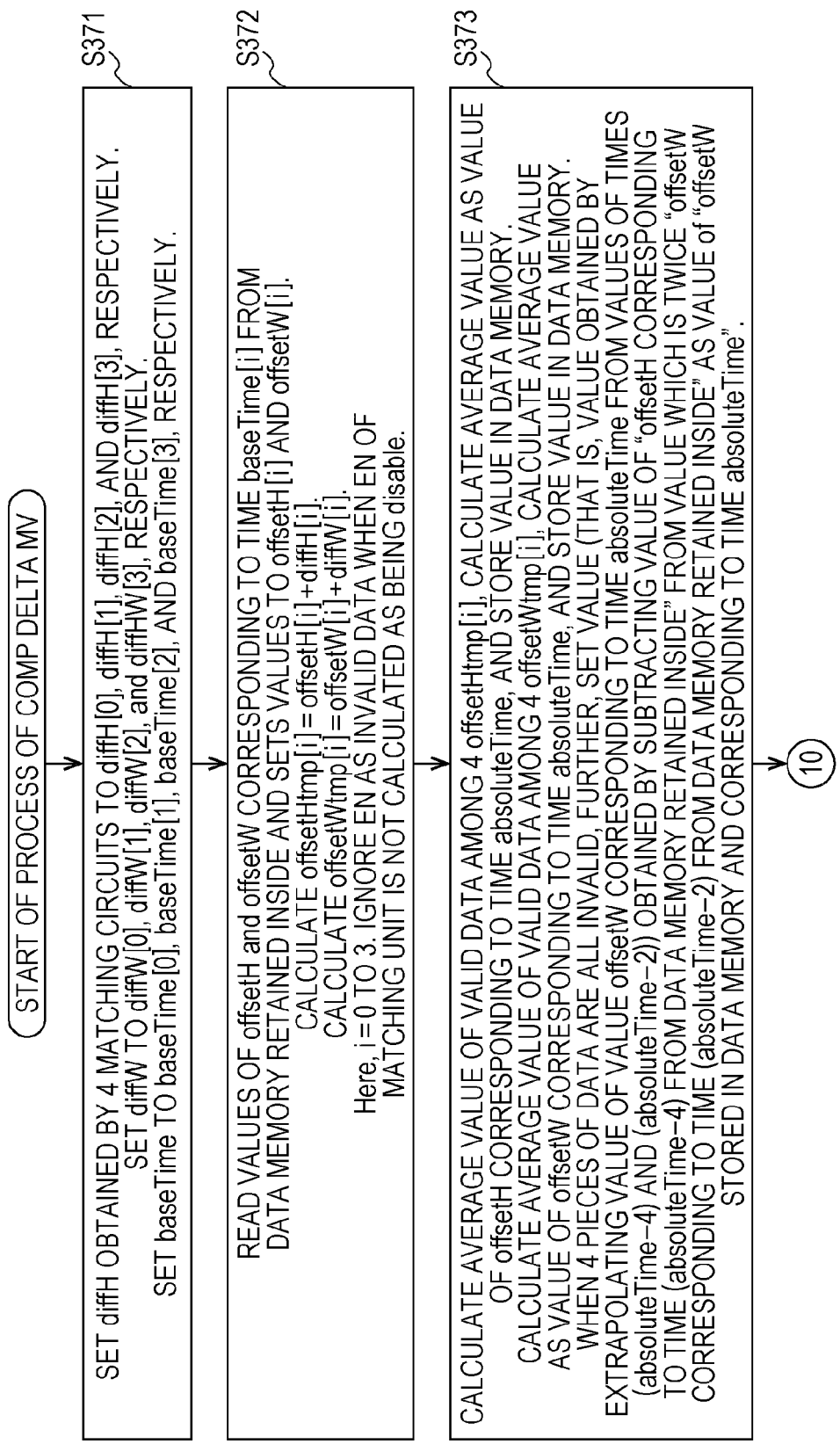
FIG. 70 is a flowchart for describing a process of the motion detection unit.
Figure 71:
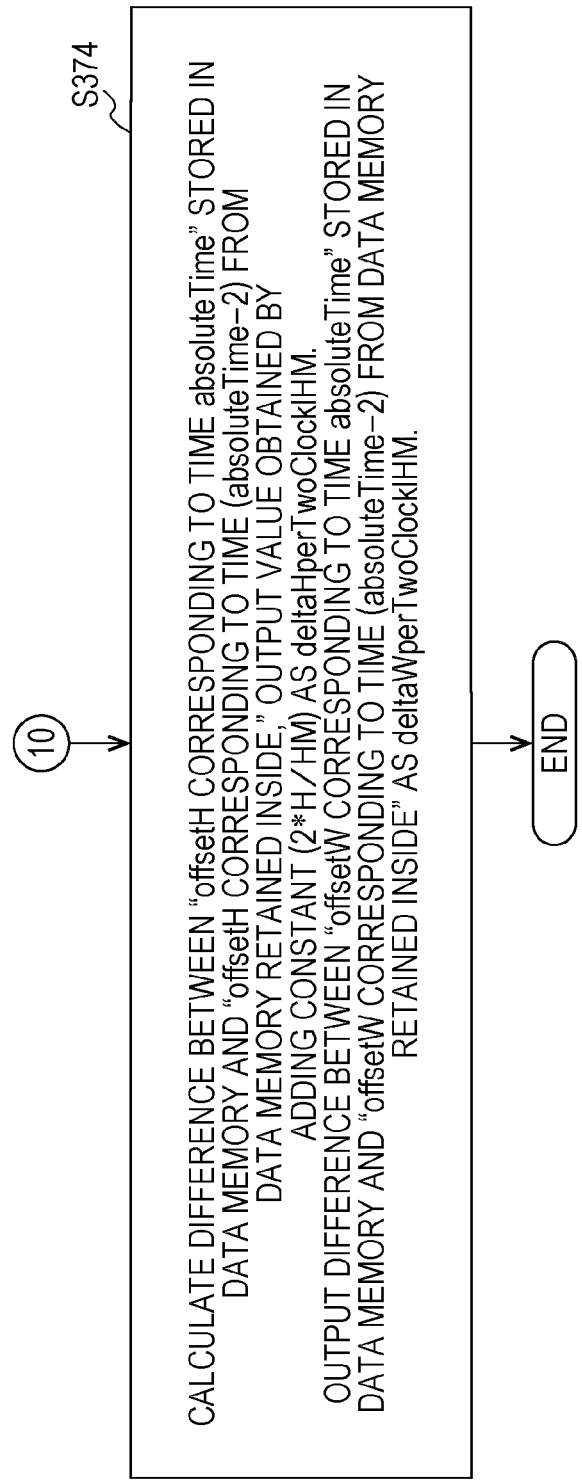
FIG. 71 is a flowchart for describing the process of the motion detection unit.

Next, a process of the motion detection unit 129 will be described with reference to FIGS. 70 to 72.

In step S371, the motion detection unit 129 sets vertical direction differences diffH supplied from the matching units 128-1 to 128-4 to vertical direction differences diffH[0], diffH[1], diffH[2], and diffH[3], respectively. Likewise, the motion detection unit 129 sets horizontal direction differences diffW supplied from the matching units 128-1 to 128-4 to horizontal direction differences diffW[0], diffW[1], diffW[2], and diffW[3], respectively. Further, the motion detection unit 129 sets the reference times baseTime supplied from the matching units 128-1 to 128-4 to reference times baseTime[0], baseTime[1], baseTime[2], and baseTime[3], respectively. Notation inside each H is written as [i] and "i=0 to 3" is satisfied.

In step S372, the motion detection unit 129 reads the values of the vertical direction offset offsetH and the horizontal direction offset offsetW corresponding to the reference time baseTime[i] from the data memory (not shown) retained inside and sets the values to a vertical direction offset offsetH[i] and a horizontal direction offset offsetW[i].

The motion detection unit 129 calculates a vertical change amount offsetHtmp[i] as a sum of the vertical direction offset offsetH[i] and the vertical direction difference diffH[i]. Likewise, the motion detection unit 129 calculates a horizontal change amount offsetWtmp[i] as a sum of the horizontal direction offset offsetW[i] and the horizontal direction difference diffW[i]. When the enable EN is not calculated as being disable, the motion detection unit 129 ignores the data as invalid data.

In step S373, the motion detection unit 129 calculates an average value of the valid data among the 4 vertical change amounts offsetHtmp[i] and stores the average value as the value of the vertical direction offset offsetH corresponding to the time absoluteTime in the inside data memory. Further, the motion detection unit 129 calculates an average value of the valid data among the 4 horizontal change amounts offsetWtmp[i] and stores the average value as the value of the horizontal direction offset offsetW corresponding to the time absoluteTime in the inside data memory (not shown).

When the 4 pieces of data are all invalid, the motion detection unit 129 sets a value obtained by subtracting the value of the vertical direction offset offsetH corresponding to the time (absoluteTime−4) from a value which is twice the vertical direction offset offsetH corresponding to a time (absoluteTime−2) from the data memory (that is, a value obtained by extrapolating the value of the vertical direction offset offsetH corresponding to the time absoluteTime from the values of the times (absoluteTime−4) and (absoluteTime−2)), as the value of the vertical direction offset offsetH corresponding to the time absoluteTime and stored in the inside data memory.

Likewise, the motion detection unit 129 sets a value obtained by subtracting the value of the horizontal direction offset offsetW corresponding to the time (absoluteTime−4) from the data memory from a value which is twice the horizontal direction offset offsetW corresponding to a time (absoluteTime−2) from the data memory (that is, a value obtained by extrapolating the value of the horizontal direction offset offsetW corresponding to the absolute time absoluteTime from the values of the times (absoluteTime−4) and (absoluteTime−2)), as the value of the horizontal direction offset offsetW corresponding to the time absoluteTime and stored in the inside data memory.

In step S374 (FIG. 71), the motion detection unit 129 calculates a difference between the vertical direction offset offsetH corresponding to the time absoluteTime stored in the data memory in the process of step S373 and the vertical direction offset offsetH corresponding to the time (absoluteTime−2) retained in the inside data memory, and then outputs a value obtained by adding a constant (2*H/HM) as a vertical movement amount deltaHperTwoClocklHM.

Further, the motion detection unit 129 outputs a difference between the horizontal direction offset offsetW corresponding to the time absoluteTime stored in the data memory in the process of step S373 and the horizontal direction offset offsetW corresponding to the time (absoluteTime−2) retained in the inside data memory, as a horizontal direction movement amount deltaWperTwoClocklHM.

The above-described variables will be described with reference to FIG. 72. In FIG. 72, the upper left position in the all of the pixels on the image sensor 11 (WS×HS pixels (light-receiving elements)) corresponding to the 1st 1 frame is set as the origin. In the 1st 1 frame, a middle portion of the image sensor 11 is read.

Accordingly, the fact that the absolute value of the vertical direction offset offsetH at each time is large means that 1920×1080 pixels are extracted from a portion close to the upper side or the lower side of the image sensor at that time. Further, the fact that the absolute value of the horizontal direction offset offsetW at each time is large means that 1920×1080 pixels are extracted from a portion close to the left side or the right side of the image sensor at that time.

Figure 72:
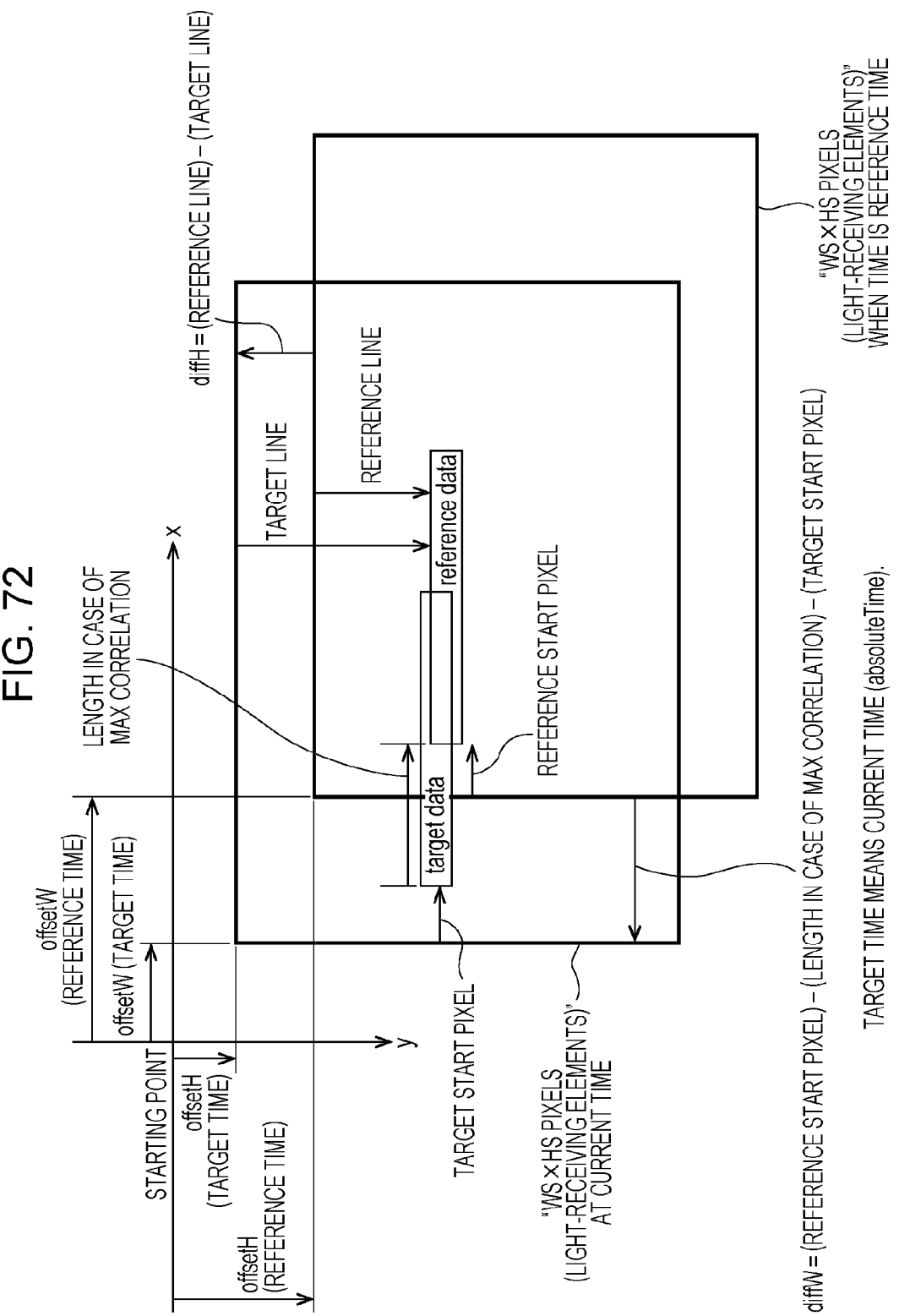
FIG. 72 is a diagram for describing a process of the motion detection unit.

As shown in FIG. 72, the vertical direction offset offsetH and the horizontal direction offset offsetW at the current time absoluteTime are obtained from the vertical direction offset offsetH and the horizontal direction offset offsetW at the previous time baseTime (that is, the reference time) and from the vertical direction difference diffH and the horizontal direction difference diffW.

In this way, the vertical direction movement amount deltaHperTwoClocklHM and the horizontal direction movement amount deltaWperTwoClocklHM are obtained.

Process of Interpolation Unit

Next, a process of the interpolation unit 132 will be described with reference to FIGS. 73 to 76.

In step S391, the interpolation unit 132 increases a time timeH corresponding to the clock clockH by 1. Here, when H=0, "timeH=0" is set only at the initial time. Accordingly, line numbers (0 to 1079) to be output are confirmed at a time synchronized with the current clock clockH.

Figure 75:
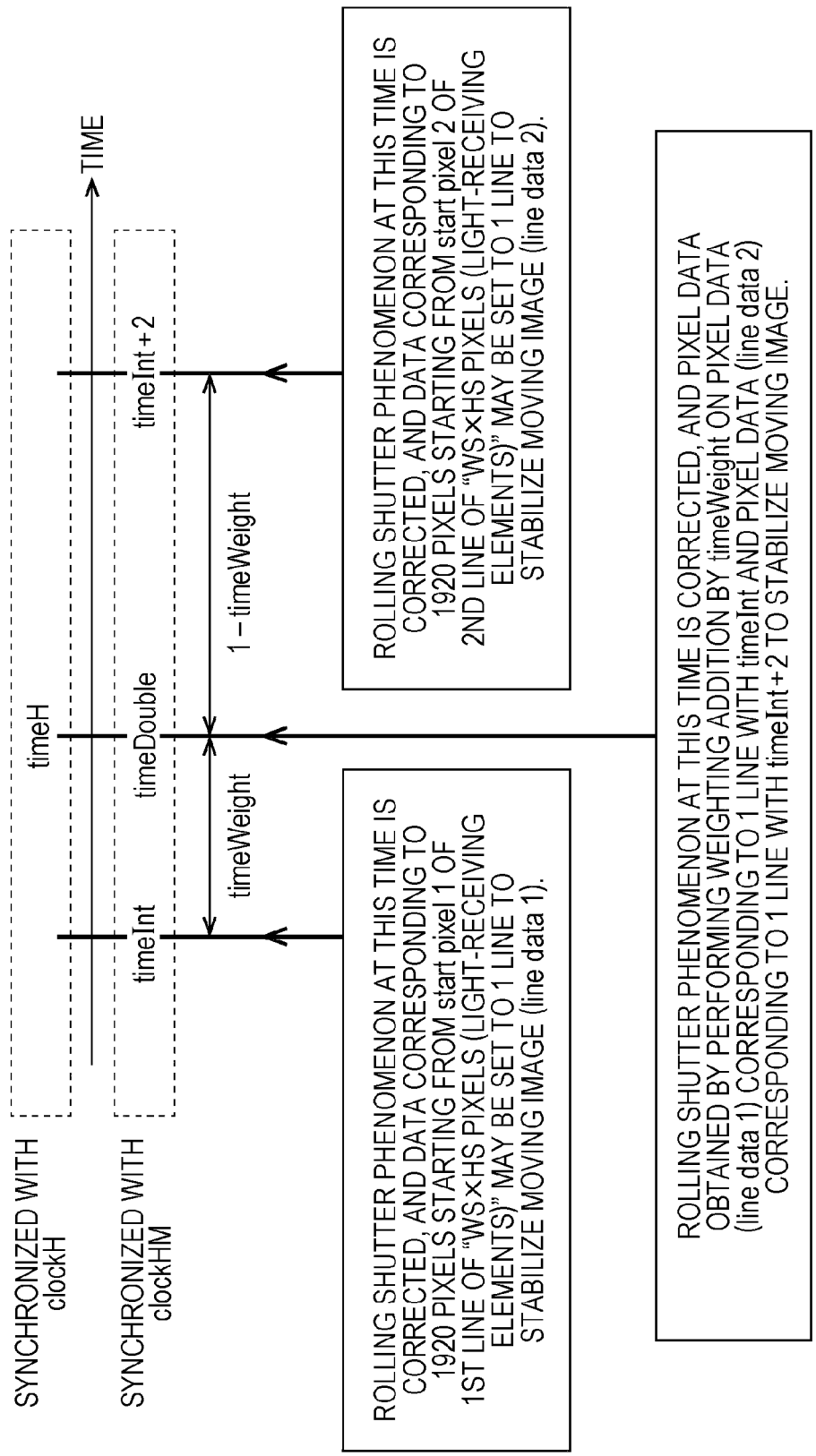
FIG. 75 is a diagram for describing a process of the interpolation unit.

In step S392, as shown in FIG. 75, the interpolation unit 132 calculates a synchronization current time timeDouble which is a current time at which the clock clockH and the clock clockHM are synchronized by timeH*HM/H. Further, as shown in FIG. 75, the interpolation unit 132 calculates a synchronization time timeInt of the clock clockHM like floor(timeDouble/2.0)*2.0. As shown in FIG. 75, the interpolation unit 132 calculates a time weight timeWeight like (timeDouble−timeInt)/2.0.

In step S393, the interpolation unit 132 reads a data set stored in the data set memory 131 and indicating which pixel of which line is good to read at a given time (timeHM described above) in synchronization with the clock clockHM and obtains information indicating which pixel of which line is good to read at each time synchronized with the clock clockH.

That is, the interpolation unit 132 reads a data set of "time time HM=timeInt" synchronized with the clock clockHM and specifying the pixels to be read, from the data set memory 131. The interpolation unit 132 defines start pixel 1 as a horizontal direction reading start position "read start pixel" of the read data set. The interpolation unit 132 defines line 1 as the current frame even-line reading vertical coordinate "line corresponding to start time of current frame" of the read data set.

In step S394, the interpolation unit 132 reads a data set of "time timeHM=timeInt+2" from the data set memory 131. The interpolation unit 132 defines start pixel 2 as a horizontal direction reading start position "read start pixel" of the read data set. The interpolation unit 132 defines line 2 as the current frame even-line reading vertical coordinate "line corresponding to start time of current frame" of the read data set.

Here, when (HM−2)<(timeInt+2), the interpolation unit 132 defines start pixel 2 as the previous horizontal direction reading start position "read start pixel past" of the read data set and defines line 2 as the immediately previous frame even-line extension line reading vertical coordinate "line corresponding to start time of previous frame."

This is because the process synchronized with the clock clockHM has already been transferred to a subsequent frame at the time of timeInt+2 when (HM−2)<(timeInt+2). Accordingly, the previous horizontal direction reading start position "read start pixel past" and the immediately previous frame even-line extension line reading vertical coordinate "line corresponding to start time of previous frame" are used instead of the horizontal direction reading start position "read start pixel" and the current frame even-line reading vertical coordinate "line corresponding to start time of current frame."

In step S395 (FIG. 74), the interpolation unit 132 generates pixel data (line data 1) corresponding to 1 line and corresponding to the time timeInt synchronized with the cock clockHM. That is, the interpolation unit 132 reads the pixel data corresponding to 1 line in which the current time reading even-line "present read line for image capture" becomes a floor (line 1) (a line in which a value after a decimal point of a value defined as line 1 is truncated) or the pixel data corresponding to 1 line in which the current time reading odd-line "present read line for motion capture[3]" becomes a floor (line 1) (a line in which a value after a decimal point of a value defined as line 1 is truncated) from the line memory 130.

The interpolation unit 132 reads the pixel data corresponding to 1 line in which the current time reading even-line "present read line for image capture" is floor(line 1)+1 or the current time reading odd-line "present read line for motion capture[3]" is floor(line 1)+1, from the line memory 130 in which the pixel data is stored.

Since the value of the current time reading even-line "present read line for image capture" is an even number and the value of the current time reading odd-line "present read line for motion capture[3]" is an odd number, one piece of data read from the line memory 130 is each read.

The total number of H pixel data strings from the position of (start pixel 1) to the position of ((start pixel 1)+H−1) are generated with the (line 1)-th line from the pixel data corresponding to 2 lines which is the read data. Since the values of (line 1) and (start pixel 1) include decimal fraction portions, the interpolation unit 132 perform 2-dimensional linear interpolation at the time of the generation of the pixel data strings. The H pieces of data corresponding to 1 line are set to line data 1.

In step S396, the interpolation unit 132 generates pixel data (line data 2) corresponding to 1 line and corresponding to the time (timeInt+2) synchronized with the cock clockHM. That is, the interpolation unit 132 reads the pixel data corresponding to 1 line in which the current time reading even-line "present read line for image capture" becomes a floor (line 2) or the pixel data corresponding to 1 line in which the current time reading odd-line "present read line for motion capture[3]" becomes a floor (line 2) from the line memory 130. The interpolation unit 132 reads the data in which the current time reading even-line "present read line for image capture" is (floor(line 2)+1) or the current time reading odd-line "present read line for motion capture[3]" is (floor(line 2)+1), from the line memory 130.

Since the value of the current time reading even-line "present read line for image capture" is an even number and the value of the current time reading odd-line "present read line for motion capture[3]" is an odd number, one piece of pixel data corresponding to 1 line and read from the line memory 130 is each read.

The interpolation unit 132 generates the total number of H pixel data strings from the position of (start pixel 2) to the position of ((start pixel 2)+H−1) with the (line 2)-th line from the pixel data corresponding to 2 lines which is the read data. Since the values of (line 2) and (start pixel 2) include decimal fraction portions, the interpolation unit 132 perform 2-dimensional linear interpolation at the time of the generation of the pixel data strings. The H pieces of data corresponding to 1 line are set to line data 2.

In step S397, the interpolation unit 132 performs weighting addition on each piece of pixel data of the data line data 1 and line data 2 corresponding to 1 line at a ratio of (1.0−timeWeight):timeWeight using a time weight timeWeight and outputs new pixel data corresponding to 1 line as pixel data (Out Data) corresponding to 1 string at the current time (timeH).

That is, when the pixel values of the pixels at the same position in line data 1 and line data 2 are assumed to be Pd1 and Pd2, respectively, and the pixel value of the pixel at a corresponding position on a line to be obtained is assumed to Pd, the interpolation unit 132 calculates "Pd1×timeWeight+Pd2×(1.0−timeWeight)" in the case of the ratio of (1.0−timeWeight):timeWeight and the calculation result is set to a pixel value Pd on the line to be obtained, as shown in FIG. 75.

As described above, which position of which line on the image sensor 11 is good to read at the current time has been decided by the vertical direction movement amount deltaHperTwoClocklHM and the horizontal direction movement amount deltaWperTwoClocklHM, and the adaptive reading from the light-receiving elements of the image sensor 11 has been performed based on the decision result.

A motion of a subject within an exposure time is predicted from the vertical direction movement amount deltaHperTwoClocklHM and the horizontal direction movement amount deltaWperTwoClocklHM, and it is decided for the odd line how many the time interval between the immediately previous reading time and the current reading time of the even line is divided. The pixel data of the even line and the pixel data of the odd line are generated through linear interpolation (generated through the process described with reference to the flowchart of FIG. 74). Therefore, even when a blur may occur in normal imaging, it is possible to generate an image in which a blur and noise are suppressed by combining an image which is formed by the pixels of the even lines and in which a blur is present and an image which is formed by the pixels of the odd lines and in which noise is present but a blur is not present.

By comparing the pixel data of the odd line and the previous pixel data, the vertical direction movement amount deltaHperTwoClocklHM and the horizontal direction movement amount deltaWperTwoClocklHM have been obtained. Of course, when a gyro sensor is embedded in an imaging device, the vertical direction movement amount deltaHperTwoClocklHM and the horizontal direction movement amount deltaWperTwoClocklHM may be obtained using a detection result of the gyro sensor.

Figure 76:
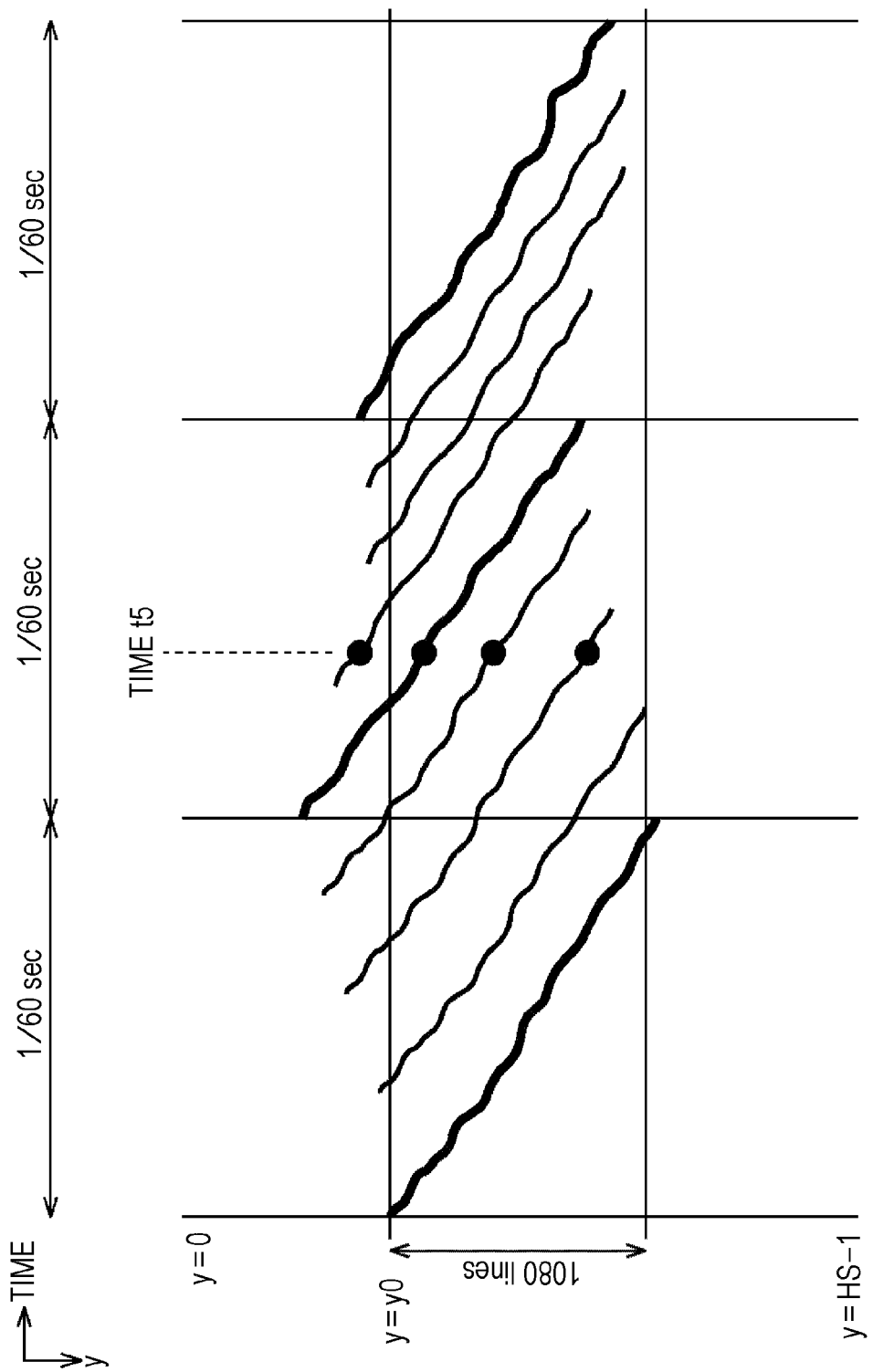
FIG. 76 is a diagram for describing waveforms obtained as reading timings of even and odd lines.

For example, in the case of the quadruple reading process of performing the resetting and the reading on the odd line 4 times at time intervals quartered from an interval between the immediately previous reading time and the current reading time of the even line, data of the odd lines formed by thick curves indicating the reading times of the even and odd lines and thin curves indicating the reading times of the odd lines in FIG. 76 are read. When a time t5 is focused on in FIG. 76, 4 lines corresponding to black circles in the drawing are read at the time t5.

In the image sensor to which an embodiment of the present technology is applied, a motion of a subject is detected in each of the read pixel lines in the 4 matching units 128-1 to 128-4. The 4 pixel lines are lines divided at the substantially equal intervals across 1080 lines and, for example, are not 4 lines or the like biased to the upper portion. Accordingly, the vertical direction movement amount deltaHperTwoClocklHM and the horizontal direction movement amount deltaWperTwoClocklHM can be detected robustly.

When the movement amounts are detected only in a portion (region) partially biased to a portion in a screen and the region is incidentally a subject projected image with no texture or a subject projected image with a repeatedly patterned design, erroneous determination may occur.

However, in an embodiment of the present technology, a region is not biased. Therefore, even when an undetermined region is present incidentally in a portion, a motion can be obtained robustly through the process of the matching unit 128 examining another region.

The above-described series of processes can be performed not only by hardware but also by software. When the series of processes are performed by software, a program of the software is installed from a recording medium to, for example, a computer in which dedicated hardware is embedded or a general personal computer capable of executing various functions by installing various programs.

Figure 77:
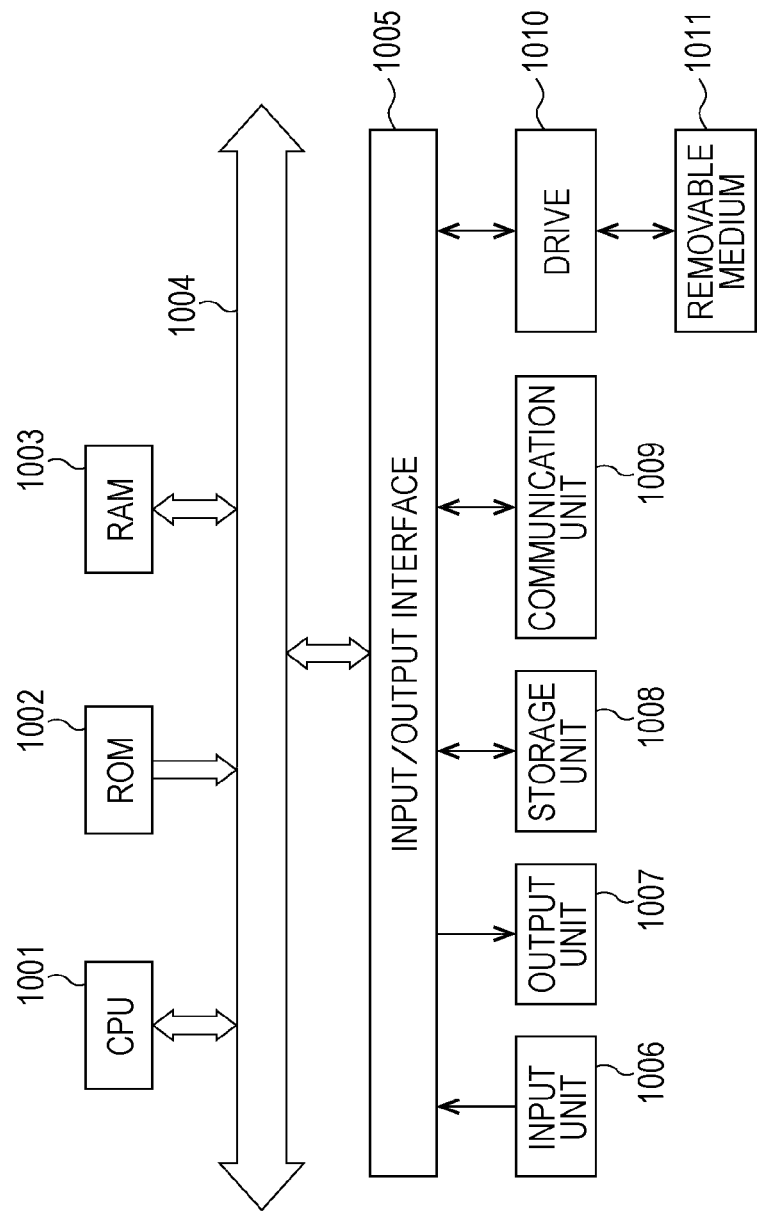
FIG. 77 is a diagram for describing an example of the configuration of a general personal computer.

FIG. 77 is a diagram illustrating an example of the configuration of a general personal computer. The personal computer includes a central processing unit (CPU) 1001. An input/output interface 1005 is connected to the CPU 1001 via a bus 1004. A read-only memory (ROM) 1002 and a random access memory (RAM) 1003 are connected to the bus 1004.

An input unit 1006 that includes an input device such as a keyboard or a mouse with which a user inputs an operation command, an output unit 1007 that outputs an image of a processing operation screen or a processing result to a display device, a storage unit 1008 that includes a hard disk drive storing a program or various kinds of data, and a communication unit 1009 that is configured by a local area network (LAN) adapter or the like and performs a communication process via a network such as the Internet are connected to the input/output interface 1005. A drive 1010 that reads and writes data from and on a removable medium 1011 such as a magnetic disc (including a flexible disc), an optical disc (including a compact disc-read only memory (CD-ROM) and a digital versatile disc (DVD)), a magneto-optic disc (including a mini disc (MD)), or a semiconductor memory is connected.

The CPU 1001 executes a program stored in the ROM 1002 or various processes according to a program read from the removable medium 1011 such as a magnetic disc, an optical disc, a magneto-optic disc, or a semiconductor memory, installed in the storage unit 1008, and loaded from the storage unit 1008 to the RAM 1003. The RAM 1003 properly stores data or the like necessary in various processes executed by the CPU 1001.

In the computer having the above-described configuration, the CPU 1001 executes the above-described series of processes, for example, by loading a program stored in the storage unit 1008 on the RAM 1003 via the input/output interface 1005 and the bus 1004 and executing the program.

A program executed by the computer (the CPU 1001) can be recorded on the removable medium 1011 which is, for example, a package medium to be provided. A program can be provided via a wired or wireless transmission medium such as a local area network, the Internet, a digital satellite broadcast.

In the computer, a program can be installed to the storage unit 1008 via the input/output interface 1005 by mounting the removable medium 1011 on the drive 1010. A program can be received via a wired or wireless transmission medium by the communication unit 1009 and can be installed to the storage unit 1008. A program can also be installed in advance to the ROM 1002 or the storage unit 1008.

A program executed by the computer may be a program that is processed chronologically in an order described in the present specification or may be a program that is processed in parallel or at a necessary timing such as a calling time.

In the present specification, a system means a collection of a plurality of constituent elements (devices, modules (components), and the like) and all of the constituent elements may be located or may not be located inside the same casing. Accordingly, a plurality of devices accommodated in separate casings and connected to each other via a network and a single device in which a plurality of modules are accommodated in a single casing are all systems.

Embodiments of the present technology are not limited to the above-described embodiments, but may be modified in various ways within the scope of the present technology without departing from the gist of the present technology.

For example, embodiments of the present technology can be configured to have a cloud computing configuration in which a single function is shared and are processed together by a plurality of devices via a network.

The steps described in the above-described flowcharts can be performed by a single device or can be shared and performed by a plurality of devices.

When a single step includes a plurality of processes, the plurality of processes included in the single step can be performed by a single device and can be shared and performed by a plurality of devices.

The present technology can also be configured as follows.

(1) An image sensor includes: a plurality of light-receiving elements that receive light from a subject and are arranged in a 2-dimensional form; a detection unit that detects a movement amount of a projected image of the subject projected to the plurality of light-receiving elements arranged in the 2-dimensional form; and a light-receiving element control unit that adaptively controls a timing at (1) which pixel data is read from the plurality of light-receiving elements arranged in the 2-dimensional form for each line according to the movement amount.

(2) In the image sensor described in (1), the detection unit may detect the movement amount using images captured previously and currently by the light-receiving elements or detect the movement amount using a gyro sensor.

(3) In the image sensor described in (1) or (2), the light-receiving element control unit may adaptively control reading for each line at a timing obtained by proration of chronological displacement of a line in which the pixel data is previously read from the plurality of light-receiving elements and chronological displacement of a line in which pixel data is currently read from the plurality of light-receiving elements.

(4) In the image sensor described in any one of (1) to (3), the light-receiving element control unit may calculate a coefficient proportional to a reciprocal of a ratio of an exposure time, in which the light-receiving elements are reset and the pixel data is then read, to a proper exposure time. The image sensor may further include a multiplication unit that adjusts a gain by multiplying pixel data generated when some of the plurality of light-receiving elements arranged in the 2-dimensional form receive light, by the coefficient.

(5) A method of operating an image sensor including a plurality of light-receiving elements that receive light from a subject and are arranged in a 2-dimensional form includes: detecting a movement amount of a projected image of the subject projected to the plurality of light-receiving elements arranged in the 2-dimensional form; and adaptively controlling a line in which pixel data is read from the plurality of light-receiving elements arranged in the 2-dimensional form according to the movement amount.

(6) A program causes a computer controlling an image sensor including a plurality of light-receiving elements that receive light from a subject and are arranged in a 2-dimensional form to perform a process including: detecting a movement amount of a projected image of the subject projected to the plurality of light-receiving elements arranged in the 2-dimensional form; and adaptively controlling a line in which pixel data is read from the plurality of light-receiving elements arranged in the 2-dimensional form according to the movement amount.

(7) An electronic device includes: a plurality of light-receiving elements that receive light from a subject and are arranged in a 2-dimensional form; a detection unit that detects a movement amount of a projected image of the subject projected to the plurality of light-receiving elements arranged in the 2-dimensional form; and a light-receiving element control unit that adaptively controls a timing at which pixel data is read from the plurality of light-receiving elements arranged in the 2-dimensional form for each line according to the movement amount.

(8) An image sensor includes: a plurality of light-receiving elements that receive light from a subject and are arranged in a 2-dimensional form; a detection unit that detects a movement amount of a projected image of the subject projected to the plurality of light-receiving elements arranged in the 2-dimensional form; and a light-receiving element control unit that adaptively controls an exposure time of some of the plurality of light-receiving elements arranged in the 2-dimensional form according to the movement amount such that the exposure time is adaptively shortened.

(9) In the image sensor described in (8), the detection unit may detect the movement amount using images captured previously and currently by the light-receiving elements or detect the movement amount using a gyro sensor.

(10) The image sensor described in (8) or (9) may further include a combining unit that combines pixel data captured by the some light-receiving elements of which the exposure time is controlled to be shortened and pixel data captured by the light-receiving elements excluding the some light-receiving elements.

(11) A method of operating an image sensor including a plurality of light-receiving elements that receive light from a subject and are arranged in a 2-dimensional form includes: detecting a movement amount of a projected image of the subject projected to the plurality of light-receiving elements arranged in the 2-dimensional form; and adaptively controlling an exposure time of some of the plurality of light-receiving elements arranged in the 2-dimensional form according to the movement amount such that the exposure time is adaptively shortened.

(12) A program causes a computer controlling an image sensor including a plurality of light-receiving elements that receive light from a subject and are arranged in a 2-dimensional form to perform a process including: detecting a movement amount of a projected image of the subject projected to the plurality of light-receiving elements arranged in the 2-dimensional form; and adaptively controlling an exposure time of some of the plurality of light-receiving elements arranged in the 2-dimensional form according to the movement amount such that the exposure time is adaptively shortened.

(13) An electronic device includes: a plurality of light-receiving elements that receive light from a subject and are arranged in a 2-dimensional form; a detection unit that detects a movement amount of a projected image of the subject projected to the plurality of light-receiving elements arranged in the 2-dimensional form; and a light-receiving element control unit that adaptively controls an exposure time of some of the plurality of light-receiving elements arranged in the 2-dimensional form according to the movement amount such that the exposure time is adaptively shortened.

(14) An image sensor includes: a plurality of light-receiving elements that receive light from a subject and are arranged in a 2-dimensional form; a detection unit that detects a movement amount of a projected image of the subject projected to the plurality of light-receiving elements arranged in the 2-dimensional form; and a light-receiving element control unit that adaptively controls an exposure time of some of the plurality of light-receiving elements arranged in the 2-dimensional form according to the movement amount such that the exposure time is adaptively shortened and imaging is performed a plurality of times.

(15) In the image sensor described in (14), the light-receiving element control unit may allow a word length of pixel data captured by the some light-receiving elements to be shorter than that of pixel data captured by the light-receiving elements excluding the some light-receiving elements.

(16) In the image sensor described in (14) or (15), the detection unit may detect the movement amount using images captured previously and currently by the some light-receiving elements or detect the movement amount using a gyro sensor.

(17) A method of operating an image sensor including a plurality of light-receiving elements that receive light from a subject and are arranged in a 2-dimensional form includes: detecting a movement amount of a projected image of the subject projected to the plurality of light-receiving elements arranged in the 2-dimensional form; and adaptively controlling an exposure time of some of the plurality of light-receiving elements arranged in the 2-dimensional form according to the movement amount such that the exposure time is adaptively shortened and imaging is performed a plurality of times.

(18) A program causes a computer controlling an image sensor including a plurality of light-receiving elements that receive light from a subject and are arranged in a 2-dimensional form to perform a process including: detecting a movement amount of a projected image of the subject projected to the plurality of light-receiving elements arranged in the 2-dimensional form; and adaptively controlling an exposure time of some of the plurality of light-receiving elements arranged in the 2-dimensional form according to the movement amount such that the exposure time is adaptively shortened and imaging is performed a plurality of times.

(19) An electronic device includes: a plurality of light-receiving elements that receive light from a subject and are arranged in a 2-dimensional form; a detection unit that detects a movement amount of a projected image of the subject projected to the plurality of light-receiving elements arranged in the 2-dimensional form; and a light-receiving element control unit that adaptively controls an exposure time of some of the plurality of light-receiving elements arranged in the 2-dimensional form according to the movement amount such that the exposure time is adaptively shortened and imaging is performed a plurality of times.

It should be understood by those skilled in the art that various modifications, combinations, sub-combinations and alterations may occur depending on design requirements and other factors insofar as they are within the scope of the appended claims or the equivalents thereof.

What is claimed is:

1. An image sensor comprising:
   a plurality of light-receiving elements that receive light from a subject and are arranged in a 2-dimensional form;
   a detection unit that detects a movement amount of a projected image of the subject projected to the plurality of light-receiving elements arranged in the 2-dimensional form; and
   a light-receiving element control unit that adaptively controls a timing at which pixel data is read from the plurality of light-receiving elements arranged in the 2-dimensional form for each line according to the movement amount,
   wherein the light-receiving element control unit calculates a coefficient proportional to a reciprocal of a ratio of an exposure time, in which the light-receiving elements are reset and the pixel data is then read, to a proper exposure time, and
   wherein the image sensor further comprises:
   a multiplication unit that adjusts a gain by multiplying pixel data generated when some of the plurality of light-receiving elements arranged in the 2-dimensional form receive light by the coefficient.

2. The image sensor according to claim 1, wherein the detection unit detects the movement amount using images captured previously and currently by the light-receiving elements or detects the movement amount using a gyro sensor.

3. The image sensor according to claim 1, wherein the light-receiving element control unit adaptively controls reading for each line at a timing obtained by proration of chronological displacement of a line in which the pixel data is previously read from the plurality of light-receiving elements and chronological displacement of a line in which pixel data is currently read from the plurality of light-receiving elements.

4. A method of operating an image sensor including a plurality of light-receiving elements that receive light from a subject and are arranged in a 2-dimensional form, the method comprising:
   detecting a movement amount of a projected image of the subject projected to the plurality of light-receiving elements arranged in the 2-dimensional form;
   adaptively controlling a line in which pixel data is read from the plurality of light-receiving elements arranged in the 2-dimensional form according to the movement amount;
   calculating a coefficient proportional to a reciprocal of a ratio of an exposure time, in which the light-receiving elements are reset and the pixel data is then read, to a proper exposure time; and
   adjusting a gain by multiplying pixel data generated when some of the plurality of light-receiving elements arranged in the 2-dimensional form receive light by the coefficient.

5. A program stored on a non-transitory computer readable medium causing a computer controlling an image sensor including a plurality of light-receiving elements that receive light from a subject and are arranged in a 2-dimensional form to perform a process comprising:
   detecting a movement amount of a projected image of the subject projected to the plurality of light-receiving elements arranged in the 2-dimensional form; and
   adaptively controlling a line in which pixel data is read from the plurality of light-receiving elements arranged in the 2-dimensional form according to the movement amount;
   calculating a coefficient proportional to a reciprocal of a ratio of an exposure time, in which the light-receiving elements are reset and the pixel data is then read, to a proper exposure time; and
   adjusting a gain by multiplying pixel data generated when some of the plurality of light-receiving elements arranged in the 2-dimensional form receive light by the coefficient.

6. An electronic device comprising:
   a plurality of light-receiving elements that receive light from a subject and are arranged in a 2-dimensional form;
   a detection unit that detects a movement amount of a projected image of the subject projected to the plurality of light-receiving elements arranged in the 2-dimensional form; and
   a light-receiving element control unit that adaptively controls a timing at which pixel data is read from the plurality of light-receiving elements arranged in the 2-dimensional form for each line according to the movement amount,
   wherein the light-receiving element control unit calculates a coefficient proportional to a reciprocal of a ratio of an exposure time, in which the light-receiving elements are reset and the pixel data is then read, to a proper exposure time, and
   wherein the image sensor further comprises:
   a multiplication unit that adjusts a gain by multiplying pixel data generated when some of the plurality of light-receiving elements arranged in the 2-dimensional form receive light by the coefficient.

7. The electronic device according to claim 6, wherein the detection unit detects the movement amount using images captured previously and currently by the light-receiving elements or detects the movement amount using a gyro sensor.

8. The electronic device according to claim 6, wherein the light-receiving element control unit adaptively controls reading for each line at a timing obtained by proration of chronological displacement of a line in which the pixel data is previously read from the plurality of light-receiving elements and chronological displacement of a line in which pixel data is currently read from the plurality of light-receiving elements.

9. The method according to claim 4, wherein detecting the movement amount includes using images captured previously and currently by the light-receiving elements or detecting the movement amount using a gyro sensor.

10. The method according to claim 4, wherein adaptively controlling a line in which pixel data is read includes adaptively controlling reading for each line at a timing obtained by proration of chronological displacement of a line in which the pixel data is previously read from the plurality of light-receiving elements and chronological displacement of a line in which pixel data is currently read from the plurality of light-receiving elements.

11. The program according to claim 5, wherein detecting the movement amount includes using images captured previously and currently by the light-receiving elements or detecting the movement amount using a gyro sensor.

12. The program according to claim 5, wherein adaptively controlling a line in which pixel data is read includes adaptively controlling reading for each line at a timing obtained by proration of chronological displacement of a line in which the pixel data is previously read from the plurality of light-receiving elements and chronological displacement of a line in which pixel data is currently read from the plurality of light-receiving elements.

\* \* \* \* \*